United States Patent
Kotlarsky et al.

(10) Patent No.: US 8,844,822 B2
(45) Date of Patent: *Sep. 30, 2014

(54) IMAGE CAPTURE AND PROCESSING SYSTEM SUPPORTING A MULTI-TIER MODULAR SOFTWARE ARCHITECTURE

(71) Applicant: Metrologic Instruments, Inc., Charlotte, NC (US)

(72) Inventors: Anatoly Kotlarsky, Holland, PA (US); Xiaoxun Zhu, Marlton, NJ (US)

(73) Assignee: Metrologic Instruments, Inc., Blackwood, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 13/758,461

(22) Filed: Feb. 4, 2013

(65) Prior Publication Data

US 2013/0200156 A1    Aug. 8, 2013

Related U.S. Application Data

(63) Continuation of application No. 12/975,781, filed on Dec. 22, 2010, now Pat. No. 8,366,005, which is a continuation of application No. 11/981,613, filed on Oct. 31, 2007, now Pat. No. 7,861,936, which is a continuation of application No. 11/640,814, filed on Dec. 18, 2006, now Pat. No. 7,708,205, which is a continuation-in-part of application No. 11/489,259, filed on Jul. 19, 2006, now Pat. No. 7,540,424, and a continuation-in-part of application No. 11/408,268, filed on Apr. 20, 2006, now Pat. No. 7,464,877, and a continuation-in-part of application No. 11/305,895, filed on Dec. 16, 2005, now Pat. No. 7,607,581, and a continuation-in-part of application No. 10/989,220, filed on Nov. 15, 2004, now Pat. No. 7,490,774, and a continuation-in-part of application No. 10/909,270, filed on Jul. 30, 2004, now Pat. No. 7,284,705, and a (Continued)

(51) Int. Cl.
*G03B 7/08* (2014.01)

(52) U.S. Cl.
USPC ............. 235/462.24; 235/462.15; 235/462.42

(58) Field of Classification Search
USPC ............. 235/462.24, 462.42, 462.15, 462.09
See application file for complete search history.

(56) References Cited

U.S. PATENT DOCUMENTS

| 4,338,514 A | 7/1982 | Bixby |
| 4,427,286 A | 1/1984 | Bosse |

(Continued)

FOREIGN PATENT DOCUMENTS

| EP | 1971952 A2 | 9/2011 |
| EP | 2477138 A1 | 7/2012 |

(Continued)

OTHER PUBLICATIONS

"The Customer's Guide to SwiftDecoderTM for Decoding Image Frames"; Omniplanar, Inc., pp. 282 (Nov. 8, 2006).

(Continued)

*Primary Examiner* — Ahshik Kim
(74) *Attorney, Agent, or Firm* — Additon, Higgins & Pendleton, P.A.

(57) ABSTRACT

An image capture and processing system supports a multi-tier modular software, and plug-in extendable, architecture. The image capture and processing system can be realized as an image-capturing cell phone, a digital camera, a video camera, mobile computing terminal and portable data terminal (PDT), provided with suitable hardware platform, communication protocols and user interfaces. A third-party customer can write and install a software plug-in into the application layer so as to enhance or modify the behavior of the image capture and processing system without any required knowledge of the hardware platform, communication protocols and/or user interfaces.

20 Claims, 108 Drawing Sheets

Related U.S. Application Data continuation-in-part of application No. 10/909,255, filed on Jul. 30, 2004, now Pat. No. 7,299,986, and a continuation-in-part of application No. 10/903,904, filed on Jul. 30, 2004, now Pat. No. 7,255,279, and a continuation-in-part of application No. 10/902,710, filed on Jul. 29, 2004, now Pat. No. 7,281,661, and a continuation-in-part of application No. 10/902,709, filed on Jul. 29, 2004, now Pat. No. 7,270,272, and a continuation-in-part of application No. 10/901,914, filed on Jul. 29, 2004, now Pat. No. 7,325,738, and a continuation-in-part of application No. 10/901,461, filed on Jul. 28, 2004, now Pat. No. 7,320,431, and a continuation-in-part of application No. 10/901,445, filed on Jul. 28, 2004, now Pat. No. 7,240,884, and a continuation-in-part of application No. 10/901,429, filed on Jul. 28, 2004, now Pat. No. 7,243,847, and a continuation-in-part of application No. 10/901,428, filed on Jul. 28, 2004, now Pat. No. 7,293,714, and a continuation-in-part of application No. 10/901,427, filed on Jul. 28, 2004, now Pat. No. 7,267,282, and a continuation-in-part of application No. 10/901,463, filed on Jul. 27, 2004, now Pat. No. 7,086,595, and a continuation-in-part of application No. 10/901,466, filed on Jul. 27, 2004, now Pat. No. 7,428,998, and a continuation-in-part of application No. 10/901,426, filed on Jul. 27, 2004, now Pat. No. 7,278,575, and a continuation-in-part of application No. 10/897,390, filed on Jul. 22, 2004, now Pat. No. 7,237,722, and a continuation-in-part of application No. 10/897,389, filed on Jul. 22, 2004, now Pat. No. 7,225,989, and a continuation-in-part of application No. 10/895,811, filed on Jul. 20, 2004, now Pat. No. 7,225,988, which is a continuation of application No. 10/895,271, filed on Jul. 20, 2004, now Pat. No. 7,216,810, and a continuation-in-part of application No. 10/894,478, filed on Jul. 19, 2004, now Pat. No. 7,357,325, and a continuation-in-part of application No. 10/894,477, filed on Jul. 19, 2004, now Pat. No. 7,360,706, and a continuation-in-part of application No. 10/894,412, filed on Jul. 19, 2004, now Pat. No. 7,213,762, and a continuation-in-part of application No. 10/894,476, filed on Jul. 16, 2004, now Pat. No. 7,178,733, and a continuation-in-part of application No. 10/893,800, filed on Jul. 16, 2004, now Pat. No. 7,273,180, and a continuation-in-part of application No. 10/893,798, filed on Jul. 16, 2004, now Pat. No. 7,185,817, and a continuation-in-part of application No. 10/893,797, filed on Jul. 16, 2004, now Pat. No. 7,188,770, and a continuation-in-part of application No. 10/712,787, filed on Nov. 13, 2003, now Pat. No. 7,128,266.

(56) References Cited

U.S. PATENT DOCUMENTS

| | | |
|---|---|---|
| 4,471,228 A | 9/1984 | Nishizawa et al. |
| 4,528,444 A | 7/1985 | Hara et al. |
| 4,538,060 A | 8/1985 | Sakai et al. |
| 4,547,139 A | 10/1985 | Hershberger |
| D297,432 S | 8/1988 | Stant et al. |
| 4,766,300 A | 8/1988 | Chadima, Jr. et al. |
| 4,794,239 A | 12/1988 | Allais |
| 4,805,026 A | 2/1989 | Oda |
| 4,816,916 A | 3/1989 | Okiyama |
| 4,818,847 A | 4/1989 | Hara et al. |
| 4,835,615 A | 5/1989 | Taniguchi et al. |
| D304,026 S | 10/1989 | Goodner et al. |
| 4,894,523 A | 1/1990 | Chadima, Jr. et al. |
| D308,865 S | 6/1990 | Weaver et al. |
| 4,952,966 A | 8/1990 | Ishida et al. |
| 4,996,413 A | 2/1991 | Mcdaniel et al. |
| 5,019,714 A | 5/1991 | Knowles |
| 5,025,319 A | 6/1991 | Mutoh et al. |
| 5,034,619 A | 7/1991 | Hammond, Jr. |
| 5,063,460 A | 11/1991 | Mutze et al. |
| 5,063,462 A | 11/1991 | Nakagawa et al. |
| 5,111,263 A | 5/1992 | Stevens |
| 5,124,537 A | 6/1992 | Chandler et al. |
| 5,142,684 A | 8/1992 | Perry et al. |
| 5,144,119 A | 9/1992 | Chadima, Jr. et al. |
| 5,221,956 A | 6/1993 | Patterson et al. |
| 5,231,293 A | 7/1993 | Longacre, Jr. |
| 5,233,169 A | 8/1993 | Longacre |
| 5,233,415 A | 8/1993 | French et al. |
| 5,235,198 A | 8/1993 | Stevens et al. |
| 5,253,198 A | 10/1993 | Birge et al. |
| 5,262,871 A | 11/1993 | Wilder et al. |
| 5,272,538 A | 12/1993 | Homma et al. |
| 5,281,800 A | 1/1994 | Pelton et al. |
| 5,286,960 A | 2/1994 | Longacre, Jr. et al. |
| 5,288,985 A | 2/1994 | Chadima, Jr. et al. |
| 5,291,008 A | 3/1994 | Havens et al. |
| 5,291,009 A | 3/1994 | Roustaei |
| 5,294,783 A | 3/1994 | Hammond, Jr. et al. |
| 5,296,689 A | 3/1994 | Reddersen et al. |
| D346,162 S | 4/1994 | Bennett et al. |
| 5,304,786 A | 4/1994 | Pavlidis et al. |
| 5,304,787 A | 4/1994 | Wang |
| 5,308,962 A | 5/1994 | Havens et al. |
| 5,309,243 A | 5/1994 | Tsai |
| 5,319,181 A | 6/1994 | Shellhammer et al. |
| 5,319,182 A | 6/1994 | Havens et al. |
| 5,331,118 A | 7/1994 | Jensen |
| 5,340,786 A | 8/1994 | Tsutsui et al. |
| 5,340,973 A | 8/1994 | Knowles et al. |
| 5,349,172 A | 9/1994 | Roustaei |
| 5,352,884 A | 10/1994 | Petrick et al. |
| 5,354,977 A | 10/1994 | Roustaei |
| 5,378,883 A | 1/1995 | Batterman et al. |
| 5,396,054 A | 3/1995 | Krichever et al. |
| 5,399,846 A | 3/1995 | Pavildis et al. |
| 5,410,141 A | 4/1995 | Koenck et al. |
| 5,418,357 A | 5/1995 | Inoue et al. |
| 5,420,409 A | 5/1995 | Longacre, Jr. et al. |
| 5,420,665 A | 5/1995 | Tagawa |
| 5,430,285 A | 7/1995 | Karpen et al. |
| 5,430,286 A | 7/1995 | Hammond, Jr. et al. |
| 5,450,291 A | 9/1995 | Kumagai |
| 5,457,309 A | 10/1995 | Pelton |
| 5,463,214 A | 10/1995 | Longacre et al. |
| 5,468,951 A | 11/1995 | Knowles et al. |
| 5,479,515 A | 12/1995 | Longacre, Jr. |
| 5,484,994 A | 1/1996 | Roustaei |
| 5,489,771 A | 2/1996 | Beach et al. |
| 5,491,330 A | 2/1996 | Sato et al. |
| 5,495,097 A | 2/1996 | Katz et al. |
| 5,502,297 A | 3/1996 | Sherman |
| 5,519,496 A | 5/1996 | Borgert et al. |
| 5,521,366 A | 5/1996 | Wang et al. |
| 5,532,467 A | 7/1996 | Roustaei |
| 5,541,419 A | 7/1996 | Arackellian |
| 5,550,366 A | 8/1996 | Roustaei |
| 5,572,006 A | 11/1996 | Wang et al. |
| 5,572,007 A | 11/1996 | Aragon et al. |
| 5,591,952 A | 1/1997 | Krichever et al. |
| 5,621,203 A | 4/1997 | Swartz et al. |
| 5,623,137 A | 4/1997 | Powers et al. |
| 5,635,697 A | 6/1997 | Shellhammer et al. |
| 5,637,851 A | 6/1997 | Swartz et al. |
| 5,646,390 A | 7/1997 | Wang et al. |
| 5,659,167 A | 8/1997 | Wang et al. |
| 5,659,761 A | 8/1997 | Dearras et al. |
| 5,661,291 A | 8/1997 | Ahearn et al. |
| 5,677,522 A | 10/1997 | Rice et al. |
| 5,702,059 A | 12/1997 | Chu et al. |

| | | | | | | |
|---|---|---|---|---|---|---|
| 5,710,417 | A | 1/1998 | Joseph et al. | 6,123,261 A | 9/2000 | Roustaei |
| 5,717,195 | A | 2/1998 | Feng et al. | 6,123,263 A | 9/2000 | Feng |
| 5,717,221 | A | 2/1998 | Li et al. | 6,128,414 A | 10/2000 | Liu |
| 5,719,384 | A | 2/1998 | Ju et al. | 6,141,046 A | 10/2000 | Roth et al. |
| 5,723,853 | A | 3/1998 | Longacre et al. | 6,149,063 A | 11/2000 | Reynolds et al. |
| 5,723,868 | A | 3/1998 | Hammond, Jr. et al. | 6,152,371 A | 11/2000 | Schwartz et al. |
| 5,736,724 | A | 4/1998 | Ju et al. | 6,158,661 A | 12/2000 | Chadima, Jr. et al. |
| 5,739,518 | A | 4/1998 | Wang | 6,161,760 A | 12/2000 | Marrs et al. |
| 5,747,796 | A | 5/1998 | Heard | 6,164,544 A | 12/2000 | Schwartz et al. |
| 5,754,227 | A | 5/1998 | Fukuoka | 6,173,893 B1 | 1/2001 | Maltsev et al. |
| 5,756,981 | A | 5/1998 | Roustaei et al. | 6,177,926 B1 | 1/2001 | Kunert |
| 5,773,806 | A | 6/1998 | Longacre | 6,177,957 B1 | 1/2001 | Anderson |
| 5,773,810 | A | 6/1998 | Hussey et al. | 6,179,208 B1 | 1/2001 | Feng |
| D396,033 | S | 7/1998 | Ahearn et al. | 6,188,381 B1 | 2/2001 | Van Der Wall et al. |
| 5,777,314 | A | 7/1998 | Roustaei | 6,209,789 B1 | 4/2001 | Amundsen et al. |
| 5,780,834 | A | 7/1998 | Havens et al. | D442,152 S | 5/2001 | Roustaei |
| 5,783,811 | A | 7/1998 | Feng et al. | 6,223,986 B1 | 5/2001 | Bobba et al. |
| 5,784,102 | A | 7/1998 | Hussey et al. | 6,223,988 B1 | 5/2001 | Batterman et al. |
| 5,786,582 | A | 7/1998 | Roustaei et al. | 6,233,986 B1 | 5/2001 | Suzuki et al. |
| 5,786,583 | A | 7/1998 | Maltsev | 6,234,395 B1 | 5/2001 | Chadima, Jr. et al. |
| 5,786,586 | A | 7/1998 | Pidhirny et al. | 6,244,512 B1 | 6/2001 | Koenck et al. |
| 5,793,033 | A | 8/1998 | Feng et al. | 6,250,551 B1 | 6/2001 | He et al. |
| 5,793,967 | A | 8/1998 | Simciak et al. | 6,254,003 B1 | 7/2001 | Pettinelli et al. |
| 5,797,015 | A | 8/1998 | Daniels, Jr. et al. | 6,264,105 B1 | 7/2001 | Longacre, Jr. et al. |
| 5,808,286 | A | 9/1998 | Nukui et al. | 6,266,685 B1 | 7/2001 | Danielson et al. |
| 5,811,774 | A | 9/1998 | Ju et al. | 6,275,388 B1 | 8/2001 | Hennick et al. |
| 5,811,784 | A | 9/1998 | Tausch et al. | 6,298,175 B1 | 10/2001 | Longacre, Jr. et al. |
| 5,815,200 | A | 9/1998 | Ju et al. | 6,298,176 B2 | 10/2001 | Longacre, Jr. et al. |
| 5,821,518 | A | 10/1998 | Sussmeier et al. | 6,321,989 B1 | 11/2001 | Wilz, Sr. et al. |
| 5,825,006 | A | 10/1998 | Longacre et al. | 6,330,974 B1 | 12/2001 | Ackley |
| 5,825,010 | A | 10/1998 | Charych et al. | 6,336,587 B1 | 1/2002 | He et al. |
| 5,831,254 | A | 11/1998 | Karpen et al. | 6,340,114 B1 | 1/2002 | Correa et al. |
| 5,831,674 | A | 11/1998 | Ju et al. | 6,345,765 B1 | 2/2002 | Wiklof |
| 5,834,754 | A | 11/1998 | Feng et al. | 6,347,163 B2 | 2/2002 | Roustaei |
| 5,837,985 | A | 11/1998 | Karpen | 6,357,659 B1 | 3/2002 | Kelly et al. |
| 5,838,495 | A | 11/1998 | Hennick | 6,360,947 B1 | 3/2002 | Knowles et al. |
| 5,841,121 | A | 11/1998 | Koenck | 6,367,699 B2 | 4/2002 | Ackley |
| 5,867,594 | A | 2/1999 | Cymbaiski | 6,370,003 B1 | 4/2002 | Hennick |
| 5,883,375 | A | 3/1999 | Knowles et al. | 6,371,374 B1 | 4/2002 | Schwartz et al. |
| 5,900,613 | A | 5/1999 | Koziol et al. | 6,373,579 B1 | 4/2002 | Ober et al. |
| 5,914,476 | A | 6/1999 | Gerst et al. | 6,385,352 B1 | 5/2002 | Roustaei |
| 5,914,477 | A | 6/1999 | Wang | 6,390,625 B1 | 5/2002 | Slawson et al. |
| 5,920,061 | A | 7/1999 | Feng | D458,265 S | 6/2002 | Fitch |
| 5,929,418 | A | 7/1999 | Ehrhart et al. | 6,398,112 B1 | 6/2002 | Li et al. |
| 5,932,741 | A | 8/1999 | Heckmann et al. | D459,728 S | 7/2002 | Roberts et al. |
| 5,932,862 | A | 8/1999 | Hussey et al. | 6,419,157 B1 | 7/2002 | Ehrhart et al. |
| 5,942,741 | A | 8/1999 | Longacre et al. | 6,421,703 B1 | 7/2002 | Steinmetz et al. |
| 5,949,052 | A | 9/1999 | Longacre, Jr. et al. | 6,431,452 B2 | 8/2002 | Feng |
| 5,949,054 | A | 9/1999 | Karpen et al. | 6,435,411 B1 | 8/2002 | Massieu et al. |
| 5,949,057 | A | 9/1999 | Feng | 6,469,289 B1 | 10/2002 | Scott-Thomas et al. |
| 5,953,534 | A | 9/1999 | Romer et al. | 6,473,519 B1 | 10/2002 | Pidhirny et al. |
| 5,965,863 | A | 10/1999 | Parker et al. | 6,478,223 B1 | 11/2002 | Ackley |
| 5,970,245 | A | 10/1999 | Poteat et al. | D467,918 S | 12/2002 | Fitch et al. |
| 5,979,763 | A | 11/1999 | Wang et al. | 6,489,798 B1 | 12/2002 | Scott-Thomas et al. |
| 5,986,705 | A | 11/1999 | Shibuya et al. | 6,491,223 B1 | 12/2002 | Longacre, Jr. et al. |
| 5,992,744 | A | 11/1999 | Smith et al. | 6,497,368 B1 | 12/2002 | Friend et al. |
| 5,992,750 | A | 11/1999 | Chadima, Jr. et al. | 6,499,664 B2 | 12/2002 | Knowles et al. |
| 6,000,612 | A | 12/1999 | Xu | 6,527,182 B1 | 3/2003 | Chiba et al. |
| 6,005,959 | A | 12/1999 | Mohan et al. | 6,547,139 B1 | 4/2003 | Havens et al. |
| RE36,528 | E | 1/2000 | Roustaei | 6,550,679 B2 | 4/2003 | Hennick et al. |
| 6,015,088 | A | 1/2000 | Parker et al. | 6,561,428 B2 | 5/2003 | Meier et al. |
| 6,016,135 | A | 1/2000 | Biss et al. | 6,565,003 B1 | 5/2003 | Ma |
| 6,016,612 | A | 1/2000 | Kruwinus | 6,575,367 B1 | 6/2003 | Longacre, Jr. |
| 6,019,286 | A | 2/2000 | Li et al. | 6,575,369 B1 | 6/2003 | Knowles et al. |
| 6,044,231 | A | 3/2000 | Soshi et al. | 6,578,766 B1 | 6/2003 | Parker et al. |
| 6,045,047 | A | 4/2000 | Pidhirny et al. | 6,585,159 B1 | 7/2003 | Meier et al. |
| 6,060,722 | A | 5/2000 | Havens et al. | 6,601,768 B1 | 8/2003 | Mccall et al. |
| 6,062,475 | A | 5/2000 | Feng | 6,607,128 B1 | 8/2003 | Schwartz et al. |
| 6,064,763 | A | 5/2000 | Maltsev | 6,616,046 B1 | 9/2003 | Barkan et al. |
| 6,075,882 | A | 6/2000 | Mullins et al. | 6,619,547 B2 | 9/2003 | Crowther et al. |
| 6,095,422 | A | 8/2000 | Ogami | 6,619,549 B2 | 9/2003 | Zhu et al. |
| 6,097,839 | A | 8/2000 | Liu | 6,628,445 B2 | 9/2003 | Chaleff et al. |
| 6,097,856 | A | 8/2000 | Hammond, Jr. | 6,637,655 B1 | 10/2003 | Hudrick et al. |
| 6,098,887 | A | 8/2000 | Figarella et al. | 6,637,658 B2 | 10/2003 | Barber et al. |
| 6,108,100 | A | 8/2000 | Mcvey et al. | 6,637,659 B2 | 10/2003 | Wilz, Sr. et al. |
| 6,109,526 | A | 8/2000 | Ohanian et al. | 6,655,595 B1 | 12/2003 | Longacre et al. |
| 6,109,528 | A | 8/2000 | Kunert et al. | 6,659,350 B2 | 12/2003 | Schwartz et al. |
| 6,119,941 | A | 9/2000 | Katsandres et al. | 6,669,093 B1 | 12/2003 | Meyerson et al. |
| | | | | 6,679,848 B2 | 1/2004 | Arling et al. |

| | | |
|---|---|---|
| 6,681,994 B1 | 1/2004 | Koenck |
| 6,685,095 B2 | 2/2004 | Roustaei et al. |
| 6,689,998 B1 | 2/2004 | Bremer |
| 6,695,209 B1 | 2/2004 | La |
| 6,698,656 B2 | 3/2004 | Parker et al. |
| 6,708,883 B2 | 3/2004 | Krichever |
| 6,722,569 B2 | 4/2004 | Ehrhart et al. |
| 6,736,320 B1 | 5/2004 | Crowther et al. |
| 6,752,310 B2 | 6/2004 | VanHoutte et al. |
| 6,752,319 B2 | 6/2004 | Ehrhart et al. |
| 6,758,402 B1 | 7/2004 | Check et al. |
| 6,758,403 B1 | 7/2004 | Keys et al. |
| 6,763,395 B1 | 7/2004 | Austin |
| 6,789,157 B1 | 9/2004 | Lija et al. |
| 6,814,290 B2 | 11/2004 | Longacre |
| 6,814,292 B2 | 11/2004 | Good |
| 6,831,690 B1 | 12/2004 | John et al. |
| 6,832,725 B2 | 12/2004 | Gardiner et al. |
| 6,834,807 B2 | 12/2004 | Ehrhart et al. |
| 6,845,915 B2 | 1/2005 | Krichever et al. |
| 6,856,440 B2 | 2/2005 | Chaleff et al. |
| 6,863,217 B2 | 3/2005 | Hudrick et al. |
| 6,865,742 B1 | 3/2005 | Khare et al. |
| 6,871,993 B2 | 3/2005 | Hecht |
| D505,423 S | 5/2005 | Ahearn et al. |
| 6,899,273 B2 | 5/2005 | Hussey et al. |
| 6,912,076 B2 | 6/2005 | Chaleff et al. |
| 6,918,540 B2 | 7/2005 | Good |
| 6,940,998 B2 | 9/2005 | Garoutie |
| 6,942,151 B2 | 9/2005 | Ehrhart |
| 6,947,612 B2 | 9/2005 | Helms et al. |
| 6,951,304 B2 | 10/2005 | Good |
| 6,959,865 B2 | 11/2005 | Walczyk et al. |
| 6,969,003 B2 | 11/2005 | Havens et al. |
| 6,991,169 B2 | 1/2006 | Bobba et al. |
| 6,999,802 B2 | 2/2006 | Kim |
| 7,025,272 B2 | 4/2006 | Yavid et al. |
| 7,044,378 B2 | 5/2006 | Patel et al. |
| 7,055,747 B2 | 6/2006 | Havens et al. |
| 7,059,525 B2 | 6/2006 | Longacre et al. |
| 7,069,562 B2 | 6/2006 | Kushnirskiy et al. |
| 7,073,178 B2 | 7/2006 | De Bonet et al. |
| 7,077,317 B2 | 7/2006 | Longacre, Jr. et al. |
| 7,077,321 B2 | 7/2006 | Longacre, Jr. et al. |
| 7,077,327 B1 | 7/2006 | Knowles et al. |
| 7,080,786 B2 | 7/2006 | Longacre, Jr. et al. |
| 7,086,595 B2 | 8/2006 | Zhu et al. |
| 7,086,596 B2 | 8/2006 | Meier et al. |
| 7,086,597 B2 | 8/2006 | Good |
| 7,097,101 B2 | 8/2006 | Kogan et al. |
| 7,100,832 B2 | 9/2006 | Good |
| 7,128,266 B2 | 10/2006 | Zhu et al. |
| 7,129,961 B1 | 10/2006 | Samra |
| 7,148,923 B2 | 12/2006 | Harper et al. |
| 7,178,733 B2 | 2/2007 | Zhu et al. |
| 7,185,817 B2 | 3/2007 | Zhu et al. |
| 7,188,770 B2 | 3/2007 | Zhu et al. |
| 7,195,164 B2 | 3/2007 | Patel |
| 7,213,762 B2 | 5/2007 | Zhu et al. |
| 7,216,810 B2 | 5/2007 | Zhu et al. |
| 7,225,430 B2 | 5/2007 | Eatough et al. |
| 7,225,988 B2 | 6/2007 | Zhu et al. |
| 7,225,989 B2 | 6/2007 | Zhu et al. |
| 7,237,722 B2 | 7/2007 | Zhu et al. |
| 7,240,059 B2 | 7/2007 | Bayliss et al. |
| 7,240,844 B2 | 7/2007 | Zhu et al. |
| 7,243,847 B2 | 7/2007 | Zhu et al. |
| 7,245,404 B2 | 7/2007 | Bushey et al. |
| 7,246,872 B2 | 7/2007 | Park |
| 7,255,279 B2 | 8/2007 | Zhu et al. |
| 7,257,816 B2 | 8/2007 | Kulp et al. |
| 7,261,238 B1 | 8/2007 | Carlson et al. |
| 7,262,783 B2 | 8/2007 | Kramer et al. |
| 7,267,282 B2 | 9/2007 | Zhu et al. |
| 7,270,272 B2 | 9/2007 | Zhu et al. |
| 7,273,180 B2 | 9/2007 | Zhu et al. |
| 7,278,575 B2 | 10/2007 | Zhu et al. |
| 7,281,661 B2 | 10/2007 | Zhu et al. |
| 7,284,705 B2 | 10/2007 | Zhu et al. |
| 7,293,714 B2 | 11/2007 | Zhu et al. |
| 7,296,748 B2 | 11/2007 | Good |
| 7,299,986 B2 | 11/2007 | Zhu et al. |
| 7,302,462 B2 | 11/2007 | Kulp et al. |
| 7,320,075 B2 | 1/2008 | Sotoodeh et al. |
| 7,320,431 B2 | 1/2008 | Zhu et al. |
| 7,325,738 B2 | 2/2008 | Zhu et al. |
| 7,331,523 B2 | 2/2008 | Meier et al. |
| 7,350,201 B2 | 3/2008 | Ferri et al. |
| 7,357,325 B2 | 4/2008 | Zhu et al. |
| 7,360,706 B2 | 4/2008 | Zhu et al. |
| 7,403,707 B2 | 7/2008 | Raskar et al. |
| 7,428,998 B2 | 9/2008 | Zhu et al. |
| 7,464,877 B2 | 12/2008 | Kotlarsky et al. |
| 7,490,774 B2 | 2/2009 | Zhu et al. |
| 7,490,778 B2 | 2/2009 | Zhu et al. |
| 7,540,424 B2 | 6/2009 | Knowles et al. |
| 7,559,475 B2 | 7/2009 | Kotlarsky et al. |
| 7,588,190 B2 | 9/2009 | Zhu et al. |
| 7,594,609 B2 | 9/2009 | Kotlarsky et al. |
| 7,607,581 B2 | 10/2009 | Kotlarsky et al. |
| 7,637,432 B2 | 12/2009 | Kotlarsky et al. |
| 7,654,461 B2 | 2/2010 | Kotlarsky et al. |
| 7,708,205 B2 | 5/2010 | Kotlarsky et al. |
| 7,712,666 B2 | 5/2010 | Kotlarsky et al. |
| 7,770,798 B2 | 8/2010 | Kotlarsky et al. |
| 7,789,309 B2 | 9/2010 | Kotlarsky et al. |
| 7,815,121 B2 | 10/2010 | Kotlarsky et al. |
| 7,861,936 B2 | 1/2011 | Kotlarsky et al. |
| 7,950,583 B2 | 5/2011 | Kotlarsky et al. |
| 8,052,057 B2 | 11/2011 | Smith et al. |
| 8,157,174 B2 | 4/2012 | Kotlarsky et al. |
| 8,366,005 B2 * | 2/2013 | Kotlarsky et al. ........ 235/462.24 |
| 2002/0008968 A1 | 1/2002 | Hennick et al. |
| 2002/0096566 A1 | 7/2002 | Schwartz et al. |
| 2002/0150309 A1 | 10/2002 | Hepworth et al. |
| 2002/0170970 A1 | 11/2002 | Ehrhart |
| 2002/0171745 A1 | 11/2002 | Ehrhart |
| 2002/0179713 A1 | 12/2002 | Pettinelli et al. |
| 2002/0191830 A1 | 12/2002 | Pidhirny et al. |
| 2003/0062418 A1 | 4/2003 | Barber et al. |
| 2003/0062419 A1 | 4/2003 | Ehrhart et al. |
| 2003/0085282 A1 | 5/2003 | Parker et al. |
| 2003/0197063 A1 | 10/2003 | Longacre |
| 2003/0209603 A1 | 11/2003 | Schwartz et al. |
| 2003/0213847 A1 | 11/2003 | McCali et al. |
| 2003/0218069 A1 | 11/2003 | Meier et al. |
| 2004/0000592 A1 | 1/2004 | Schwartz et al. |
| 2004/0004125 A1 | 1/2004 | Havens et al. |
| 2004/0094627 A1 | 5/2004 | Parker et al. |
| 2004/0177361 A1 | 9/2004 | Bernhard et al. |
| 2004/0195328 A1 | 10/2004 | Barber et al. |
| 2005/0167504 A1 | 8/2005 | Meier et al. |
| 2005/0218231 A1 | 10/2005 | Massieu |
| 2005/0246718 A1 | 11/2005 | Erlingsson et al. |
| 2005/0274801 A1 | 12/2005 | Harding et al. |
| 2006/0180670 A1 | 8/2006 | Acosta et al. |
| 2006/0208083 A1 | 9/2006 | Kotlarsky et al. |
| 2008/0164313 A1 | 7/2008 | Kotlarsky et al. |
| 2011/0284625 A1 | 11/2011 | Smith et al. |

FOREIGN PATENT DOCUMENTS

| | | |
|---|---|---|
| WO | 9944360 | 9/1999 |
| WO | 2007075519 A2 | 7/2007 |

OTHER PUBLICATIONS

"4600r Retail 2D Imager by Handheld Products", Hand Held Products, www.handheld.com, pp. 2 (Apr. 2007).

"Code Reader 2.0 (CR2)—All Applications Reader", Code Corporation, www.codecorp.com pp. 10 (Apr. 6, 2004).

"LM9638 Monochrome CMOS Image Sensor SXGA 18 FPS", National Semiconductor, www.national.com, pp. 2, (2000).

"LMC555 CMOS Timer", National Semiconductor Corporation, pp. 10 (Mar. 2002).

"MagTek's MICRImage Transmits Check Images at Speed of Ethernet", Mag-Tek, pp. 2 (Feb. 14, 2002).

(56) References Cited

OTHER PUBLICATIONS

"Wearable Scanners", Symbol Technologies, Inc. pp. 2 (Sep. 2000).
Haynes, Simon D. et al., "SONIC-A Plug-In Architecture for Video Processing", Seventh Annual IEEE Symposium on Field-Programmable Custom Computing Machines, pp. 280 (1999).
International Search Report for International Application No. PCT/US06/48148 (WO2007075519), dated Sep. 19, 2007.
Kotlarsky, Anatoly, "The Spark Real-Time Kernel", Dr. Dobb's Portal, pp. 6 (May 1, 1999).
Miller, Benjamin, "Code Corporation's New Imager Offers Revolutionary Performance and Bluetooth Radio", Codex Corporation, pp. 2 (Feb. 19, 2003).
Google Inc: "Nexus One User's Guide", (Oct. 15, 2010) XP55024684, as cited in EP Search Report for EP Application No. 12151007.7 (Issued as EP2477138), pp. 17, 74, 241-248, 297-333.
Search Report for EP Application No. 12151007.7 (Issued as EP2477138) dated May 9, 2012, pp. 2.

\* cited by examiner

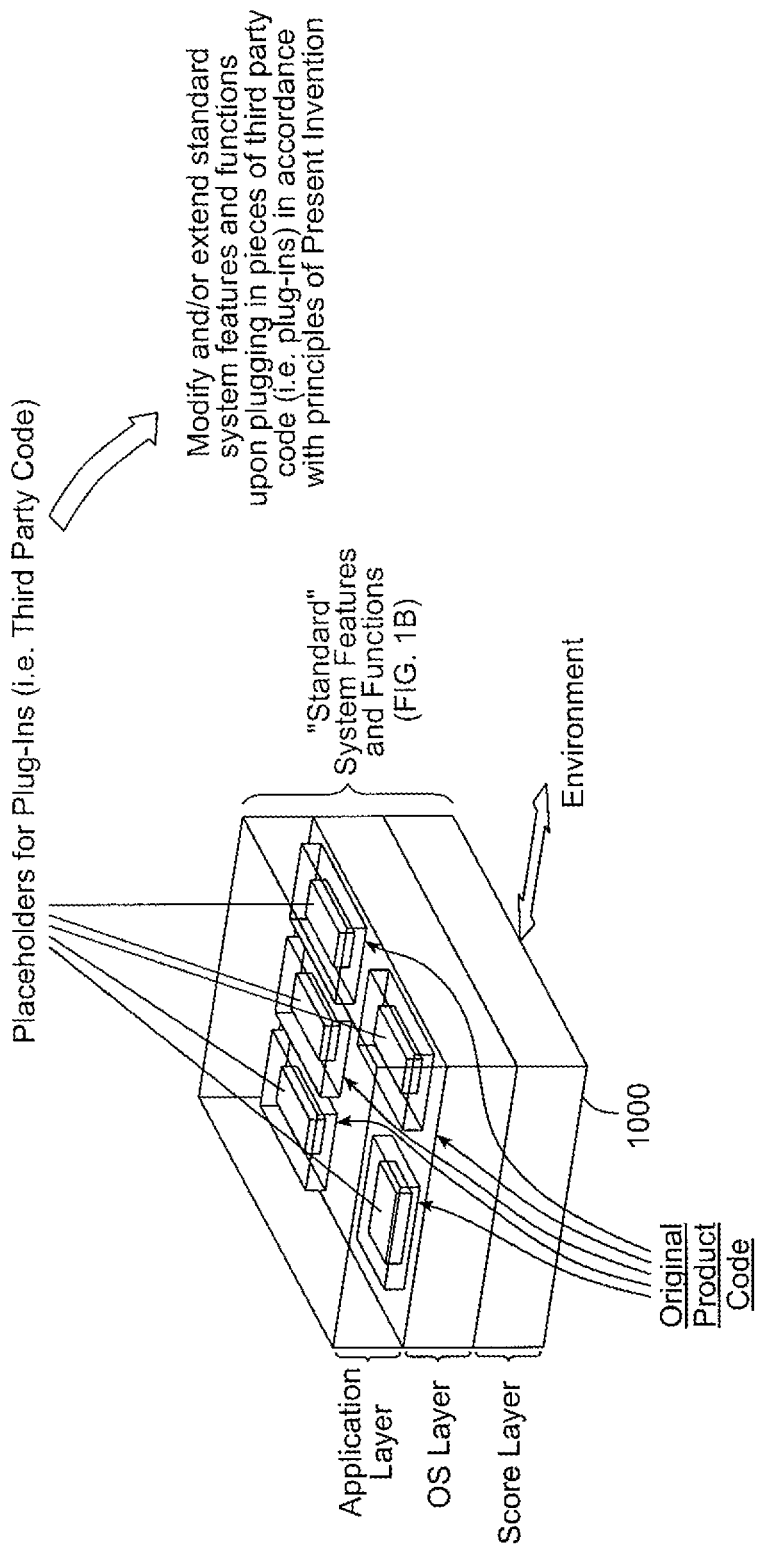

Standard Features And Functions
Supportable Upon Multi-Tier Software Architecture
Of The Digital Image Capture And Processing
Of The Present Invention System Triggering Feature (i.e. Trigger Event Generation): Object Presence Detection Subsystem
Standard System Functions:
Automatic Triggering (i.e. IR Object Presence Detection) (e.g. ON, OFF).:
Manual Triggering (e.g. ON, OFF)
Semi-Automatic Triggering (e.g. ON, OFF)

Object Range Detection Feature: Object Range Detection Subsystem
Standard System Functions:
(IR-Based) Long/Short Range Detection (e.g. ON, OFF)
(IR-Based) Quantized/Incremental Range Detection (e.g. ON, OFF)

Object Velocity Detection Feature: Object Velocity Detection Subsystem
Standard System Functions:
LIDAR-Based Object Velocity Detection (e.g. ON, OFF)
IR-PULSE-DOPPLER Object Velocity Detection (e.g. ON, OFF)

Object Dimensioning Feature: Object Dimensioning Subsystem
Standard System Functions:
LIDAR-based Object Dimensioning (e.g. ON or OFF)
Structured-Laser Light Object Dimensioning (e.g. ON or OFF)

Field of View (FOV) Illumination Feature: Illumination Subsystem
Standard System Functions:
Illumination Mode (e.g. Ambient/OFF, LED Continuous, and LED Strobe/Flash)
Automatic Illumination Control (i.e. ON or OFF)
Illumination Field Type (e.g. Narrow-Area Near-Field Illumination, Wide-Area Far-Field Illumination, Narrow-Area Field Of Illumination, Wide-Area Field Of Illumination)

FIG. 1C1

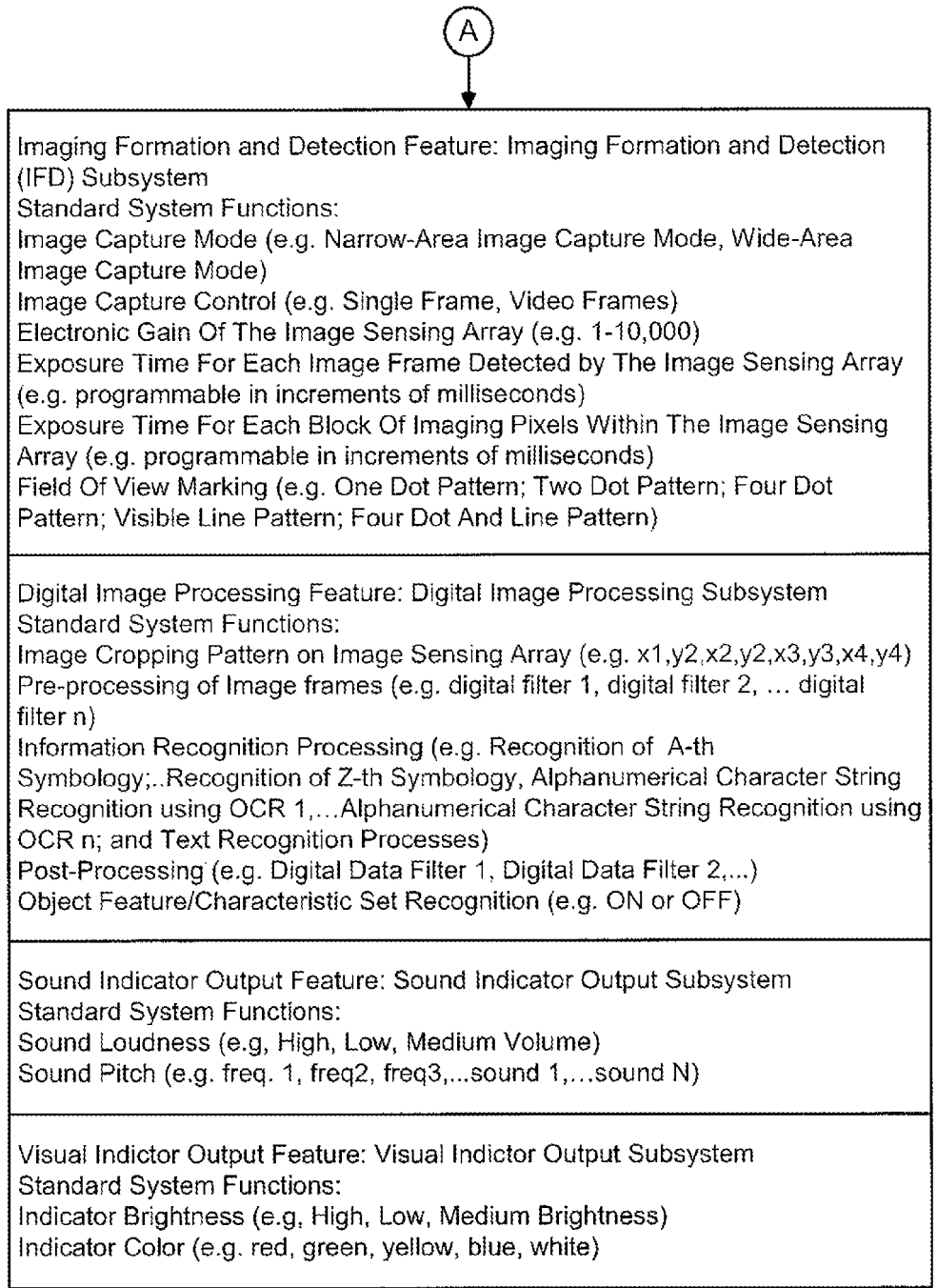
FIG. 1C2

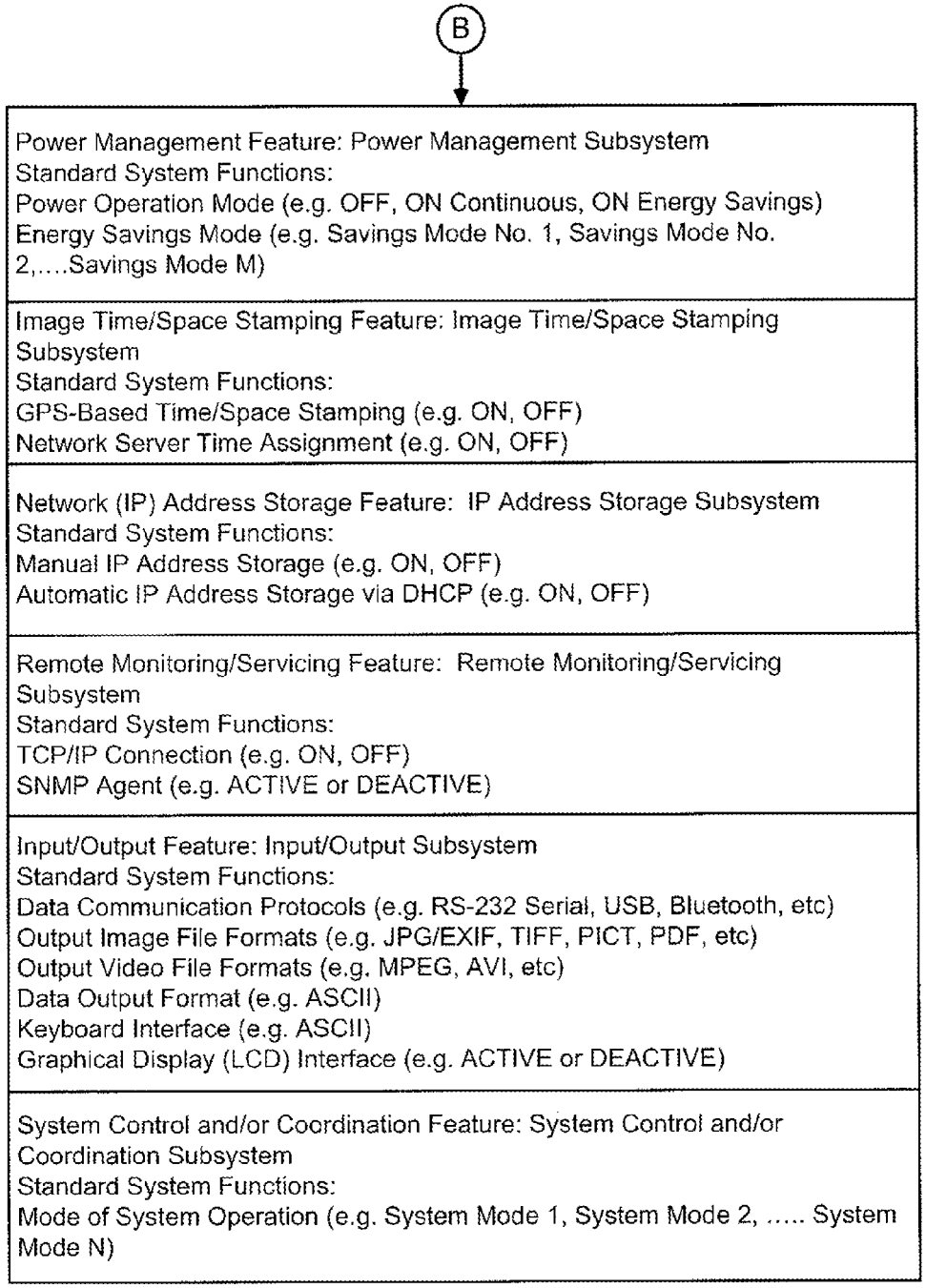
FIG. 1C3

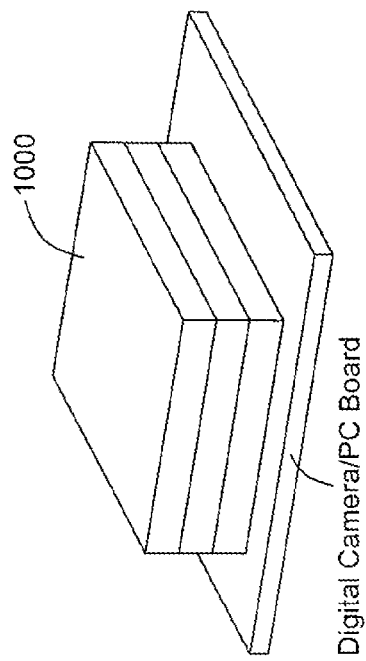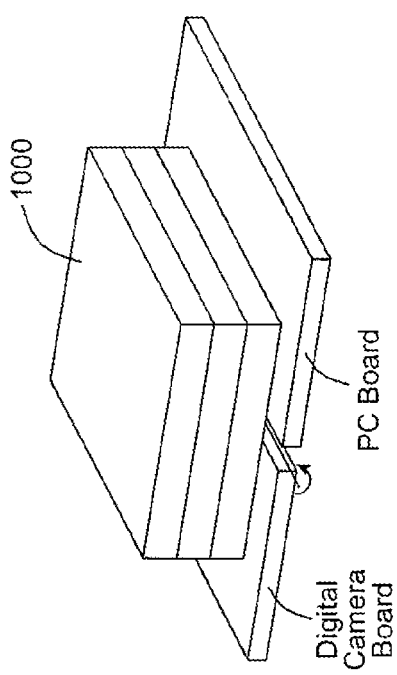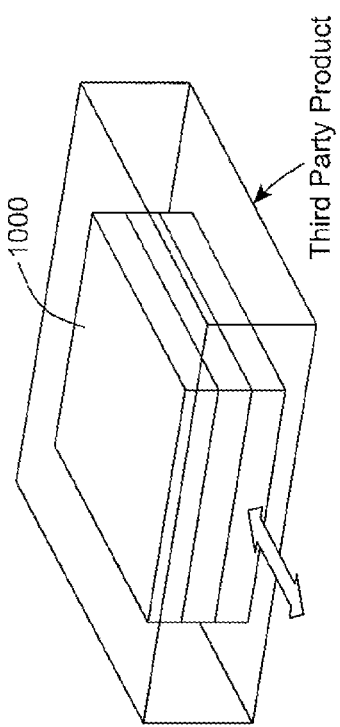

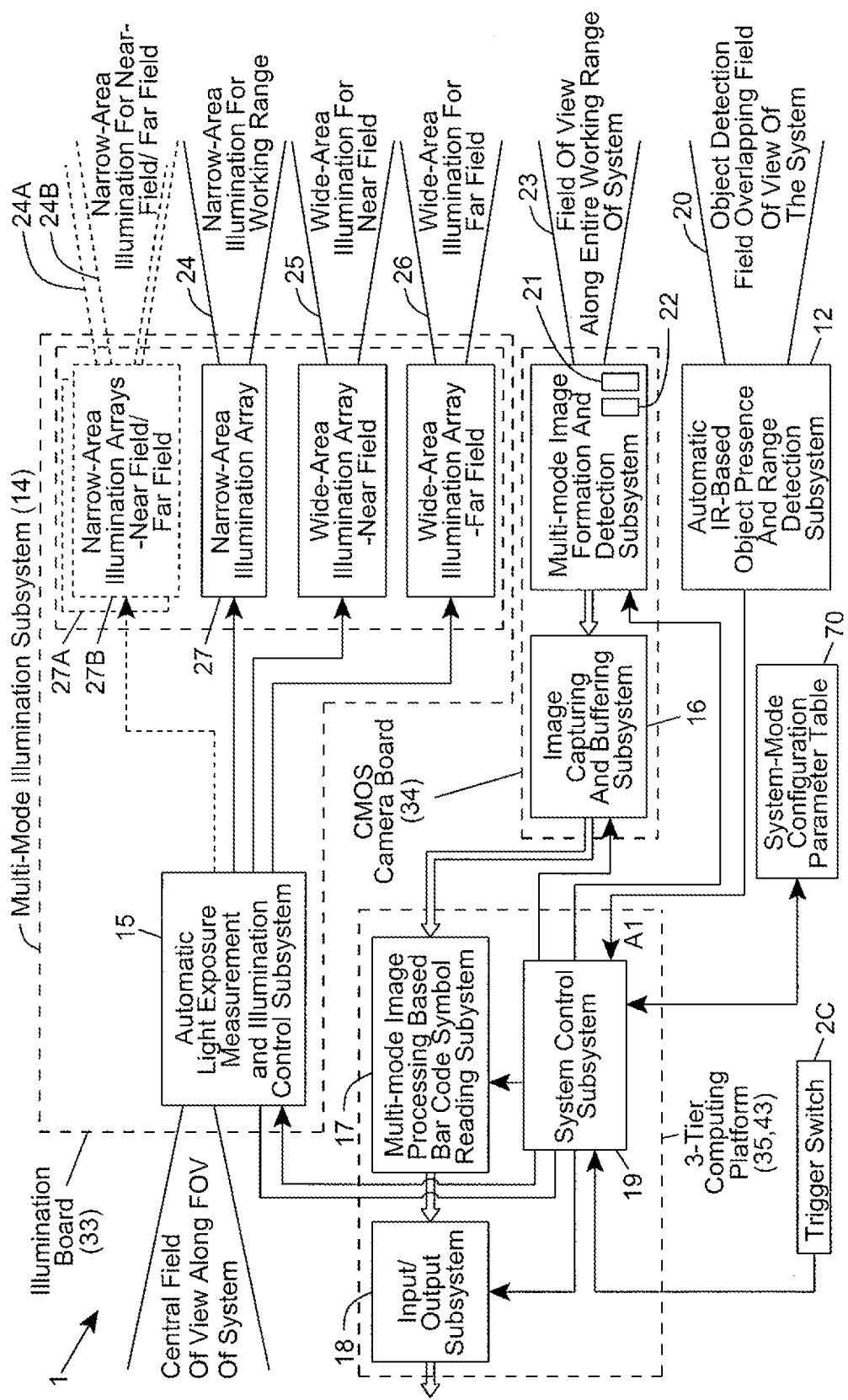
FIG. 2L1

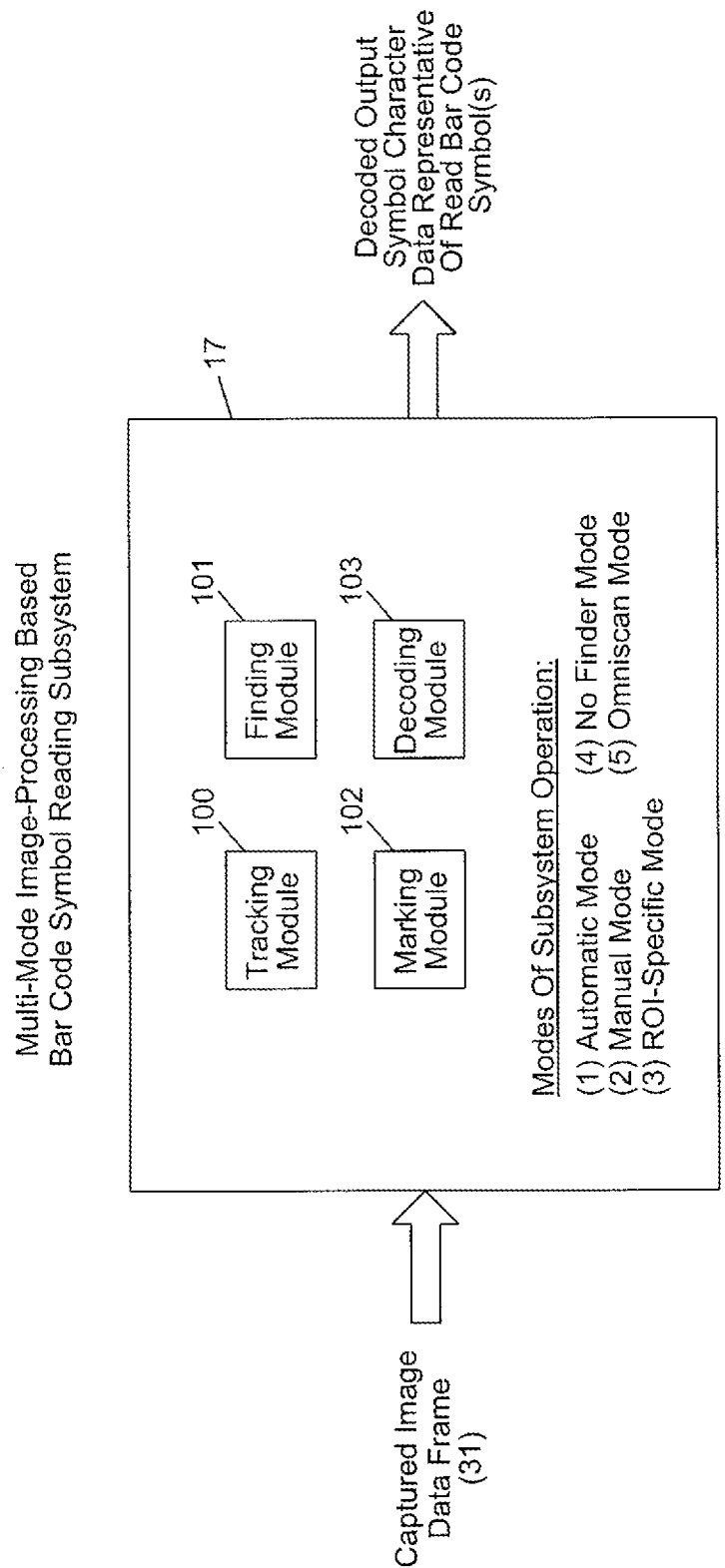
FIG. 2L2

- 45° FOV ✓
- As Few Elements As Possible ✓
  - Previous Designs Had 4 Or 5
- As Small As Possible ✓
  - Max Diameter = 12mm
- All Spherical Surfaces ✓
- Common Glasses ✓
  - LaK2 (≈LaK9)
  - ZF10 (=SF8)
  - LaF2 (≈LaF3)

- Barrel Hold Lens Elements
- Base Hold Sensors
- Barrel Slides In Base To Focus

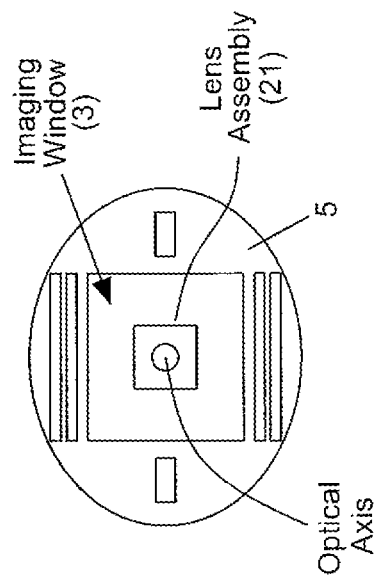
FIG. 3F2
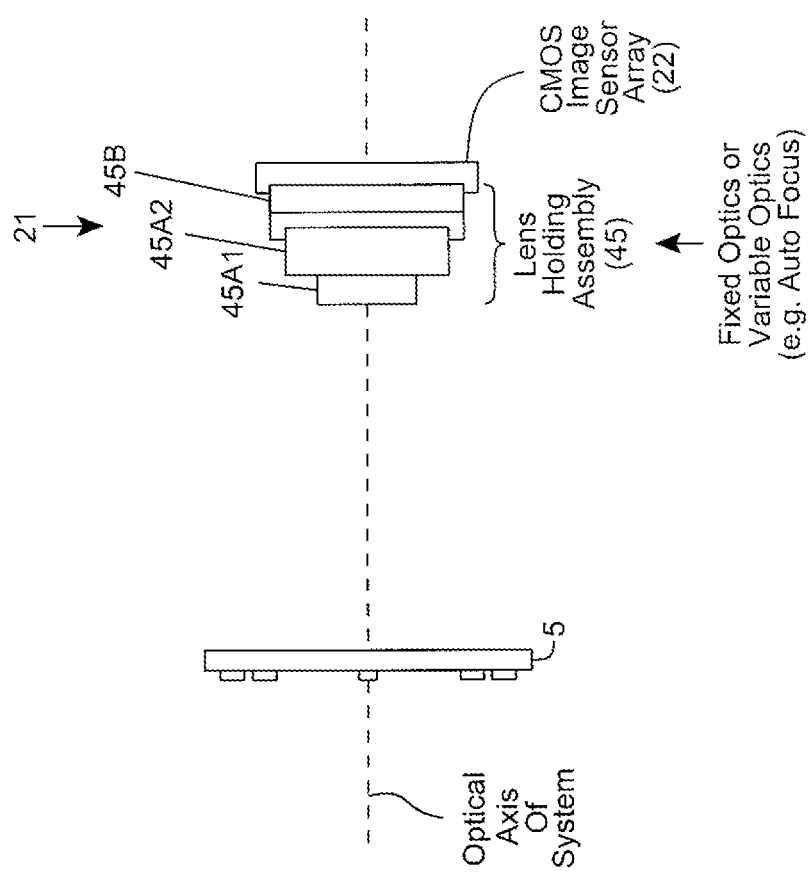
FIG. 3F1

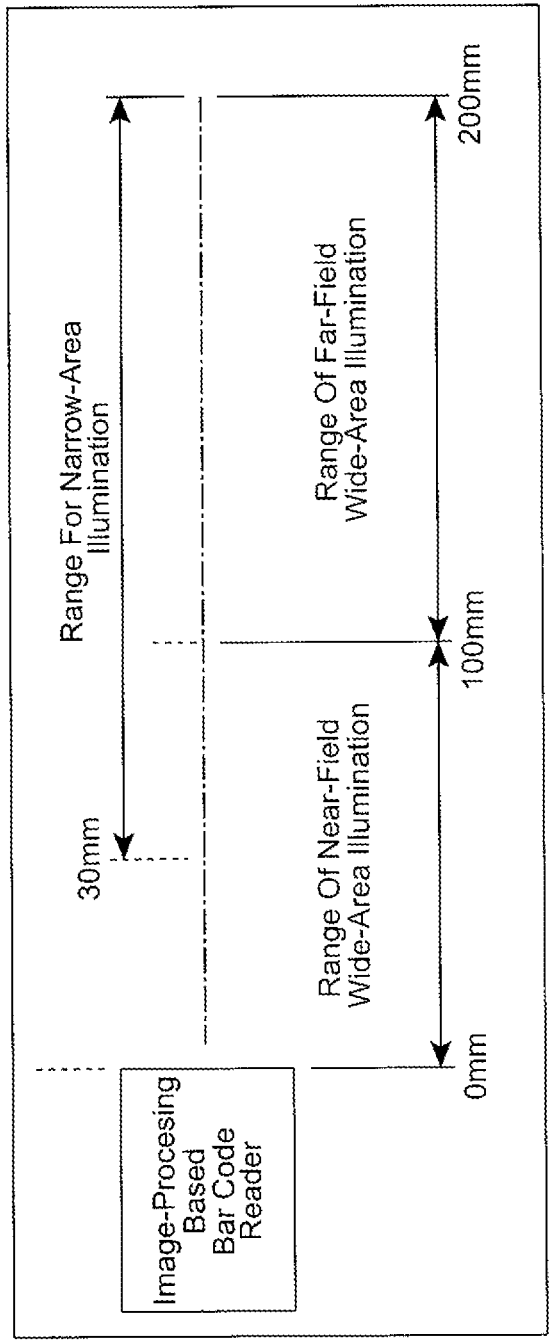
FIG. 4A1

Illumination Design Goals For First Illustrative Embodiment

- Wide-Area Illumination Modes
  - Match FOV and DOF (45°, 200mm)
  - Sufficient power density on target
    - Pixel value > 80 DN at far field center
  - Achieve sufficient uniformity (center:edge = 2:1 max)
  - Use as few LEDs as possible

- Narrow-Area Illumination Mode
  - Line usable beginning 40 mm from window
  - Match FOV and DOF
  - Sufficient power density on target
  - Sufficiently thin line
    - Height < 10 mm at far field

FIG. 4A2

LEDs For Narrow-Area Illumination
- Linear Illumination: Osram LS E655
  - 633 nm InGaAlP
  - 60° Lambertian Emittance
  - 6.75 mW Total Output Power (Typical Conditions)
  - $0.18 Each In 50k
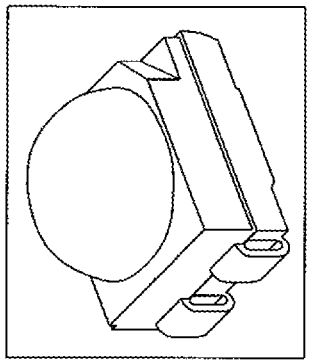
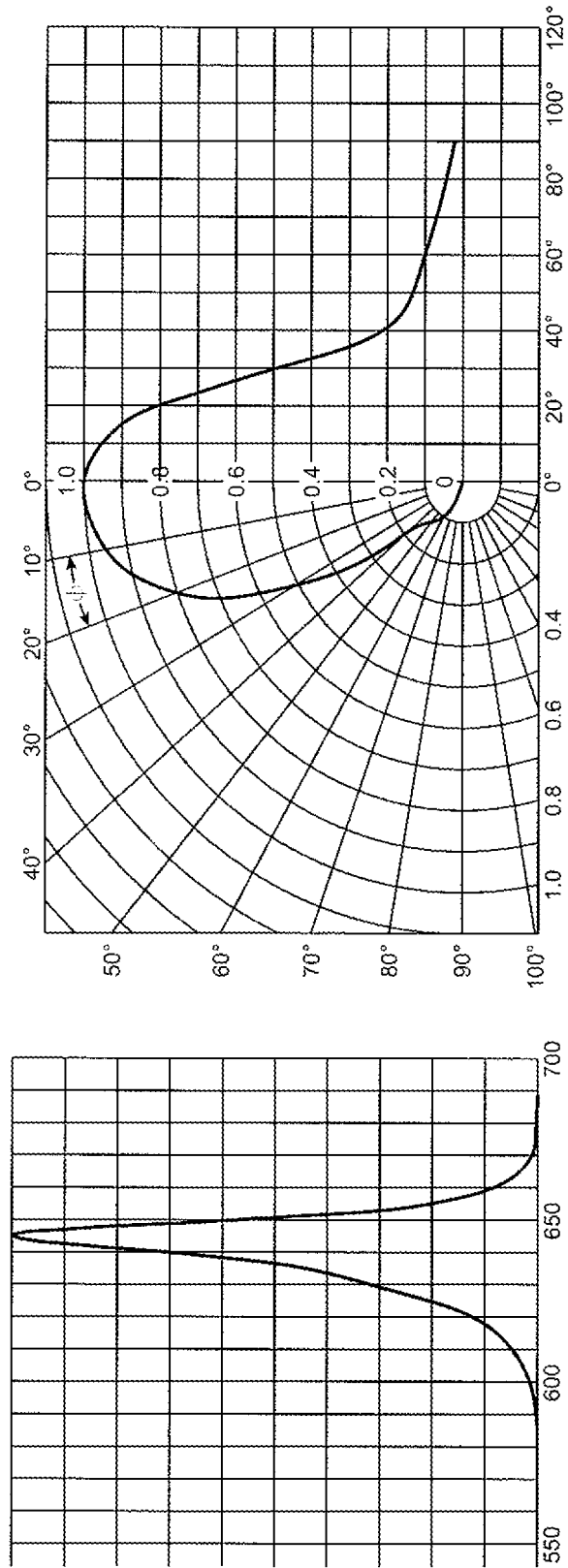
FIG. 4C2
FIG. 4C1

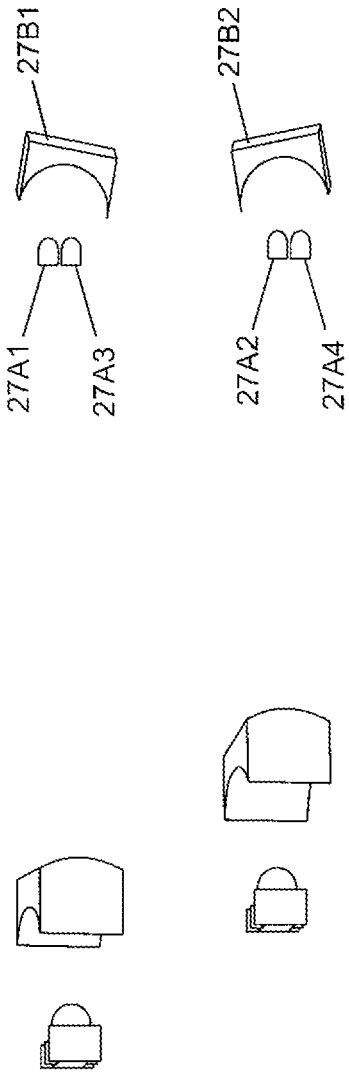
FIG. 4C3
FIG. 4C4

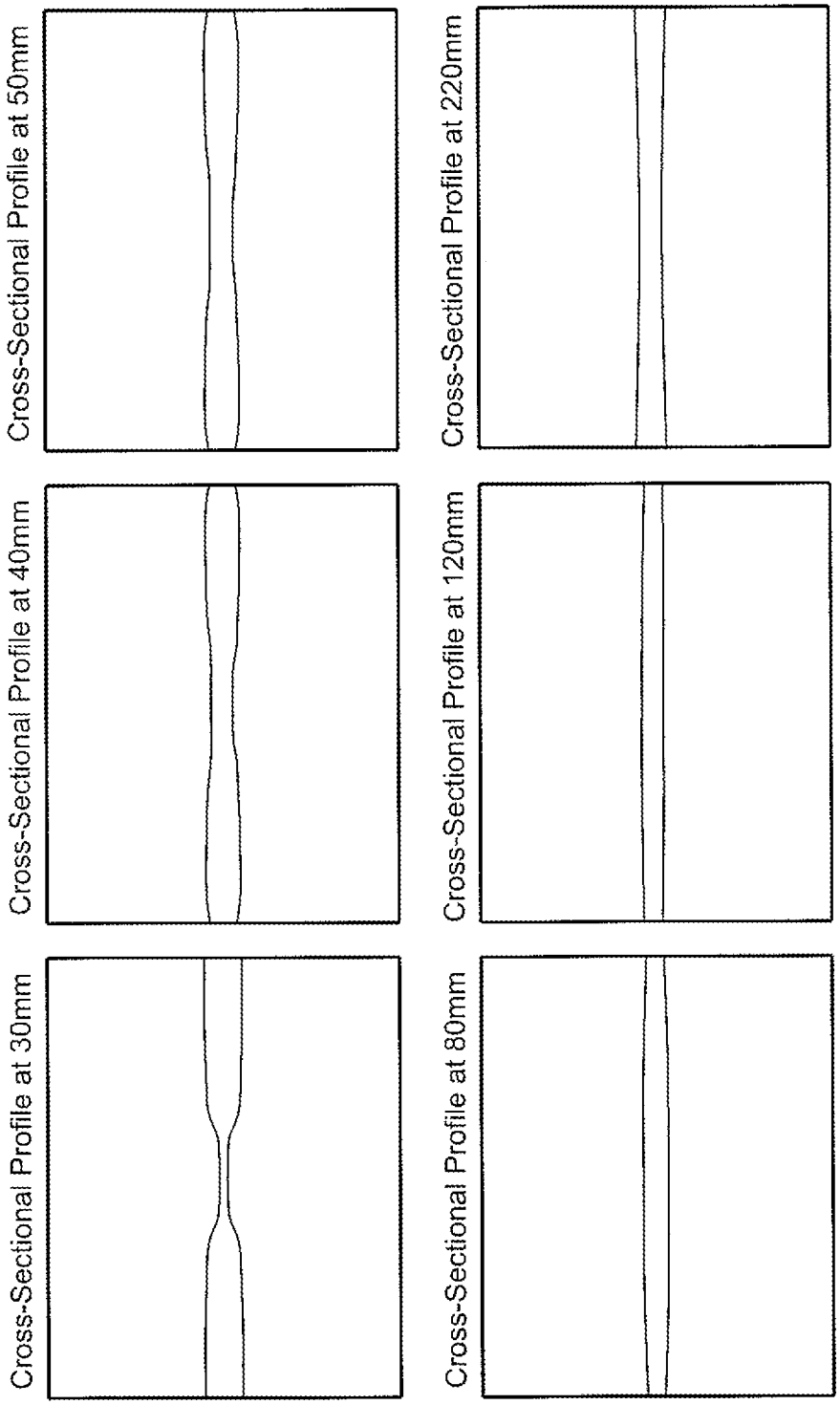
FIG. 4C5

Area LEDs
- Area Illumination: Osram LS E67B
  - 633 nm InGaAlP
  - 120° Lambertian Emittance
  - 11.7 mW Total Output Power (Typical Conditions)
  - ~$0.18 each In 50k
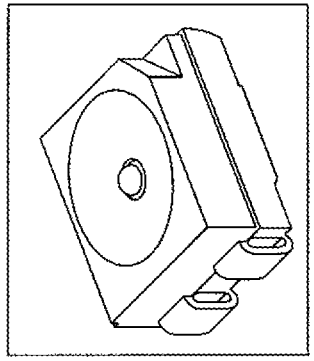
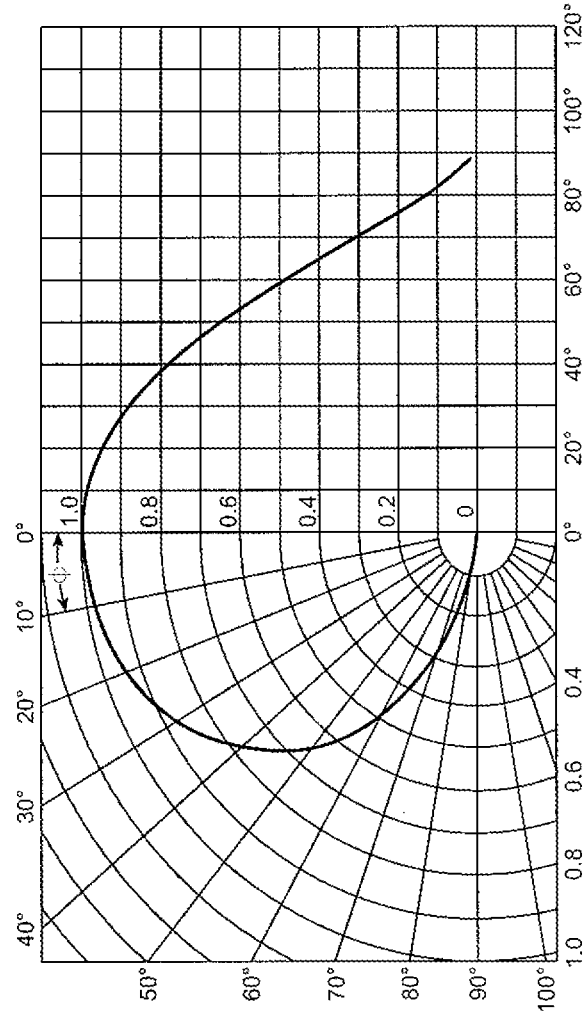
FIG. 4D2
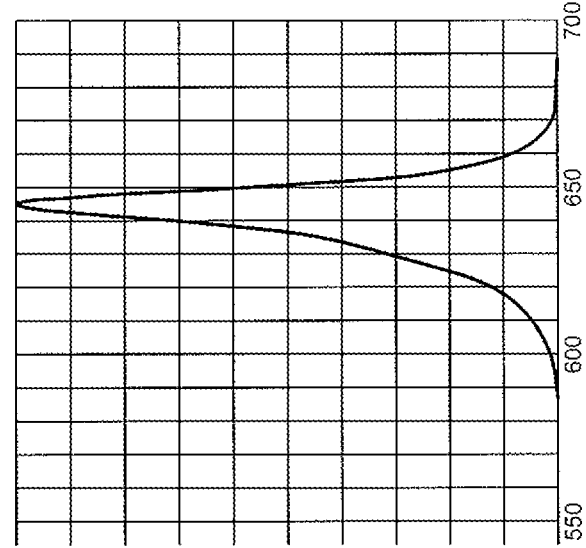
FIG. 4D1

Far Area Lenses
- Plano Convex Lenses In Front Of Far Field LEDs
- Light Aimed By Angling Lenses
  - Even Out Distribution Across FOV Throughout DOF
  - Satisfy Center: Edge = 2:1 Max Criterion
  - Allows LEDs To Be Mounted Flat
- All Lenses CNCed In Single Piece Of Plastic
FIG. 4D4
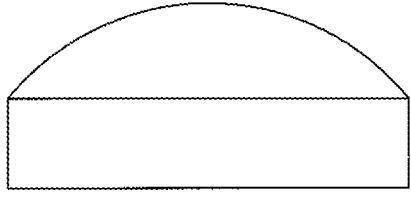
FIG. 4D3

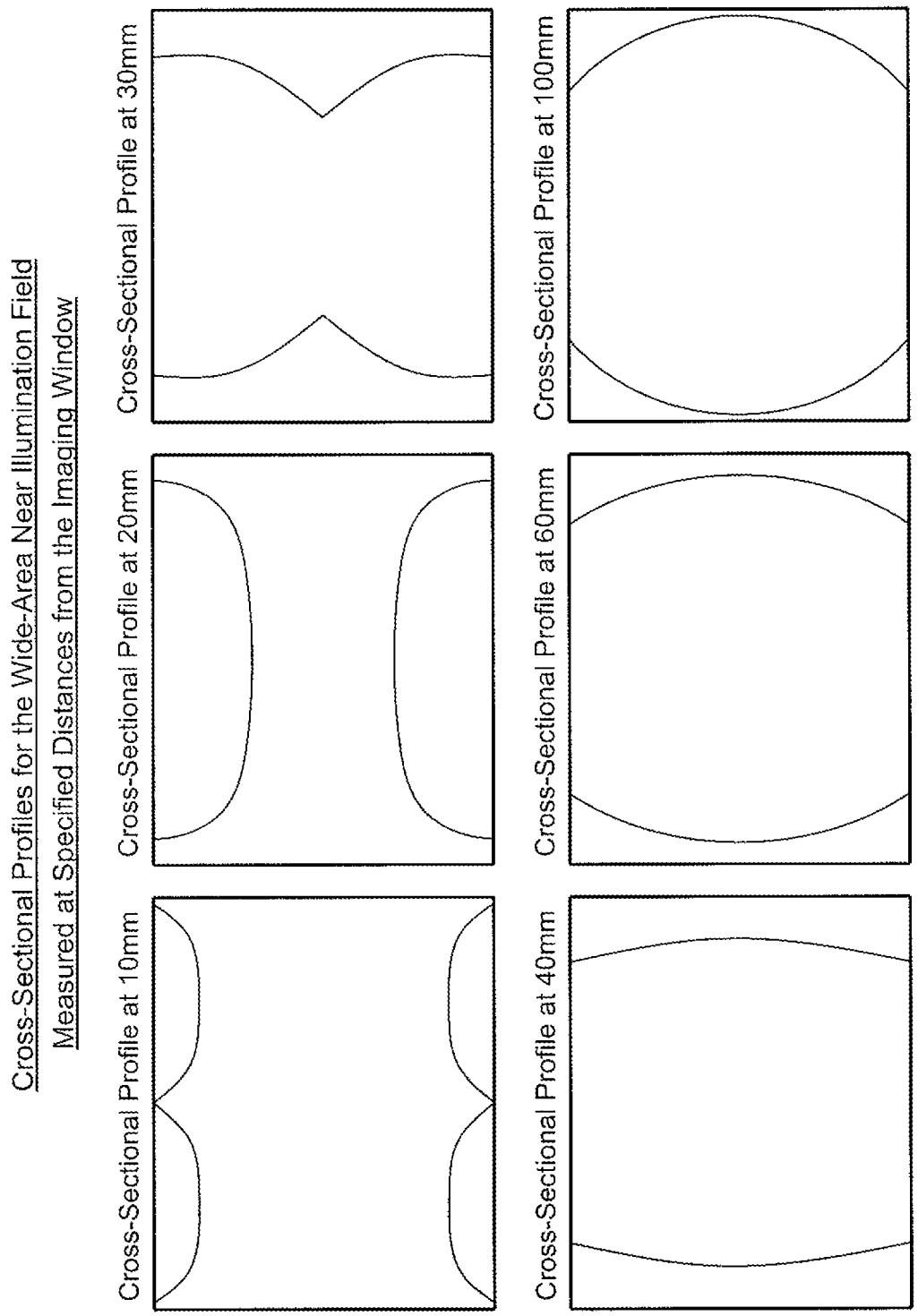
FIG. 4D5

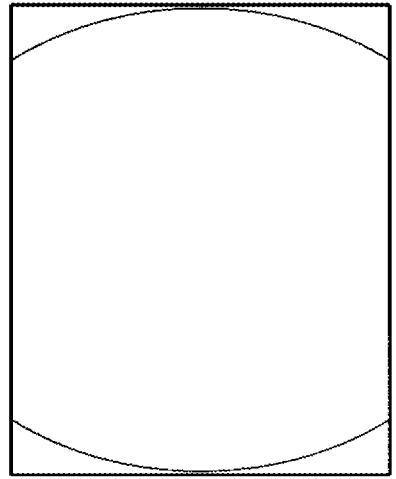
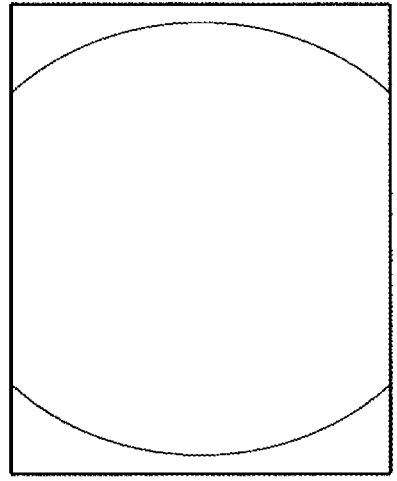
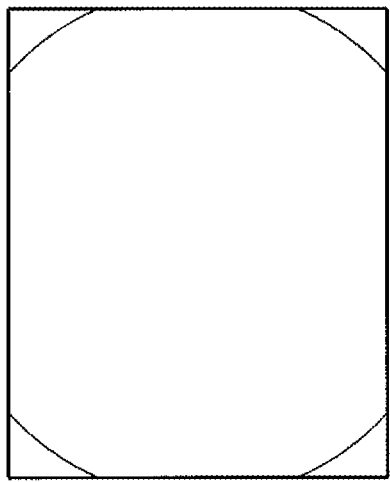
FIG. 4D6

Pixel Value Calculation

- Pixel Value Calculation For Center Of Far-Field Shows Sufficient Signal (> 80DN)

| | Description | Value | Unit |
|---|---|---|---|
| Sensor Power Density | Target Power Density | 4 | µW/mm² |
| | Surface Reflection | 0.6 | # |
| | Optical Transmittance | 0.9 | |
| | F-Number | 9 | |
| | Pixel Power Density | 0.007 | µW/mm² |
| Signal | CMOS Internal Gain | 4.5 | # |
| | Amplification Gain | 20 | dB |
| | Integration Gain | 5 | ms |
| | Sensor Responsivity | 1.8 | V / (lx s) |
| | Wavelength | 633 | nm |
| | Photopic Luminous Efficiency | 0.238 | lm / W |
| | Signal Out Of Sensor | 0.439 | V |
| Pixel Value | A/D Range Max | 1.3 | V |
| | A/D Range Min | 0.0 | V |
| | Pixel Value (0-255) | 86 | DN |

FIG. 4D7

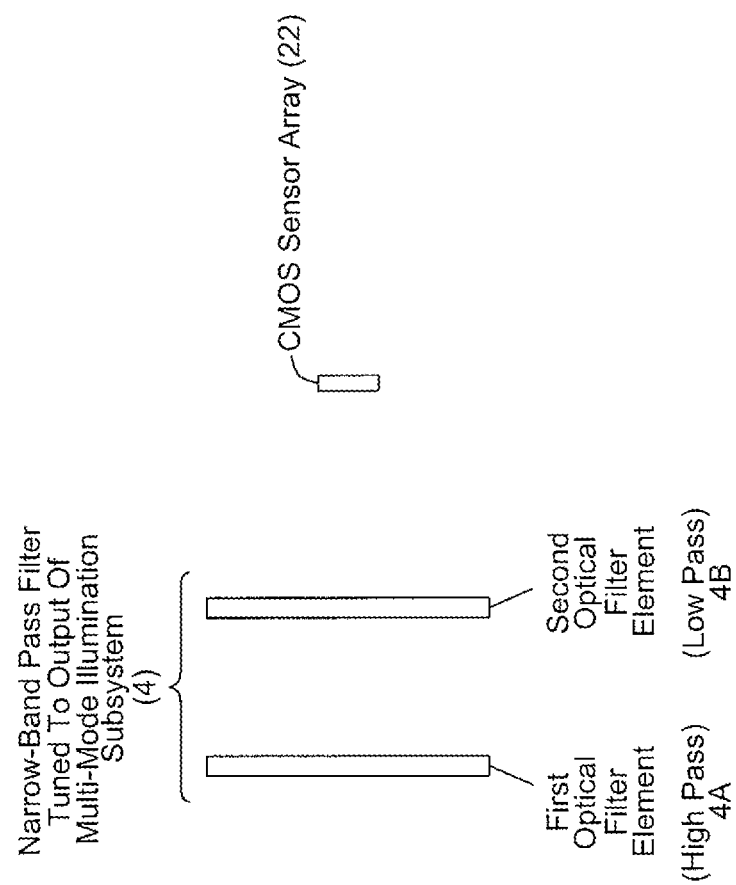
FIG. 5A1

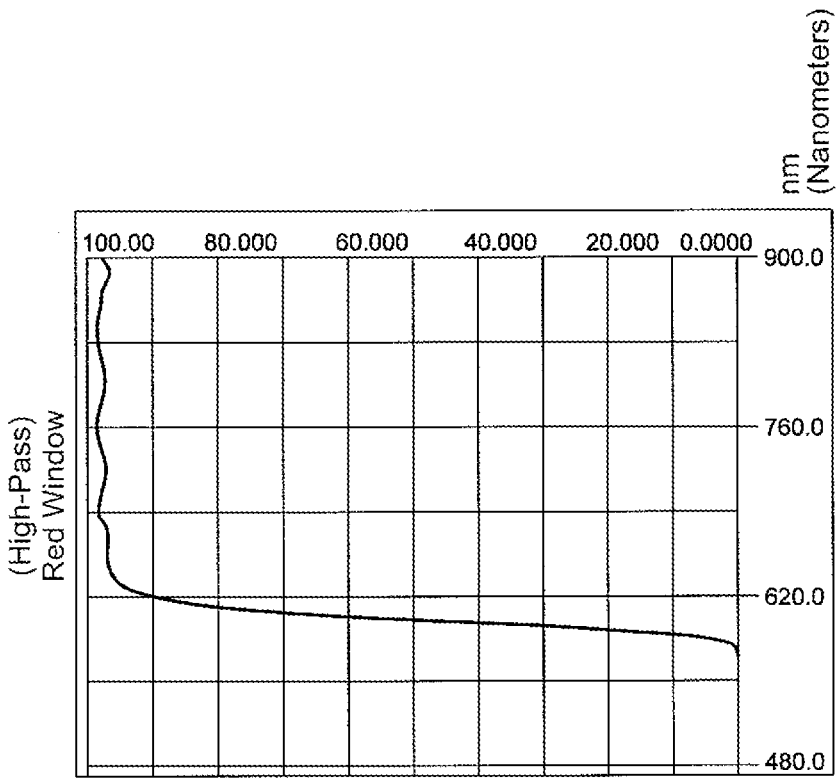
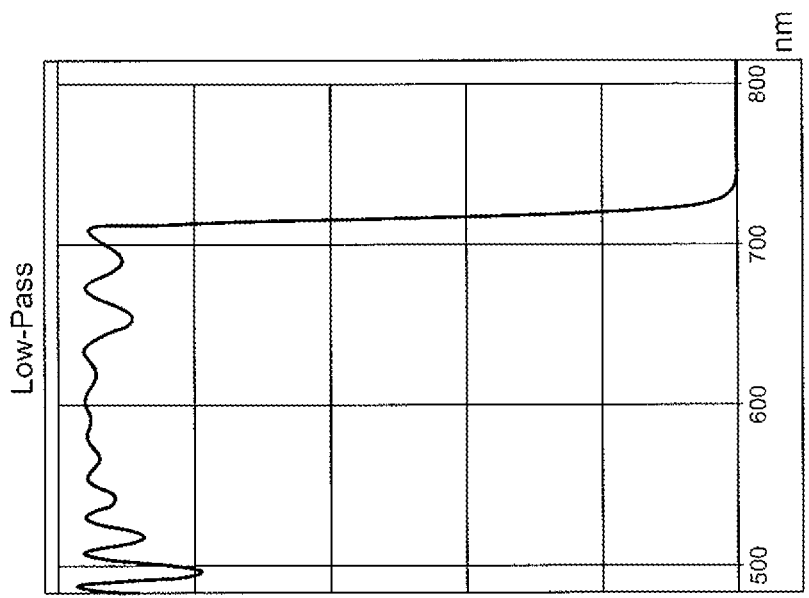
Red Window And Low-Pass Filter Characteristics
• Must Bandpass Return Light Against Ambient
 - Red Window + Low Pass Filter
 - Restricts Range To 620nm – 700nm
FIG. 5A2
FIG. 5A3

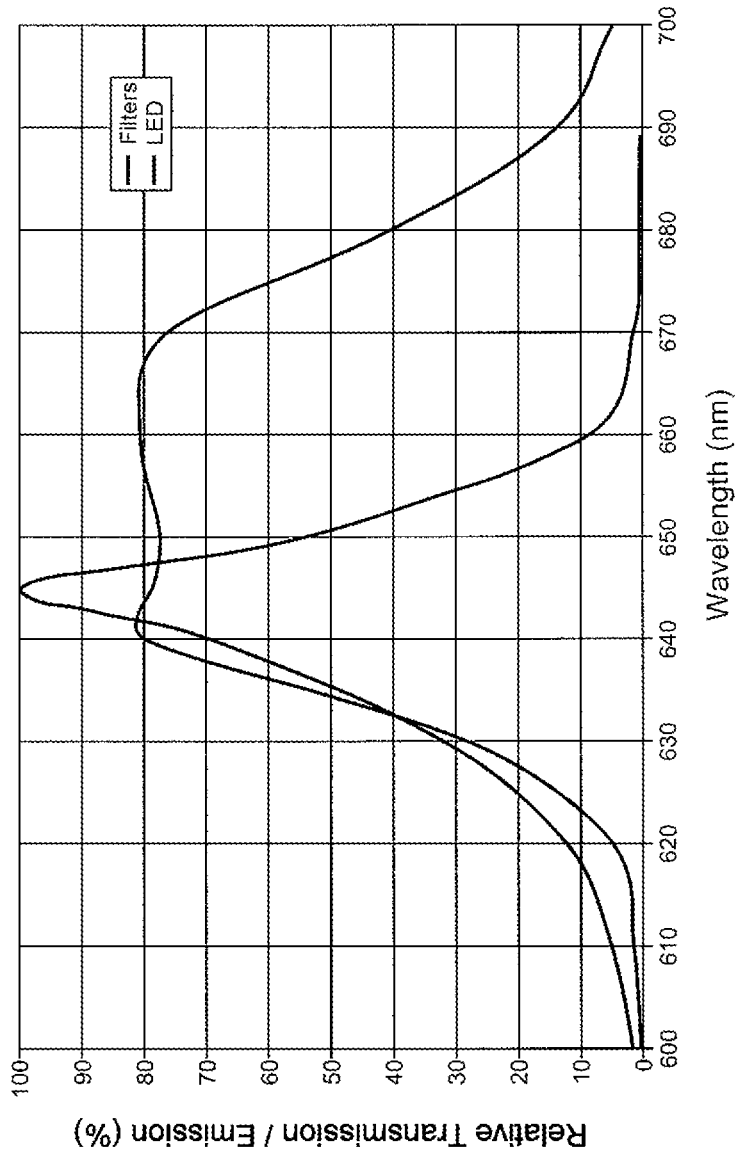
FIG. 5A4

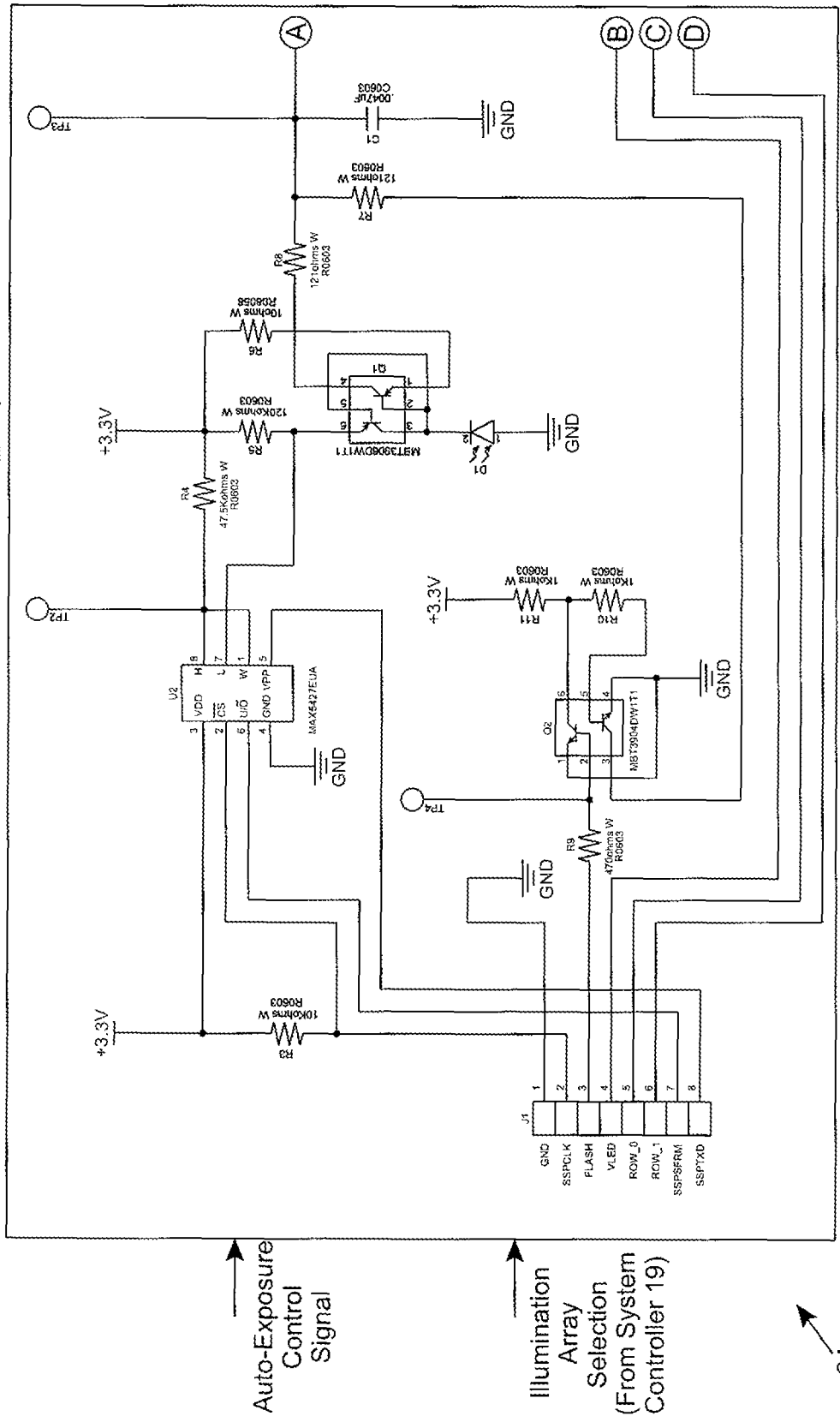
FIG. 6C1

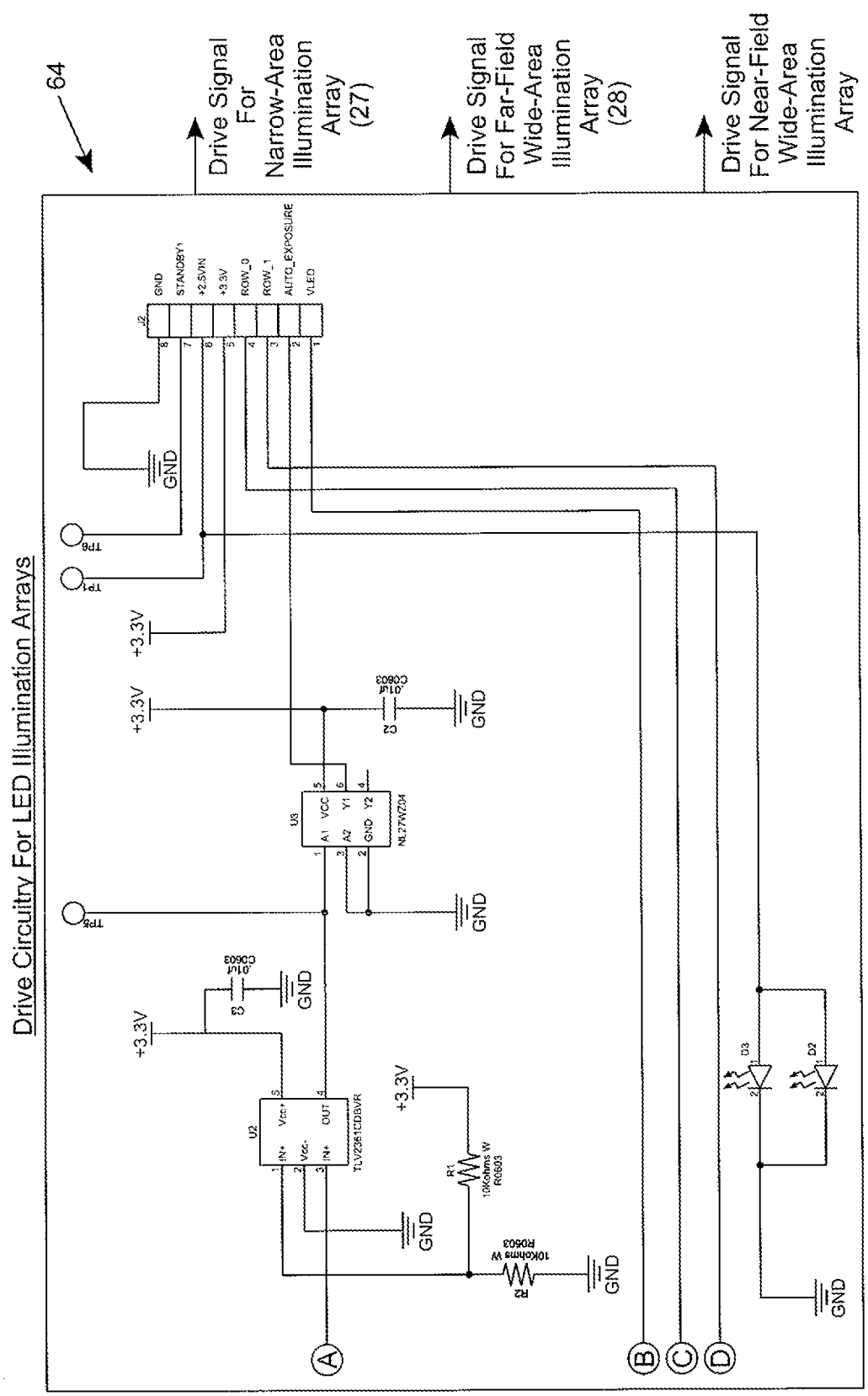
FIG. 6C2

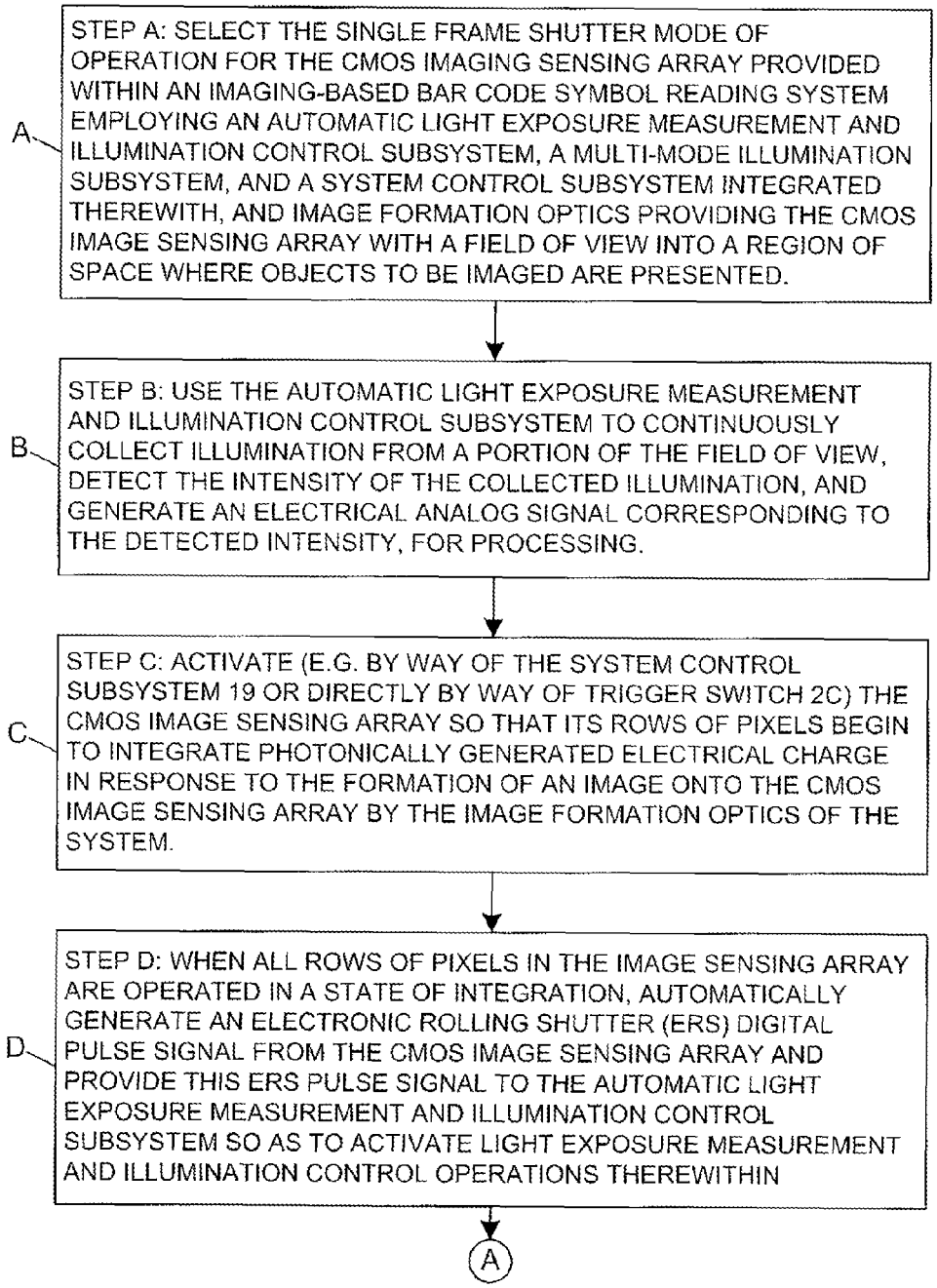
FIG. 6E1

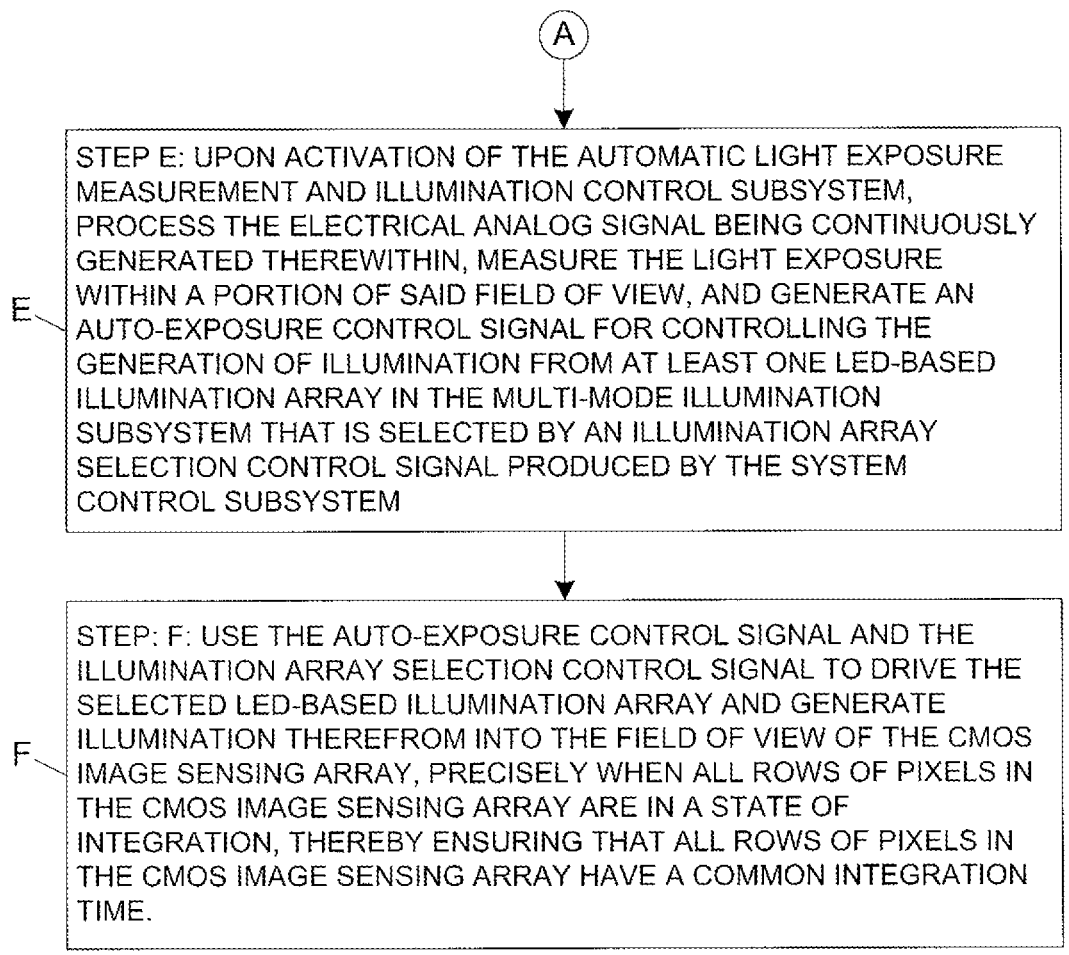
FIG. 6E2

Events Dispatcher

Provides a means of signaling and delivering events to the App Events Manager
(pointer to App Events Manager is provided at the SCORE initialization)

```
int
ScoreSignalEvent(int event_id,        /* Input: event id */
        void * p_par);      /* Input: pointer to the event's parameters */
```

App Events Manager is responsible for processing the event: It can start a new task, or stop currently running task, or do something or nothing and simply ignore the event.

FIG. 12A

Examples of System-Defined Events

SCORE_EVENT_POWER_UP
Signals the completion of the system start-up. No parameters.

SCORE_EVENT_TIMEOUT
Signals the timeout of the logical timer. Parameter: pointer to timer id.

SCORE_EVENT_UNEXPECTED_INPUT
Signals that the unexpected input data is available. Parameter: pointer to connection id.

SCORE_EVENT_TRIG_ON
Signals that the user pulled the trigger. No parameters.

SCORE_EVENT_TRIG_OFF
Signals that the user released the trigger. No parameters.

SCORE_EVENT_OBJECT_DETECT_ON
Signals that the object is positioned under the camera. No parameters.

SCORE_EVENT_OBJECT_DETECT_OFF
Signals that the object is removed from the field-of-view of the camera. No parameters.

SCORE_EVENT_EXIT_TASK and SCORE_EVENT_ABORT_TASK
Signal the end of the task execution. Parameter: pointer to the UTID.

FIG. 12B

Tasks Manager

Provides a means of executing and
stopping application specific tasks (threads)

```
typedef void *                              /* Return: pointer to the set of returned parameters */
(*TASK_FUNC)(void *params);                 /* Input: set of input parameters */ int
ScoreStartTask(TASK_FUNC task_func,  /* Return: 0 if successful, otherwise error code */
                                     /* Input: pointer to the task's main function */
    int task_id,                     /* Input: id assigned to the task by application */
    void *task_params,               /* Input: parameters passed to the task's main function */
    int task_owner,                  /* Input: connection id of the task's owner */
    int task_priority,               /* Input: task's priority (must be 0 for now) */
    size_t stacksize,                /* Input: size of the stack, or 0 for default size */
    size_t heapsize,                 /* Input: size of the heap, or 0 for default size */
    UTID *p_utid);                   /* Output: unique task identifier */

BOOL     /* Return: TRUE if it kills the task, or FALSE if the task was not found */
ScoreKillTask(UTID pthread_id)       /* Input: unique task identifer */
```

FIG. 12C

Input / Output Manager

- High priority thread running in the background and monitoring activities of the external devices and user connections
- Signals appropriate events to the application when such activities are detected

FIG. 12D

Input / Output Subsystem

Provides a means of creating and deleting input/output connections...

```
int                               /* Return: connection id if successful, otherwise (-1) */
ScoreIomngrCreateConnection(int conn_type,    /* Input:  connection type */
    int fd,                       /* Input:  file descriptor of a device or a socket */
    int conn_state,               /* Input:  initial state of the connection, the value controlled by application */
    void *properties);            /* Input:  pointer to the connection properties */ int                               /* Return: connection id if successful, otherwise (-1) */
ScoreInitRS232(char *full_name,   /* Input:  full name of the device, such as "/dev/ttyS0" */
    RS232_PROP *rs232_prop);      /* Input:  RS232 parameters */
```

FIG. 12E1

Input / Output Subsystem

...and communicating with the outside world

```
int
ScoreIomngrGetData(int connection_id,   /* Input: connection id, or -1 for the task owner */
                   char *input_buffer,  /* Input: pointer to the input buffer */
                   int min_len,         /* Input: minimum number of bytes to receive */
                   int max_len,         /* Input: maximum number of bytes to receive */
                   BOOL echo,           /* Input: TRUE if data should be echoed back to device, otherwise FALSE */
                   int timeout_ms);     /* Input: If not 0, number of milliseconds to wait */
                                        /* Return: number of bytes received */ int
ScoreIomngrSendData(int connection_id,  /* Input: connection id */
                    char *p_data,       /* Input: pointer to the data buffer */
                    int len);           /* Input: number of bytes to send */
                                        /* Return: 0 if successful, or (-1) in case of error */ void
ScoreIomngrSendStream(int stream_type,  /* Input: type of output stream */
                      char *p_data,     /* Input: pointer to the data buffer */
                      int len);         /* Input: number of bytes to send */
```

FIG. 12E2

Timer Subsystem

Provides a means of creating, deleting...

```
int                                    /* Return: timer id if successful, otherwise (-1) */
ScoreCreateTimer(int flags);           /* Input: optional SCORE_TIMER_CONTINUOUS */ void
ScoreDeleteTimer(int timer_id);        /* Input: timer id, must be >= 0 */ int                                    /* Return: 0 if successful, otherwise (-1) */
ScoreStartTimer(int timer_id,          /* Input: timer id */
    int time_ms);                      /* Input: timer value, in ms */ int                                    /* Return: 0 if successful, otherwise (-1) */
ScoreStopTimer(int timer_id);          /* Input: timer id */
```

FIG. 12F1

Timer Subsystem

...and utilizing logical timers

```
BOOL              /* Return: TRUE if the timer timed out, otherwise FALSE */
ScoreTimerTimedOut(int timer_id);      /* Input: timer id */ int            /* Return: time (in ms) left before the timer times out, or (-1) in case of error */
ScoreGetTimeLeft(int timer_id);                  /* Input: timer id */ int       /* Return: time (in ms) gone since the timer has been started (or restarted), or (-1) in case of error */
ScoreGetTime(int timer_id);            /* Input: timer id */

BOOL              /* Return: TRUE if timer is stopped, otherwise FALSE */
ScoreIsTimerStopped(int timer_id);     /* Input: timer id */
```

FIG. 12F2

Memory Control Subsystem

Provides a thread-level dynamic memory management (the interfaces fully compatible with standard dynamic memory management functions)...

```
void *
ScoreMalloc(size_t size);        /* Return: pointer to the allocated memory if successful, otherwise NULL */
                                 /* Input:  size, in bytes, of the needed memory */ void
ScoreFree(void *mem);            /* Input:  pointer to the memory to be freed */
```

FIG. 12G1

Memory Control Subsystem

...as well as a means of buffering the data

```
int
ScoreCreateOutpMem(SCORE_OUTP_MEM *p_outp_mem);       /* Return: 0 if successful */
                                                       /* Input: pointer to buffered memory structure */ void
ScoreDestroyOutpMem(SCORE_OUTP_MEM *p_outp_mem);       /* Input: pointer to buffered memory structure */ int
ScoreWriteToOutpMem (SCORE_OUTP_MEM *p_outp_mem,       /* Return: 0 if successful */
                                                       /* Input: pointer to buffered memory structure */
    void *p_data,                                      /* Input: pointer to the data to be buffered up for output */
    size_t len);                                       /* Input: size of the data, in bytes */ int
ScoreSendDataFromOutpMem(int connection_id,            /* Return: 0 if successful */
                                                       /* Input: id of the connection to send the data to */
    SCORE_OUTP_MEM *p_outp_mem);                       /* Input: pointer to buffered memory structure */ int
ScoreSendStreamFromOutpMem(int stream_type,            /* Return: 0 if successful */
                                                       /* Input: type of output stream */
    SCORE_OUTP_MEM *p_outp_mem);                       /* Input: pointer to buffered memory structure */
```

FIG. 12G2

User Commands Manager

Provides a standard way of entering user commands and executing application modules responsible for handling them (pointer to User Commands Table is provided at the SCORE initialization)

```
int
ScoreCmdManager(void *params);

rc = ScoreStartTask(ScoreCmdManager,
                    CMDMNGR_TASK_ID,
                    NULL,
                    0,
                    connection_id_,                /* Input: user command manager task */
                    0,                             /* Input: id assigned to the commands manager */
                    (64 * 1024),
                    (512 * 1024),                  /* Input: connection id of the owner */
                    &cmdmngr_utid);                /* Input: priority */
                                                   /* Input: stack size */
                                                   /* Input: heap size */
                                                   /* Output: unique task identifier */
```

FIG. 12H

Device Drivers

- Trigger driver -- establishes software connection with the hardware trigger
- Image acquisition driver -- implements image acquisition functionality
- IR driver -- implements object detection functionality

FIG. 12I

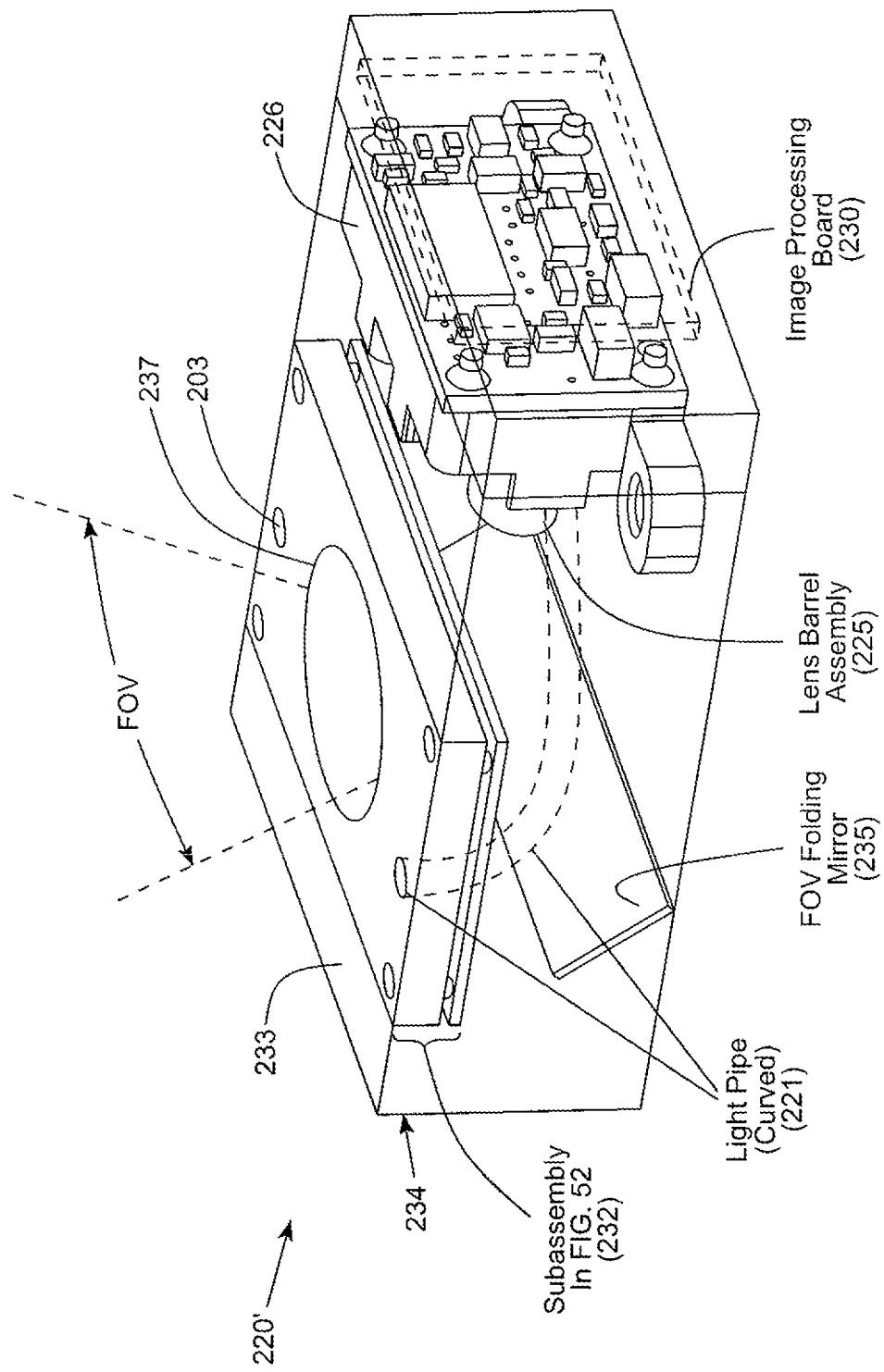
FIG. 19A1

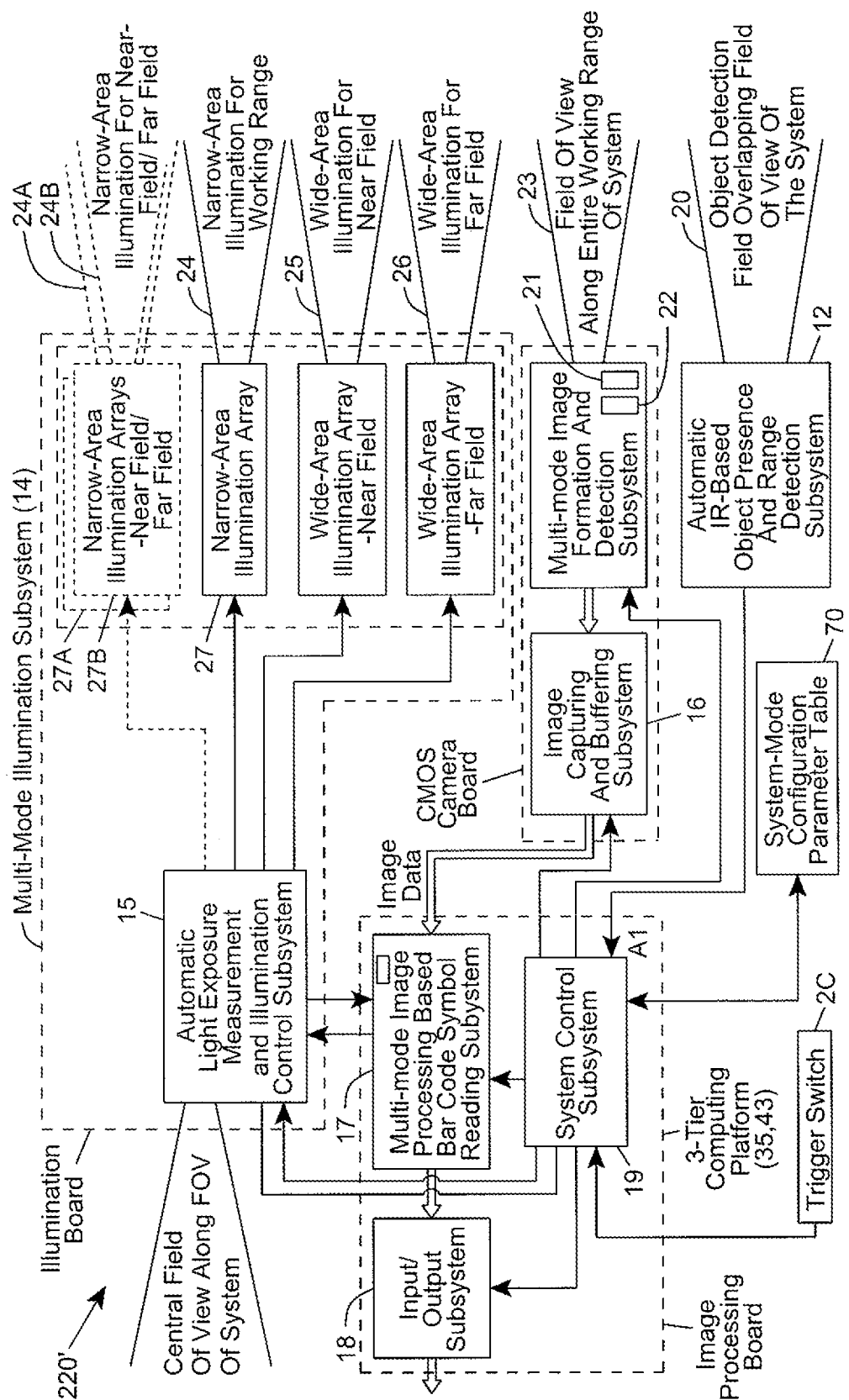
FIG. 19A2

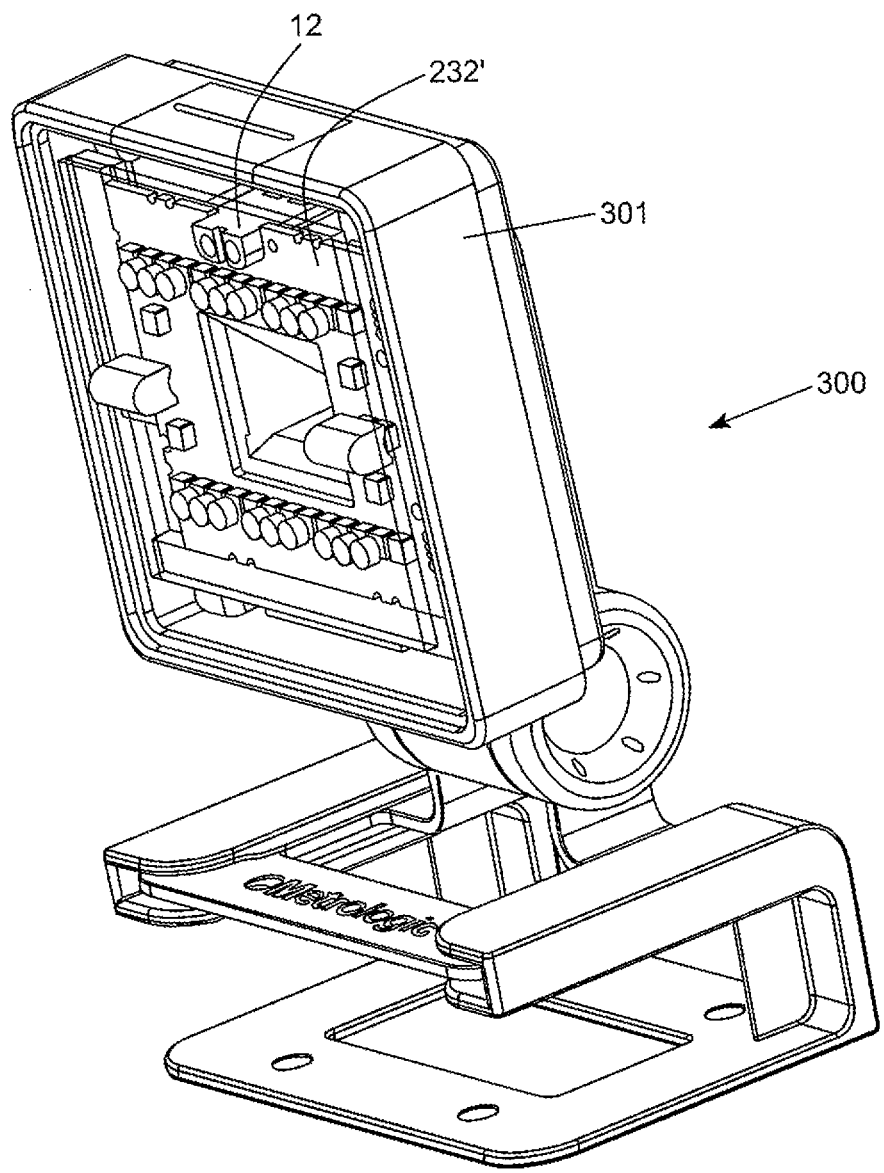
FIG. 19B1

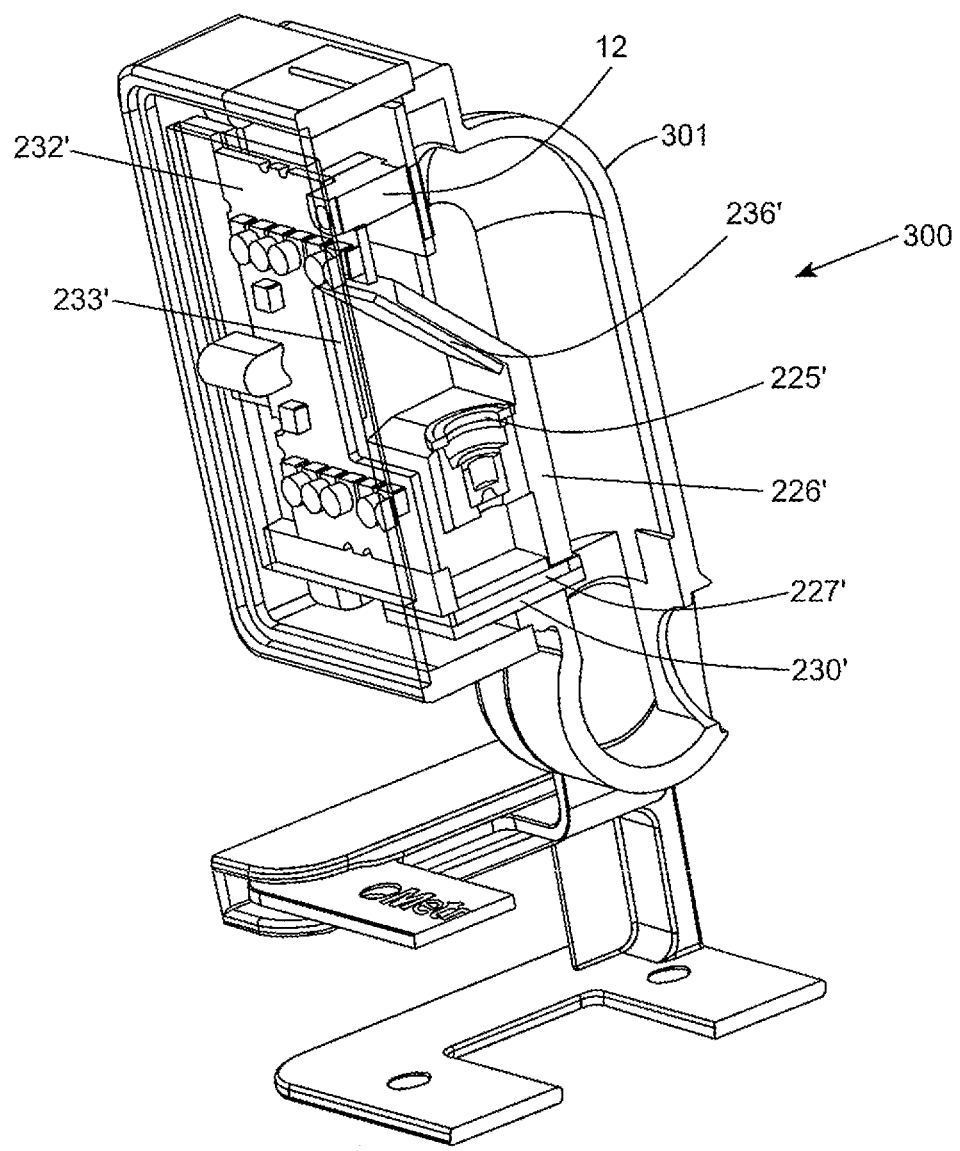
FIG. 19B2

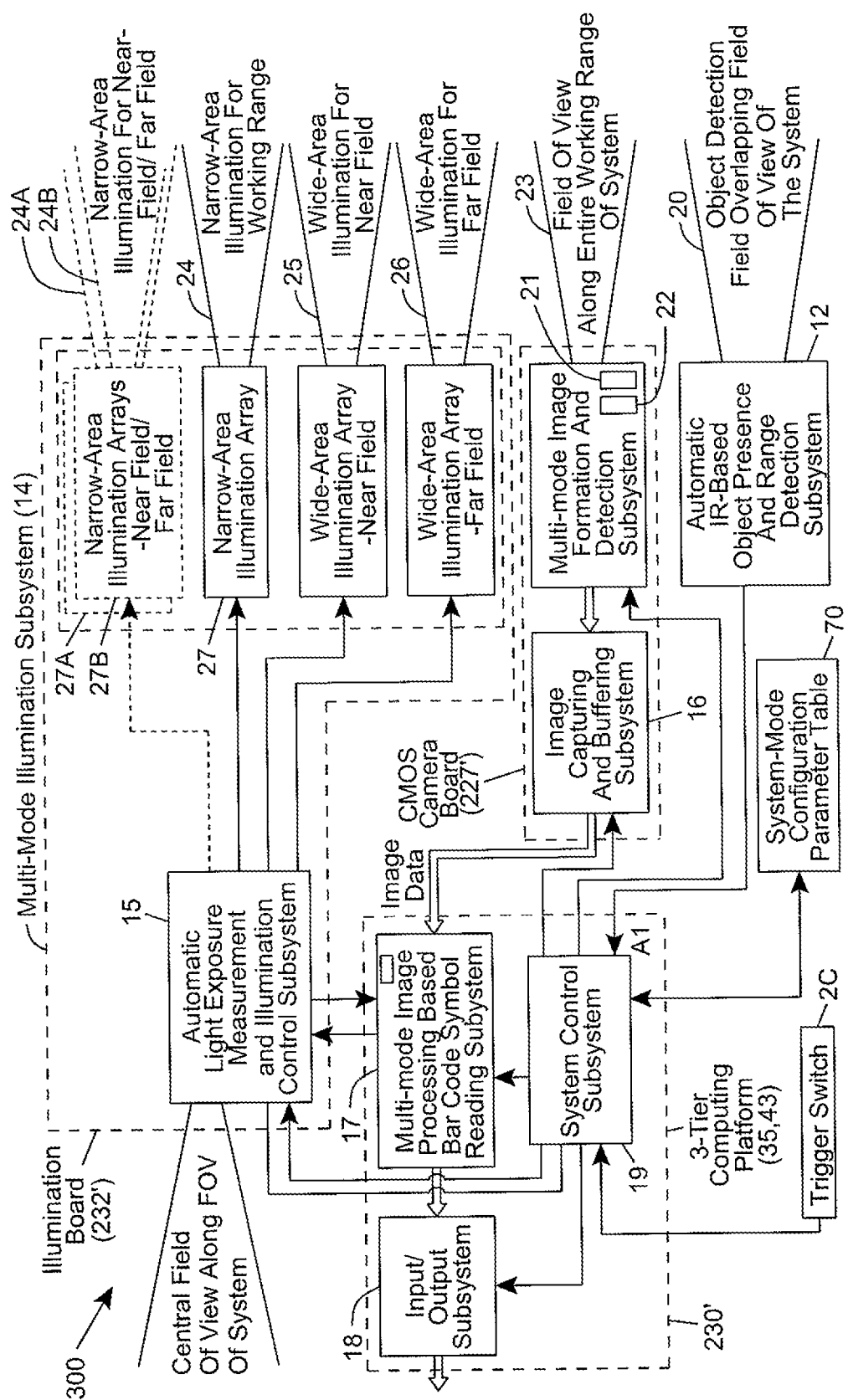
FIG. 19B3

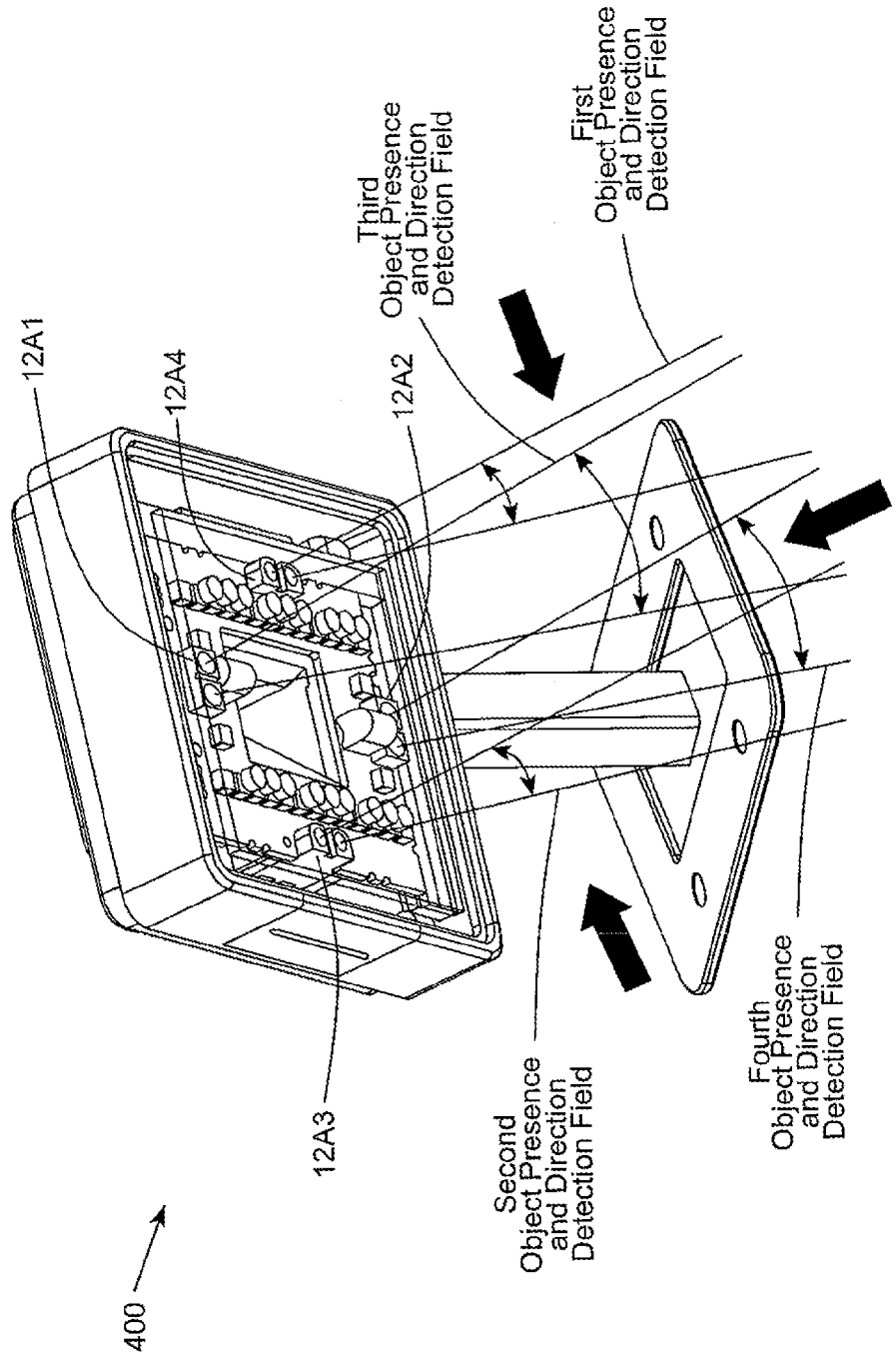

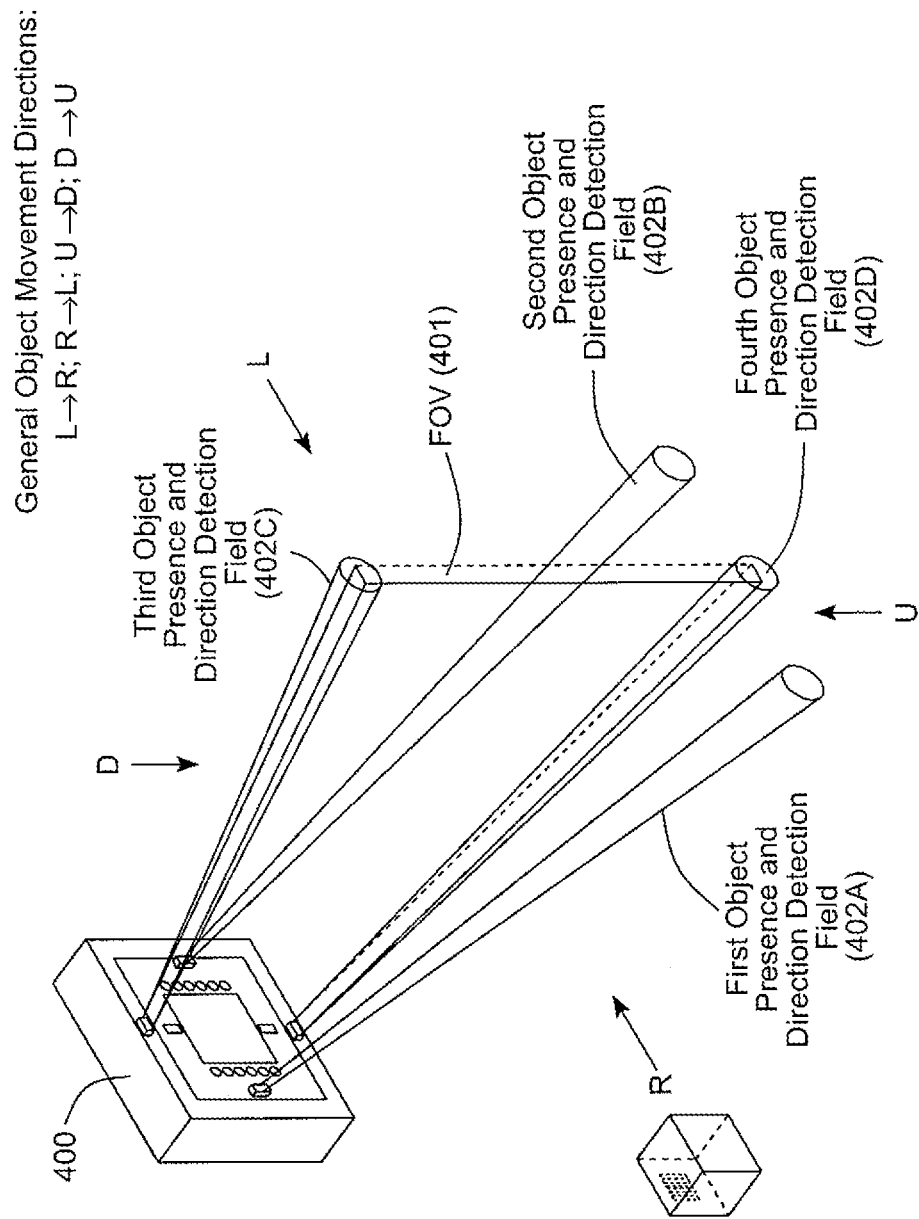
FIG. 19C2

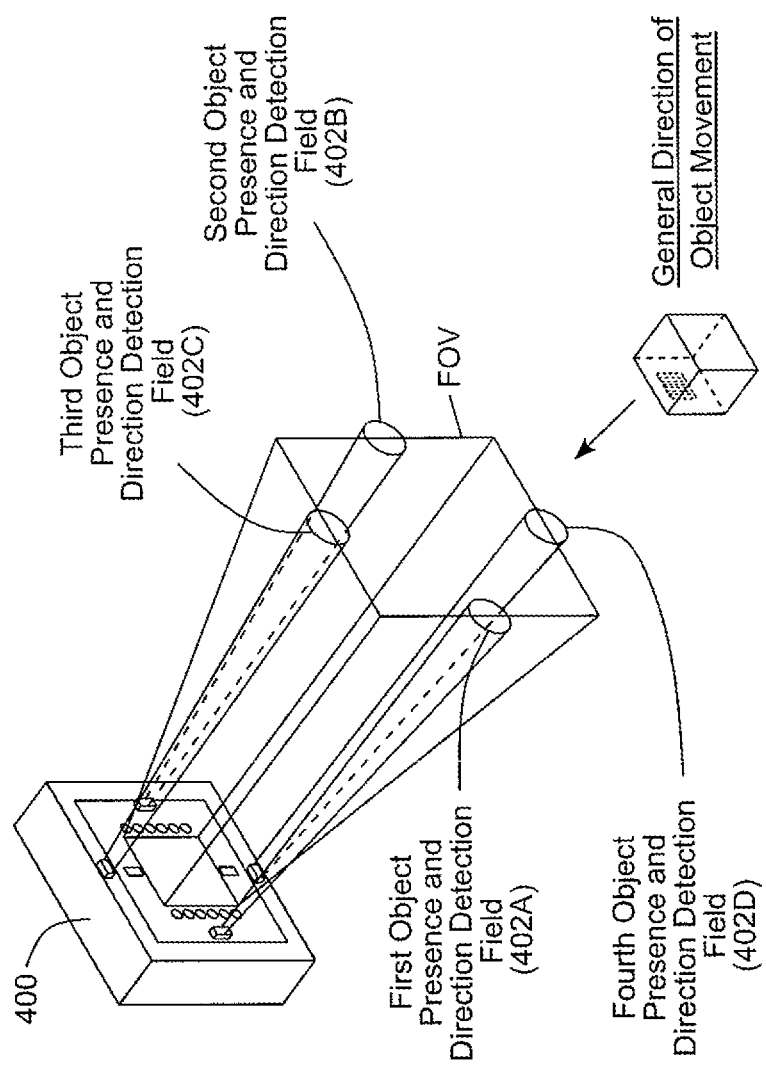
FIG. 19C3

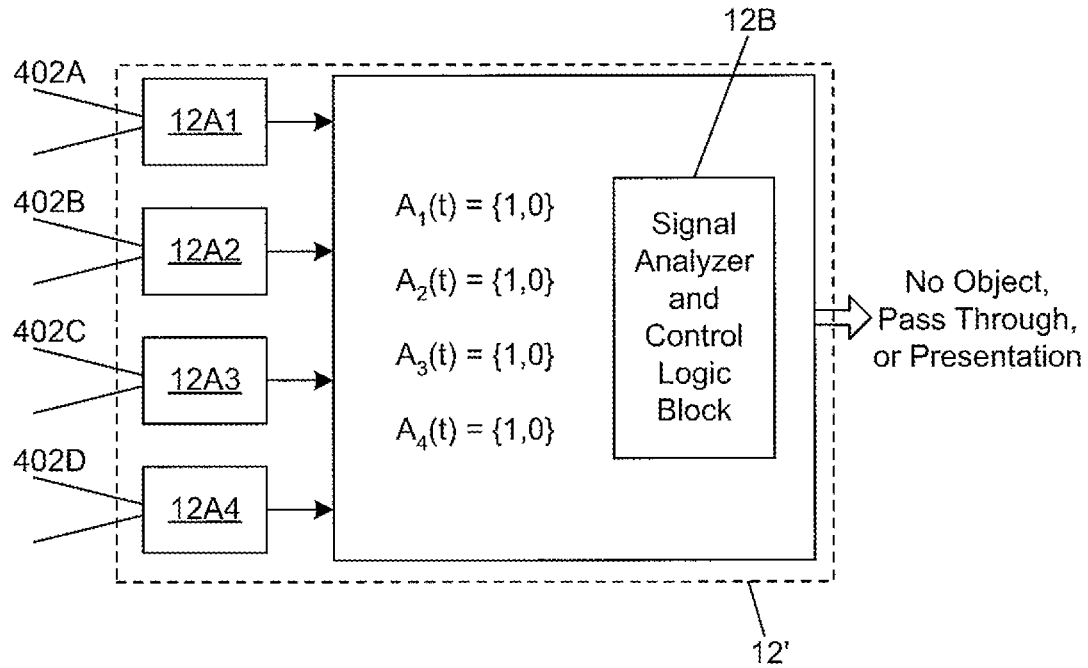
RULE 1: If $A_1(t) = 1$, before $A_2(t) = 1$,
then L → R movement.
RULE 2: If $A_2(t) = 1$, before $A_1(t) = 1$,
then R → L movement.
RULE 3: If $A_3(t) = 1$, before $A_4(t) = 1$,
then U → D movement.
RULE 4: If $A_4(t) = 1$, before $A_3(t) = 1$,
then D → U movement.
RULE 5: If L → R or R → L movement is detected,
then activate "Pass-Through" mode; otherwise
activate "Presentation" mode.
FIG. 19C4

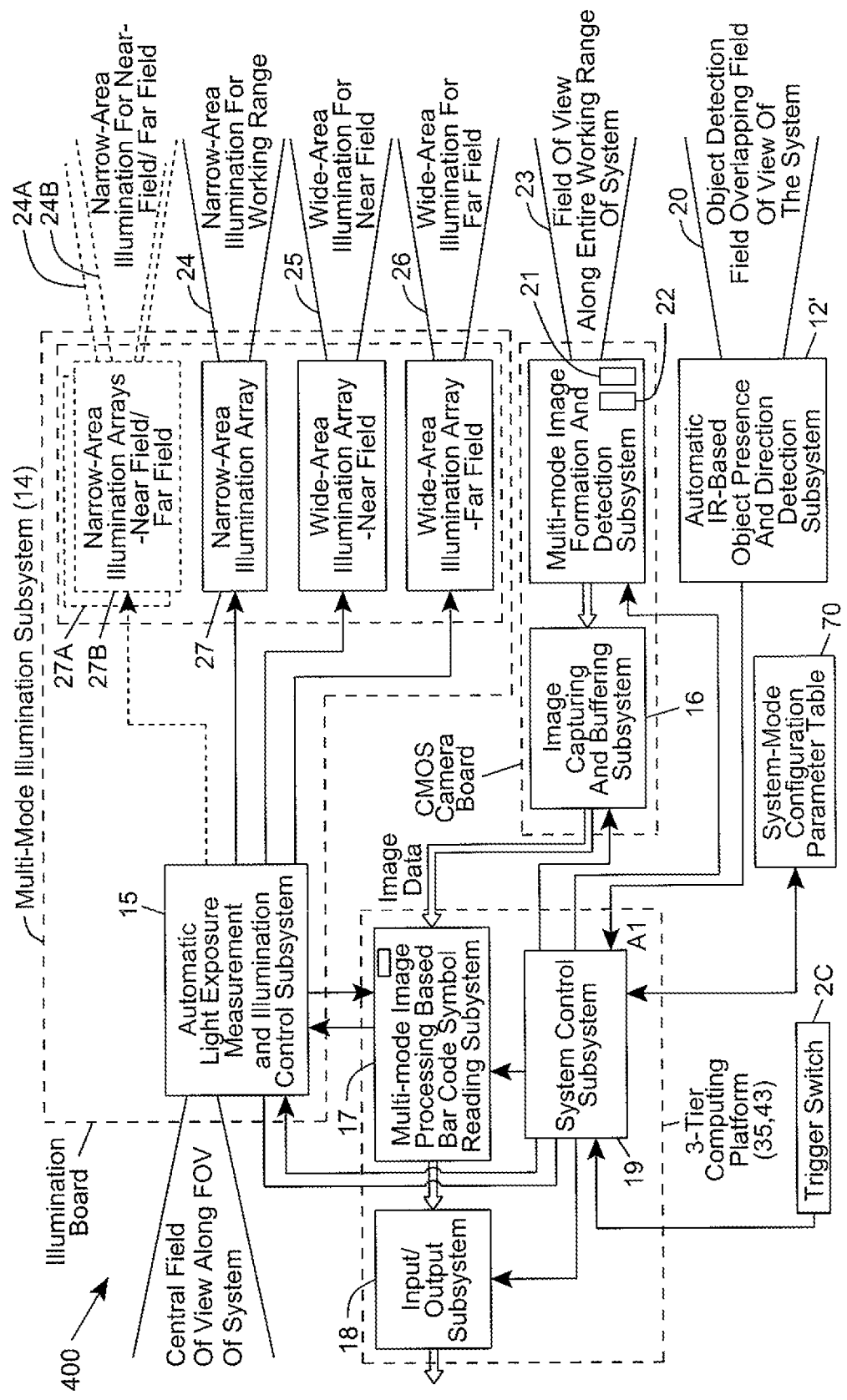
FIG. 19C5

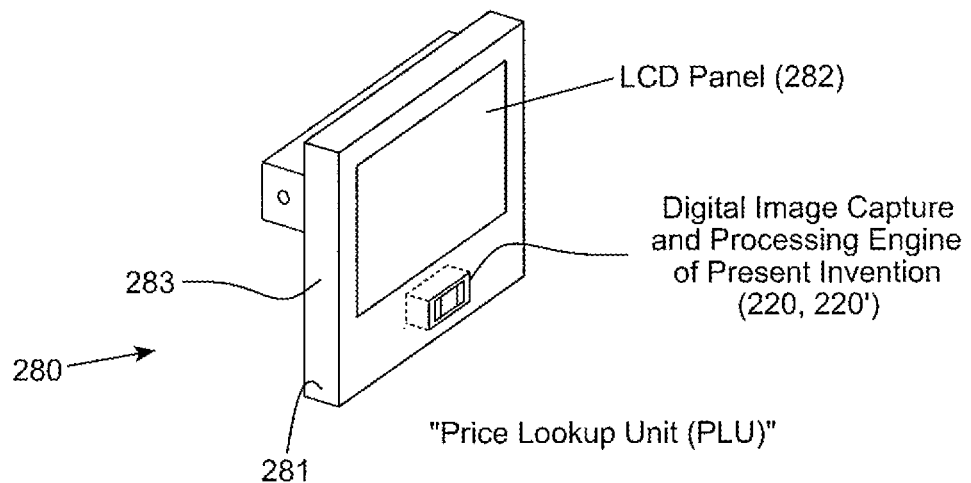
FIG. 21
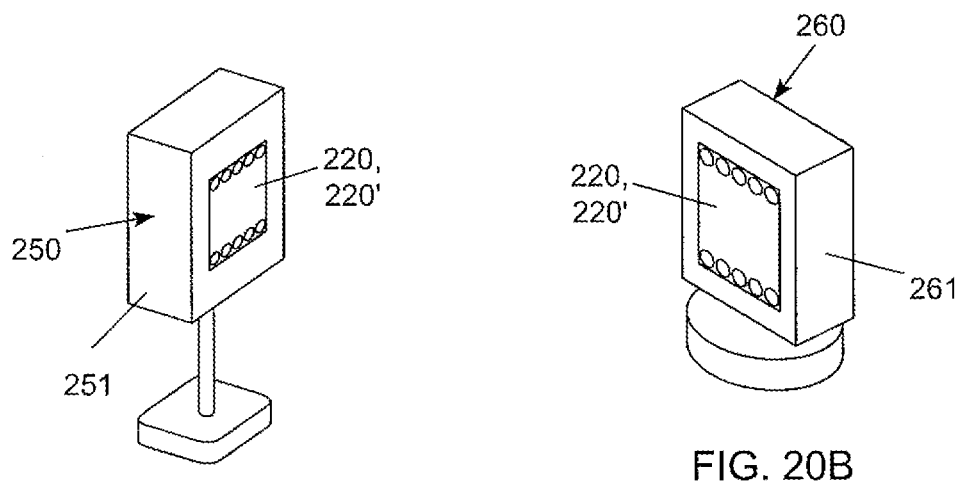
FIG. 20A
FIG. 20B
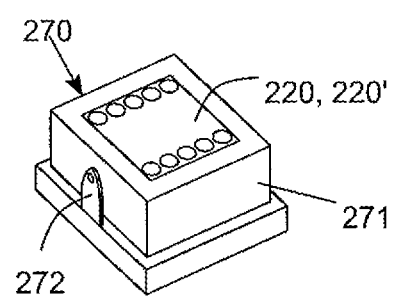
FIG. 20C

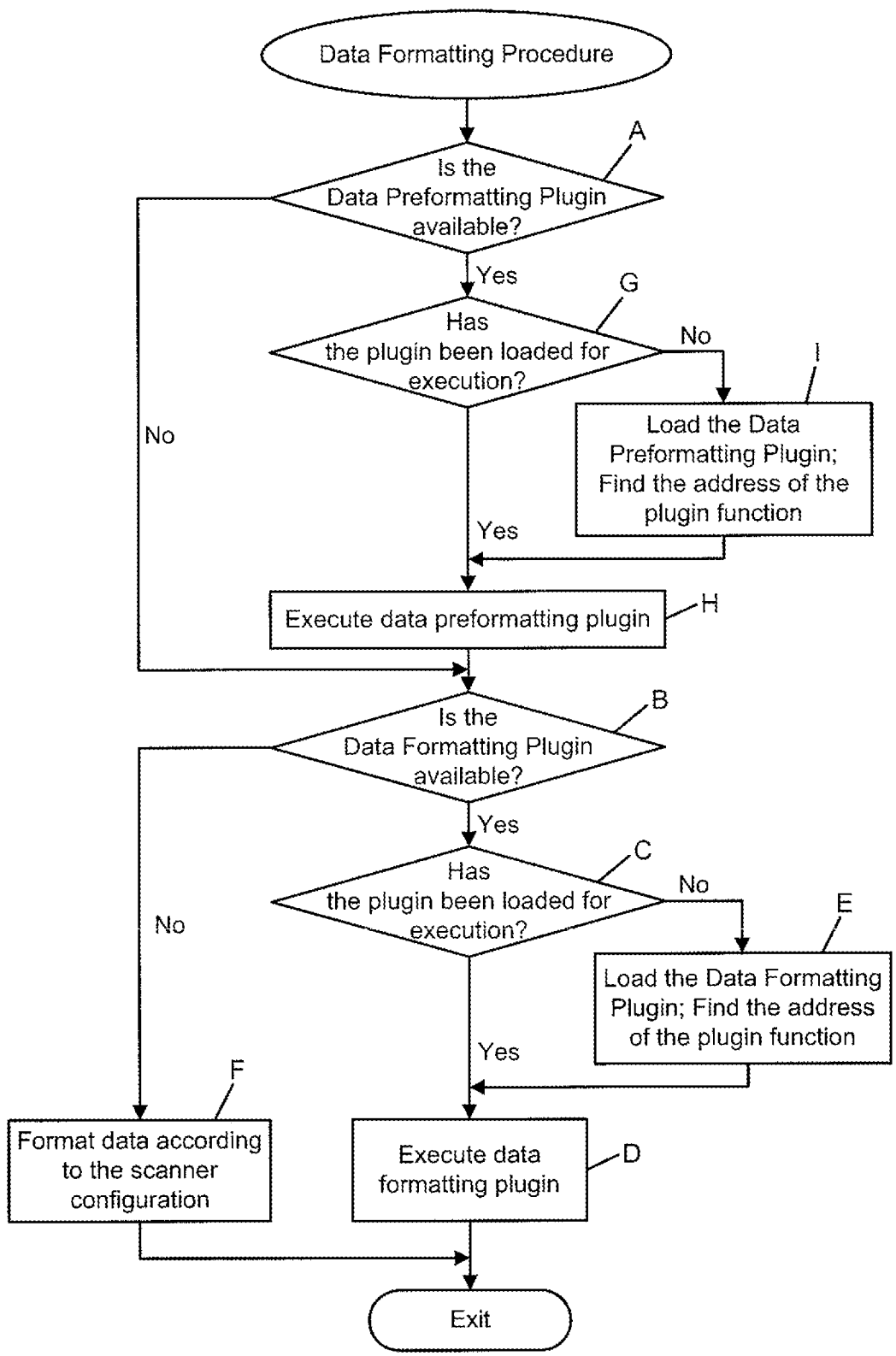
FIG. 23C1

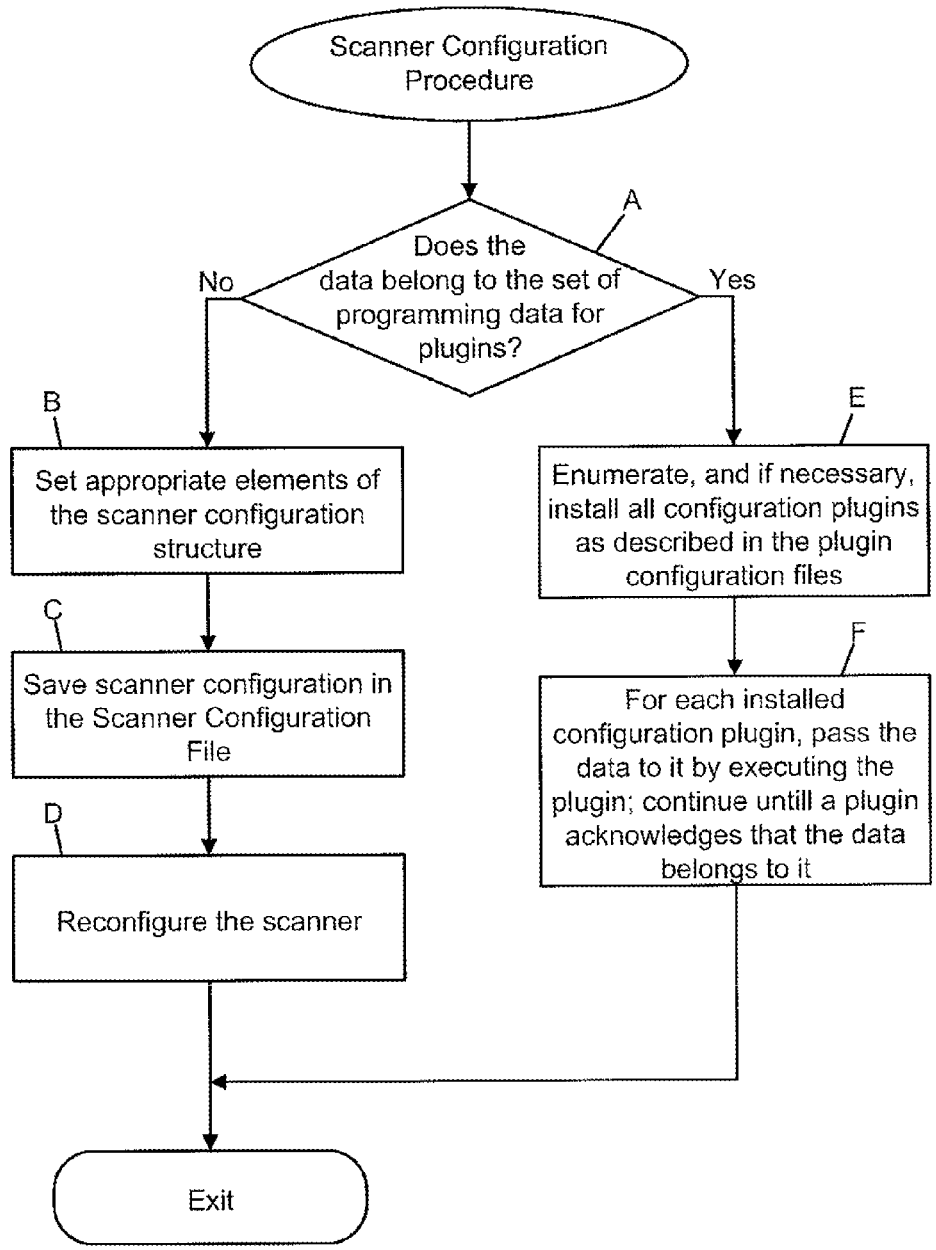
FIG. 23C2

IMAGE CAPTURE AND PROCESSING SYSTEM SUPPORTING A MULTI-TIER MODULAR SOFTWARE ARCHITECTURE

RELATED CASES

This application is a Continuation of U.S. application Ser. No. 12/975,781 filed Dec. 22, 2010, now U.S. Pat. No. 8,366,005; which is a Continuation of U.S. application Ser. No. 11/981,613 filed Oct. 31, 2007, now U.S. Pat. No. 7,861,936; which is a Continuation of U.S. application Ser. No. 11/640,814 filed Dec. 18, 2006, now U.S. Pat. No. 7,708,205; which is a Continuation-in-Part of the following U.S. applications: Ser. No. 11/489,259 filed Jul. 19, 2006, now U.S. Pat. No. 7,540,424; Ser. No. 11/408,268 filed Apr. 20, 2006, now U.S. Pat. No. 7,464,877; Ser. No. 11/305,895 filed Dec. 16, 2005, now U.S. Pat. No. 7,607,581; Ser. No. 10/989,220 filed Nov. 15, 2004, now U.S. Pat. No. 7,490,774; Ser. No. 10/909,270 filed Jul. 30, 2004, now U.S. Pat. No. 7,284,705; Ser. No. 10/909,255 filed Jul. 30, 2004, now U.S. Pat. No. 7,299,986; Ser. No. 10/903,904 filed Jul. 30, 2004, now U.S. Pat. No. 7,255,279; Ser. No. 10/902,710 filed Jul. 29, 2004, now U.S. Pat. No. 7,281,661; Ser. No. 10/902,709 filed Jul. 29, 2004, now U.S. Pat. No. 7,270,272; Ser. No. 10/901,914 filed Jul. 29, 2004, now U.S. Pat. No. 7,325,738; Ser. No. 10/901,461 filed Jul. 28, 2004, now U.S. Pat. No. 7,320,431; Ser. No. 10/901,445 filed Jul. 28, 2004, now U.S. Pat. No. 7,240,844; Ser. No. 10/901,429 filed Jul. 28, 2004, now U.S. Pat. No. 7,243,847; Ser. No. 10/901,428 filed Jul. 28, 2004, now U.S. Pat. No. 7,293,714; Ser. No. 10/901,427 filed Jul. 28, 2004, now U.S. Pat. No. 7,267,282; Ser. No. 10/901,463 filed Jul. 27, 2004, now U.S. Pat. No. 7,086,595; Ser. No. 10/901,446 filed Jul. 27, 2004, now U.S. Pat. No. 7,428,998; Ser. No. 10/901,426 filed Jul. 27, 2004, now U.S. Pat. No. 7,278,575; Ser. No. 10/897,390 filed Jul. 22, 2004, now U.S. Pat. No. 7,237,722; Ser. No. 10/897,389 filed Jul. 22, 2004, now U.S. Pat. No. 7,225,989; Ser. No. 10/895,811 filed Jul. 20, 2004, now U.S. Pat. No. 7,225,988; Ser. No. 10/895,271 filed Jul. 20, 2004, now U.S. Pat. No. 7,216,810; Ser. No. 10/894,478 filed Jul. 19, 2004, now U.S. Pat. No. 7,357,325; Ser. No. 10/894,477 filed Jul. 19, 2004, now U.S. Pat. No. 7,360,706; Ser. No. 10/894,412 filed Jul. 19, 2004, now U.S. Pat. No. 7,213,762; Ser. No. 10/894,476 filed Jul. 16, 2004, now U.S. Pat. No. 7,178,733; Ser. No. 10/893,800 filed Jul. 16, 2004, now U.S. Pat. No. 7,273,180; Ser. No. 10/893,798 filed Jul. 16, 2004, now U.S. Pat. No. 7,185,817; Ser. No. 10/893,797 filed Jul. 16, 2004, now U.S. Pat. No. 7,188,770; Ser. No. 10/712,787 filed Nov. 13, 2003, now U.S. Pat. No. 7,128,266. Each of the foregoing patent applications and patents is hereby incorporated by reference in its entirety.

FIELD OF INVENTION

The present invention relates to hand-supportable and portable area-type digital bar code readers having diverse modes of digital image processing for reading one-dimensional (1D) and two-dimensional (2D) bar code symbols, as well as other forms of graphically-encoded intelligence.

BACKGROUND

The state of the automatic-identification industry can be understood in terms of (i) the different classes of bar code symbologies that have been developed and adopted by the industry, and (ii) the kinds of apparatus developed and used to read such bar code symbologies in various user environments.

In general, there are currently three major classes of bar code symbologies, namely: one dimensional (1D) bar code symbologies, such as UPC/EAN, Code 39, etc.; 1D stacked bar code symbologies, Code 49, PDF417, etc.; and two-dimensional (2D) data matrix symbologies.

One Dimensional optical bar code readers are well known in the art. Examples of such readers include readers of the Metrologic Voyager® Series Laser Scanner manufactured by Metrologic Instruments, Inc. Such readers include processing circuits that are able to read one dimensional (1D) linear bar code symbologies, such as the UPC/EAN code, Code 39, etc., that are widely used in supermarkets. Such 1D linear symbologies are characterized by data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed, including Code 49, as described in U.S. Pat. No. 4,794,239 (Allais), and PDF417, as described in U.S. Pat. No. 5,340,786 (Pavlidis, et al.). Stacked symbols partition the encoded data into multiple rows, each including a respective 1D bar code pattern, all or most of all of which must be scanned and decoded, then linked together to form a complete message. Scanning still requires relatively high resolution in one dimension only, but multiple linear scans are needed to read the whole symbol.

The third class of bar code symbologies, known as 2D matrix symbologies offer orientation-free scanning and greater data densities and capacities than their 1D counterparts. In 2D matrix codes, data is encoded as dark or light data elements within a regular polygonal matrix, accompanied by graphical finder, orientation and reference structures. When scanning 2D matrix codes, the horizontal and vertical relationships of the data elements are recorded with about equal resolution.

In order to avoid having to use different types of optical readers to read these different types of bar code symbols, it is desirable to have an optical reader that is able to read symbols of any of these types, including their various subtypes, interchangeably and automatically. More particularly, it is desirable to have an optical reader that is able to read all three of the above-mentioned types of bar code symbols, without human intervention, i.e., automatically. This is turn, requires that the reader have the ability to automatically discriminate between and decode bar code symbols, based only on information read from the symbol itself. Readers that have this ability are referred to as "auto-discriminating" or having an "auto-discrimination" capability.

If an auto-discriminating reader is able to read only 1D bar code symbols (including their various subtypes), it may be said to have a 1D auto-discrimination capability. Similarly, if it is able to read only 2D bar code symbols, it may be said to have a 2D auto-discrimination capability. If it is able to read both 1D and 2D bar code symbols interchangeably, it may be said to have a 1D/2D auto-discrimination capability. Often, however, a reader is said to have a 1D/2D auto-discrimination capability even if it is unable to discriminate between and decode 1D stacked bar code symbols.

Optical readers that are capable of 1D auto-discrimination are well known in the art. An early example of such a reader is Metrologic's VoyagerCG® Laser Scanner, manufactured by Metrologic Instruments, Inc.

Optical readers, particularly hand held optical readers, that are capable of 1D/2D auto-discrimination and based on the use of an asynchronously moving 1D image sensor, are described in U.S. Pat. Nos. 5,288,985 and 5,354,977, which applications are hereby expressly incorporated herein by reference. Other examples of hand held readers of this type, based on the use of a stationary 2D image sensor, are described in U.S. Pat. Nos. 6,250,551; 5,932,862; 5,932,741; 5,942,741; 5,929,418; 5,914,476; 5,831,254; 5,825,006; 5,784,102, which are also hereby expressly incorporated herein by reference.

Optical readers, whether of the stationary or movable type, usually operate at a fixed scanning rate, which means that the readers are designed to complete some fixed number of scans during a given amount of time. This scanning rate generally has a value that is between 30 and 200 scans/sec for 1D readers. In such readers, the results the successive scans are decoded in the order of their occurrence.

Imaging-based bar code symbol readers have a number advantages over laser scanning based bar code symbol readers, namely: they are more capable of reading stacked 2D symbologies, such as the PDF 417 symbology; more capable of reading matrix 2D symbologies, such as the Data Matrix symbology; more capable of reading bar codes regardless of their orientation; have lower manufacturing costs; and have the potential for use in other applications, which may or may not be related to bar code scanning, such as OCR, security systems, etc Prior art imaging-based bar code symbol readers suffer from a number of additional shortcomings and drawbacks.

Most prior art hand held optical reading devices can be reprogrammed by reading bar codes from a bar code programming menu or with use of a local host processor as taught in U.S. Pat. No. 5,929,418. However, these devices are generally constrained to operate within the modes in which they have been programmed to operate, either in the field or on the bench, before deployment to end-user application environments. Consequently, the statically-configured nature of such prior art imaging-based bar code reading systems has limited their performance as well as capacity for easy integration into third-party products (i.e. systems and devices).

Prior art imaging-based bar code symbol readers with integrated illumination subsystems also support a relatively short range of the optical depth of field. This limits the capabilities of such systems from reading big or highly dense bar code labels.

Prior art imaging-based bar code symbol readers generally require separate apparatus for producing a visible aiming beam to help the user to aim the camera's field of view at the bar code label on a particular target object.

Prior art imaging-based bar code symbol readers generally require capturing multiple frames of image data of a bar code symbol, and special apparatus for synchronizing the decoding process with the image capture process within such readers, as required in U.S. Pat. Nos. 5,932,862 and 5,942,741 assigned to Welch Allyn, Inc.

Prior art imaging-based bar code symbol readers generally require large arrays of LEDs in order to flood the field of view within which a bar code symbol might reside during image capture operations, oftentimes wasting large amounts of electrical power which can be significant in portable or mobile imaging-based readers.

Prior art imaging-based bar code symbol readers generally require processing the entire pixel data set of capture images to find and decode bar code symbols represented therein. On the other hand, some prior art imaging systems use the inherent programmable (pixel) windowing feature within conventional CMOS image sensors to capture only partial image frames to reduce pixel data set processing and enjoy improvements in image processing speed and thus imaging system performance.

Many prior art imaging-based bar code symbol readers also require the use of decoding algorithms that seek to find the orientation of bar code elements in a captured image by finding and analyzing the code words of 2-D bar code symbologies represented therein.

Some prior art imaging-based bar code symbol readers generally require the use of a manually-actuated trigger to actuate the image capture and processing cycle thereof.

Prior art imaging-based bar code symbol readers generally require separate sources of illumination for producing visible aiming beams and for producing visible illumination beams used to flood the field of view of the bar code reader.

Prior art imaging-based bar code symbol readers generally utilize during a single image capture and processing cycle, and a single decoding methodology for decoding bar code symbols represented in captured images.

Some prior art imaging-based bar code symbol readers require exposure control circuitry integrated with the image detection array for measuring the light exposure levels on selected portions thereof.

Also, many imaging-based readers also require processing portions of captured images to detect the image intensities thereof and determine the reflected light levels at the image detection component of the system, and thereafter to control the LED-based illumination sources to achieve the desired image exposure levels at the image detector.

Prior art imaging-based bar code symbol readers employing integrated illumination mechanisms control image brightness and contrast by controlling the time the image sensing device is exposed to the light reflected from the imaged objects. While this method has been proven for the CCD-based bar code scanners, it is not suitable, however, for the CMOS-based image sensing devices, which require a more sophisticated shuttering mechanism, leading to increased complexity, less reliability and, ultimately, more expensive bar code scanning systems.

Prior art imaging-based bar code symbol readers generally require the use of tables and bar code menus to manage which decoding algorithms are to be used within any particular mode of system operation to be programmed by reading bar code symbols from a bar code menu.

Also, due to the complexity of the hardware platforms of such prior art imaging-based bar code symbol readers, end-users are not permitted to modify the features and functionalities of such system to their customized application requirements, other than changing limited functions within the system by reading system-programming type bar code symbols, as disclosed in U.S. Pat. Nos. 6,321,989; 5,965,863; 5,929,418; 5,932,862, each being incorporated herein by reference.

Also, dedicated image-processing based bar code symbol reading devices usually have very limited resources, such as the amount of volatile and non-volatile memories. Therefore, they usually do not have a rich set of tools normally available to universal computer systems. Further, if a customer or a third-party needs to enhance or alter the behavior of a conventional image-processing based bar code symbol reading system or device, they need to contact the device manufacturer and negotiate the necessary changes in the "standard" software or the ways to integrate their own software into the device, which usually involves the re-design or re-compilation of the software by the original equipment manufacturer (OEM). This software modification process is both costly and time consuming.

Also, as a result of limitations in the mechanical, electrical, optical, and software design of prior art imaging-based bar code symbol readers, such prior art readers generally: (i) fail to enable users to read high-density 1D bar codes with the ease and simplicity of laser scanning based bar code symbol readers and also 2D symbologies, such as PDF 417 and Data Matrix, and (iii) have not enabled end-users to modify the features and functionalities of such prior art systems without detailed knowledge about the hard-ware platform, communication interfaces and the user interfaces of such systems.

Also, control operations in prior art image-processing bar code symbol reading systems have not been sufficiently flexible or agile to adapt to the demanding lighting conditions presented in challenging retail and industrial work environments where 1D and 2D bar code symbols need to be reliably read.

Thus, there is a great need in the art for an improved method of and apparatus for reading bar code symbols using image capture and processing techniques which avoid the shortcomings and drawbacks of prior art methods and apparatus.

OBJECTS AND SUMMARY

Accordingly, a primary object of the present invention is to provide a novel method of and apparatus for enabling the recognition of graphically-encoded information, including 1D and 2D bar code symbologies and alphanumerical character strings, using novel image capture and processing based systems and devices, which avoid the shortcomings and drawbacks of prior art methods and apparatus.

Another object of the present invention is to provide a digital image capture and processing system employing multi-layer software-based system architecture permitting modification of system features and functionalities by way of third party code plug-ins.

Another object of the present invention is to provide such an image capture and processing system that allows customers, VARs and third parties to modify and/or extend a set of standard features and functions of the system without needing to contact the system's OEM and negotiate ways of integrating their desired enhancements to the system.

Another object of the present invention is to provide such an image capture and processing system that allows customers, VARs and third parties to independently design their own software according to the OEM specifications, and plug this software into the system, thereby effectively changing the device's behavior, without detailed knowledge about the hard-ware platform of the system, its communications with outside environment, and user-related interfaces Another object of the present invention is to provide a customer of such an image capture and processing system, or any third-party thereof, with a way of and means for enhancing or altering the behavior of the system without interfering with underlying hardware, communications and user-related interfaces.

Another object of the present invention is to provide end-users of such an image capture and processing system, as well as third-parties, with a way of and means for designing, developing, and installing in the device, their own plug-in modules without a need for knowledge of details of the device's hardware.

Another object of the present invention is to provide original equipment manufacturers (OEM) with a way of and means for installing the OEM's plug-in modules into an image capture and processing system, without knowledge of the third-party's plug-in (software) modules that have been installed therein, provided established specifications for system features and functionalities for the third-party plug-ins are met.

Another object of the present invention is to provide customers of an image capture and processing system, and third-parties thereof, with a way of and means for installing their own modules to enhance or alter the "standard" behavior of the device according to their own needs and independently from each other.

Another object of the present invention is to provide an image capture and processing system that supports designer/manufacturer-constrained system behavior modification, without requiring detailed knowledge about the hard-ware platform of the system, its communications with outside environment, and user-related interfaces.

Another object of the present invention is to provide a novel hand-supportable digital imaging-based bar code symbol reader capable of automatically reading 1D and 2D bar code symbologies using the state-of-the art imaging technology, and at the speed and with the reliability achieved by conventional laser scanning bar code symbol readers.

Another object of the present invention is to provide a novel hand-supportable digital imaging-based bar code symbol reader that is capable of reading stacked 2D symbologies such as PDF417, as well as Data Matrix.

Another object of the present invention is to provide a novel hand-supportable digital imaging-based bar code symbol reader that is capable of reading bar codes independent of their orientation with respect to the reader.

Another object of the present invention is to provide a novel hand-supportable digital imaging-based bar code symbol reader that utilizes an architecture that can be used in other applications, which may or may not be related to bar code scanning, such as OCR, OCV, security systems, etc.

Another object of the present invention is to provide a novel hand-supportable digital imaging-based bar code symbol reader that is capable of reading high-density bar codes, as simply and effectively as "flying-spot" type laser scanners do.

Another object of the present invention is to provide a hand-supportable imaging-based bar code symbol reader capable of reading 1D and 2D bar code symbologies in a manner as convenient to the end users as when using a conventional laser scanning bar code symbol reader.

BRIEF DESCRIPTION OF THE DRAWINGS

For a more complete understanding of how to practice the Objects of the Present Invention, the following Detailed Description of the Illustrative Embodiments can be read in conjunction with the accompanying Drawings, briefly described below:

FIG. 1A is a schematic representation of a digital image capture and processing system of the present invention, employing a multi-tier software system architecture capable of supporting various subsystems providing numerous standard system features and functions that can be modified and/or extended using the innovative plug-in programming methods of the present invention;

FIGS. 1C1-1C3, taken together, sets forth a table indicating the features and functions supported by each of the subsystems provided in the system architecture of the a digital image capture and processing system of the present invention, represented in FIGS. 1A and 1B;

FIG. 1D is a schematic representation indicating that the digital image capture and processing system of the present invention, shown in FIGS. 1A through 1C3, can be implemented using a digital camera board and a printed circuit (PC) board that are interfaced together;

FIG. 1E is a schematic representation indicating that the digital image capture and processing system of the present invention, shown in FIGS. 1A through 1C3, can be implemented using a single hybrid digital camera/PC board;

FIG. 1F is a schematic representation illustrating that the digital image capture and processing system of the present invention, shown in FIGS. 1A through 1E, can be integrated or embodied within third-party products, such as, for example, but not limited to digital image-processing based bar code symbol reading systems, OCR systems, object recognition systems, portable data terminals (PDTs), mobile phones, computer mice-type devices, personal computers, keyboards, consumer appliances, automobiles, ATMs, vending machines, reverse-vending machines, retail POS-based transaction systems, 2D or 2D digitizers, and CAT scanning systems, automobile identification systems, package inspection systems, personal identification systems and the like;

FIG. 2L1 is a schematic block diagram representative of a system design for the hand-supportable digital imaging-based bar code symbol reading device illustrated in FIGS. 2A through 2K, wherein the system design is shown comprising (1) a Multi-Mode Area-Type Image Formation and Detection (i.e. Camera) Subsystem having image formation (camera) optics for producing a field of view (FOV) upon an object to be imaged and a CMOS or like area-type image sensing array for detecting imaged light reflected off the object during illumination operations in either (i) a narrow-area image capture mode in which a few central rows of pixels on the image sensing array are enabled, or (ii) a wide-area image capture mode in which all rows of the image sensing array are enabled, (2) a Multi-Mode LED-Based Illumination Subsystem for producing narrow and wide area fields of narrow-band illumination within the FOV of the Image Formation And Detection Subsystem during narrow and wide area modes of image capture, respectively, so that only light transmitted from the Multi-Mode Illumination Subsystem and reflected from the illuminated object and transmitted through a narrow-band transmission-type optical filter realized within the hand-supportable housing (i.e. using a red-wavelength high-pass reflecting window filter element disposed at the light transmission aperture thereof and a low-pass filter before the image sensor) is detected by the image sensor and all other components of ambient light are substantially rejected, (3) an IR-based object presence and range detection subsystem for producing an IR-based object detection field within the FOV of the Image Formation and Detection Subsystem, (4) an Automatic Light Exposure Measurement and Illumination Control Subsystem for controlling the operation of the LED-Based Multi-Mode Illumination Subsystem, (5) an Image Capturing and Buffering Subsystem for capturing and buffering 2-D images detected by the Image Formation and Detection Subsystem, (6) a Multimode Image-Processing Based Bar Code Symbol Reading Subsystem for processing images captured and buffered by the Image Capturing and Buffering Subsystem and reading 1D and 2D bar code symbols represented, and (7) an Input/Output Subsystem for outputting processed image data and the like to an external host system or other information receiving or responding device, in which each said subsystem component is integrated about (7) a System Control Subsystem, as shown;

FIG. 2L2 is a schematic block representation of the Multi-Mode Image-Processing Based Bar Code Symbol Reading Subsystem, realized using the three-tier computing platform illustrated in FIG. 2M;

FIG. 3F1 is a first schematic representation showing, from a side view, the physical position of the LEDs used in the Multi-Mode Illumination Subsystem, in relation to the image formation lens assembly, the image sensing array employed therein (e.g. a Motorola MCM20027 or National Semiconductor LM9638 CMOS 2-D image sensing array having a 1280×10$^{24}$ pixel resolution (½" format), 6 micron pixel size, 13.5 Mhz clock rate, with randomly accessible region of interest (ROI) window capabilities);

FIG. 3F2 is a second schematic representation showing, from an axial view, the physical layout of the LEDs used in the Multi-Mode Illumination Subsystem of the digital imaging-based bar code symbol reading device, shown in relation to the image formation lens assembly, and the image sensing array employed therein;

FIG. 4A1 is a schematic representation specifying the range of narrow-area illumination, near-field wide-area illumination, and far-field wide-area illumination produced from the LED-Based Multi-Mode Illumination Subsystem employed in the hand-supportable digital imaging-based bar code symbol reading device of the present invention;

FIG. 4A2 is a table specifying the geometrical properties and characteristics of each illumination mode supported by the LED-Based Multi-Mode Illumination Subsystem employed in the hand-supportable digital imaging-based bar code symbol reading device of the present invention;

FIG. 4C1 is a graphical representation showing the Lambertian emittance versus wavelength characteristics of the LEDs used to implement the narrow-area illumination array in the Multi-Mode Illumination Subsystem of the present invention;

FIG. 4C2 is a graphical representation showing the Lambertian emittance versus polar angle characteristics of the LEDs used to implement the narrow-area illumination array in the Multi-Mode Illumination Subsystem of the present invention;

FIG. 4C3 is a schematic representation of the cylindrical lenses used before the LEDs in the narrow-area (linear) illumination arrays in the digital imaging-based bar code symbol reading device of the present invention, wherein the first surface of the cylindrical lens is curved vertically to create a narrow-area (i.e. linear) illumination pattern, and the second surface of the cylindrical lens is curved horizontally to control the height of the of the narrow-area illumination pattern to produce a narrow-area (i.e. linear) illumination field;

FIG. 4C4 is a schematic representation of the layout of the pairs of LEDs and two cylindrical lenses used to implement the narrow-area (linear) illumination array employed in the digital imaging-based bar code symbol reading device of the present invention;

FIG. 4C5 is a set of six illumination profiles for the narrow-area (linear) illumination fields produced by the narrow-area (linear) illumination array employed in the digital imaging-based bar code symbol reading device of the illustrative embodiment, taken at 30, 40, 50, 80, 120, and 220 millimeters along the field away from the imaging window (i.e. working distance) of the digital imaging-based bar code symbol reading device, illustrating that the spatial intensity of the narrow-area illumination field begins to become substantially uniform at about 80 millimeters;

FIG. 4D1 is a graphical representation showing the Lambertian emittance versus wavelength characteristics of the LEDs used to implement the wide area illumination arrays employed in the digital imaging-based bar code symbol reading device of the present invention;

FIG. 4D2 is a graphical representation showing the Lambertian emittance versus polar angle characteristics of the LEDs used to implement the far-field and near-field wide-area illumination arrays employed in the digital imaging-based bar code symbol reading device of the present invention;

FIG. 4D3 is a schematic representation of the plano-convex lenses used before the LEDs in the far-field wide-area illumination arrays in the illumination subsystem of the present invention, FIG. 4D4 is a schematic representation of the layout of LEDs and plano-convex lenses used to implement the far and narrow wide-area illumination array employed in the digital imaging-based bar code symbol reading device of the present invention, wherein the illumination beam produced therefrom is aimed by positioning the lenses at angles before the LEDs in the near-field (and far-field) wide-area illumination arrays employed therein;

FIG. 4D5 is a set of six illumination profiles for the near-field wide-area illumination fields produced by the near-field wide-area illumination arrays employed in the digital imaging-based bar code symbol reading device of the illustrative embodiment, taken at 10, 20, 30, 40, 60, and 100 millimeters along the field away from the imaging window (i.e. working distance) of the digital imaging-based bar code symbol reading device, illustrating that the spatial intensity of the near-field wide-area illumination field begins to become substantially uniform at about 40 millimeters;

FIG. 4D6 is a set of three illumination profiles for the far-field wide-area illumination fields produced by the far-field wide-area illumination arrays employed in the digital imaging-based bar code symbol reading device of the illustrative embodiment, taken at 100, 150 and 220 millimeters along the field away from the imaging window (i.e. working distance) of the digital imaging-based bar code symbol reading device, illustrating that the spatial intensity of the far-field wide-area illumination field begins to become substantially uniform at about 100 millimeters;

FIG. 4D7 is a table illustrating a preferred method of calculating the pixel intensity value for the center of the far-field wide-area illumination field produced from the Multi-Mode Illumination Subsystem employed in the digital imaging-based bar code symbol reading device of the present invention, showing a significant signal strength (greater than 80 DN);

FIG. 5A1 is a schematic representation showing the red-wavelength reflecting (high-pass) imaging window integrated within the hand-supportable housing of the digital imaging-based bar code symbol reading device, and the low-pass optical filter disposed before its CMOS image sensing array therewithin, cooperate to form a narrow-band optical filter subsystem for transmitting substantially only the very narrow band of wavelengths (e.g. 620-700 nanometers) of visible illumination produced from the Multi-Mode Illumination Subsystem employed in the digital imaging-based bar code symbol reading device, and rejecting all other optical wavelengths outside this narrow optical band however generated (i.e. ambient light sources);

FIG. 5A2 is a schematic representation of transmission characteristics (energy versus wavelength) associated with the low-pass optical filter element disposed after the red-wavelength reflecting high-pass imaging window within the hand-supportable housing of the digital imaging-based bar code symbol reading device, but before its CMOS image sensing array, showing that optical wavelengths below 620 nanometers are transmitted and wavelengths above 620 nm are substantially blocked (e.g. absorbed or reflected);

FIG. 5A3 is a schematic representation of transmission characteristics (energy versus wavelength) associated with the red-wavelength reflecting high-pass imaging window integrated within the hand-supportable housing of the digital imaging-based bar code symbol reading device of the present invention, showing that optical wavelengths above 700 nanometers are transmitted and wavelengths below 700 nm are substantially blocked (e.g. absorbed or reflected);

FIG. 5A4 is a schematic representation of the transmission characteristics of the narrow-based spectral filter subsystem integrated within the hand-supportable imaging-based bar code symbol reading device of the present invention, plotted against the spectral characteristics of the LED-emissions produced from the Multi-Mode Illumination Subsystem of the illustrative embodiment of the present invention;

FIGS. 6C1 and 6C2, taken together, set forth a schematic diagram of a hybrid analog/digital circuit designed to implement the Automatic Light Exposure Measurement and Illumination Control Subsystem of FIG. 6B employed in the hand-supportable digital imaging-based bar code symbol reading device of the present invention;

FIGS. 6E1 and 6E2, taken together, set forth a flow chart describing the steps involved in carrying out the global exposure control method of the present invention, within the digital imaging-based bar code symbol reading device of the illustrative embodiments;

FIG. 7 is a schematic block diagram of the IR-based automatic Object Presence and Range Detection Subsystem employed in the hand-supportable digital imaging-based bar code symbol reading device of the present invention, wherein a first range indication control signal is generated upon detection of an object within the near-field region of the Multi-Mode Illumination Subsystem, and wherein a second range indication control signal is generated upon detection of an object within the far-field region of the Multi-Mode Illumination Subsystem;

FIG. 12A is a schematic representation of the Events Dispatcher software module which provides a means of signaling and delivering events to the Application Events Manager, including the starting of a new task, stopping a currently running task, doing something, or doing nothing and ignoring the event;

FIG. 12B is a table listing examples of system-defined events which can occur and be dispatched within the hand-supportable digital imaging-based bar code symbol reading device of the present invention, namely: SCORE_EVENT_POWER_UP which signals the completion of system start-up and involves no parameters; _SCORE_EVENT_TIMEOUT which signals the timeout of the logical timer, and involves the parameter "pointer to timer id"; SCORE_EVENT_UNEXPECTED_INPUT which signals that the unexpected input data is available and involves the parameter "pointer to connection id"; SCORE_EVENT_TRIG_ON which signals that the user pulled the trigger switch and involves no parameters; SCORE_EVENT_TRIG_OFF which signals that the user released the trigger switch and involves no parameters; SCORE_EVENT_OBJECT_DETECT_ON which signals that the object is positioned under the bar code reader and involves no parameters; SCORE_EVENT_OBJECT_DETECT_OFF which signals that the object is removed from the field of view of the bar code reader and involves no parameters; SCORE_EVENT_EXIT_TASK which signals the end of the task execution and involves the pointer UTID; and SCORE_EVENT_ABORT_TASK which signals the aborting of a task during execution;

FIG. 12C is a schematic representation of the Tasks Manager software module which provides a means for executing and stopping application specific tasks (i.e. threads);

FIG. 12D is a schematic representation of the Input/Output Manager software module (i.e. Input/Output Subsystem), which runs in the background and monitors activities of external devices and user connections, and signals appropriate events to the Application Layer, which such activities are detected;

FIGS. 12E1 and 12E2 set forth a schematic representation of the Input/Output Subsystem software module which provides a means for creating and deleting input/output connections, and communicating with external systems and devices;

FIGS. 12F1 and 12F2 set forth a schematic representation of the Timer Subsystem which provides a means for creating, deleting, and utilizing logical timers;

FIGS. 12G1 and 12G2 set forth a schematic representation of the Memory Control Subsystem which provides an interface for managing the thread-level dynamic memory with the device, fully compatible with standard dynamic memory management functions, as well as a means for buffering collected data;

FIG. 12H is a schematic representation of the user commands manager which provides a standard way of entering user commands, and executing application modules responsible for handling the same;

FIG. 12I is a schematic representation of the device driver software modules, which includes trigger switch drivers for establishing a software connection with the hardware-based manually-actuated trigger switch employed on the digital imaging-based bar code symbol reading device, an image acquisition driver for implementing image acquisition functionality aboard the digital imaging-based bar code symbol reading device, and an IR driver for implementing object detection functionality aboard the imaging-based bar code symbol reading device;

FIG. 19A1 is a perspective view of an alternative illustrative embodiment of the digital image capture and processing engine shown in FIGS. 14Q through 17, adapted for POS applications and reconfigured so that the illumination/aiming subassembly shown in FIG. 16 is mounted adjacent the light transmission window of the engine housing, whereas the remaining subassembly is mounted relative to the bottom of the engine housing so that the optical axis of the camera lens is parallel with the light transmission aperture, and a field of view (FOV) folding mirror is mounted beneath the illumination/aiming subassembly for directing the FOV of the system out through the central aperture formed in the illumination/aiming subassembly;

FIG. 19A2 is a schematic block diagram representative of a system design for the digital image capture and processing engine of the present invention shown in FIG. 19A1, wherein the system design is similar to that shown in FIG. 2A1, except that the Automatic Light Exposure Measurement and Illumination Control Subsystem is adapted to measure the light exposure on a central portion of the CMOS image sensing array and control the operation of the LED-Based Multi-Mode Illumination Subsystem in cooperation with a software-based illumination metering program realized within the Multi-Mode Image Processing Based Bar Code Symbol Reading Subsystem, involving the real-time exposure quality analysis of captured digital images in accordance with an adaptive system control method;

FIG. 19B1 is a perspective view of an automatic imaging-based bar code symbol reading system of the present invention supporting a presentation-type mode of operation using wide-area illumination and video image capture and processing techniques, and employing the general engine design shown in FIG. 19A1;

FIG. 19B2 is a cross-sectional view of the system shown in FIG. 19B1;

FIG. 19B3 is a schematic block diagram representative of a system design for the digital image capture and processing engine of the present invention shown in FIG. 19B1, wherein the system design is similar to that shown in FIG. 2A1, except that the Automatic Light Exposure Measurement and Illumination Control Subsystem is adapted to measure the light exposure on a central portion of the CMOS image sensing array and control the operation of the LED-Based Multi-Mode Illumination Subsystem in cooperation with a software-based illumination metering program realized within the Multi-Mode Image Processing Based Bar Code Symbol Reading Subsystem, performing the real-time exposure quality analysis of captured digital images in accordance with an adaptive system control method;

FIG. 19C1 is a perspective view of an automatic imaging-based bar code symbol reading system of the present invention supporting a pass-through mode of operation using narrow-area illumination and video image capture and processing techniques, as well as a presentation-type mode of operation using wide-area illumination and video image capture and processing techniques;

FIG. 19C2 is a schematic representation illustrating the system of FIG. 19C1 operated in its Pass-Through Mode of system operation;

FIG. 19C3 is a schematic representation illustrating the system of FIG. 19C1 operated in its Presentation Mode of system operation;

FIG. 19C4 is a schematic block diagram representative of a system design for the digital image capture and processing engine of the present invention shown in FIGS. 19C1 and 19C2, wherein the system design is similar to that shown in FIG. 2A1, except for the following differences: (1) the Automatic Light Exposure Measurement and Illumination Control Subsystem is adapted to measure the light exposure on a central portion of the CMOS image sensing array and control the operation of the LED-Based Multi-Mode Illumination Subsystem in cooperation with the Multi-Mode Image Processing Based Bar Code Symbol Reading Subsystem, carrying out real-time quality analysis of captured digital images in accordance with an adaptive system control method; (2) the narrow-area field of illumination and image capture is oriented in the vertical direction with respect to the counter surface of the POS environment, to support the Pass-Through Mode of the system, as illustrated in FIG. 19C2; and (3) the IR-based object presence and range detection system employed in FIG. 19C1 is replaced with an automatic IR-based object presence and direction detection subsystem which comprises four independent IR-based object presence and direction detection channels;

FIG. 19C5 is a schematic block diagram of the automatic IR-based object presence and direction detection subsystem employed in the bar code reading system illustrated in FIGS. 19C1 through 19C4, showing four independent IR-based object presence and direction detection channels which automatically generate activation control signals for four orthogonal directions within the FOV of the system, which are received and processed by a signal analyzer and control logic block;

FIG. 20A is a perspective view of a first illustrative embodiment of a projection-type POS image-processing based bar code symbol reading system, employing the digital image capture and processing engine showing in FIGS. 14A through 18 or 19A1 through 19A2;

FIG. 20B is a perspective view of a second illustrative embodiment of a projection-type POS image-processing based bar code symbol reading system, employing the digital image capture and processing engine showing in FIGS. 14A through 18 or 19A1 through 19A2;

FIG. 20C is a perspective view of a third illustrative embodiment of a projection-type POS image-processing based bar code symbol reading system, employing the digital image capture and processing engine showing in FIGS. 14A through 18 or 19A1 through 19A2;

FIG. 21 is a perspective view of a price lookup unit (PLU) system employing a digital image capture and processing subsystem of the present invention identifying bar coded consumer products in retail store environments, and displaying the price thereof on the LCD panel integrated in the system;

FIG. 23C1 is an exemplary flow chart representation showing what operations are carried out when the system feature called "Data Formatting Procedure" is executed within the Data Output Procedure software module in the Application Layer of the system as shown in FIG. 10; and FIG. 23C2 is an exemplary flow chart representation showing what operations are carried out when the system feature called "Scanner Configuration Procedure" is executed within the Data Output Procedure software module in the Application Layer of the system as shown in FIG. 10.

DETAILED DESCRIPTION

Figure 1B:
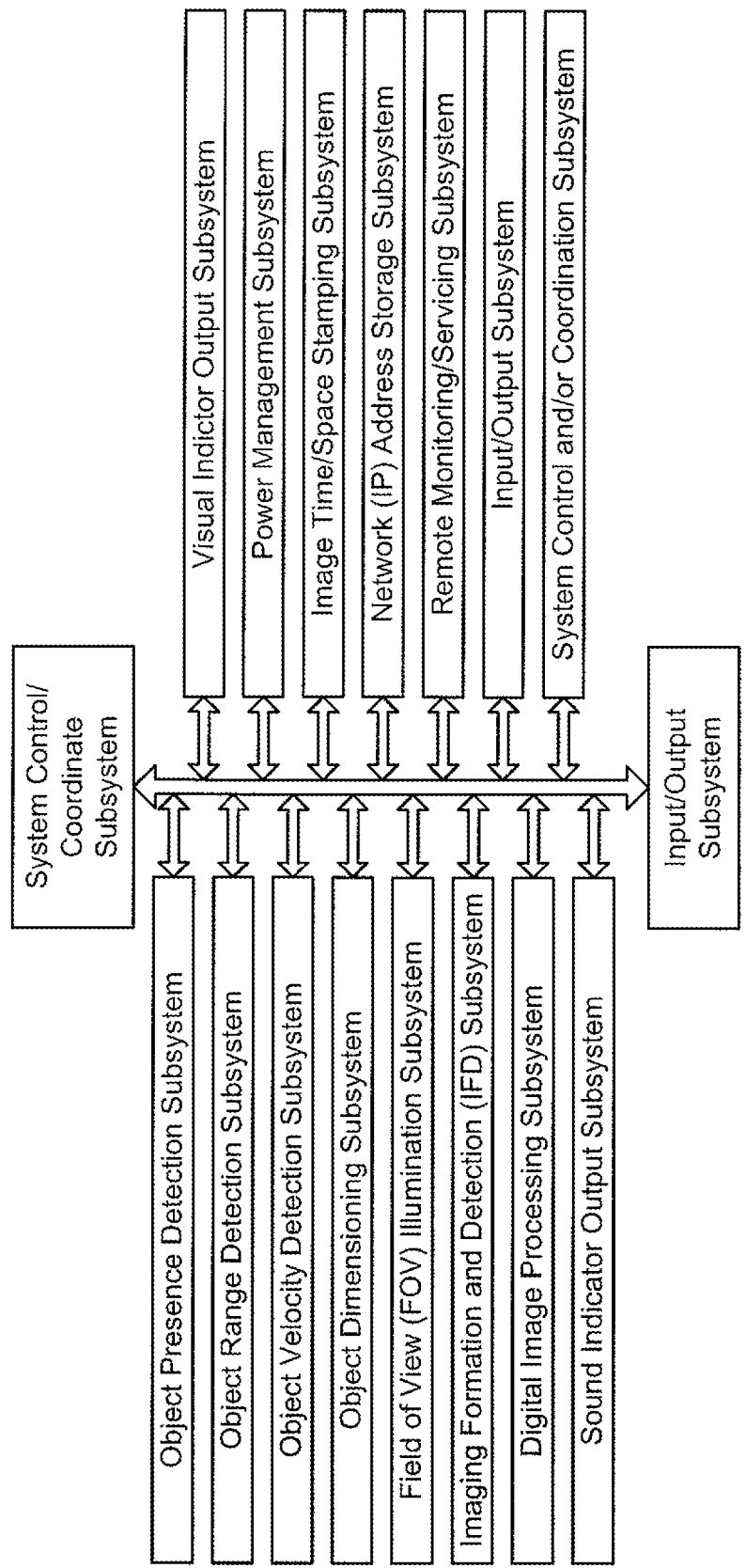
FIG. 1B is a schematic representation of the system architecture of the a digital image capture and processing system of the present invention, represented in FIG. 1A.

Referring to the figures in the accompanying Drawings, the various illustrative embodiments of the hand-supportable imaging-based bar code symbol reading system of the present invention will be described in greater detail, wherein like elements will be indicated using like reference numerals.

Overview Of The Digital Image Capture And Processing System Of The Present Invention Employing Multi-Layer Software-Based System Architecture Permitting Modification And/Or Extension Of System Features And Functions By Way Of Third Party Code Plug-Ins The present invention addresses the shortcomings and drawbacks of prior art digital image capture and processing systems and devices, including laser and digital imaging-based bar code symbol readers, by providing a novel system architecture, platform and development environment which enables VARs, OEMs and others (i.e. other than the original system designers) to modify and/or extend the standard system features and functions of a very broad class of digital image capture and processing systems and devices, without requiring such third-parties to possess detailed knowledge about the hard-ware platform of the system, its communications with outside environment, and/or its user-related interfaces. This novel approach has numerous benefits and advantages to third parties wishing to employ, in their third party products, the digital image capture and processing technology of an expert digital imager designer and manufacturer, such as Applicants and their Assignee, Metrologic Instruments, Inc., but not having to sacrifice or risk the disclosure of its valuable intellectual property and know now, during such system feature and functionality modification and/or extension processes, in order to meet the requirements of its end-user applications at hand.

As shown in FIGS. 1A through 1B, the digital image capture and processing system of the present invention 1000 employs a multi-tier software system architecture capable of supporting various subsystems providing numerous standard system features and functions that can be modified and/or extended using the innovative plug-in programming methods of the present invention. In the illustrative embodiments of the present invention disclosed herein, such subsystems include: an object presence detection subsystem; an object range detection subsystem; an object velocity detection subsystem; an object dimensioning subsystem; a field of view (FOV) illumination subsystem; an imaging formation and detection (IFD) subsystem; a digital image processing subsystem; a sound indicator output subsystem; a visual indictor output subsystem; a power management subsystem; an image time/space stamping subsystem; a network (IP) address storage subsystem; a remote monitoring/servicing subsystem; an input/output subsystem; and a system control and/or coordination subsystem, generally integrated as shown.

For the illustrative embodiments of the present invention disclosed herein, exemplary standard system features and functions are described in the table of FIGS. 1C1-1C3. Such system features and functions are described below, in conjunction with the subsystem that generally supports the feature and function in the digital image capture and processing of the present invention:

System Triggering Feature (i.e. Trigger Event Generation):
Object Presence Detection Subsystem Standard System Functions:
Automatic Triggering (i.e. IR Object Presence Detection) (e.g. ON, OFF)
Manual Triggering (e.g. ON, OFF)
Semi-Automatic Triggering (e.g. ON, OFF)
Object Range Detection Feature: Object Range Detection Subsystem
Standard System Functions:
(IR-Based) Long/Short Range Detection (e.g. ON, OFF)
(IR-Based) Quantized/Incremental Range Detection (e.g. ON, OFF)
Object Velocity Detection Feature: Object Velocity Detection Subsystem
Standard System Functions:
LIDAR-Based Object Velocity Detection (e.g. ON, OFF)
IR-PULSE-DOPPLER Object Velocity Detection (e.g. ON, OFF)
Object Dimensioning Feature: Object Dimensioning Subsystem
Standard System Functions:
LIDAR-based Object Dimensioning (e.g. ON or OFF)

Structured-Laser Light Object Dimensioning (e.g. ON or OFF)
Field of View (FOV) Illumination Feature: Illumination Subsystem Standard System Functions:
Illumination Mode (e.g. Ambient/OFF, LED Continuous, and LED Strobe/Flash)
Automatic Illumination Control (i.e. ON or OFF)
Illumination Field Type (e.g. Narrow-Area Near-Field Illumination, Wide-Area Far-Field Illumination, Narrow-Area Field Of Illumination, Wide-Area Field Of Illumination)
Imaging Formation and Detection Feature: Imaging Formation and Detection (IFD) Subsystem Standard System Functions:
Image Capture Mode (e.g. Narrow-Area Image Capture Mode, Wide-Area Image Capture Mode)
Image Capture Control (e.g. Single Frame, Video Frames)
Electronic Gain Of The Image Sensing Array (e.g. 1-10,000)
Exposure Time For Each Image Frame Detected by The Image Sensing Array (e.g. programmable in increments of milliseconds)
Exposure Time For Each Block Of Imaging Pixels Within The Image Sensing Array (e.g. programmable in increments of milliseconds)
Field Of View Marking (e.g. One Dot Pattern; Two Dot Pattern; Four Dot Pattern; Visible Line Pattern; Four Dot And Line Pattern)
Digital Image Processing Feature: Digital Image Processing Subsystem Standard System Functions:
Image Cropping Pattern on Image Sensing Array (e.g. x1, y2, x2, y2, x3, y3, x4, y4)
Pre-processing of Image frames (e.g. digital filter 1, digital filter 2, . . . digital filter n)
Information Recognition Processing (e.g. Recognition of A-th Symbology; . . . Recognition of Z-th
Symbology, Alphanumerical Character String Recognition using OCR 1, . . . Alphanumerical Character
String Recognition using OCR n; and Text Recognition Processes)
Post-Processing (e.g. Digital Data Filter 1, Digital Data Filter 2, . . . )
Object Feature/Characteristic Set Recognition (e.g. ON or OFF)
Sound Indicator Output Feature: Sound Indicator Output Subsystem
Standard System Functions:
Sound Loudness (e.g., High, Low, Medium Volume)
Sound Pitch (e.g. freq. 1, freq2, freq3, . . . sound 1, . . . sound N)
Visual Indictor Output Feature: Visual Indictor Output Subsystem
Standard System Functions:
Indicator Brightness (e.g., High, Low, Medium Brightness)
Indicator Color (e.g. red, green, yellow, blue, white)
Power Management Feature: Power Management Subsystem Standard System Functions:
Power Operation Mode (e.g. OFF, ON Continuous, ON Energy Savings)
Energy Savings Mode (e.g. Savings Mode No. 1, Savings Mode No. 2, . . . Savings Mode M)
Image Time/Space Stamping Feature: Image Time/Space Stamping Subsystem Standard System Functions:
GPS-Based Time/Space Stamping (e.g. ON, OFF)
Network Server Time Assignment (e.g. ON, OFF)
Network (IP) Address Storage Feature: IP Address Storage Subsystem Standard System Functions:
Manual IP Address Storage (e.g. ON, OFF)
Automatic IP Address Storage via DHCP (e.g. ON, OFF)
Remote Monitoring/Servicing Feature: Remote Monitoring/Servicing Subsystem Standard System Functions:
TCP/IP Connection (e.g. ON, OFF)
SNMP Agent (e.g. ACTIVE or DEACTIVE)
Input/Output Feature: Input/Output Subsystem
Standard System Functions:
Data Communication Protocols (e.g. RS-232 Serial, USB, Bluetooth, etc)
Output Image File Formats (e.g. JPG/EXIF, TIFF, PICT, PDF, etc)
Output Video File Formats (e.g. MPEG, AVI, etc)
Data Output Format (e.g. ASCII)
Keyboard Interface (e.g. ASCII)
Graphical Display (LCD) Interface (e.g. ACTIVE or DEACTIVE)
System Control and/or Coordination Feature: System Control and/or Coordination Subsystem Standard System Functions:
Mode of System Operation (e.g. System Mode 1, System Mode 2, . . . System Mode N)

As indicated in FIG. 1D, the digital image capture and processing system of the present invention 1000, represented in FIGS. 1A through 1C3, can be implemented using a digital camera board and a printed circuit (PC) board that are interfaced together. Alternatively, as shown in FIG. 1E, the digital image capture and processing system of the present invention 1000 can also be implemented using a single hybrid digital camera/PC board, as shown.

As shown in FIG. 1F, the digital image capture and processing system of the present invention can be integrated or embodied within third-party products, such as, for example, but not limited to, image-processing based bar code symbol reading systems, OCR systems, object recognition systems, portable data terminals (PDTs), mobile phones, computer mice-type devices, personal computers, keyboards, consumer appliances, automobiles, ATMs, vending machines, reverse-vending machines, retail POS-based transaction systems, 2D or 2D digitizers, and CAT scanning systems, automobile identification systems, package inspection systems, and personal identification systems, and the like.

In general, the digital image capture and processing system of the present invention has a set of standard features and functions as described above, and a set of custom features and functionalities that satisfy customized end-user application requirements, which typically aim to modify and/or extend such standard system features and functions for particular applications at hand.

In the illustrative embodiments described in detail below with reference to FIGS. 2A through 13F, the digital image capture and processing system of the present invention (regardless of the third-product into which the system is integrated or embodied), generally comprises:

a digital camera subsystem for projecting a field of view (FOV) upon an object to be imaged in said FOV, and detecting imaged light reflected off the object during illumination operations in an image capture mode in which one or more digital images of the object are formed and detected by said digital camera subsystem;

a digital image processing subsystem for processing digital images and producing raw or processed output data or recognizing or acquiring information graphically represented therein, and producing output data representative of the recognized information;

an input/output subsystem for transmitting said output data to an external host system or other information receiving or responding device;

a system control system for controlling and/or coordinating the operation of the subsystems above; and a computing platform for supporting the implementation of one or more of the subsystems above, and the features and functions of the digital image capture and processing system.

The computing platform includes (i) memory for storing pieces of original product code written by the original designers of the digital image capture and processing system, and (ii) a microprocessor for running one or more Applications by calling and executing pieces of said original product code in a particular sequence, so as support a set of standard features and functions which characterize a standard behavior of the digital image capture and processing system.

As will be described in greater detail with reference to FIGS. 22 through 23C2, these pieces of original product code have a set of place holders into which third-party product code can be inserted or plugged by third parties, including value-added resellers (VARs), original equipment manufacturers (OEMs), and also end-users of the digital image capture and processing system.

In accordance with the novel principles of the present invention, one or more pieces of third-party code ("plug-ins") are inserted or plugged into the set of place holders, and operate to extend the standard features and functions of the digital image capture and processing system, and modify the standard behavior thereof into a custom behavior for the digital image capture and processing system.

In most embodiments of the present invention, the digital image capture and processing system will further comprise a housing having a light transmission window, wherein the FOV is projected through the light transmission window and upon an object to be imaged in the FOV. Also, typically, these pieces of original product code as well as third-party product code are maintained in one or more libraries supported in the memory structure of the computing platform. In general, such memory comprises a memory architecture having different kinds of memory, each having a different access speed and performance characteristics.

In accordance with the principles of the present invention, the end-user, such a value-added reseller (VAR) or original equipment manufacturer (OEM), can write such pieces of third-party code (i.e. plug-ins) according to specifications set by the original system designers, and these pieces of custom code can be plugged into the place holders, so as to modify and extend the features and functions of the digital image capture and processing system (or third-party product into which the system is integrated or embodied), and modify the standard behavior of the digital image capture and processing system into a custom behavior for the digital image capture and processing system, without permanently modifying the standard features and functions of the digital image capture and processing system.

In some illustrative embodiments of the present invention, the digital camera system comprises: a digital image formation and detection subsystem having (i) image formation optics for projecting the FOV through a light transmission window and upon the object to be imaged in the FOV, and (ii) an image sensing array for detecting imaged light reflected off the object during illumination operations in an image capture mode in which sensor elements in the image sensing array are enabled so as to detect one or more digital images of the object formed on the image sensing array; an illumination subsystem having an illumination array for producing and projecting a field of illumination through the light transmission window and within the FOV during the image capture mode; and an image capturing and buffering subsystem for capturing and buffering these digital images detected by the image formation and detection subsystem.

The image sensing array can be realized by a digital image sensing structure selected from the group consisting of an area-type image sensing array, and a linear-type image sensing array.

Figure 10:
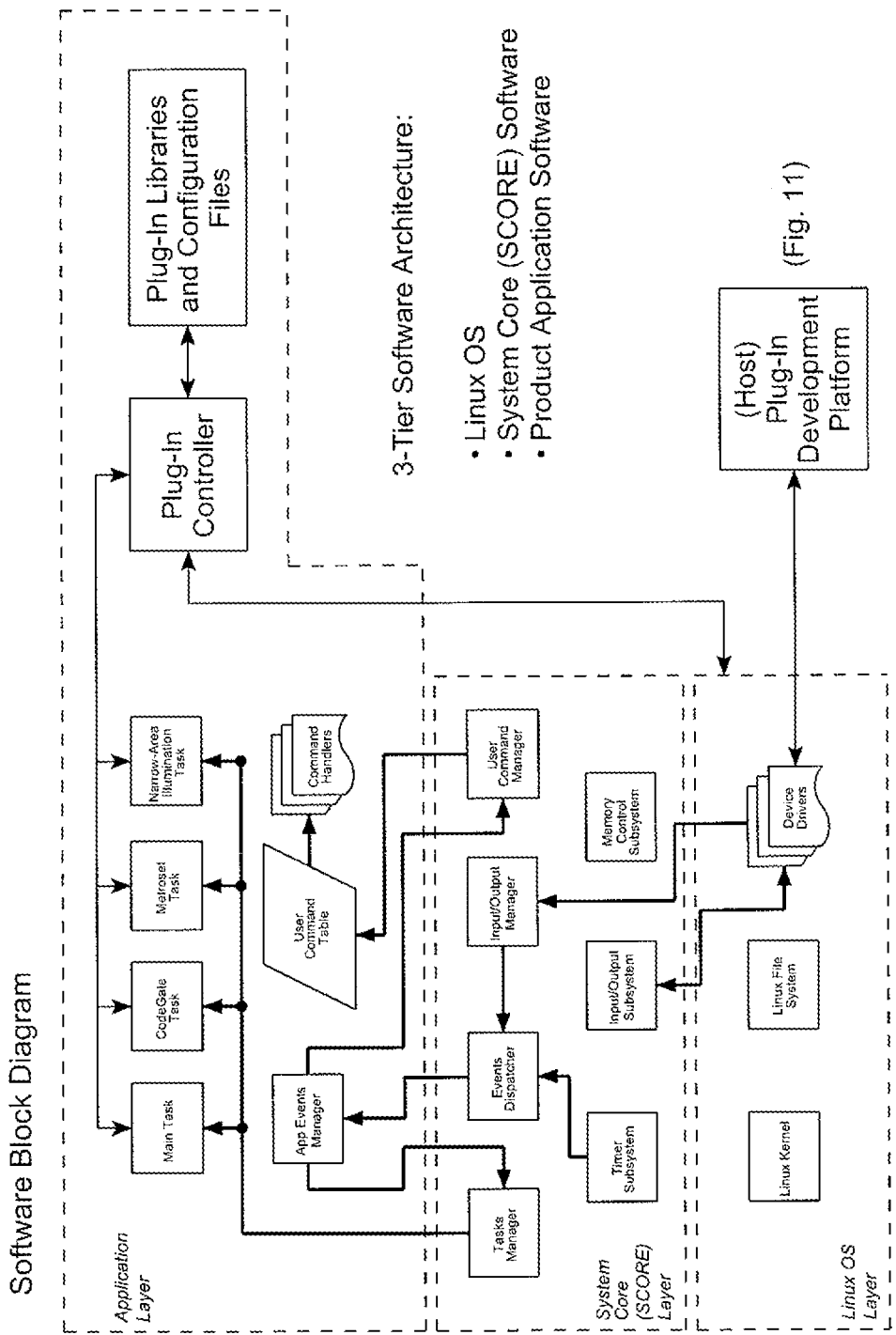
FIG. 10 is a schematic representation showing the software modules associated with the three-tier software architecture of the hand-supportable digital imaging-based bar code symbol reading device of the present invention, namely: the Main Task module, the CodeGate Task module, the Narrow-Area Illumination Task module, the Metroset Task module, the Application Events Manager module, the User Commands Table module, the Command Handler module, Plug-In Controller, and Plug-In Libraries and Configuration Files, all residing within the Application layer of the software architecture; the Tasks Manager module, the Events Dispatcher module, the Input/Output Manager module, the User Commands Manager module, the Timer Subsystem module, the Input/Output Subsystem module and the Memory Control Subsystem module residing with the System Core (SCORE) layer of the software architecture; and the Linux Kernal module in operable communication with the Plug-In Controller, the Linux File System module, and Device Drivers modules residing within the Linux Operating System (OS) layer of the software architecture, and in operable communication with an external (host0 Plug-In Development Platform via standard or proprietary communication interfaces.

Preferably, the memory employed in the computing platform of the system maintains system parameters used to configure the functions of the digital image capture and processing system. In the illustrative embodiments, the memory comprises a memory architecture that supports a three-tier modular software architecture characterized by an Operating System (OS) layer, a System CORE (SCORE) layer, and an Application layer and responsive to the generation of a triggering event within said digital-imaging based code symbol reading system, as shown in FIG. 10. The OS layer includes one or more software modules selected from the group consisting of an OS kernal module, an OS file system module, and device driver modules. The SCORE layer includes one or more of software modules selected from the group consisting of a tasks manager module, an events dispatcher module, an input/output manager module, a user commands manager module, the timer subsystem module, an input/output subsystem module and an memory control subsystem module. The Application Layer includes one or more software modules selected from the group consisting of a code symbol decoding module, a function programming module, an application events manager module, a user commands table module, and a command handler module.

The field of illumination projected from the illumination subsystem can be narrow-band illumination produced from an array of light emitting diodes (LEDs). Also, the digital image processing subsystem is typically adapted to process captured digital images so as to read one or more code symbols graphically represented in the digital images, and produces output data in the form of symbol character data representative of the read one or more code symbols. Each code symbol can be a bar code symbol selected from the group consisting of a 1D bar code symbol, a 2D bar code symbol, and a data matrix type code symbol structure.

These and other aspects of the present invention will become apparent hereinafter and in the claims. It is, therefore, appropriate at this juncture to now describe in detail, the various illustrative embodiments of the digital image capture and processing system of the present invention depicted in FIGS. 1A through 1F. In each of these illustrative embodiments shown in FIGS. 2A through 13F and 14Q through 21, the digital image capture and processing system 1000 of the present invention is either integrated or embodied into the structure, features and functionalities of the systems or products shown. After these illustrative embodiments have been described, the technical aspects of the plug-in programming methods of the present invention will be described in great detail with reference to FIGS. 22 through 23C2.

Hand-Supportable Digital Imaging-Based Bar Code Reading Device of the First Illustrative Embodiment of the Present Invention Referring to FIGS. 2A through 2L, the hand-supportable digital imaging-based bar code symbol reading device of the first illustrative embodiment of the present invention 1 is shown in detail comprising a hand-supportable housing 2 having a handle portion 2A and a head portion 2B that is provided with a light transmission window 3 with a high-pass (red-wavelength reflecting) optical filter element 4A having light transmission characteristics set forth in FIG. 5A2, in the illustrative embodiment. As will be described in greater detail hereinafter, high-pass optical filter element 4A cooperates within an interiorly mounted low-pass optical filter element 4B characterized in FIG. 5A1, which cooperates with the high-pass optical filter element 4A. These high and low pass filter elements 4A and 4B cooperate to provide a narrow-band optical filter system 4 that integrates with the head portion of the housing and permits only a narrow band of illumination (e.g. 633 nanometers) to exit and enter the housing during imaging operations.

Figure 2A:
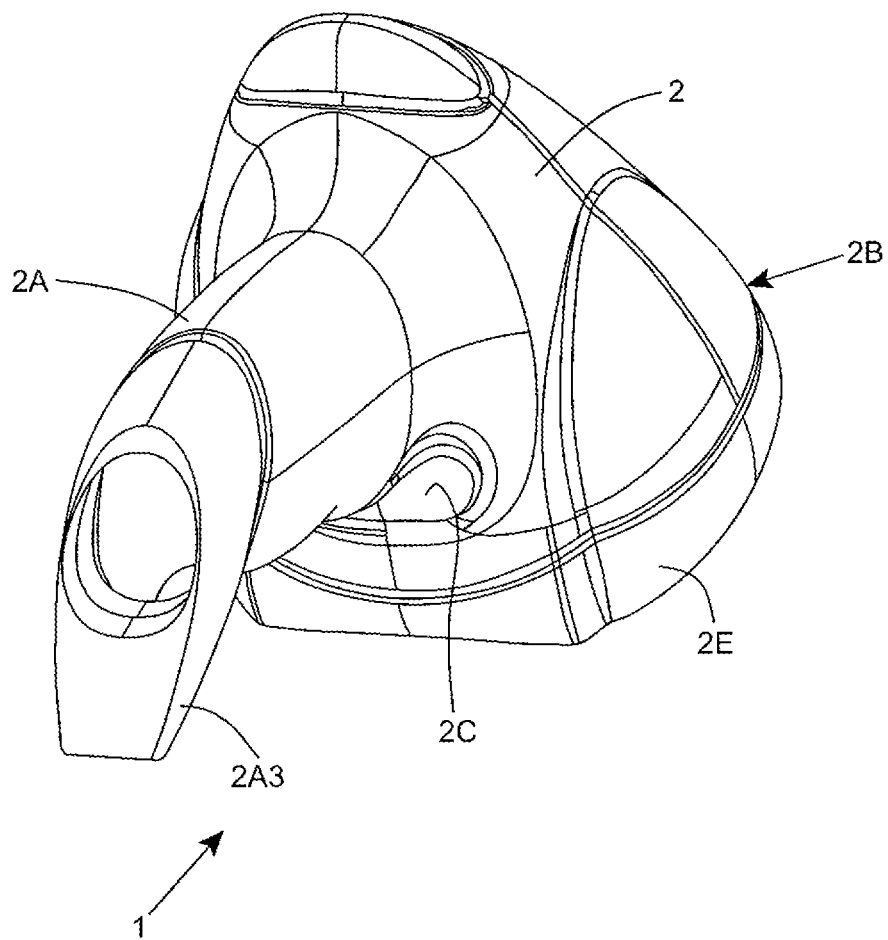
FIG. 2A is a rear perspective view of the hand-supportable digital imaging-based bar code symbol reading device of the first illustrative embodiment of the present invention.
Figure 2B:
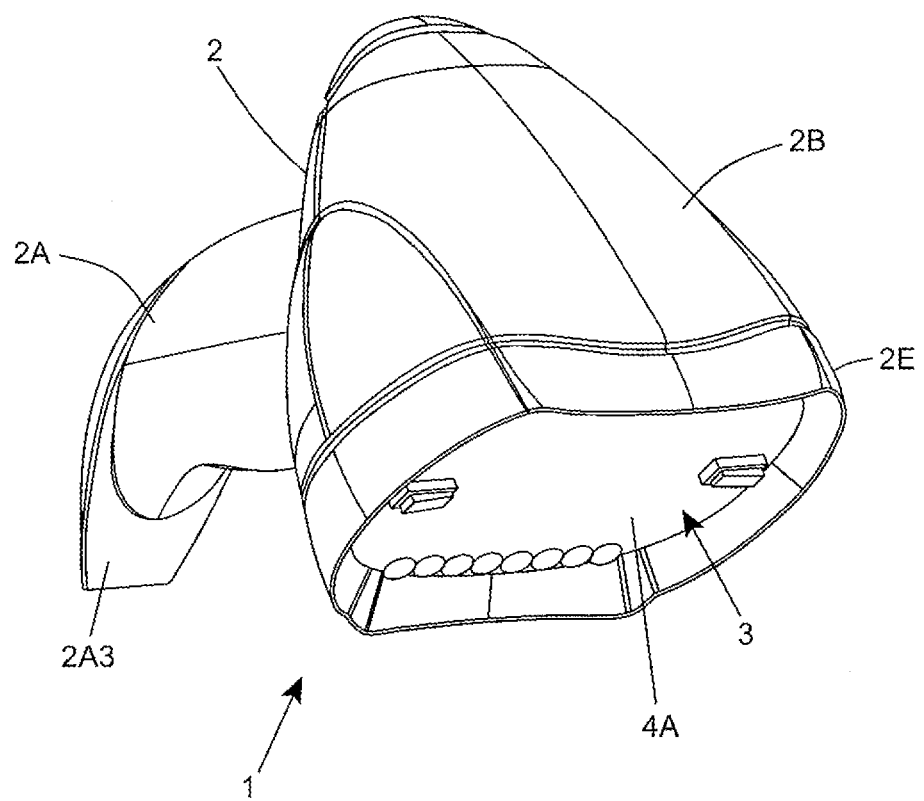
FIG. 2B is a front perspective view of the hand-supportable digital imaging-based bar code symbol reading device of the first illustrative embodiment of the present invention.
Figure 2C:
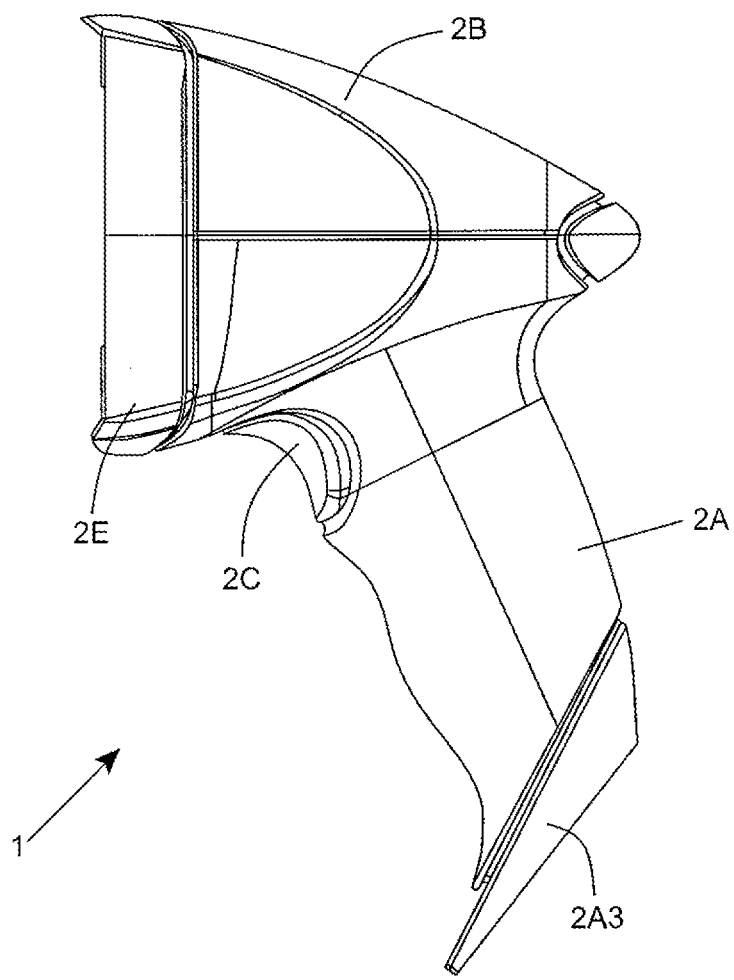
FIG. 2C is an elevated left side view of the hand-supportable digital imaging-based bar code symbol reading device of the first illustrative embodiment of the present invention.
Figure 2D:
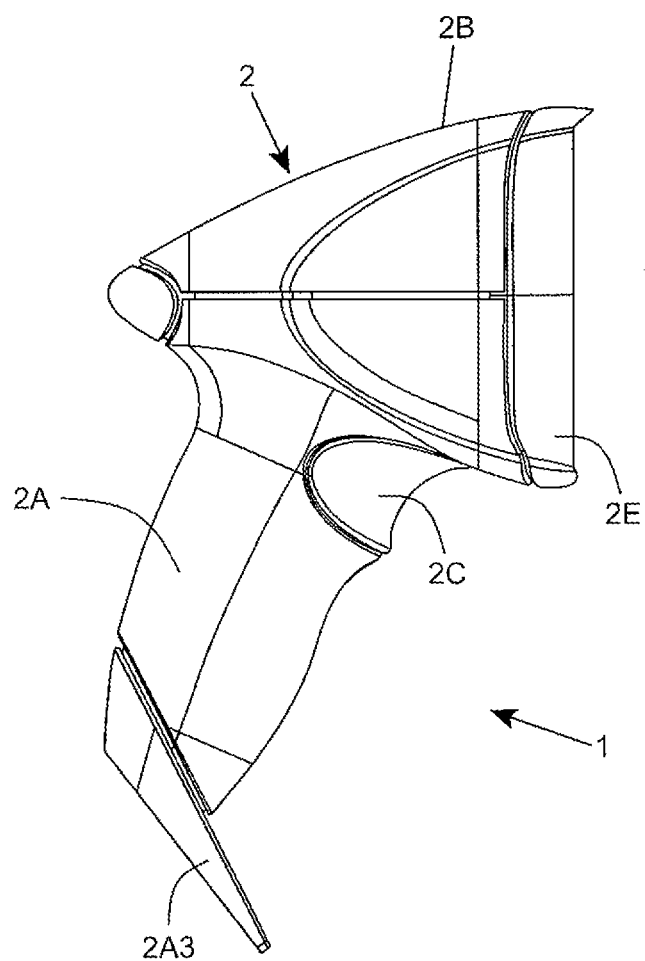
FIG. 2D is an elevated right side view of the hand-supportable digital imaging-based bar code symbol reading device of the first illustrative embodiment of the present invention.
Figure 2E:
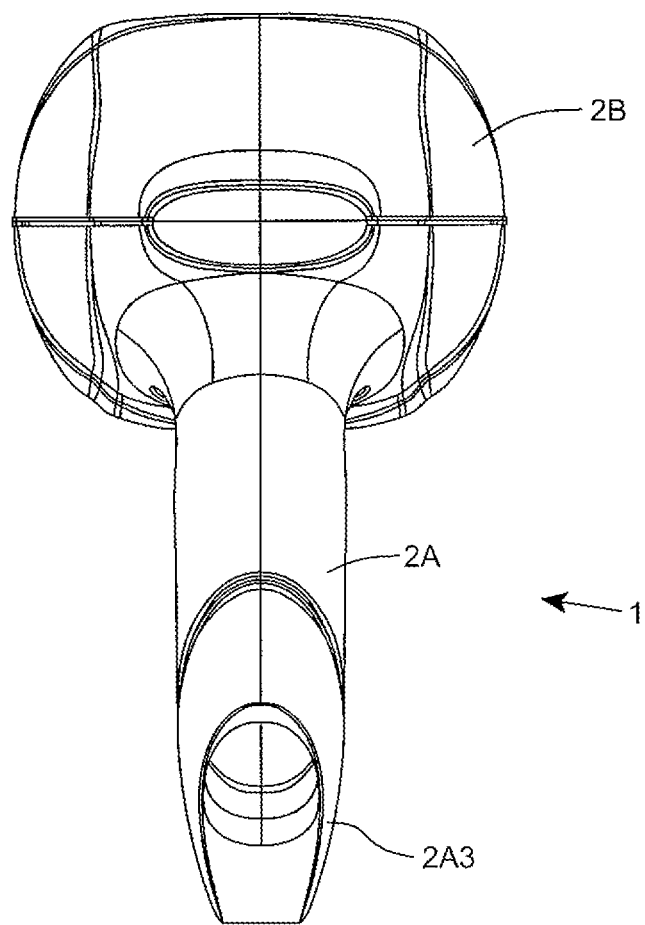
FIG. 2E is an elevated rear view of the hand-supportable digital imaging-based bar code symbol reading device of the first illustrative embodiment of the present invention.
Figure 2F:
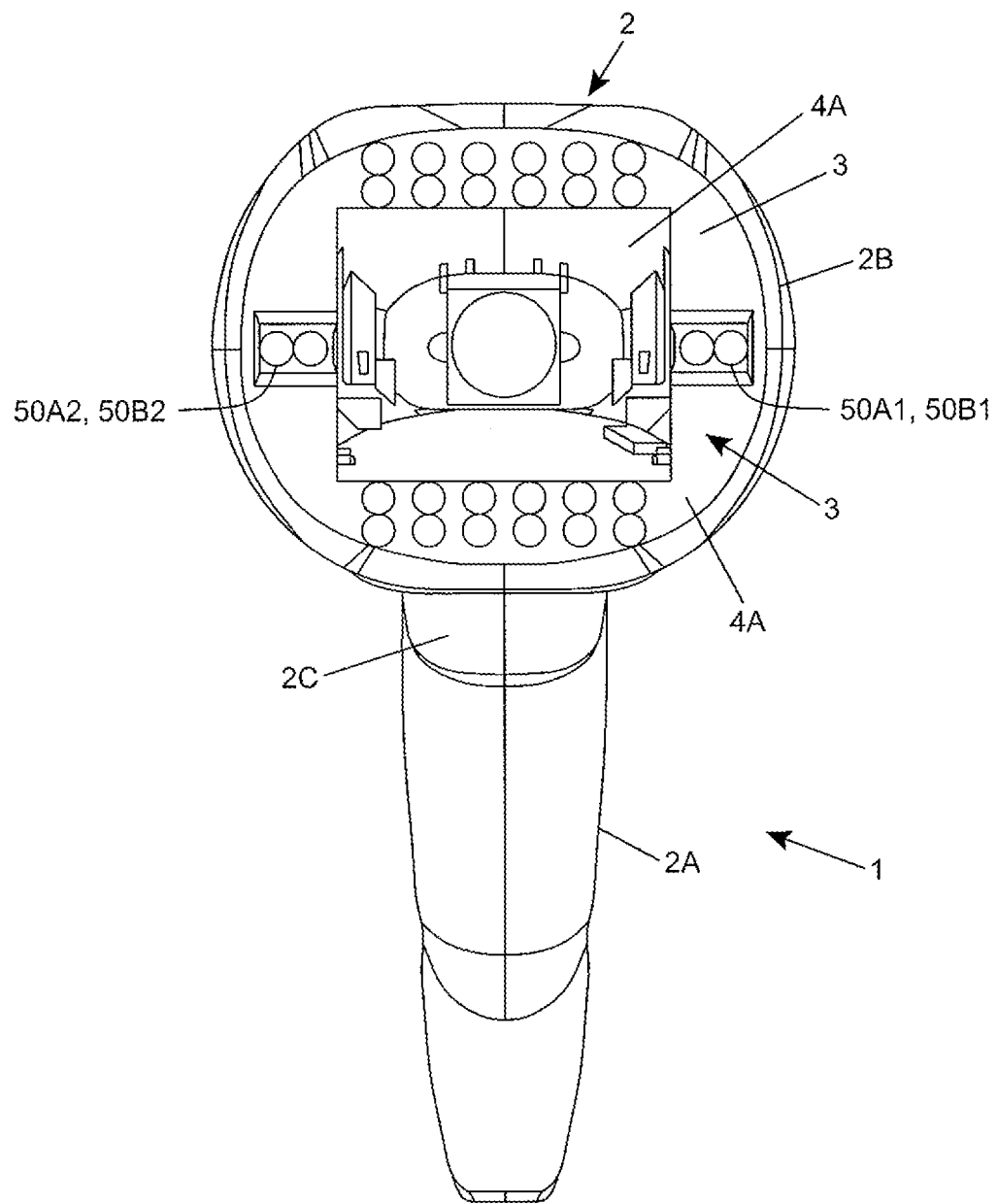
FIG. 2F is an elevated front view of the hand-supportable digital imaging-based bar code symbol reading device of the first illustrative embodiment of the present invention, showing components associated with its illumination subsystem and its image capturing subsystem.
Figure 2G:
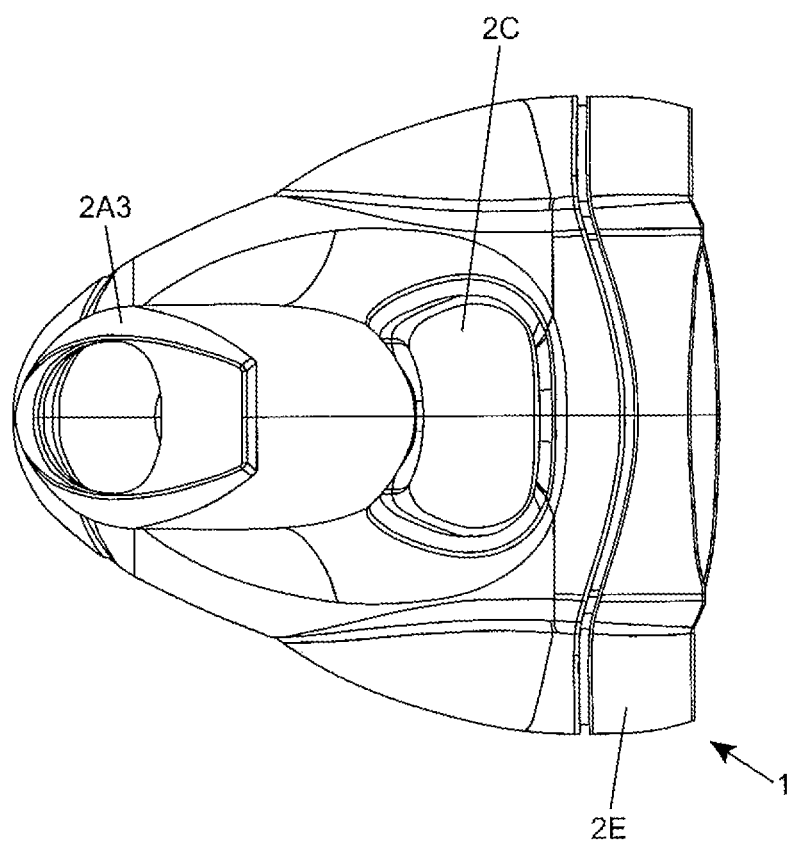
FIG. 2G is a bottom view of the hand-supportable digital imaging-based bar code symbol reading device of the first illustrative embodiment of the present invention.
Figure 2H:
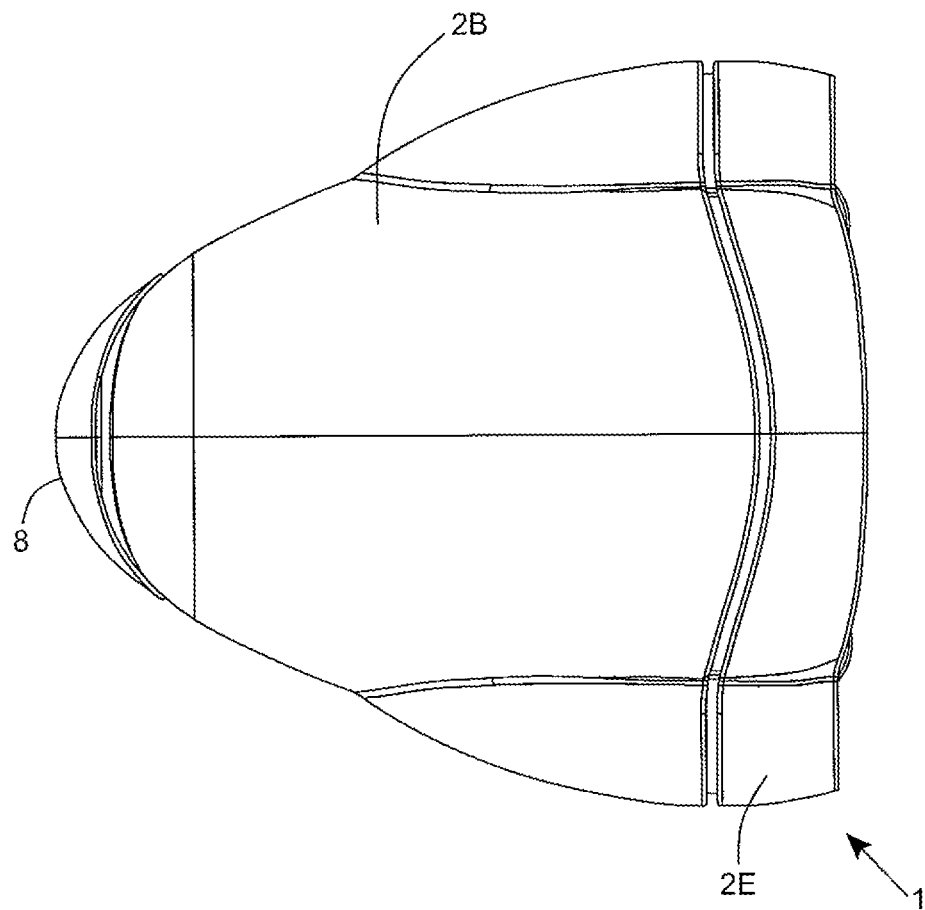
FIG. 2H is a top rear view of the hand-supportable digital imaging-based bar code symbol reading device of the first illustrative embodiment of the present invention.
Figure 2I:
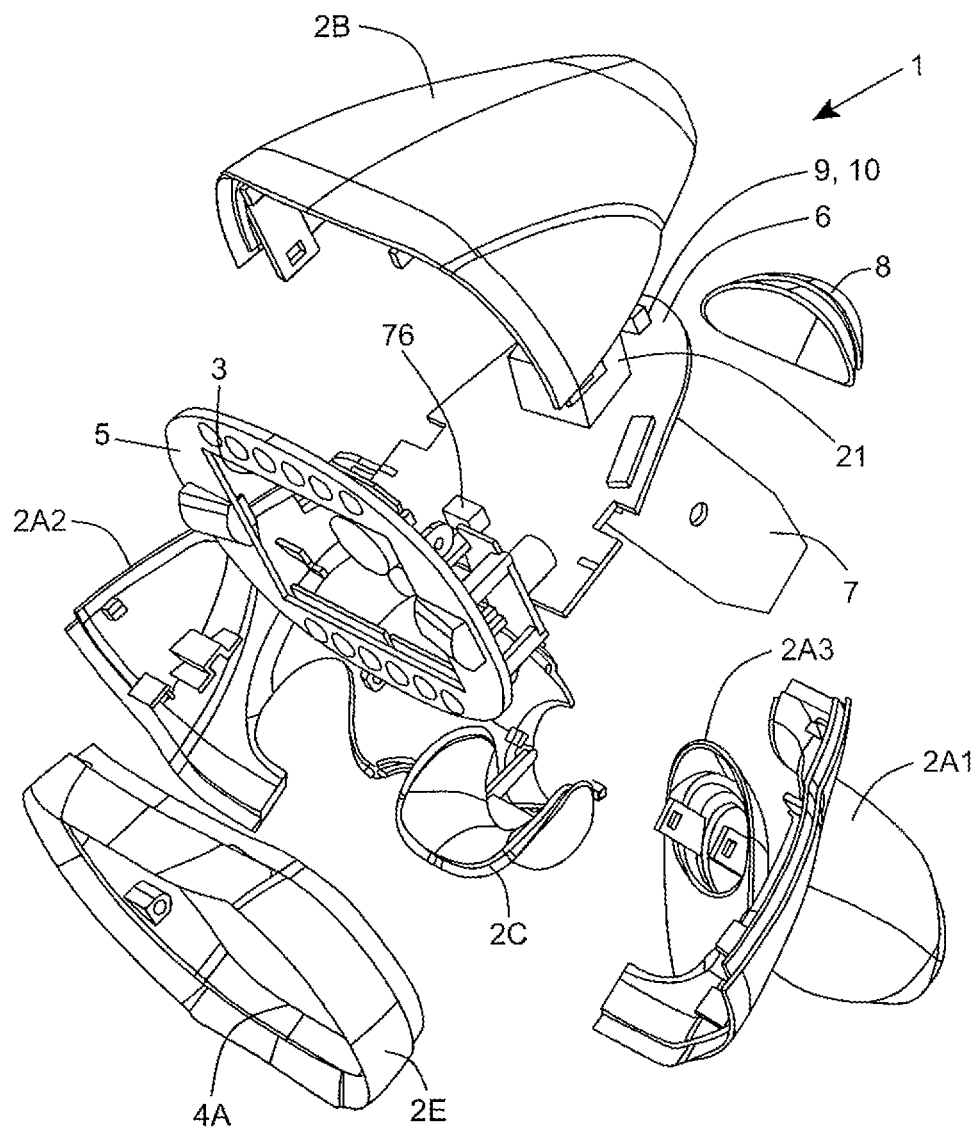
FIG. 2I is a first perspective exploded view of the hand-supportable digital imaging-based bar code symbol reading device of the first illustrative embodiment of the present invention.
Figure 2J:
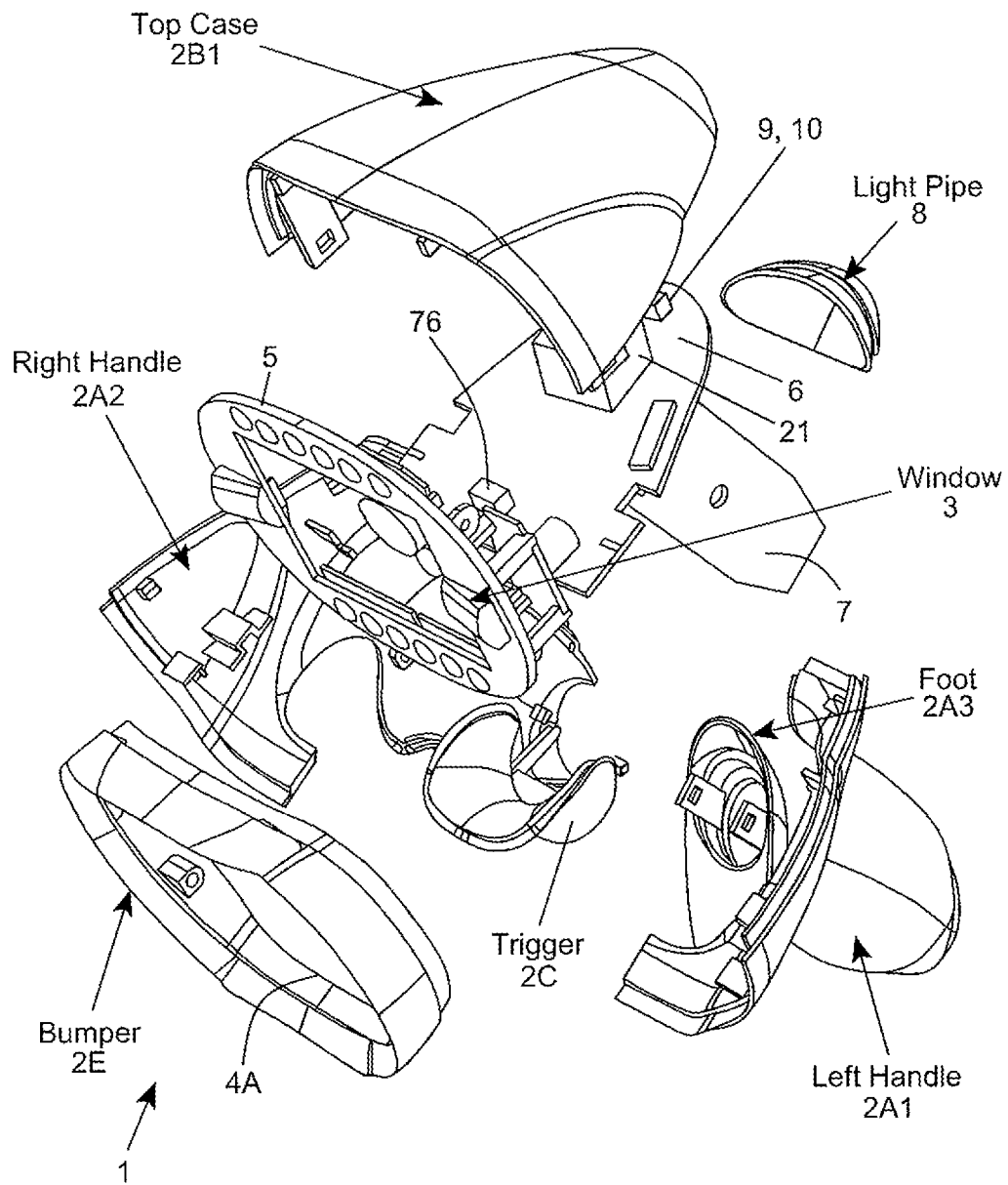
FIG. 2J is a second perspective exploded view of the hand-supportable digital imaging-based bar code symbol reading device of the first illustrative embodiment of the present invention.
Figure 2K:
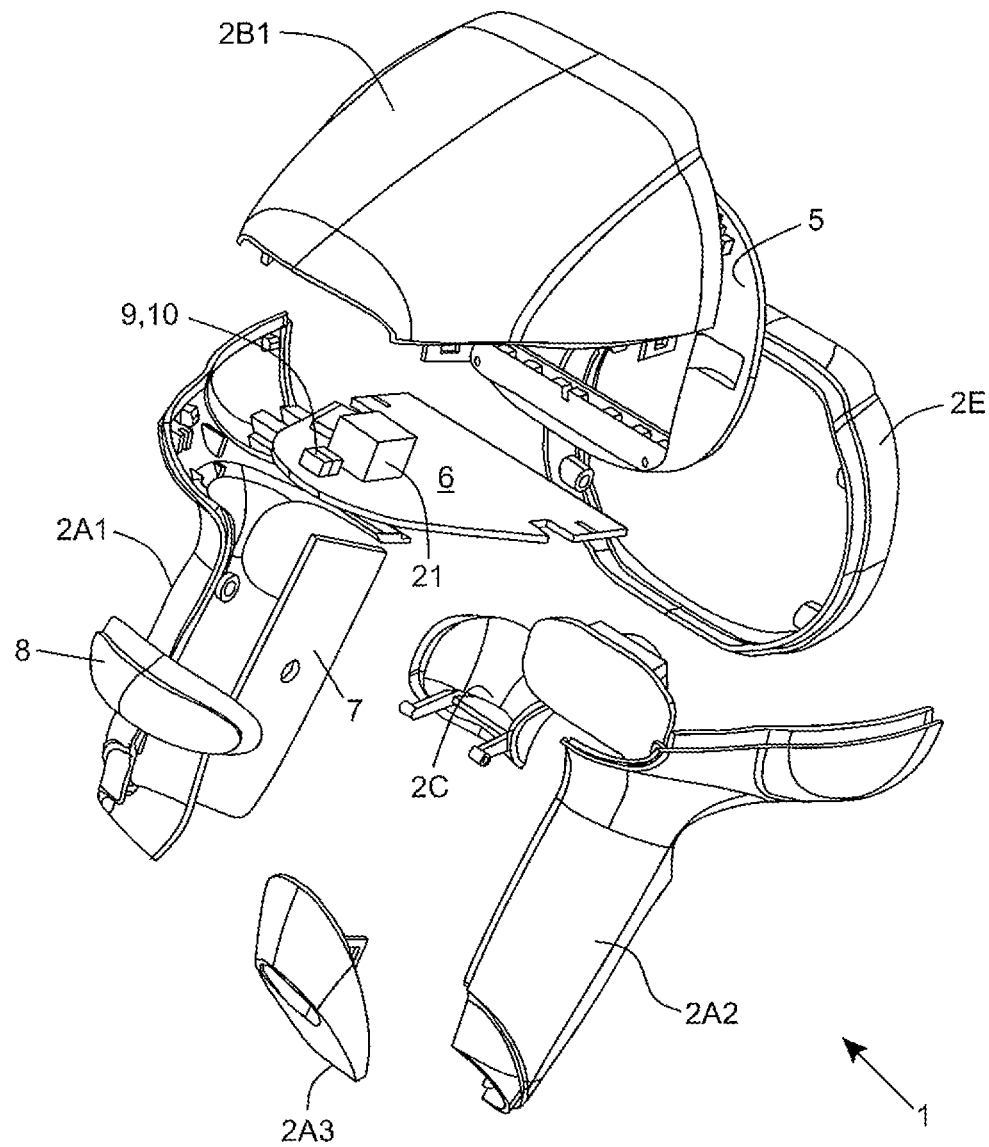
FIG. 2K is a third perspective exploded view of the hand-supportable digital imaging-based bar code symbol reading device of the first illustrative embodiment of the present invention.

As best shown in FIGS. 2I, 2J, and 2K, the hand-supportable housing 2 of the illustrative embodiment comprises: left and right housing handle halves 2A1 and 2A2; a foot-like structure 2A3 which is mounted between the handle halves 2A1 and 2A2; a trigger switch structure 2C which snap fits within and pivots within a pair of spaced apart apertures 2D1 and 2D2 provided in the housing halves; a light transmission window panel 5 through which light transmission window 3 is formed and supported within a recess formed by handle halves 2A1 and 2A2 when they are brought together, and which supports all LED illumination arrays provided by the system; an optical bench 6 for supporting electro-optical components and operably connected an orthogonally-mounted PC board 7 which is mounted within the handle housing halves; a top housing portion 2B 1 for connection with the housing handle halves 2A1 and 2A2 and enclosing the head portion of the housing; light pipe lens element 7 for mounting over an array of light emitting diodes (LEDs) 9 and light pipe structures 10 mounted within the rear end of the head portion of the hand-supportable housing; and a front bumper structure 2E for holding together the top housing portion 2B1 and left and right handle halves 2A1 and 2A2 with the light transmission window panel 5 sandwiched therebetween, while providing a level of shock protection thereto.

In other embodiments of the present invention the form factor of the hand-supportable housing might be different. In yet other applications, the housing need not even be hand-supportable, but rather might be designed for stationary support on a desktop or countertop surface, or for use in a commercial or industrial application.

Schematic Block Functional Diagram as System Design Model for the Hand-Supportable Digital Image-Based Bar Code Reading Device of the Present Invention As shown in the system design model of FIG. 2L1, the hand-supportable Digital Imaging-Based Bar Code Symbol Reading Device 1 of the illustrative embodiment comprises: an IR-based Object Presence and Range Detection Subsystem 12; a Multi-Mode Area-type Image Formation and Detection (i.e. camera) Subsystem 13 having narrow-area mode of image capture, near-field wide-area mode of image capture, and a far-field wide-area mode of image capture; a Multi-Mode LED-Based Illumination Subsystem 14 having narrow-area mode of illumination, near-field wide-area mode of illumination, and a far-field wide-area mode of illumination; an Automatic Light Exposure Measurement and Illumination Control Subsystem 15; an Image Capturing and Buffering Subsystem 16; a Multi-Mode Image-Processing Bar Code Symbol Reading Subsystem 17 having five modes of image-processing based bar code symbol reading indicated in FIG. 2L2 and to be described in detail hereinabove; an Input/Output Subsystem 18; a manually-actuatable trigger switch 2C for sending user-originated control activation signals to the device; a System Mode Configuration Parameter Table 70; and a System Control Subsystem 18 integrated with each of the above-described subsystems, as shown.

The primary function of the IR-based Object Presence and Range Detection Subsystem 12 is to automatically produce an IR-based object detection field 20 within the FOV of the Multi-Mode Image Formation and Detection Subsystem 13, detect the presence of an object within predetermined regions of the object detection field (20A, 20B), and generate control activation signals A1 which are supplied to the System Control Subsystem 19 for indicating when and where an object is detected within the object detection field of the system.

In the first illustrative embodiment, the Multi-Mode Image Formation And Detection (I.E. Camera) Subsystem 13 has image formation (camera) optics 21 for producing a field of view (FOV) 23 upon an object to be imaged and a CMOS area-image sensing array 22 for detecting imaged light reflected off the object during illumination and image acquisition/capture operations.

Figure 3A:
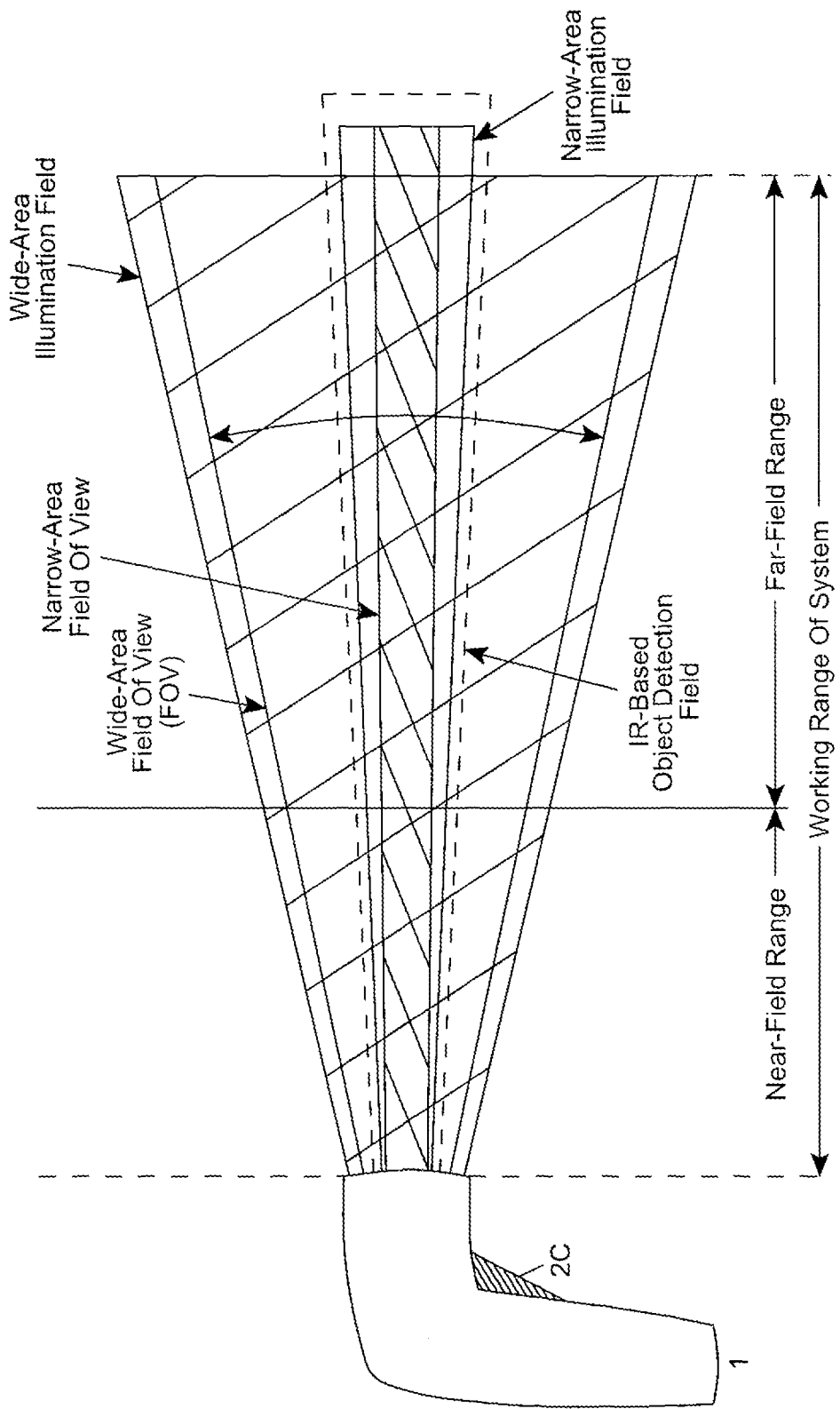
FIG. 3A is a schematic representation showing the spatial relationships between the near and far and narrow and wide area fields of narrow-band illumination within the FOV of the Multi-Mode Image Formation and Detection Subsystem during narrow and wide area image capture modes of operation.

In the first illustrative embodiment, the primary function of the Multi-Mode LED-Based Illumination Subsystem 14 is to produce a narrow-area illumination field 24, near-field wide-area illumination field 25, and a far-field wide-area illumination field 25, each having a narrow optical-bandwidth and confined within the FOV of the Multi-Mode Image Formation And Detection Subsystem 13 during narrow-area and wide-area modes of imaging, respectively. This arrangement is designed to ensure that only light transmitted from the Multi-Mode Illumination Subsystem 14 and reflected from the illuminated object is ultimately transmitted through a narrow-band transmission-type optical filter subsystem 4 realized by (1) high-pass (i.e. red-wavelength reflecting) filter element 4A mounted at the light transmission aperture 3 immediately in front of panel 5, and (2) low-pass filter element 4B mounted either before the image sensing array 22 or anywhere after panel 5 as shown in FIG. 3C. FIG. 5A4 sets forth the resulting composite transmission characteristics of the narrow-band transmission spectral filter subsystem 4, plotted against the spectral characteristics of the emission from the LED illumination arrays employed in the Multi-Mode Illumination Subsystem 14.

The primary function of the narrow-band integrated optical filter subsystem 4 is to ensure that the CMOS image sensing array 22 only receives the narrow-band visible illumination transmitted by the three sets of LED-based illumination arrays 27, 28 and 29 driven by LED driver circuitry 30 associated with the Multi-Mode Illumination Subsystem 14, whereas all other components of ambient light collected by the light collection optics are substantially rejected at the image sensing array 22, thereby providing improved SNR thereat, thus improving the performance of the system.

The primary function of the Automatic Light Exposure Measurement and Illumination Control Subsystem 15 is to twofold: (1) to measure, in real-time, the power density [joules/cm] of photonic energy (i.e. light) collected by the optics of the system at about its image sensing array 22, and generate Auto-Exposure Control Signals indicating the amount of exposure required for good image formation and detection; and (2) in combination with Illumination Array Selection Control Signal provided by the System Control Subsystem 19, automatically drive and control the output power of selected LED arrays 27, 28 and/or 29 in the Multi-Mode Illumination Subsystem, so that objects within the FOV of the system are optimally exposed to LED-based illumination and optimal images are formed and detected at the image sensing array 22.

The primary function of the Image Capturing and Buffering Subsystem 16 is to (1) detect the entire 2-D image focused onto the 2D image sensing array 22 by the image formation optics 21 of the system, (2) generate a frame of digital pixel data 31 for either a selected region of interest of the captured image frame, or for the entire detected image, and then (3) buffer each frame of image data as it is captured. Notably, in the illustrative embodiment, a single 2D image frame (31) is captured during each image capture and processing cycle, or during a particular stage of a processing cycle, so as to eliminate the problems associated with image frame overwriting, and synchronization of image capture and decoding processes, as addressed in U.S. Pat. Nos. 5,932,862 and 5,942,741 assigned to Welch Allyn, and incorporated herein by reference.

The primary function of the Multi-Mode Imaging-Based Bar Code Symbol Reading Subsystem 17 is to process images that have been captured and buffered by the Image Capturing and Buffering Subsystem 16, during both narrow-area and wide-area illumination modes of system operation. Such image processing operations include image-based bar code decoding, and described in detail hereinafter in Applicant WIPO International Publication No. 2005/050390, incorporated herein by reference.

The primary function of the Input/Output Subsystem 18 is to support standard and/or proprietary communication interfaces with external host systems and devices, and output processed image data and the like to such external host systems or devices by way of such interfaces. Examples of such interfaces, and technology for implementing the same, are given in U.S. Pat. No. 6,619,549, incorporated herein by reference in its entirety.

The primary function of the System Control Subsystem 19 is to provide some predetermined degree of control or management signaling services to each subsystem component integrated, as shown. While this subsystem can be implemented by a programmed microprocessor, in the illustrative embodiment, it is implemented by the three-tier software architecture supported on computing platform shown in FIG. 2M, and as represented in FIGS. 11A through 13F, and described in detail hereinafter.

The primary function of the manually-actuatable Trigger Switch 2C integrated with the hand-supportable housing is to enable the user to generate a control activation signal upon manually depressing the Trigger Switch 2C, and to provide this control activation signal to the System Control Subsystem 19 for use in carrying out its complex system and subsystem control operations, described in detail herein.

The primary function of the System Mode Configuration Parameter Table 70 is to store (in non-volatile/persistent memory) a set of configuration parameters for each of the available Programmable Modes of System Operation specified in the Programmable Mode of Operation Table, and which can be read and used by the System Control Subsystem 19 as required during its complex operations.

The detailed structure and function of each subsystem will now be described in detail above.

Schematic Diagram as System Implementation Model for the Hand-Supportable Digital Imaging-Based Bar Code Reading Device of the Present Invention FIG. 2B shows a schematic diagram of a system implementation for the hand-supportable Digital Imaging-Based Bar Code Symbol Reading Device 1 illustrated in FIGS. 2A through 2L. As shown in this system implementation, the bar code symbol reading device is realized using a number of hardware component comprising: an illumination board 33 carrying components realizing electronic functions performed by the LED-Based Multi-Mode Illumination Subsystem 14 and Automatic Light Exposure Measurement And Illumination Control Subsystem 15; a CMOS camera board 34 carrying high resolution (1280×1024 7-bit 6 micron pixel size) CMOS image sensing array 22 running at 25 Mhz master clock, at 7 frames/second at 1280*1024 resolution with randomly accessible region of interest (ROI) window capabilities, realizing electronic functions performed by the Multi-Mode Image Formation and Detection Subsystem 13; a CPU board 35 (i.e. computing platform) including (i) an Intel Sabinal 32-Bit Microprocessor PXA210 36 running at 200 mHz 1.0 core voltage with a 16 bit 100 Mhz external bus speed, (ii) an expandable (e.g. 7+ megabyte) Intel J3 Asynchronous 16-bit Flash memory 37, (iii) an 16 Megabytes of 100 MHz SDRAM 38, (iv) an Xilinx Spartan II FPGA FIFO 39 running at 50 Mhz clock frequency and 60 MB/Sec data rate, configured to control the camera timings and drive an image acquisition process, (v) a multimedia card socket 40, for realizing the other subsystems of the system, (vi) a power management module 41 for the MCU adjustable by the I2C bus, and (vii) a pair of UARTs 42A and 42B (one for an IRDA port and one for a JTAG port); an interface board 43 for realizing the functions performed by the I/O subsystem 18; and an IR-based object presence and range detection circuit 44 for realizing Subsystem 12, which includes a pair of IR LEDs and photodiodes 12A for transmitting and receiving a pencil-shaped IR-based object-sensing signal.

Figure 4B:
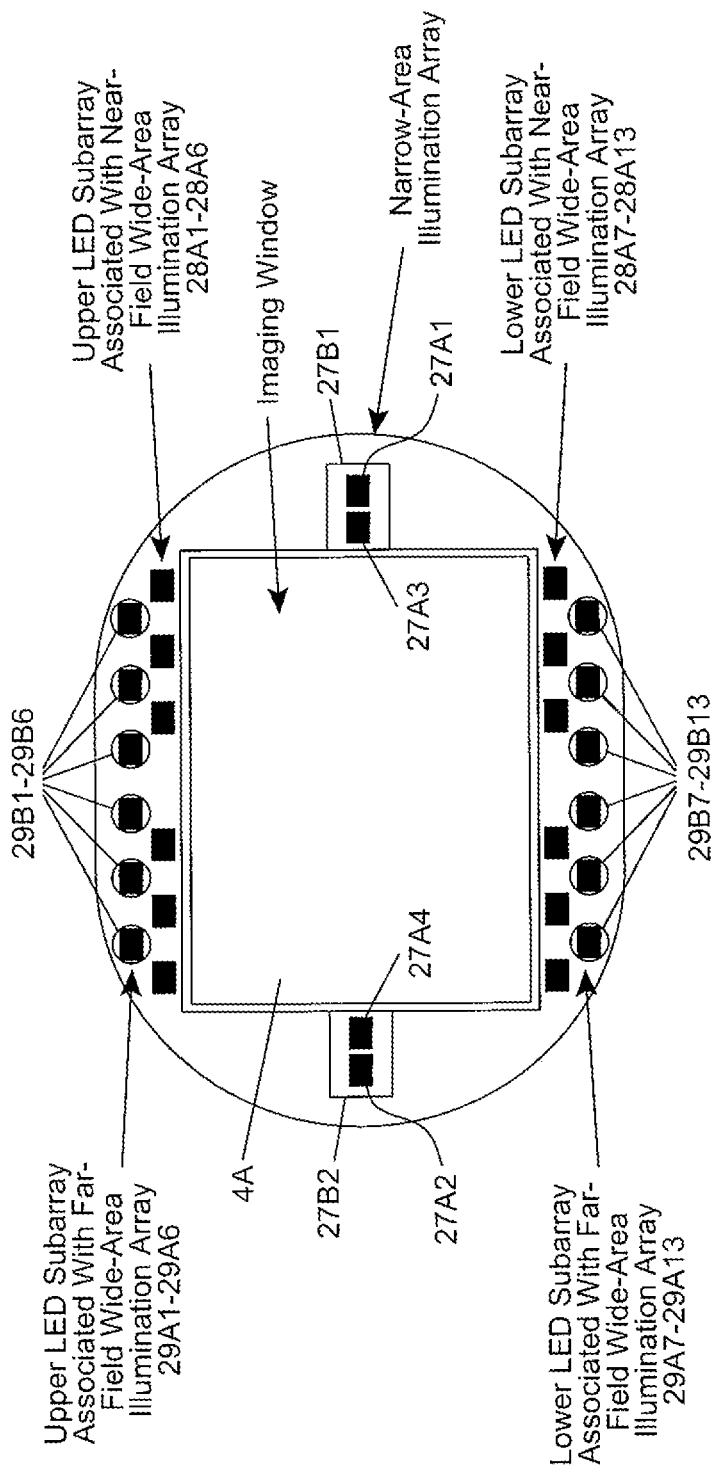
FIG. 4B is a schematic representation illustrating the physical arrangement of LED light sources associated with the narrow-area illumination array and the near-field and far-field wide-area illumination arrays employed in the digital imaging-based bar code symbol reading device of the present invention, wherein the LEDs in the far-field wide-area illuminating arrays are located behind spherical lenses, the LEDs in the narrow-area illuminating array are disposed behind cylindrical lenses, and the LEDs in the near-field wide-area illuminating array are unlensed in the first illustrative embodiment of the Digital Imaging-Based Bar Code Reading Device.

In the illustrative embodiment, the image formation optics 21 supported by the bar code reader provides a field of view of 103 mm at the nominal focal distance to the target, of approximately 70 mm from the edge of the bar code reader. The minimal size of the field of view (FOV) is 62 mm at the nominal focal distance to the target of approximately 10 mm. Preliminary tests of the parameters of the optics are shown on FIG. 4B (the distance on FIG. 4B is given from the position of the image sensing array 22, which is located inside the bar code symbol reader approximately 80 mm from the edge). As indicated in FIG. 4C, the depth of field of the image formation optics varies from approximately 69 mm for the bar codes with resolution of 5 mils per narrow module, to 181 mm for the bar codes with resolution of 13 mils per narrow module.

The Multi-Mode Illumination Subsystem 14 is designed to cover the optical field of view (FOV) 23 of the bar code symbol reader with sufficient illumination to generate high-contrast images of bar codes located at both short and long distances from the imaging window. The illumination subsystem also provides a narrow-area (thin height) targeting beam 24 having dual purposes: (a) to indicate to the user where the optical view of the reader is; and (b) to allow a quick scan of just a few lines of the image and attempt a super-fast bar code decoding if the bar code is aligned properly. If the bar code is not aligned for a linearly illuminated image to decode, then the entire field of view is illuminated with a wide-area illumination field 25 or 26 and the image of the entire field of view is acquired by Image Capture and Buffering Subsystem 16 and processed by Multi-Mode Bar Code Symbol Reading Subsystem 17, to ensure reading of a bar code symbol presented therein regardless of its orientation.

The interface board 43 employed within the bar code symbol reader provides the hardware communication interfaces for the bar code symbol reader to communicate with the outside world. The interfaces implemented in system will typically include RS232, keyboard wedge, and/or USB, or some combination of the above, as well as others required or demanded by the particular application at hand.

Specification of the Area-Type Image Formation and Detection (i.e. Camera) Subsystem During its Narrow-Area (Linear) and Wide-Area Modes of Imaging, Supported by the Narrow and Wide Area Fields Of Narrow-Band Illumination, Respectively As shown in FIGS. 3B through 3E, the Multi-Mode Image Formation And Detection (IFD) Subsystem 13 has a narrow-area image capture mode (i.e. where only a few central rows of pixels about the center of the image sensing array are enabled) and a wide-area image capture mode of operation (i.e. where all pixels in the image sensing array are enabled). The CMOS image sensing array 22 in the Image Formation and Detection Subsystem 13 has image formation optics 21 which provides the image sensing array with a field of view (FOV) 23 on objects to be illuminated and imaged. As shown, this FOV is illuminated by the Multi-Mode Illumination Subsystem 14 integrated within the bar code reader.

The Multi-Mode Illumination Subsystem 14 includes three different LED-based illumination arrays 27, 28 and 29 mounted on the light transmission window panel 5, and arranged about the light transmission window 4A. Each illumination array is designed to illuminate a different portion of the FOV of the bar code reader during different modes of operation. During the narrow-area (linear) illumination mode of the Multi-Mode Illumination Subsystem 14, the central narrow-wide portion of the FOV indicated by 23 is illuminated by the narrow-area illumination array 27, shown in FIG. 3A. During the near-field wide-area illumination mode of the Multi-Mode Illumination Subsystem 14, which is activated in response to the IR Object Presence and Range Detection Subsystem 12 detecting an object within the near-field portion of the FOV, the near-field wide-area portion of the FOV is illuminated by the near-field wide-area illumination array 28, shown in FIG. 3A. During the far-field wide-area illumination mode of the Multi-Mode Illumination Subsystem 14, which is activated in response to the IR Object Presence and Range Detection Subsystem 12 detecting an object within the far-field portion of the FOV, the far-field wide-area portion of the FOV is illuminated by the far-field wide-area illumination array 29, shown in FIG. 3A. In FIG. 3A, the spatial relationships are shown between these fields of narrow-band illumination and the far and near field portions the FOV of the Image Formation and Detection Subsystem 13.

Figure 3B:
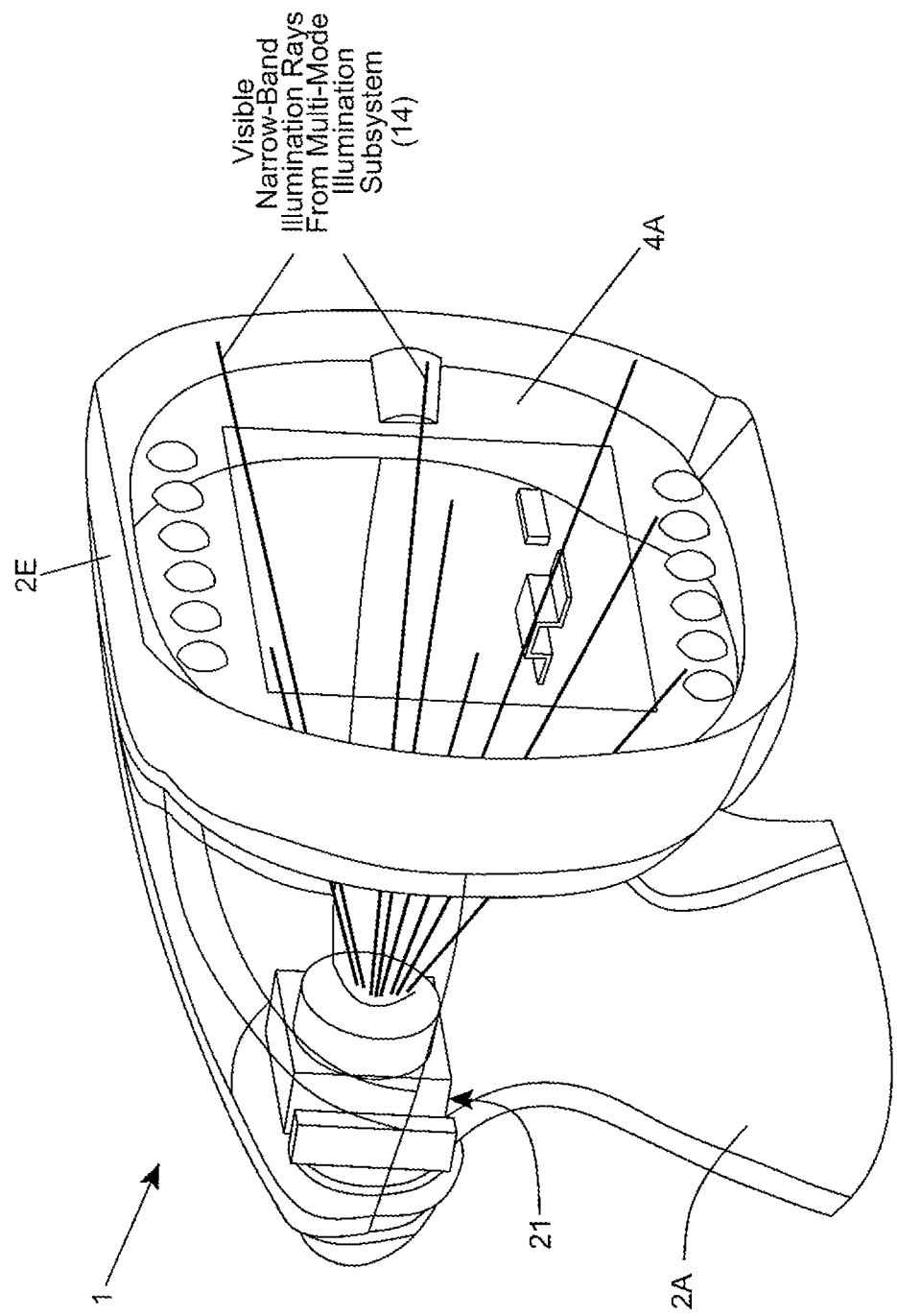
FIG. 3B is a perspective partially cut-away view of the hand-supportable digital imaging-based bar code symbol reading device of the first illustrative embodiment, showing the LED-Based Multi-Mode Illumination Subsystem transmitting visible narrow-band illumination through its narrow-band transmission-type optical filter system and illuminating an object with such narrow-band illumination, and also showing the image formation optics, including the low pass filter before the image sensing array, for collecting and focusing light rays reflected from the illuminated object, so that an image of the object is formed and detected using only the optical components of light contained within the narrow-band of illumination, while all other components of ambient light are substantially rejected before image detection at the image sensing array.
Figure 3C:
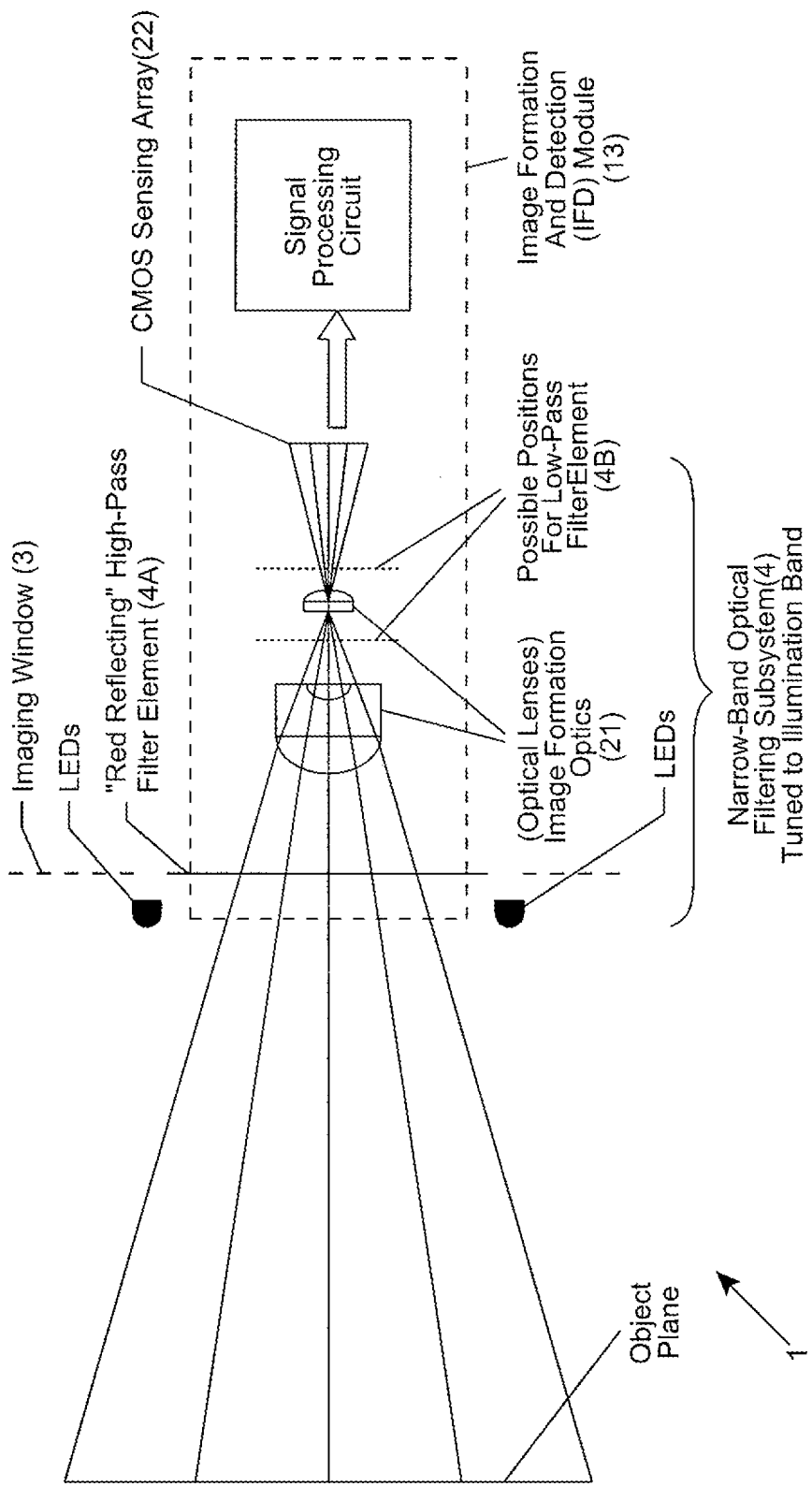
FIG. 3C is a schematic representation showing the geometrical layout of the optical components used within the hand-supportable digital imaging-based bar code symbol reading device of the first illustrative embodiment, wherein the red-wavelength reflecting high-pass lens element is positioned at the imaging window of the device before the image formation lens elements, while the low-pass filter is disposed before the image sensor of between the image formation elements, so as to image the object at the image sensing array using only optical components within the narrow-band of illumination, while rejecting all other components of ambient light.

In FIG. 3B, the Multi-Mode LED-Based Illumination Subsystem 14 is shown transmitting visible narrow-band illumination through its narrow-band transmission-type optical filter subsystem 4, shown in FIG. 3C and integrated within the hand-supportable Digital Imaging-Based Bar Code Symbol Reading Device. The narrow-band illumination from the Multi-Mode Illumination Subsystem 14 illuminates an object with the FOV of the image formation optics of the Image Formation and Detection Subsystem 13, and light rays reflected and scattered therefrom are transmitted through the high-pass and low-pass optical filters 4A and 4B and are ultimately focused onto image sensing array 22 to form of a focused detected image thereupon, while all other components of ambient light are substantially rejected before reaching image detection at the image sensing array 22. Notably, in the illustrative embodiment, the red-wavelength reflecting high-pass optical filter element 4A is positioned at the imaging window of the device before the image formation optics 21, whereas the low-pass optical filter element 4B is disposed before the image sensing array 22 between the focusing lens elements of the image formation optics 21. This forms narrow-band optical filter subsystem 4 which is integrated within the bar code reader to ensure that the object within the FOV is imaged at the image sensing array 22 using only spectral components within the narrow-band of illumination produced from Subsystem 14, while rejecting substantially all other components of ambient light outside this narrow range (e.g. 15 nm).

Figure 3D:
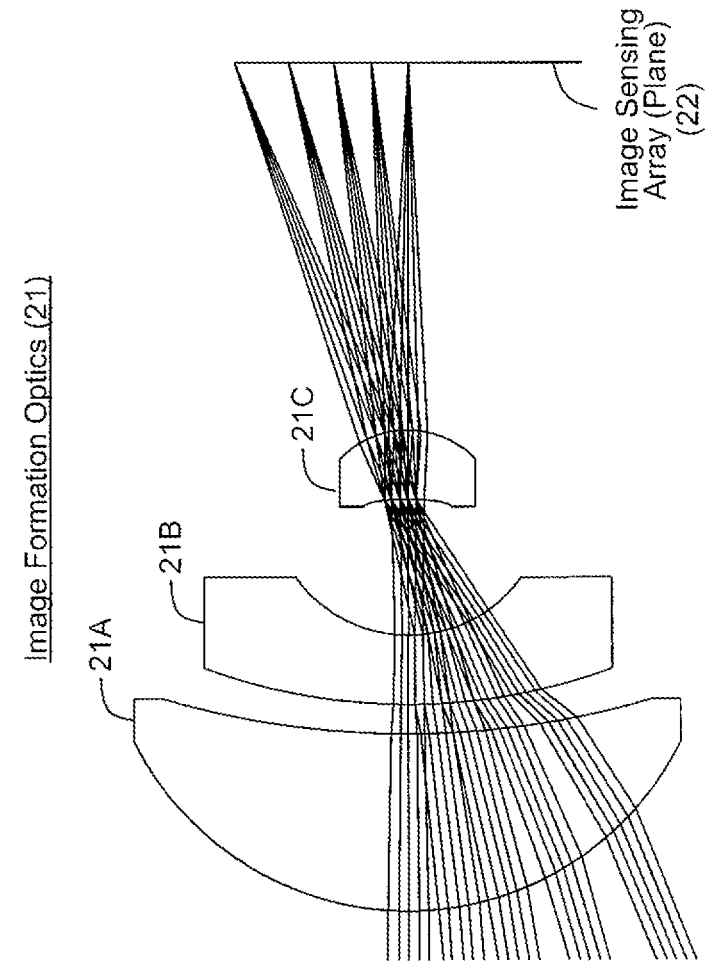
FIG. 3D is a schematic representation of the image formation optical subsystem employed within the hand-supportable digital imaging-based bar code symbol reading device of the first illustrative embodiment, wherein all three lenses are made as small as possible (with a maximum diameter of 12 mm), all have spherical surfaces, all are made from common glass, e.g. LAK2 (~LaK9), ZF10 (=SF8), LAF2 (~LaF3)

As shown in FIG. 3D, the Image Formation And Detection Subsystem 14 employed within the hand-supportable image-based bar code reading device comprising three lenses 21A, 21B and 21C, each made as small as possible (with a maximum diameter of 12 mm), having spherical surfaces, and made from common glass, e.g. LAK2 (~LaK9), ZF10 (=SF8), LAF2 (~LaF3). Collectively, these lenses are held together within a lens holding assembly 45, as shown in FIG. 3E, and form an image formation subsystem arranged along the optical axis of the CMOS image sensing array 22 of the bar code reader.

Figure 3E:
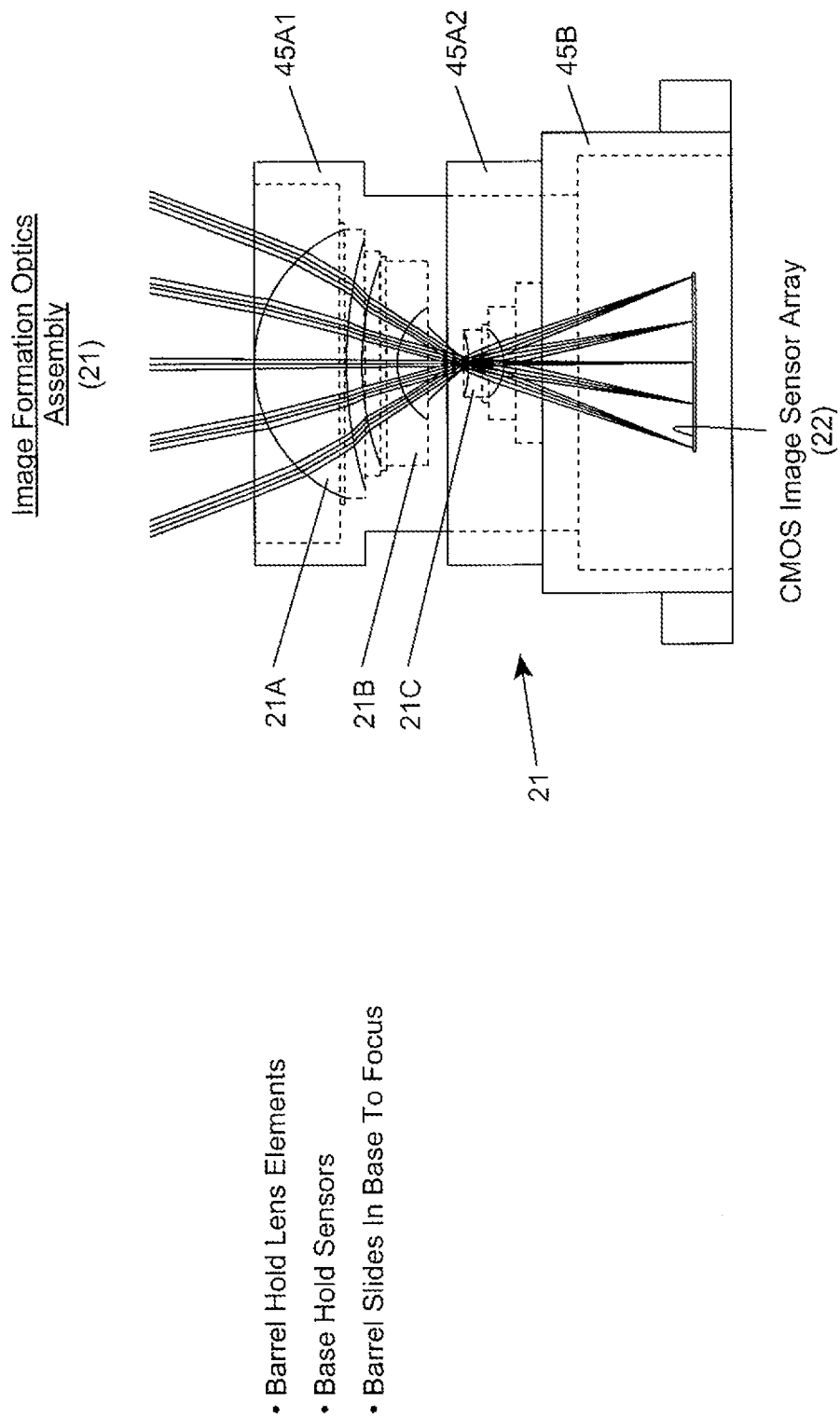
FIG. 3E is a schematic representation of the lens holding assembly employed in the image formation optical subsystem of the hand-supportable digital imaging-based bar code symbol reading device of the first illustrative embodiment, showing a two-piece barrel structure which holds the lens elements, and a base structure which holds the image sensing array, wherein the assembly is configured so that the barrel structure slides within the base structure so as to focus the assembly.

As shown in FIG. 3E, the lens holding assembly 45 comprises: a barrel structure 45A1, 45A2 for holding lens elements 21A, 21B and 21C; and a base structure 45B for holding the image sensing array 22; wherein the assembly is configured so that the barrel structure 45A slides within the base structure 45B so as to focus the fixed-focus lens assembly during manufacture.

In FIGS. 3F1 and 3F2, the lens holding assembly 45 and imaging sensing array 22 are mounted along an optical path defined along the central axis of the system. In the illustrative embodiment, the image sensing array 22 has, for example, a $1280 \times 10^{24}$ pixel resolution (½" format), 6 micron pixel size, with randomly accessible region of interest (ROI) window capabilities. It is understood, though, that many others kinds of imaging sensing devices (e.g. CCD) can be used to practice the principles of the present invention disclosed herein, without departing from the scope or spirit of the present invention.

Details regarding a preferred Method of Designing the Image Formation (i.e. Camera) Optics Within the Image-Based Bar Code Reader Of The Present Invention Using The Modulation Transfer Function (MTF) and also a Method Of Theoretically Characterizing The DOF Of The Image Formation Optics Employed In The Imaging-Based Bar Code Reader Of The Present Invention can be found in WIPO International Publication No. WO 2005/050390, supra.

Specification of Multi-Mode LED-Based Illumination Subsystem Employed in the Hand-Supportable Image-Based Bar Code Reading System of the Present Invention In the illustrative embodiment, the LED-Based Multi-Mode Illumination Subsystem 14 comprises: narrow-area illumination array 27; near-field wide-area illumination array 28; and far-field wide-area illumination array 29. The three fields of narrow-band illumination produced by the three illumination arrays of subsystem 14 are schematically depicted in FIG. 4A1. As will be described hereinafter, narrow-area illumination array 27 can be realized as two independently operable arrays, namely: a near-field narrow-area illumination array and a far-field narrow-area illumination array, which are activated when the target object is detected within the near and far fields, respectively, of the automatic IR-based Object Presence and Range Detection Subsystem 12 during wide-area imaging modes of operation. However, for purposes of illustration, the first illustrative embodiment of the present invention employs only a single field narrow-area (linear) illumination array which is designed to illuminate over substantially entire working range of the system, as shown in FIG. 4A1.

As shown in FIGS. 4B, 4C3 and 4C4, the narrow-area (linear) illumination array 27 includes two pairs of LED light sources 27A1 and 27A2 provided with cylindrical lenses 27B1 and 27B2, respectively, and mounted on left and right portions of the light transmission window panel 5. During the narrow-area image capture mode of the Image Formation and Detection Subsystem 13, the narrow-area (linear) illumination array 27 produces narrow-area illumination field 24 of narrow optical-bandwidth within the FOV of the system. In the illustrative embodiment, narrow-area illumination field 24 has a height less than 10 mm at far field, creating the appearance of substantially linear or rather planar illumination field.

The near-field wide-area illumination array 28 includes two sets of (flattop) LED light sources 28A1-28A6 and 28A7-

28A13 without any lenses mounted on the top and bottom portions of the light transmission window panel 5, as shown in FIG. 4B. During the near-field wide-area image capture mode of the Image Formation and Detection Subsystem 13, the near-field wide-area illumination array 28 produces a near-field wide-area illumination field 25 of narrow optical-bandwidth within the FOV of the system.

As shown in FIGS. 4B, 4D3 and 4D4, the far-field wide-area illumination array 29 includes two sets of LED light sources 29A1-29A6 and 29A7-29A13 provided with spherical (i.e. plano-convex) lenses 29B1-29B6 and 29B7-29B13, respectively, and mounted on the top and bottom portions of the light transmission window panel 5. During the far-field wide-area image capture mode of the Image Formation and Detection Subsystem 13, the far-field wide-area illumination array 29 produces a far-field wide-area illumination beam of narrow optical-bandwidth within the FOV of the system.

Narrow-Area (Linear) Illumination Arrays Employed in the Multi-Mode Illumination Subsystem As shown in FIG. 4A1, the narrow-area (linear) illumination field 24 extends from about 30 mm to about 200 mm within the working range of the system, and covers both the near and far fields of the system. The near-field wide-area illumination field 25 extends from about 0 mm to about 100 mm within the working range of the system. The far-field wide-area illumination field 26 extends from about 100 mm to about 200 mm within the working range of the system. The Table shown in FIG. 4A2 specifies the geometrical properties and characteristics of each illumination mode supported by the Multi-Mode LED-based Illumination Subsystem 14 of the present invention.

The narrow-area illumination array 27 employed in the Multi-Mode LED-Based Illumination Subsystem 14 is optically designed to illuminate a thin area at the center of the field of view (FOV) of the imaging-based bar code symbol reader, measured from the boundary of the left side of the field of view to the boundary of its right side, as specified in FIG. 4A1. As will be described in greater detail hereinafter, the narrow-area illumination field 24 is automatically generated by the Multi-Mode LED-Based Illumination Subsystem 14 in response to the detection of an object within the object detection field of the automatic IR-based Object Presence and Range Detection Subsystem 12. In general, the object detection field of the IR-based Object Presence and Range Detection Subsystem 12 and the FOV of the Image Formation and Detection Subsystem 13 are spatially co-extensive and the object detection field spatially overlaps the FOV along the entire working distance of the imaging-based bar code symbol reader. The narrow-area illumination field 24, produced in response to the detection of an object, serves a dual purpose: it provides a visual indication to an operator about the location of the optical field of view of the bar code symbol reader, thus, serves as a field of view aiming instrument; and during its image acquisition mode, the narrow-area illumination beam is used to illuminated a thin area of the FOV within which an object resides, and a narrow 2-D image of the object can be rapidly captured (by a small number of rows of pixels in the image sensing array 22), buffered and processed in order to read any linear bar code symbols that may be represented therewithin.

FIG. 4C1 shows the Lambertian emittance versus wavelength characteristics of the LEDs used to implement the narrow-area illumination array 27 in the Multi-Mode Illumination Subsystem 14. FIG. 4C2 shows the Lambertian emittance versus polar angle characteristics of the same LEDs. FIG. 4C3 shows the cylindrical lenses used before the LEDs (633 nm InGaAlP) in the narrow-area (linear) illumination arrays in the illumination subsystem of the present invention. As shown, the first surface of the cylindrical lens is curved vertically to create a narrow-area (linear) illumination pattern, and the second surface of the cylindrical lens is curved horizontally to control the height of the of the linear illumination pattern to produce a narrow-area illumination pattern. FIG. 4C4 shows the layout of the pairs of LEDs and two cylindrical lenses used to implement the narrow-area illumination array of the illumination subsystem of the present invention. In the illustrative embodiment, each LED produces about a total output power of about 11.7 mW under typical conditions. FIG. 4C5 sets forth a set of six illumination profiles for the narrow-area illumination fields produced by the narrow-area illumination arrays of the illustrative embodiment, taken at 30, 40, 50, 80, 120, and 220 millimeters along the field away from the imaging window (i.e. working distance) of the bar code reader of the present invention, illustrating that the spatial intensity of the area-area illumination field begins to become substantially uniform at about 80 millimeters. As shown, the narrow-area illumination beam is usable beginning 40 mm from the light transmission/imaging window.

Near-Field Wide-Area Illumination Arrays Employed in the Multi-Mode Illumination Subsystem The near-field wide-area illumination array 28 employed in the LED-Based Multi-Mode Illumination Subsystem 14 is optically designed to illuminate a wide area over a near-field portion of the field of view (FOV) of the imaging-based bar code symbol reader, as defined in FIG. 4A1. As will be described in greater detail hereinafter, the near-field wide-area illumination field 28 is automatically generated by the LED-based Multi-Mode Illumination Subsystem 14 in response to: (1) the detection of any object within the near-field of the system by the IR-based Object Presence and Range Detection Subsystem 12; and (2) one or more of following events, including, for example: (i) failure of the image processor to successfully decode process a linear bar code symbol during the narrow-area illumination mode; (ii) detection of code elements such as control words associated with a 2-D bar code symbol; and/or (iii) detection of pixel data in the image which indicates that object was captured in a state of focus.

In general, the object detection field of the IR-based Object Presence and Range Detection Subsystem 12 and the FOV of the Image Formation And Detection Subsystem 13 are spatially co-extensive and the object detection field spatially overlaps the FOV along the entire working distance of the imaging-based bar code symbol reader. The near-field wide-area illumination field 23, produced in response to one or more of the events described above, illuminates a wide area over a near-field portion of the field of view (FOV) of the imaging-based bar code symbol reader, as defined in FIG. 5A, within which an object resides, and a 2-D image of the object can be rapidly captured by all rows of the image sensing array 22, buffered and decode-processed in order to read any 1D or 2-D bar code symbols that may be represented therewithin, at any orientation, and of virtually any bar code symbology. The intensity of the near-field wide-area illumination field during object illumination and image capture operations is determined by how the LEDs associated with the near-field wide array illumination arrays 28 are electrically driven by the Multi-Mode Illumination Subsystem 14. The degree to which the LEDs are driven is determined by the intensity of reflected light measured near the image formation plane by the automatic light exposure and control subsystem 15. If the intensity of reflected light at the photodetector of the Automatic Light Exposure Measurement and Illumination Control Subsystem 15 is weak, indicative that the object exhibits low light reflectivity characteristics and a more intense amount of illumination will need to be produced by the LEDs to ensure sufficient light exposure on the image sensing array 22, then the Automatic Light Exposure Measurement and Illumination Control Subsystem 15 will drive the LEDs more intensely (i.e. at higher operating currents).

FIG. 4D1 shows the Lambertian emittance versus wavelength characteristics of the LEDs used to implement the wide area illumination arrays in the illumination subsystem of the present invention. FIG. 4D2 shows the Lambertian emittance versus polar angle characteristics of the LEDs used to implement the near field wide-area illumination arrays in the Multi-Mode Illumination Subsystem 14. FIG. 4D4 is geometrical the layout of LEDs used to implement the narrow wide-area illumination array of the Multi-Mode Illumination Subsystem 14, wherein the illumination beam produced therefrom is aimed by angling the lenses before the LEDs in the near-field wide-area illumination arrays of the Multi-Mode Illumination Subsystem 14. FIG. 4D5 sets forth a set of six illumination profiles for the near-field wide-area illumination fields produced by the near-field wide-area illumination arrays of the illustrative embodiment, taken at 10, 20, 30, 40, 60, and 100 millimeters along the field away from the imaging window (i.e. working distance) of the imaging-based bar code symbol reader 1. These plots illustrate that the spatial intensity of the near-field wide-area illumination field begins to become substantially uniform at about 40 millimeters (i.e. center:edge=2:1 max).

Far-Field Wide-Area Illumination Arrays Employed in the Multi-Mode Illumination Subsystem The far-field wide-area illumination array 26 employed in the Multi-Mode LED-based Illumination Subsystem 14 is optically designed to illuminate a wide area over a far-field portion of the field of view (FOV) of the imaging-based bar code symbol reader, as defined in FIG. 4A1. As will be described in greater detail hereinafter, the far-field wide-area illumination field 26 is automatically generated by the LED-Based Multi-Mode Illumination Subsystem 14 in response to: (1) the detection of any object within the near-field of the system by the IR-based Object Presence and Range Detection Subsystem 12; and (2) one or more of following events, including, for example: (i) failure of the image processor to successfully decode process a linear bar code symbol during the narrow-area illumination mode; (ii) detection of code elements such as control words associated with a 2-D bar code symbol; and/or (iii) detection of pixel data in the image which indicates that object was captured in a state of focus. In general, the object detection field of the IR-based Object Presence and Range Detection Subsystem 12 and the FOV 23 of the image detection and formation subsystem 13 are spatially co-extensive and the object detection field 20 spatially overlaps the FOV 23 along the entire working distance of the imaging-based bar code symbol reader. The far-field wide-area illumination field 26, produced in response to one or more of the events described above, illuminates a wide area over a far-field portion of the field of view (FOV) of the imaging-based bar code symbol reader, as defined in FIG. 5A, within which an object resides, and a 2-D image of the object can be rapidly captured (by all rows of the image sensing array 22), buffered and processed in order to read any 1D or 2-D bar code symbols that may be represented therewithin, at any orientation, and of virtually any bar code symbology. The intensity of the far-field wide-area illumination field during object illumination and image capture operations is determined by how the LEDs associated with the far-field wide-area illumination array 29 are electrically driven by the Multi-Mode Illumination Subsystem 14. The degree to which the LEDs are driven (i.e. measured in terms of junction current) is determined by the intensity of reflected light measured near the image formation plane by the Automatic Light Exposure Measurement And Illumination Control Subsystem 15. If the intensity of reflected light at the photo-detector of the Automatic Light Exposure Measurement and Illumination Control Subsystem 15 is weak, indicative that the object exhibits low light reflectivity characteristics and a more intense amount of illumination will need to be produced b the LEDs to ensure sufficient light exposure on the image sensing array 22, then the Automatic Light Exposure Measurement and Illumination Control Subsystem 15 will drive the LEDs more intensely (i.e. at higher operating currents).

During both near and far field wide-area illumination modes of operation, the Automatic Light Exposure Measurement and Illumination Control Subsystem (i.e. module) 15 measures and controls the time duration which the Multi-Mode Illumination Subsystem 14 exposes the image sensing array 22 to narrow-band illumination (e.g. 633 nanometers, with approximately 15 nm bandwidth) during the image capturing/acquisition process, and automatically terminates the generation of such illumination when such computed time duration expires. In accordance with the principles of the present invention, this global exposure control process ensures that each and every acquired image has good contrast and is not saturated, two conditions essential for consistent and reliable bar code reading FIG. 4D 1 shows the Lambertian emittance versus wavelength characteristics of the LEDs used to implement the far-field wide-area illumination arrays 29 in the Multi-Mode Illumination Subsystem 14. FIG. 4D2 shows the Lambertian emittance versus polar angle characteristics of the LEDs used to implement the same. FIG. 4D3 shows the plano-convex lenses used before the LEDs in the far-field wide-area illumination arrays in the Multi-Mode Illumination Subsystem 14. FIG. 4D4 shows a layout of LEDs and plano-convex lenses used to implement the far wide-area illumination array 29 of the illumination subsystem, wherein the illumination beam produced therefrom is aimed by angling the lenses before the LEDs in the far-field wide-area illumination arrays of the Multi-Mode Illumination Subsystem 14. FIG. 4D6 sets forth a set of three illumination profiles for the far-field wide-area illumination fields produced by the far-field wide-area illumination arrays of the illustrative embodiment, taken at 100, 150 and 220 millimeters along the field away from the imaging window (i.e. working distance) of the imaging-based bar code symbol reader 1, illustrating that the spatial intensity of the far-field wide-area illumination field begins to become substantially uniform at about 100 millimeters. FIG. 4D7 shows a table illustrating a preferred method of calculating the pixel intensity value for the center of the far field wide-area illumination field produced from the Multi-Mode Illumination Subsystem 14, showing a significant signal strength (greater than 80 DN at the far center field).

Specification of the Narrow-Band Optical Filter Subsystem Integrated within the Hand-Supportable Housing of the Imager of the Present Invention As shown in FIG. 5A1, the hand-supportable housing of the bar code reader of the present invention has integrated within its housing, narrow-band optical filter subsystem 4 for transmitting substantially only the very narrow band of wavelengths (e.g. 620-700 nanometers) of visible illumination produced from the narrow-band Multi-Mode Illumination Subsystem 14, and rejecting all other optical wavelengths outside this narrow optical band however generated (i.e. ambient light sources). As shown, narrow-band optical filter subsystem 4 comprises: red-wavelength reflecting (high-pass) imaging window filter 4A integrated within its light transmission aperture 3 formed on the front face of the hand-supportable housing; and low pass optical filter 4B disposed before the CMOS image sensing array 22. These optical filters 4A and 4B cooperate to form the narrow-band optical filter subsystem 4 for the purpose described above. As shown in FIG. 5A2, the light transmission characteristics (energy versus wavelength) associated with the low-pass optical filter element 4B indicate that optical wavelengths below 620 nanometers are transmitted therethrough, whereas optical wavelengths above 620 nm are substantially blocked (e.g. absorbed or reflected). As shown in FIG. 5A3, the light transmission characteristics (energy versus wavelength) associated with the high-pass imaging window filter 4A indicate that optical wavelengths above 700 nanometers are transmitted therethrough, thereby producing a red-color appearance to the user, whereas optical wavelengths below 700 nm are substantially blocked (e.g. absorbed or reflected) by optical filter 4A.

During system operation, spectral band-pass filter subsystem 4 greatly reduces the influence of the ambient light, which falls upon the CMOS image sensing array 22 during the image capturing operations. By virtue of the optical filter of the present invention, a optical shutter mechanism is eliminated in the system. In practice, the optical filter can reject more than 85% of incident ambient light, and in typical environments, the intensity of LED illumination is significantly more than the ambient light on the CMOS image sensing array 22. Thus, while an optical shutter is required in nearly most conventional CMOS imaging systems, the imaging-based bar code reading system of the present invention effectively manages the exposure time of narrow-band illumination onto its CMOS image sensing array 22 by simply controlling the illumination time of its LED-based illumination arrays 27, 28 and 29 using control signals generated by Automatic Light Exposure Measurement and Illumination Control Subsystem 15 and the CMOS image sensing array 22 while controlling illumination thereto by way of the band-pass optical filter subsystem 4 described above. The result is a simple system design, without moving parts, and having a reduced manufacturing cost.

While the band-pass optical filter subsystem 4 is shown comprising a high-pass filter element 4A and low-pass filter element 4B, separated spatially from each other by other optical components along the optical path of the system, subsystem 4 may be realized as an integrated multi-layer filter structure installed in front of the image formation and detection (IFD) module 13, or before its image sensing array 22, without the use of the high-pass window filter 4A, or with the use thereof so as to obscure viewing within the imaging-based bar code symbol reader while creating an attractive red-colored protective window. Preferably, the red-color window filter 4A will have substantially planar surface characteristics to avoid focusing or defocusing of light transmitted therethrough during imaging operations.

Specification of the Automatic Light Exposure Measurement and Illumination Control Subsystem of the Present Invention The primary function of the Automatic Light Exposure Measurement and Illumination Control Subsystem 15 is to control the brightness and contrast of acquired images by (i) measuring light exposure at the image plane of the CMOS imaging sensing array 22 and (ii) controlling the time duration that the Multi-Mode Illumination Subsystem 14 illuminates the target object with narrow-band illumination generated from the activated LED illumination array. Thus, the Automatic Light Exposure Measurement and Illumination Control Subsystem 15 eliminates the need for a complex shuttering mechanism for CMOS-based image sensing array 22. This novel mechanism ensures that the imaging-based bar code symbol reader of the present invention generates non-saturated images with enough brightness and contrast to guarantee fast and reliable image-based bar code decoding in demanding end-user applications.

During object illumination, narrow-band LED-based light is reflected from the target object (at which the hand-supportable bar code reader is aimed) and is accumulated by the CMOS image sensing array 22. Notably, the object illumination process must be carried out for an optimal duration so that the acquired image frame has good contrast and is not saturated. Such conditions are required for the consistent and reliable bar code decoding operation and performance. The Automatic Light Exposure Measurement and Illumination Control Subsystem 15 measures the amount of light reflected from the target object, calculates the maximum time that the CMOS image sensing array 22 should be kept exposed to the actively-driven LED-based illumination array associated with the Multi-Mode Illumination Subsystem 14, and then automatically deactivates the illumination array when the calculated time to do so expires (i.e. lapses).

Figure 6A:
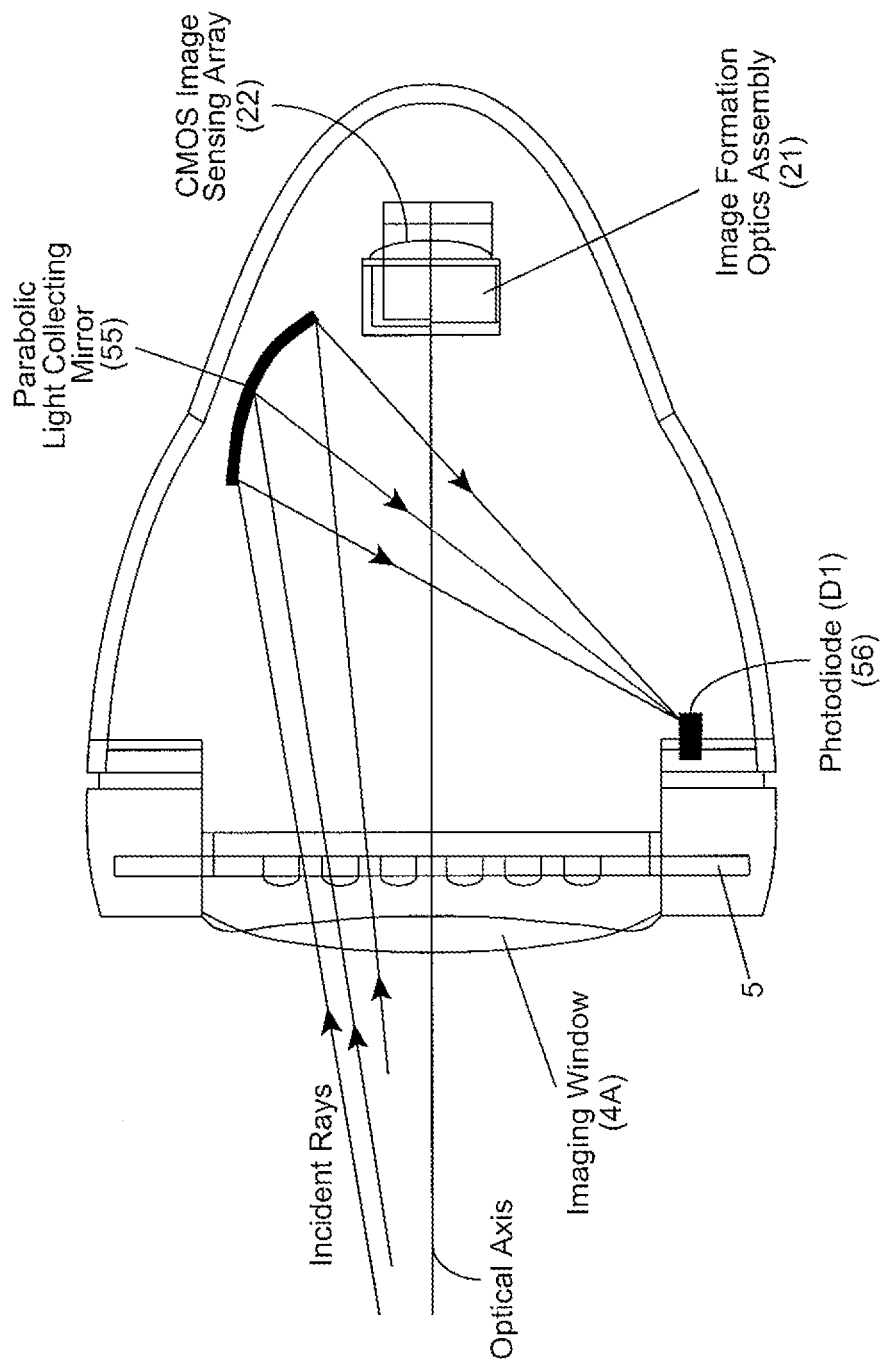
FIG. 6A is a schematic representation showing the geometrical layout of the spherical/parabolic light reflecting/collecting mirror and photodiode associated with the Automatic Light Exposure Measurement and Illumination Control Subsystem, and arranged within the hand-supportable digital imaging-based bar code symbol reading device of the illustrative embodiment, wherein incident illumination is collected from a selected portion of the center of the FOV of the system using a spherical light collecting mirror, and then focused upon a photodiode for detection of the intensity of reflected illumination and subsequent processing by the Automatic Light Exposure Measurement and Illumination Control Subsystem, so as to then control the illumination produced by the LED-based Multi-Mode Illumination Subsystem employed in the digital imaging-based bar code symbol reading device of the present invention.
Figure 7:
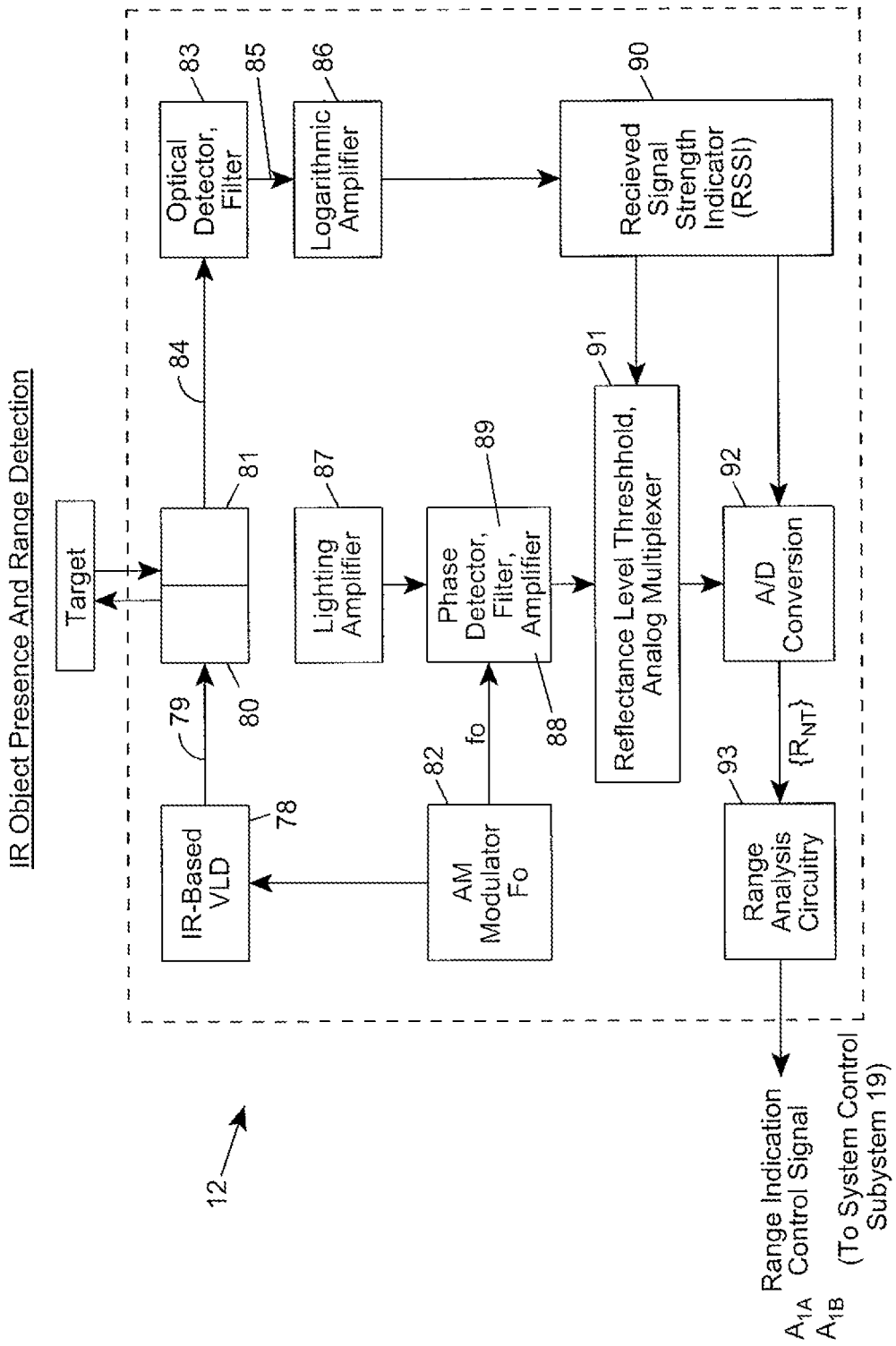

As shown in FIG. 6A of the illustrative embodiment, the Automatic Light Exposure Measurement and Illumination Control Subsystem 15 comprises: a parabolic light-collecting mirror 55 mounted within the head portion of the hand-supportable housing, for collecting narrow-band LED-based light reflected from a central portion of the FOV of the system, which is then transmitted through the narrow-band optical filter subsystem 4 eliminating wide band spectral interference; a light-sensing device (e.g. photo-diode) 56 mounted at the focal point of the light collection mirror 55, for detecting the filtered narrow-band optical signal focused therein by the light collecting mirror 55; and an electronic circuitry 57 for processing electrical signals produced by the photo-diode 56 indicative of the intensity of detected light exposure levels within the focal plane of the CMOS image sensing array 22. During light exposure measurement operations, incident narrow-band LED-based illumination is gathered from the center of the FOV of the system by the spherical light collecting mirror 55 and narrow-band filtered by the narrow-band optical filter subsystem 4 before being focused upon the photo-diode 56 for intensity detection. The photo-diode 56 converts the detected light signal into an electrical signal having an amplitude which directly corresponds to the intensity of the collected light signal.

Figure 6B:
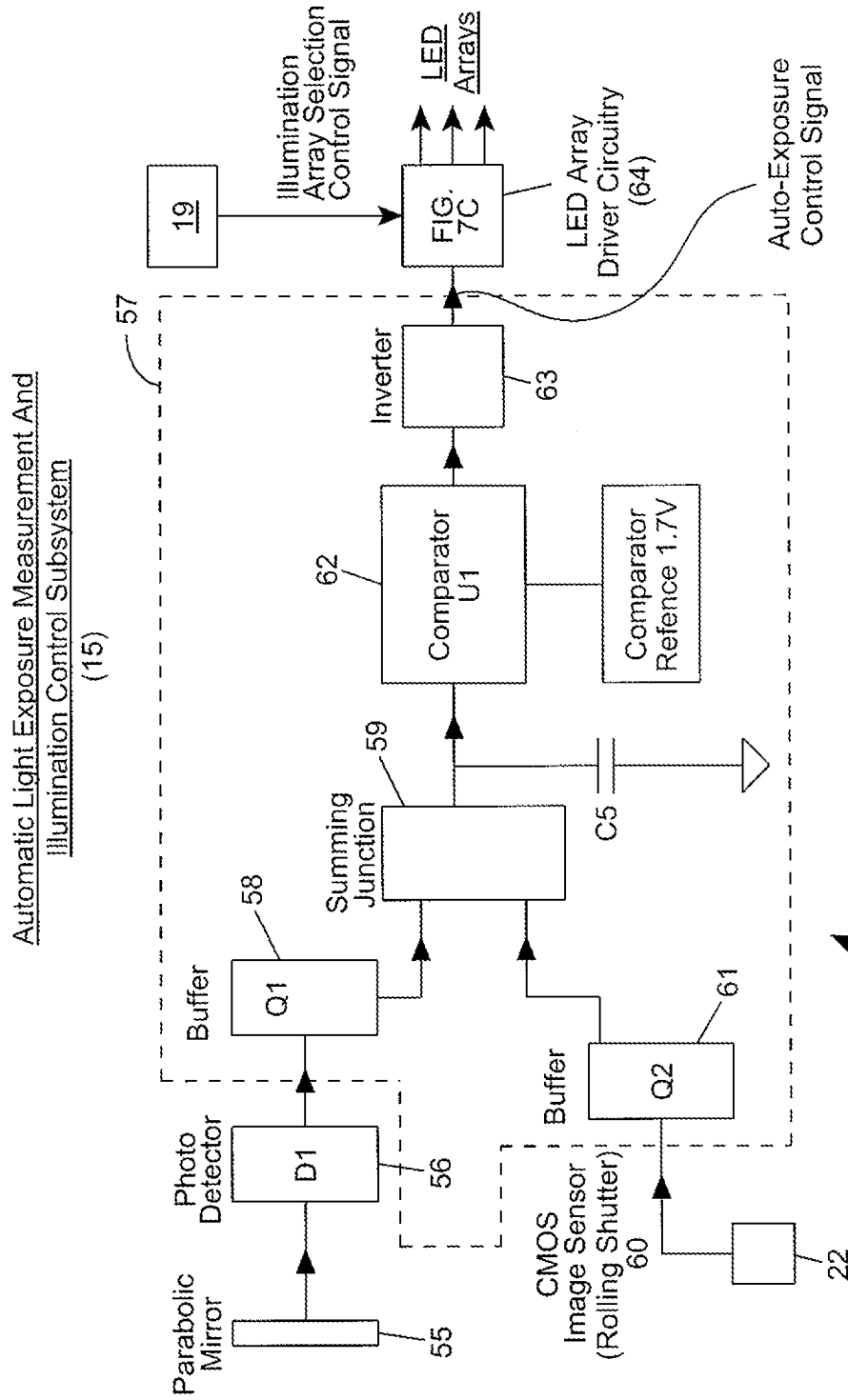
FIG. 6B is a schematic diagram of the Automatic Light Exposure Measurement and Illumination Control Subsystem employed in the hand-supportable digital imaging-based bar code symbol reading device of the present invention, wherein illumination is collected from the center of the FOV of the system and automatically detected so as to generate a control signal for driving, at the proper intensity, the narrow-area illumination array as well as the far-field and narrow-field wide-area illumination arrays of the Multi-Mode Illumination Subsystem, so that the CMOS image sensing array produces digital images of illuminated objects of sufficient brightness.

As shown in FIG. 6B, the System Control Subsystem 19 generates an illumination array selection control signal which determines which LED illumination array (i.e. the narrow-area illumination array 27 or the far-field and narrow-field wide-area illumination arrays 28 or 29) will be selectively driven at any instant in time of system operation by LED Array Driver Circuitry 64 in the Automatic Light Exposure Measurement and Illumination Control Subsystem 15. As shown, electronic circuitry 57 processes the electrical signal from photo-detector 56 and generates an auto exposure control signal for the selected LED illumination array. In term, this auto exposure control signal is provided to the LED array driver circuitry 64, along with an illumination array selection control signal from the System Control Subsystem 19, for selecting and driving (i.e. energizing) one or more LED illumination array(s) so as to generate visible illumination at a suitable intensity level and for suitable time duration so that the CMOS image sensing array 22 automatically detects digital high-resolution images of illuminated objects, with sufficient contrast and brightness, while achieving global exposure control objectives of the present invention disclosed herein. As shown in FIGS. 6B and 7C, the illumination array selection control signal is generated by the System Control Subsystem 19 in response to (i) reading the system mode configuration parameters from the system mode configuration parameter table 70, shown in FIG. 2A1, for the programmed mode of system operation at hand, and (ii) detecting the output from the automatic IR-based Object Presence and Range Detection Subsystem 12.

Notably, in the illustrative embodiment, there are three possible LED-based illumination arrays 27, 28 and 29 which can be selected for activation by the System Control Subsystem 19, and the upper and/or lower LED subarrays in illumination arrays 28 and 29 can be selectively activated or deactivated on a subarray-by-subarray basis, for various purposes taught herein, including automatic specular reflection noise reduction during wide-area image capture modes of operation.

Each one of these illumination arrays can be driven to different states depending on the auto-exposure control signal generated by electronic signal processing circuit 57, which will be generally a function of object distance, object surface reflectivity and the ambient light conditions sensed at photo-detector 56, and measured by signal processing circuit 57. The operation of signal processing circuitry 57 will now be detailed below.

As shown in FIG. 6B, the narrow-band filtered optical signal that is produced by the parabolic light focusing mirror 55 is focused onto the photo-detector D1 56 which generates an analog electrical signal whose amplitude corresponds to the intensity of the detected optical signal. This analog electrical signal is supplied to the signal processing circuit 57 for various stages of processing. The first step of processing involves converting the analog electrical signal from a current-based signal to a voltage-based signal which is achieved by passing it through a constant-current source buffer circuit 58, realized by one half of transistor Q1 (58). This inverted voltage signal is then buffered by the second half of the transistor Q1 (58) and is supplied as a first input to a summing junction 59. As shown in FIG. 7C, the CMOS image sensing array 22 produces, as output, a digital electronic rolling shutter (ERS) pulse signal 60, wherein the duration of this ERS pulse signal 60 is fixed to a maximum exposure time allowed in the system. The ERS pulse signal 60 is buffered through transistor Q2 61 and forms the other side of the summing junction 59. The outputs from transistors Q1 and Q2 form an input to the summing junction 59. A capacitor C5 is provided on the output of the summing junction 59 and provides a minimum integration time sufficient to reduce any voltage overshoot in the signal processing circuit 57. The output signal across the capacitor C5 is further processed by a comparator U1 62. In the illustrative embodiment, the comparator reference voltage signal is set to 1.7 volts. This reference voltage signal sets the minimum threshold level for the light exposure measurement circuit 57. The output signal from the comparator 62 is inverted by inverter U3 63 to provide a positive logic pulse signal which is supplied, as auto exposure control signal, to the input of the LED array driver circuit 64 shown in FIG. 7C.

As will be explained in greater detail below, the LED array driver circuit 64 shown in FIG. 7C automatically drives an activated LED illuminated array, and the operation of LED array driver circuit 64 depends on the mode of operation in which the Multi-Mode Illumination Subsystem 14 is configured. In turn, the mode of operation in which the Multi-Mode Illumination Subsystem 14 is configured at any moment in time will typically depend on (i) the state of operation of the Object Presence and Range Detection Subsystem 12 and (ii) the programmed mode of operation in which the entire Imaging-Based Bar Code Symbol Reading System is configured using system mode configuration parameters read from Table 70 shown in FIG. 2A1.

As shown in FIG. 7C, the LED array driver circuit 64 comprises analog and digital circuitry which receives two input signals: (i) the auto exposure control signal from signal processing circuit 57; and (ii) the illumination array selection control signal. The LED array driver circuit 64 generates, as output, digital pulse-width modulated (PCM) drive signals provided to either the narrow-area illumination array 27, the upper and/or lower LED subarray employed in the near-field wide-area illumination array 28, and/or the upper and/or lower LED subarrays employed in the far-field wide-area illumination array 29. Depending on which mode of system operation the imaging-based bar code symbol reader has been configured, the LED array driver circuit 64 will drive one or more of the above-described LED illumination arrays during object illumination and imaging operations. As will be described in greater detail below, when all rows of pixels in the CMOS image sensing array 22 are in a state of integration (and thus have a common integration time), such LED illumination array(s) are automatically driven by the LED array driver circuit 64 at an intensity and for duration computed (in an analog manner) by the Automatic Light Exposure and Illumination Control Subsystem 15 so as to capture digital images having good contrast and brightness, independent of the light intensity of the ambient environment and the relative motion of target object with respect to the imaging-based bar code symbol reader.

Figure 6D:
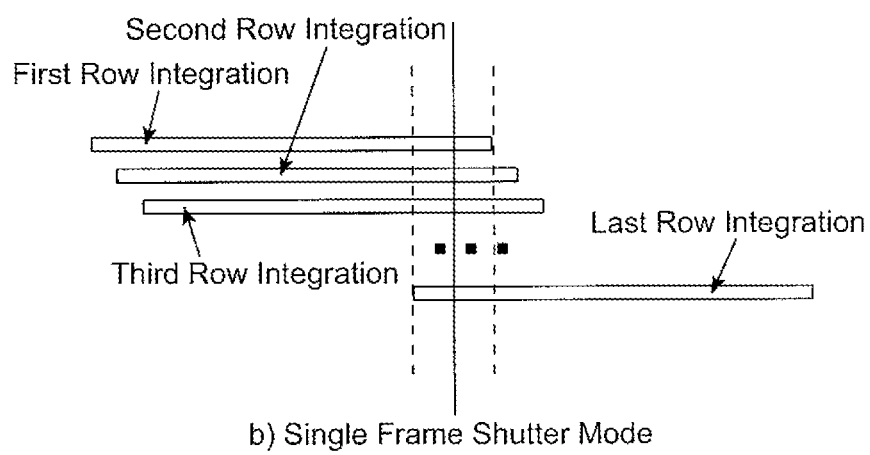
FIG. 6D is a schematic diagram showing that, in accordance with the principles of the present invention, the CMOS image sensing array employed in the digital imaging-based bar code symbol reading device of the illustrative embodiment, once activated by the System Control Subsystem (or directly by the trigger switch), and when all rows in the image sensing array are in a state of integration operation, automatically activates the Automatic Light Exposure Measurement and Illumination Control Subsystem which, in response thereto, automatically activates the LED illumination driver circuitry to automatically drive the appropriate LED illumination arrays associated with the Multi-Mode Illumination Subsystem in a precise manner and globally expose the entire CMOS image detection array with narrowly tuned LED-based illumination when all of its rows of pixels are in a state of integration, and thus have a common integration time, thereby capturing high quality images independent of the relative motion between the bar code reader and the object.

Global Exposure Control Method of the Present Invention Carried Out Using the CMOS Image Sensing Array In the illustrative embodiment, the CMOS image sensing array 22 is operated in its Single Frame Shutter Mode (i.e. rather than its Continuous Frame Shutter Mode) as shown in FIG. 6D, and employs a novel exposure control method which ensure that all rows of pixels in the CMOS image sensing array 22 have a common integration time, thereby capturing high quality images even when the object is in a state of high speed motion. This novel exposure control technique shall be referred to as "the global exposure control method" of the present invention, and the flow chart of FIGS. 6E1 and 6E2 describes clearly and in great detail how this method is implemented in the imaging-based bar code symbol reader of the illustrative embodiment. The global exposure control method will now be described in detail below.

As indicated at Block A in FIG. 6E1, Step A in the global exposure control method involves selecting the single frame shutter mode of operation for the CMOS imaging sensing array provided within an imaging-based bar code symbol reading system employing an automatic light exposure measurement and illumination control subsystem, a multi-mode illumination subsystem, and a system control subsystem integrated therewith, and image formation optics providing the CMOS image sensing array with a field of view into a region of space where objects to be imaged are presented.

As indicated in Block B in FIG. 6E1, Step B in the global exposure control method involves using the automatic light exposure measurement and illumination control subsystem to continuously collect illumination from a portion of the field of view, detect the intensity of the collected illumination, and generate an electrical analog signal corresponding to the detected intensity, for processing.

As indicated in Block C in FIG. 6E1, Step C in the global exposure control method involves activating (e.g. by way of the system control subsystem 19 or directly by way of trigger switch 2C) the CMOS image sensing array so that its rows of pixels begin to integrate photonically generated electrical charge in response to the formation of an image onto the CMOS image sensing array by the image formation optics of the system.

As indicated in Block D in FIG. 6E1, Step D in the global exposure control method involves the CMOS image sensing array 22 automatically (i) generating an electronic rolling shutter (ERS) digital pulse signal when all rows of pixels in the image sensing array are operated in a state of integration, and providing this ERS pulse signal to the Automatic Light Exposure Measurement And Illumination Control Subsystem 15 so as to activate light exposure measurement and illumination control functions/operations therewithin.

As indicated in Block E in FIG. 6E2, Step E in the global exposure control method involves, upon activation of light exposure measurement and illumination control functions within Subsystem 15, (i) processing the electrical analog signal being continuously generated therewithin, (ii) measuring the light exposure level within a central portion of the field of view 23 (determined by light collecting optics 55 shown in FIG. 6A), and (iii) generating an auto-exposure control signal for controlling the generation of visible field of illumination from at least one LED-based illumination array (27, 28 and/or 29) in the Multi-Mode Illumination Subsystem 14 which is selected by an illumination array selection control signal produced by the System Control Subsystem 19.

Finally, as indicated at Block F in FIG. 6E2, Step F in the global exposure control method involves using (i) the auto exposure control signal and (ii) the illumination array selection control signal to drive the selected LED-based illumination array(s) and illuminate the field of view of the CMOS image sensing array 22 in whatever image capture mode it may be configured, precisely when all rows of pixels in the CMOS image sensing array are in a state of integration, as illustrated in FIG. 6D, thereby ensuring that all rows of pixels in the CMOS image sensing array have a common integration time. By enabling all rows of pixels in the CMOS image sensing array 22 to have a common integration time, high-speed "global exposure control" is effectively achieved within the imaging-based bar code symbol reader of the present invention, and consequently, high quality images are captured independent of the relative motion between the bar code symbol reader and the target object.

Specification of the IR-Based Automatic Object Presence and Range Detection Subsystem Employed in the Hand-Supportable Digital Image-Based Bar Code Reading Device of the Present Invention As shown in FIG. 8A, IR-wavelength based Automatic Object Presence and Range Detection Subsystem 12 is realized in the form of a compact optics module 76 mounted on the front portion of optics bench 6, as shown in FIG. 1J.

As shown in FIG. 7, the object presence and range detection module 12 of the illustrative embodiment comprises a number of subcomponents, namely: an optical bench 77 having an ultra-small footprint for supporting optical and electro-optical components used to implement the subsystem 12; at least one IR laser diode 78 mounted on the optical bench 77, for producing a low power IR laser beam 79; IR beam shaping optics 80, supported on the optical bench for shaping the IR laser beam (e.g. into a pencil-beam like geometry) and directing the same into the central portion of the object detection field 20 defined by the field of view (FOV) of IR light collection/focusing optics 81 supported on the optical bench 77; an amplitude modulation (AM) circuit 82 supported on the optical bench 77, for modulating the amplitude of the IR laser beam produced from the IR laser diode at a frequency $f_0$ (e.g. 75 Mhz) with up to 7.5 milliWatts of optical power; optical detector (e.g. an avalanche-type IR photo-detector) 83, mounted at the focal point of the IR light collection/focusing optics 81, for receiving the IR optical signal reflected off an object within the object detection field, and converting the received optical signal 84 into an electrical signal 85; an amplifier and filter circuit 86, mounted on the optical bench 77, for isolating the $f_0$ signal component and amplifying it; a limiting amplifier 87, mounted on the optical bench, for maintaining a stable signal level; a phase detector 88, mounted on the optical bench 77, for mixing the reference signal component $f_0$ from the AM circuit 82 and the received signal component $f_0$ reflected from the packages and producing a resulting signal which is equal to a DC voltage proportional to the Cosine of the phase difference between the reference and the reflected $f_0$ signals; an amplifier circuit 89, mounted on the optical bench 77, for amplifying the phase difference signal; a received signal strength indicator (RSSI) 90, mounted on the optical bench 77, for producing a voltage proportional to a LOG of the signal reflected from the target object which can be used to provide additional information; a reflectance level threshold analog multiplexer 91 for rejecting information from the weak signals; and a 12 bit A/D converter 92, mounted on the optical bench 77, for converting the DC voltage signal from the RSSI circuit 90 into sequence of time-based range data elements $\{R_{n,i}\}$, taken along nT discrete instances in time, where each range data element $R_{n,i}$ provides a measure of the distance of the object referenced from (i) the IR laser diode 78 to (ii) a point on the surface of the object within the object detection field 20; and range analysis circuitry 93 described below.

In general, the function of range analysis circuitry 93 is to analyze the digital range data from the A/D converter 90 and generate two control activation signals, namely: (i) "an object presence detection" type of control activation signal $A_{1A}$ indicating simply whether an object is presence or absent from the object detection field, regardless of the mode of operation in which the Multi-Mode Illumination Subsystem 14 might be configured; and (ii) "a near-field/far-field" range indication type of control activation signal $A_{1B}$ indicating whether a detected object is located in either the predefined near-field or far-field portions of the object detection field, which correspond to the near-field and far-field portions of the FOV of the Multi-Mode Image Formation and Detection Subsystem 13.

Various kinds of analog and digital circuitry can be designed to implement the IR-based Automatic Object Presence and Range Detection Subsystem 12. Alternatively, this subsystem can be realized using various kinds of range detection techniques as taught in U.S. Pat. No. 6,637,659, incorporated herein by reference in its entirely.

In the illustrative embodiment, Automatic Object Presence and Range Detection Subsystem 12 operates as follows. In System Modes of Operation requiring automatic object presence and/or range detection, Automatic Object Presence and Range Detection Subsystem 12 will be activated at system start-up and operational at all times of system operation, typically continuously providing the System Control Subsystem 19 with information about the state of objects within both the far and near portions of the object detection field 20 of the imaging-based symbol reader. In general, this Subsystem detects two basic states of presence and range, and therefore has two basic states of operation. In its first state of operation, the IR-based automatic Object Presence and Range Detection Subsystem 12 automatically detects an object within the near-field region of the FOV 20, and in response thereto generates a first control activation signal which is supplied to the System Control Subsystem 19 to indicate the occurrence of this first fact. In its second state of operation, the IR-based automatic Object Presence and Range Detection Subsystem 12 automatically detects an object within the far-field region of the FOV 20, and in response thereto generates a second control activation signal which is supplied to the System Control Subsystem 19 to indicate the occurrence of this second fact. As will be described in greater detail and throughout this patent specification, these control activation signals are used by the System Control Subsystem 19 during particular stages of the system control process, such as determining (i) whether to activate either the near-field and/or far-field LED illumination arrays, and (ii) how strongly should these LED illumination arrays be driven to ensure quality image exposure at the CMOS image sensing array 22.

Figure 2M:
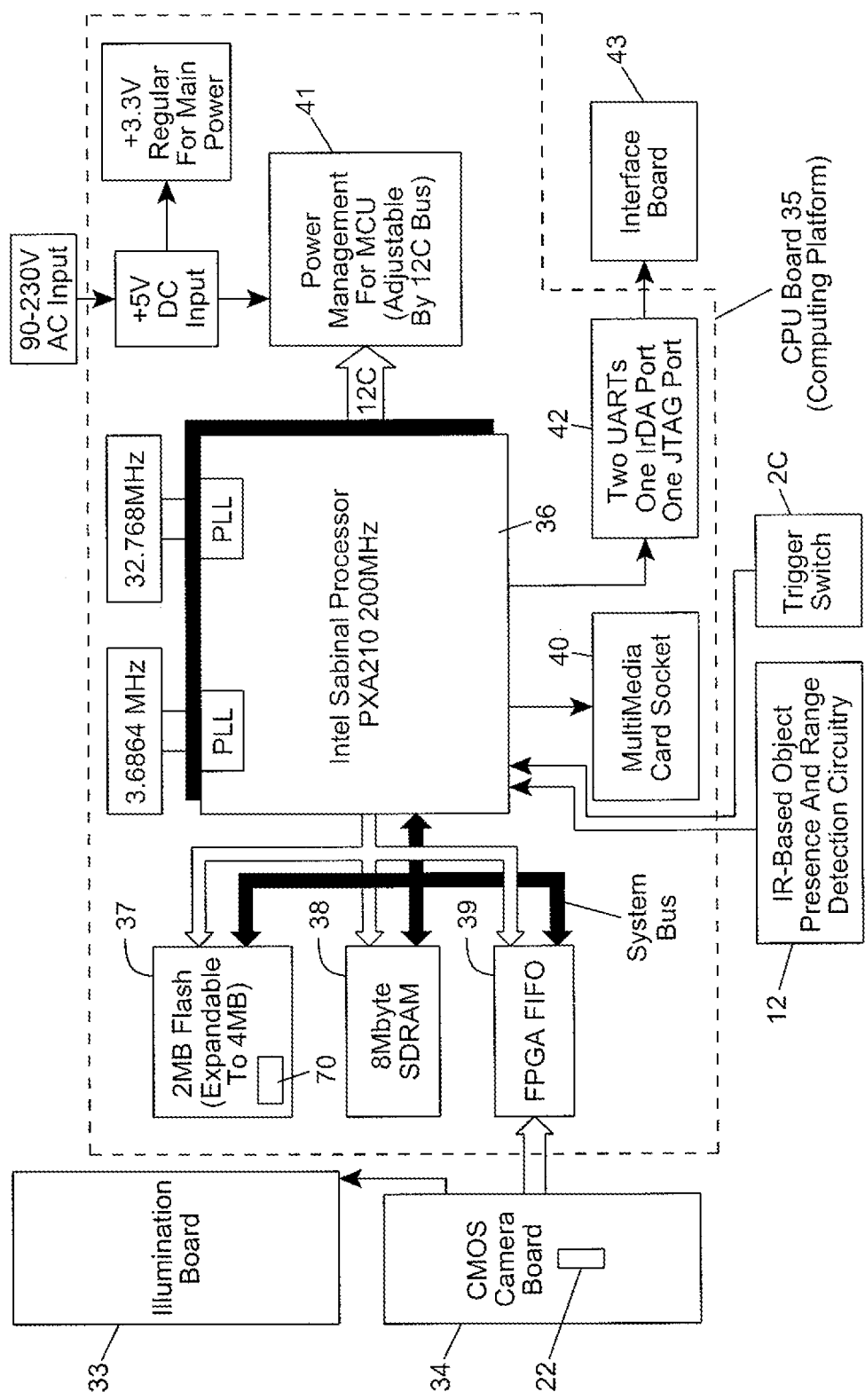
FIG. 2M is a schematic diagram representative of a system implementation for the hand-supportable digital imaging-based bar code symbol reading device illustrated in FIGS. 2A through 2L2, wherein the system implementation is shown comprising (1) an illumination board 33 carrying components realizing electronic functions performed by the Multi-Mode LED-Based Illumination Subsystem and the Automatic Light Exposure Measurement And Illumination Control Subsystem, (2) a CMOS camera board carrying a high resolution (1280×1024 7-bit 6 micron pixel size) CMOS image sensor array running at 25 Mhz master clock, at 7 frames/second at 1280*1024 resolution with randomly accessible region of interest (ROI) window capabilities, realizing electronic functions performed by the multi-mode area-type Image Formation and Detection Subsystem, (3) a CPU board (i.e. computing platform) including (i) an Intel Sabinal 32-Bit Microprocessor PXA210 running at 200 Mhz 1.0 core voltage with a 16 bit 100 Mhz external bus speed, (ii) an expandable (e.g. 7+ megabyte) Intel J3 Asynchronous 16-bit Flash memory, (iii) an 16 Megabytes of 100 MHz SDRAM, (iv) an Xilinx Spartan II FPGA FIFO 39 running at 50 Mhz clock frequency and 60 MB/Sec data rate, configured to control the camera timings and drive an image acquisition process, (v) a multimedia card socket, for realizing the other subsystems of the system, (vi) a power management module for the MCU adjustable by the system bus, and (vii) a pair of UARTs (one for an IRDA port and one for a JTAG port), (4) an interface board for realizing the functions performed by the I/O subsystem, and (5) an IR-based object presence and range detection circuit for realizing the IR-based Object Presence And Range Detection Subsystem.
Figure 8:
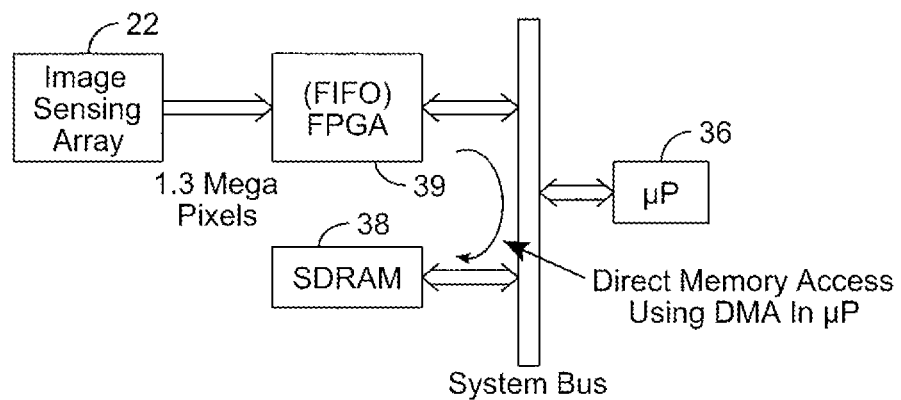
FIG. 8 is a schematic representation of the hand-supportable digital imaging-based bar code symbol reading device of the present invention, showing that its CMOS image sensing array is operably connected to its microprocessor through a FIFO (realized by way of a FPGA) and a system bus, and that its SDRAM is also operably connected to the microprocessor by way of the system bus, enabling the mapping of pixel data captured by the imaging array into the SDRAM under the control of the direct memory access (DMA) module within the microprocessor.

Specification of the Mapping of Pixel Data Captured by the Imaging Array into the SDRAM Under the Control of the Direct Memory Access (DMA) Module within the Microprocessor As shown in FIG. 8, the CMOS image sensing array 22 employed in the digital imaging-based bar code symbol reading device hereof is operably connected to its microprocessor 36 through FIFO 39 (realized by way of a FPGA) and system bus shown in FIG. 2M. As shown, SDRAM 38 is also operably connected to the microprocessor 36 by way of the system bus, thereby enabling the mapping of pixel data captured by the CMOS image sensing array 22 into the SDRAM 38 under the control of the direct memory access (DMA) module within the microprocessor 36.

Figure 9:
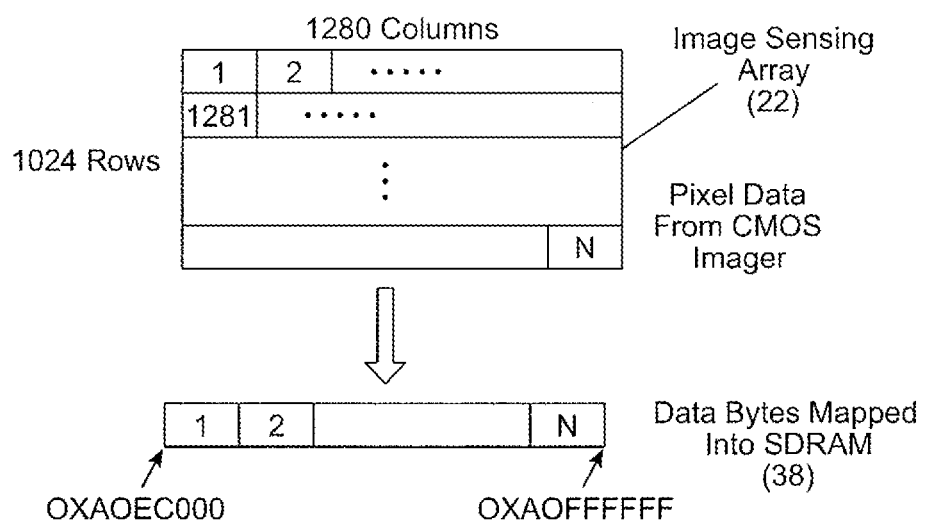
FIG. 9 is a schematic representation showing how the bytes of pixel data captured by the CMOS imaging array within the hand-supportable digital imaging-based bar code symbol reading device of the present invention, are mapped into the addressable memory storage locations of its SDRAM during each image capture cycle carried out within the device.

Referring to FIG. 9, details will now be given on how the bytes of pixel data captured by CMOS image sensing array 22 are automatically mapped (i.e. captured and stored) into the addressable memory storage locations of its SDRAM 38 during each image capture cycle carried out within the hand-supportable imaging-based bar code reading device of the present invention.

In the implementation of the illustrative embodiment, the CMOS image sensing array 22 sends 7-bit gray-scale data bytes over a parallel data connection to FPGA 39 which implements a FIFO using its internal SRAM. The FIFO 39 stores the pixel data temporarily and the microprocessor 36 initiates a DMA transfer from the FIFO (which is mapped to address OXOCOOOOOO, chip select 3) to the SDRAM 38. In general, modern microprocessors have internal DMA modules, and a preferred microprocessor design, the DMA module will contain a 32-byte buffer. Without consuming any CPU cycles, the DMA module can be programmed to read data from the FIFO 39, store read data bytes in the DMA's buffer, and subsequently write the data to the SDRAM 38. Alternatively, a DMA module can reside in FPGA 39 to directly write the FIFO data into the SDRAM 38. This is done by sending a bus request signal to the microprocessor 36, so that the microprocessor 36 releases control of the bus to the FPGA 39 which then takes over the bus and writes data into the SDRAM 38.

Below, a brief description will be given on where pixel data output from the CMOS image sensing array 22 is stored in the SDRAM 38, and how the microprocessor (i.e. implementing a decode algorithm) 36 accesses such stored pixel data bytes. FIG. 9F represents the memory space of the SDRAM 38. A reserved memory space of 1.3 MB is used to store the output of the CMOS image sensing array 22. This memory space is a 1:1 mapping of the pixel data from the CMOS image sensing array 22. Each byte represents a pixel in the image sensing array 22. Memory space is a mirror image of the pixel data from the image sensing array 22. Thus, when the decode program (36) accesses the memory, it is as if it is accessing the raw pixel image of the image sensing array 22. No time code is needed to track the data since the modes of operation of the bar code reader guarantee that the microprocessor 36 is always accessing the up-to-date data, and the pixel data sets are a true representation of the last optical exposure. To prevent data corruption, i.e. new data coming in while old data are still being processed, the reserved space is protected by disabling further DMA access once a whole frame of pixel data is written into memory. The DMA module is re-enabled until either the microprocessor 36 has finished going through its memory, or a timeout has occurred.

During image acquisition operations, the image pixels are sequentially read out of the image sensing array 22. Although one may choose to read and column-wise or row-wise for some CMOS image sensors, without loss of generality, the row-by-row read out of the data is preferred. The pixel image data set is arranged in the SDRAM 38 sequentially, starting at address OXAOEC0000. To randomly access any pixel in the SDRAM 38 is a straightforward matter: the pixel at row y ¼ column x located is at address (OXAOEC0000+y x 1280+x).

As each image frame always has a frame start signal out of the image sensing array 22, that signal can be used to start the DMA process at address OXAOEC0000, and the address is continuously incremented for the rest of the frame. But the reading of each image frame is started at address OXAOEC0000 to avoid any misalignment of data. Notably, however, if the microprocessor 36 has programmed the CMOS image sensing array 22 to have a ROI window, then the starting address will be modified to (OXAOEC0000+ 1280 X $R_1$), where $R_1$ is the row number of the top left corner of the ROI.

Specification of the Three-Tier Software Architecture of the Hand-Supportable Digital Image-Based Bar Code Reading Device of the Present Invention As shown in FIG. 10, the hand-supportable digital imaging-based bar code symbol reading device of the present invention 1 is provided with a three-tier software architecture comprising the following software modules: (1) the Main Task module, the CodeGate Task module, the Metroset Task module, the Application Events Manager module, the User Commands Table module, the Command Handler module, the Plug-In Controller (Manager) and Plug-In Libraries and Configuration Files, each residing within the Application layer of the software architecture; (2) the Tasks Manager module, the Events Dispatcher module, the Input/Output Manager module, the User Commands Manager module, the Timer Subsystem module, the Input/Output Subsystem module and the Memory Control Subsystem module, each residing within the System Core (SCORE) layer of the software architecture; and (3) the Linux Kernal module, the Linux File System module, and Device Drivers modules, each residing within the Linux Operating System (OS) layer of the software architecture.

While the operating system layer of the imaging-based bar code symbol reader is based upon the Linux operating system, it is understood that other operating systems can be used (e.g. Microsoft Windows, Max OXS, Unix, etc), and that the design preferably provides for independence between the main Application Software Layer and the Operating System Layer, and therefore, enables of the Application Software Layer to be potentially transported to other platforms. Moreover, the system design principles of the present invention provides an extensibility of the system to other future products with extensive usage of the common software components, which should make the design of such products easier, decrease their development time, and ensure their robustness.

In the illustrative embodiment, the above features are achieved through the implementation of an event-driven multi-tasking, potentially multi-user, Application layer running on top of the System Core software layer, called SCORE. The SCORE layer is statically linked with the product Application software, and therefore, runs in the Application Level or layer of the system. The SCORE layer provides a set of services to the Application in such a way that the Application would not need to know the details of the underlying operating system, although all operating system APIs are, of course, available to the application as well. The SCORE software layer provides a real-time, event-driven, OS-independent framework for the product Application to operate. The event-driven architecture is achieved by creating a means for detecting events (usually, but not necessarily, when the hardware interrupts occur) and posting the events to the Application for processing in real-time manner. The event detection and posting is provided by the SCORE software layer. The SCORE layer also provides the product Application with a means for starting and canceling the software tasks, which can be running concurrently, hence, the multi-tasking nature of the software system of the present invention.

Specification of Software Modules within the SCORE Layer of the System Software Architecture Employed in Imaging-Based Bar Code Reader of the Present Invention The SCORE layer provides a number of services to the Application layer.

The Tasks Manager provides a means for executing and canceling specific application tasks (threads) at any time during the product Application run.

The Events Dispatcher provides a means for signaling and delivering all kinds of internal and external synchronous and asynchronous events When events occur, synchronously or asynchronously to the Application, the Events Dispatcher dispatches them to the Application Events Manager, which acts on the events accordingly as required by the Application based on its current state. For example, based on the particular event and current state of the application, the Application Events Manager can decide to start a new task, or stop currently running task, or do something else, or do nothing and completely ignore the event.

The Input/Output Manager provides a means for monitoring activities of input/output devices and signaling appropriate events to the Application when such activities are detected.

The Input/Output Manager software module runs in the background and monitors activities of external devices and user connections, and signals appropriate events to the Application Layer, which such activities are detected. The Input/Output Manager is a high-priority thread that runs in parallel with the Application and reacts to the input/output signals coming asynchronously from the hardware devices, such as serial port, user trigger switch 2C, bar code reader, network connections, etc. Based on these signals and optional input/output requests (or lack thereof) from the Application, it generates appropriate system events, which are delivered through the Events Dispatcher to the Application Events Manager as quickly as possible as described above.

The User Commands Manager provides a means for managing user commands, and utilizes the User Commands Table provided by the Application, and executes appropriate User Command Handler based on the data entered by the user.

The Input/Output Subsystem software module provides a means for creating and deleting input/output connections and communicating with external systems and devices The Timer Subsystem provides a means of creating, deleting, and utilizing all kinds of logical timers.

The Memory Control Subsystem provides an interface for managing the multi-level dynamic memory with the device, fully compatible with standard dynamic memory management functions, as well as a means for buffering collected data. The Memory Control Subsystem provides a means for thread-level management of dynamic memory. The interfaces of the Memory Control Subsystem are fully compatible with standard C memory management functions. The system software architecture is designed to provide connectivity of the device to potentially multiple users, which may have different levels of authority to operate with the device.

The User Commands Manager, which provides a standard way of entering user commands, and executing application modules responsible for handling the same. Each user command described in the User Commands Table is a task that can be launched by the User Commands Manager per user input, but only if the particular user's authority matches the command's level of security.

The Events Dispatcher software module provides a means of signaling and delivering events to the Application Events Manager, including the starting of a new task, stopping a currently running task, or doing something or nothing and simply ignoring the event.

FIG. 12B provides a Table listing examples of System-Defined Events which can occur and be dispatched within the hand-supportable digital imaging-based bar code symbol reading device of the present invention, namely: SCORE_EVENT_POWER_UP which signals the completion of system start-up and involves no parameters; _ SCORE_EVENT_TIMEOUT which signals the timeout of the logical timer, and involves the parameter "pointer to timer id"; SCORE_EVENT_UNEXPECTED_INPUT which signals that the unexpected input data is available and involves the parameter "pointer to connection id"; SCORE_EVENT_TRIG_ON which signals that the user pulled the trigger and involves no parameters; SCORE_EVENT_TRIG_OFF which signals that the user released the trigger and involves no parameters; SCORE_EVENT_OBJECT_DETECT_ON which signals that the object is positioned under the bar code reader and involves no parameters; SCORE_EVENT_OBJECT_DETECT_OFF which signals that the object is removed from the field of view of the bar code reader and involves no parameters; SCORE_EVENT_EXIT_TASK which signals the end of the task execution and involves the pointer UTID; and SCORE_EVENT_ABORT_TASK which signals the aborting of a task during execution.

The imaging-based bar code symbol reading device of the present invention provides the user with a command-line interface (CLI), which can work over the standard communication lines, such as RS232, available in the bar code reader. The CLI is used mostly for diagnostic purposes, but can also be used for configuration purposes in addition to the MetroSet® and MetroSelect® programming functionalities. To send commands to the bar code reader utilizing the CLI, a user must first enter the User Command Manager by typing in a special character, which could actually be a combination of multiple and simultaneous keystrokes, such Ctrl and S for example. Any standard and widely available software communication tool, such as Windows HyperTerminal, can be used to communicate with the bar code reader. The bar code reader acknowledges the readiness to accept commands by sending the prompt, such as "MTLG>" back to the user. The user can now type in any valid Application command. To quit the User Command Manager and return the scanner back to its normal operation, a user must enter another special character, which could actually be a combination of multiple and simultaneous keystrokes, such Ctrl and R for example.

An example of the valid command could be the "Save Image" command, which is used to upload an image from the bar code reader's memory to the host PC. This command has the following CLI format:

save [filename [compr]]

where (1) save is the command name.

(2) filename is the name of the file the image gets saved in. If omitted, the default filename is "image.bmp".

(3) compr is the compression number, from 0 to 10. If omitted, the default compression number is 0, meaning no compression. The higher compression number, the higher image compression ratio, the faster image transmission, but more distorted the image gets.

The imaging-based bar code symbol reader of the present invention can have numerous commands. All commands are described in a single table (User Commands Table shown in FIG. 10) contained in the product Applications software layer. For each valid command, the appropriate record in the table contains the command name, a short description of the command, the command type, and the address of the function that implements the command.

When a user enters a command, the User Command Manager looks for the command in the table. If found, it executes the function the address of which is provided in the record for the entered command. Upon return from the function, the User Command Manager sends the prompt to the user indicating that the command has been completed and the User Command Manager is ready to accept a new command Specification of Software Modules within the Application Layer of the System Software Architecture Employed in Imaging-Based Bar Code Reader of the Present Invention The image processing software employed within the system hereof performs its bar code reading function by locating and recognizing the bar codes within the frame of a captured image comprising pixel data. The modular design of the image processing software provides a rich set of image processing functions, which could be utilized in the future for other potential applications, related or not related to bar code symbol reading, such as: optical character recognition (OCR) and verification (OCV); reading and verifying directly marked symbols on various surfaces; facial recognition and other biometrics identification; etc.

The CodeGate Task, in an infinite loop, performs the following task. It illuminates a "thin" narrow horizontal area at the center of the field-of-view (FOV) and acquires a digital image of that area. It then attempts to read bar code symbols represented in the captured frame of image data using the image processing software facilities supported by the Image-Processing Bar Code Symbol Reading Subsystem 17 of the present invention to be described in greater detail hereinafter. If a bar code symbol is successfully read, then Subsystem 17 saves the decoded data in the special Decode Data Buffer. Otherwise, it clears the Decode Data Buffer. Then, it continues the loop. The CodeGate Task routine never exits on its own. It can be canceled by other modules in the system when reacting to other events. For example, when a user pulls the trigger switch 2C, the event TRIGGER_ON is posted to the application. The Application software responsible for processing this event, checks if the CodeGate Task is running, and if so, it cancels it and then starts the Main Task. The CodeGate Task can also be canceled upon OBJECT_DETECT_OFF event, posted when the user moves the bar code reader away from the object, or when the user moves the object away from the bar code reader. The CodeGate Task routine is enabled (with Main Task) when "semi-automatic-triggered" system modes of programmed operation (Modes of System Operation Nos. 11-14) are to be implemented on the illumination and imaging platform of the present invention.

The Narrow-Area Illumination Task is a simple routine which is enabled (with Main Task) when "manually-triggered" system modes of programmed operation (Modes of System Operation Nos. 1-5) are to be implemented on the illumination and imaging platform of the present invention. However, this routine is never enabled simultaneously with CodeGate Task. As shown in the event flow chart of FIG. 13D, either CodeGate Task or Narrow-Area Illumination Task are enabled with the Main Task routine to realize the diverse kinds of system operation described herein.

Depending the System Mode in which the imaging-based bar code symbol reader is configured, Main Task will typically perform differently, but within the limits described in FIG. 13J. For example, when the imaging-based bar code symbol reader is configured in the Programmable Mode of System Operation No. 12 (i.e. Semi-Automatic-Triggered Multiple-Attempt 1D/2D Single-Read Mode) to be described in greater detail hereinafter, the Main Task first checks if the Decode Data Buffer contains data decoded by the CodeGate Task. If so, then it immediately sends the data out to the user by executing the Data Output procedure and exits. Otherwise, in a loop, the Main Task does the following: it illuminates an entire area of the field-of-view and acquires a full-frame image of that area. It attempts to read a bar code symbol the captured image. If it successfully reads a bar code symbol, then it immediately sends the data out to the user by executing the Data Output procedure and exits. Otherwise, it continues the loop. Notably, upon successful read and prior to executing the Data Output procedure, the Main Task analyzes the decoded data for a "reader programming" command or a sequence of commands. If necessary, it executes the MetroSelect functionality. The Main Task can be canceled by other modules within the system when reacting to other events. For example, the bar code reader of the present invention can be re-configured using standard Metrologic configuration methods, such as MetroSelect® and MetroSet®. The MetroSelect functionality is executed during the Main Task.

The MetroSet functionality is executed by the special MetroSet Task. When the Focus RS232 software driver detects a special NULL-signal on its communication lines, it posts the METROSET_ON event to the Application. The Application software responsible for processing this event starts the MetroSet task. Once the MetroSet Task is completed, the scanner returns to its normal operation.

The function of the Plug-In Controller (i.e. Manager) is to read configuration files and find plug-in libraries within the Plug-In and Configuration File Library, and install plug-in into the memory of the operating system, which returns back an address to the Plug-In Manager indicating where the plug-in has been installed, for future access. As will be described in greater detail hereinafter, the Plug-In Development Platform support development of plug-ins that enhance, extend and/or modify the features and functionalities of the image-processing based bar code symbol reading system, and once developed, to upload developed plug-ins within the file system of the operating system layer, while storing the addresses of such plug-ins within the Plug-In and Configuration File Library in the Application Layer.

Modes of System Operation Nos. 6-10 can be readily implemented on the illumination and imaging platform of the present invention by making the following software system modifications: (1) an Auto-Read Task routine would be added to the system routine library (wherein Auto-Read Task could be an infinite loop routine where the primary operations of CodeGate Task and Main Task are sequenced together to attempt first automatic narrow-area illumination and image capture and processing, followed by automatic wide-area illumination and image capture and processing, and repeating the wide-area operation in an infinite loop, until the object is no longer detected within a particular predetermined time period; and (2) modifying the query block "Is CodeGate Task or Narrow-Area Illumination Task Enabled?" in the Object_Detect_On event handling routine shown in FIG. 13D, to further ask whether the "Auto-Read Task Routine is enabled", and on the "Yes" control path, providing a block which starts "Auto-Read Task" and then advancing control to Return.

Operating System Layer Software Modules within the Application Layer of the System Software Architecture Employed in Imaging-Based Bar Code Reader of the Present Invention The Devices Drivers software modules, which includes trigger drivers, provide a means for establishing a software connection with the hardware-based manually-actuated trigger switch 2C employed on the imaging-based device, an image acquisition driver for implementing image acquisition functionality aboard the imaging-based device, and an IR driver for implementing object detection functionality aboard the imaging-based device.

As shown in FIG. 12I, the Device Drive software modules include: trigger drivers for establishing a software connection with the hardware-based manually-actuated trigger switch 2C employed on the imaging-based bar code symbol reader of the present invention; an image acquisition driver for implementing image acquisition functionality aboard the imaging-based bar code symbol reader; and an IR driver for implementing object detection functionality aboard the imaging-based bar code symbol reader.

Basic System Operations Supported by the Three-Tier Software Architecture of the Hand-Supportable Digital Imaging-Based Bar Code Reading Device of the Present Invention The basic system operations supported by the three-tier software architecture of the hand-supportable digital imaging-based bar code reading device of the present invention are shown in FIGS. 13A-13F and corresponding sections of Applicants' WIPO Publication No. WO 2005/005039, supra.

Notably, these basic operations represent functional modules (or building blocks) with the system architecture of the present invention, which can be combined in various combinations to implement numerous Programmable Modes of System Operation using the image acquisition and processing platform disclosed herein. For purposes of illustration, and the avoidance of obfuscation of the present invention, these basic system operations will be described below with reference to Programmable Mode of System Operation No. 12: Semi-Automatic-Triggered Multiple-Attempt 1D/2D Single-Read Mode Employing The No-Finder Mode And The Manual Or Automatic Modes Of the Multi-Mode Bar Code Reading Subsystem 17.

Figure 13A:
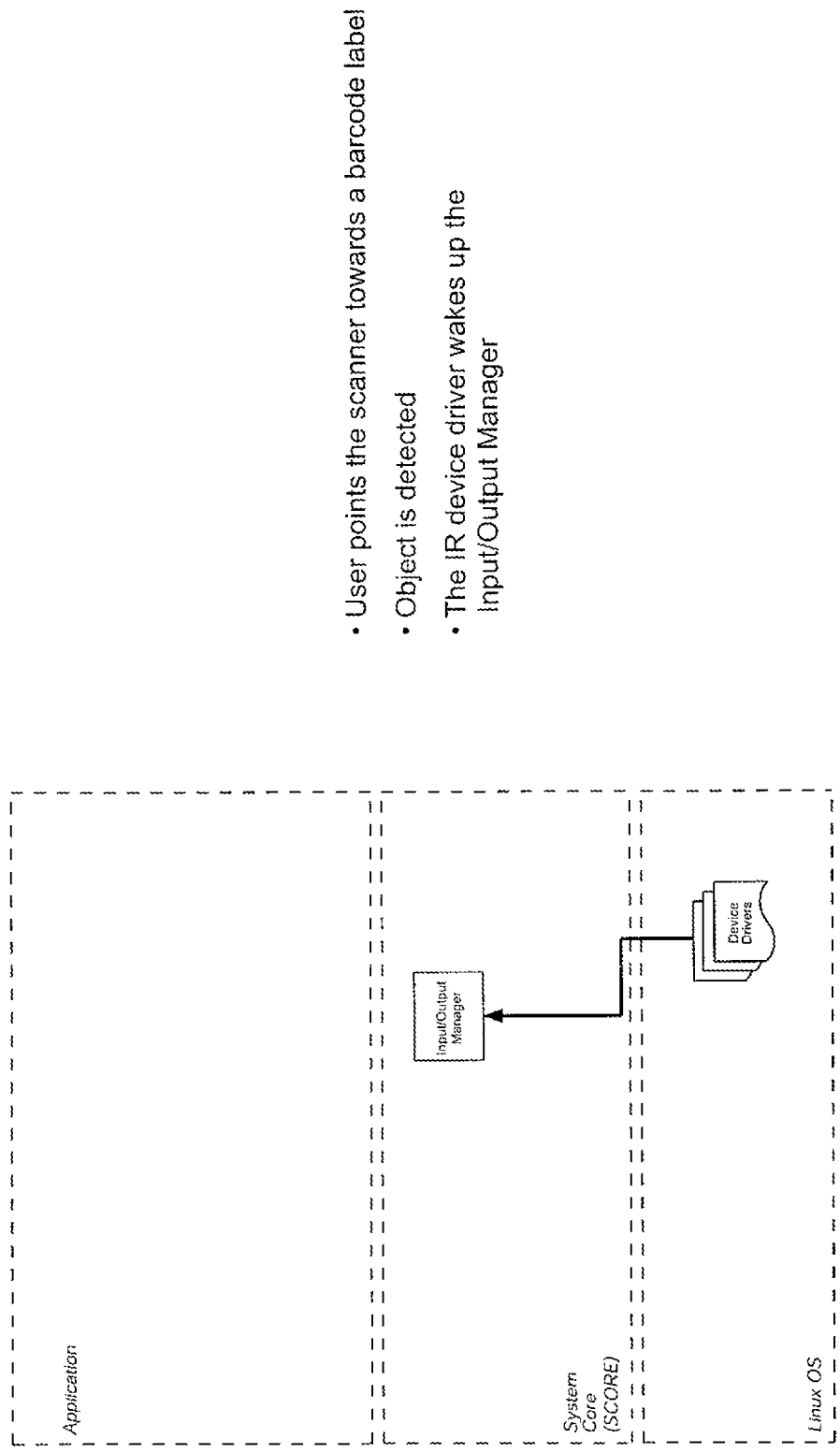
FIG. 13A is an exemplary flow chart representation showing how when the user points the bar code reader towards a bar code symbol, the IR device drivers detect that object within the field, and then wakes up the Input/Output Manager software module at the System Core Layer.
Figure 13B:
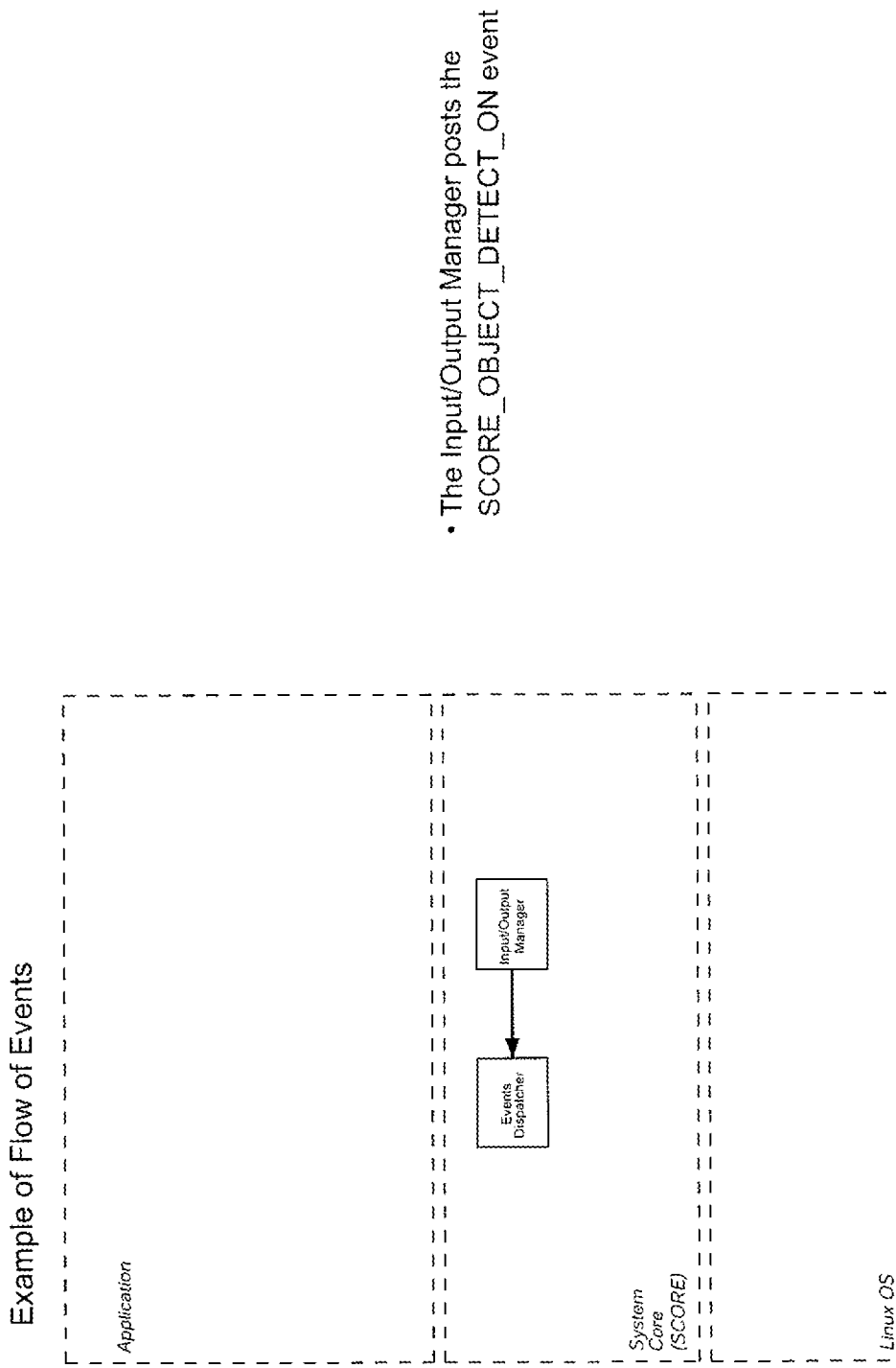
FIG. 13B is an exemplary flow chart representation showing how upon detecting an object, the Input/Output Manager posts the SCORE_OBJECT_DETECT_ON event to the Events Dispatcher software module.
Figure 13C:
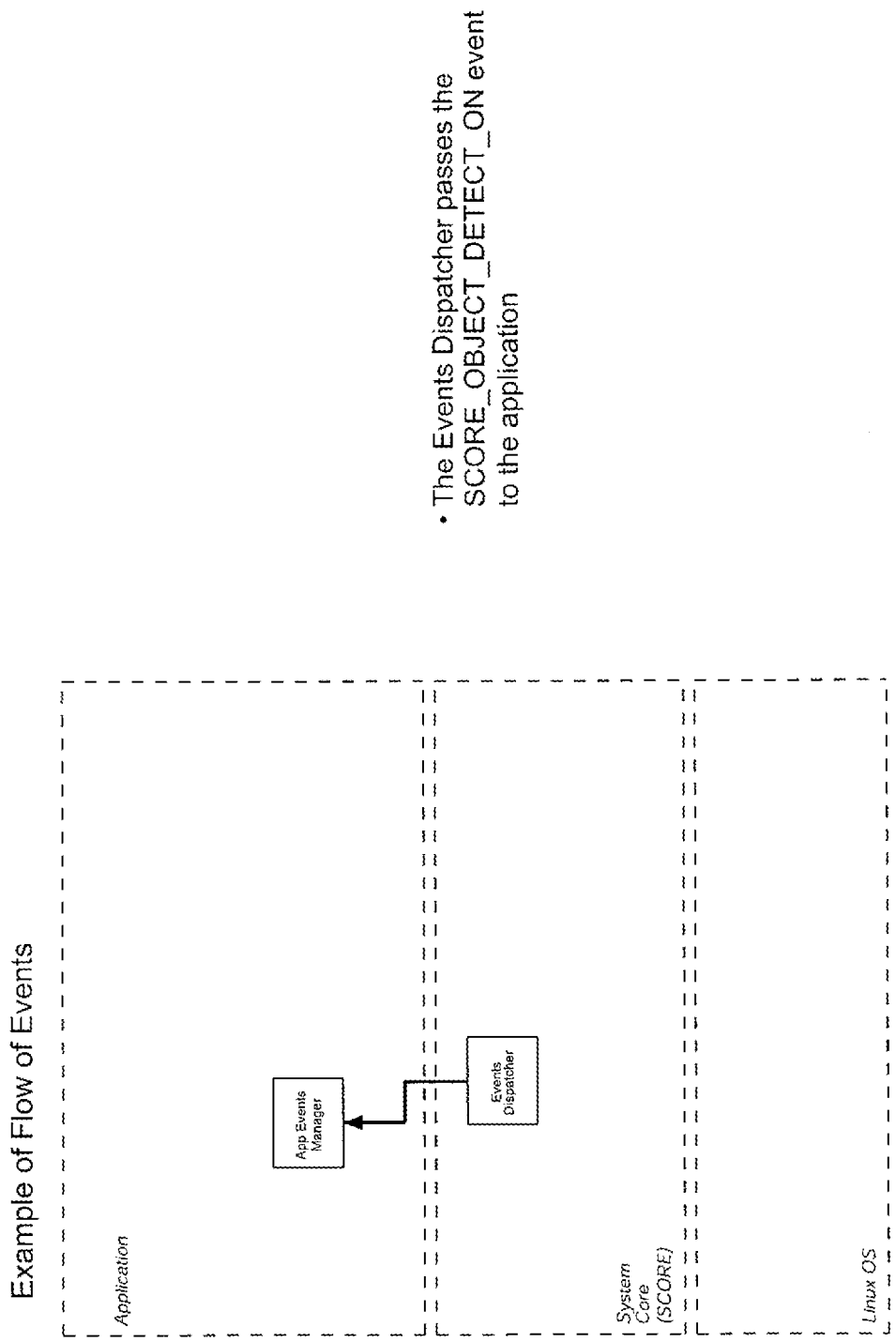
FIG. 13C is an exemplary flow chart representation showing how, in response to detecting an object, the Events Dispatcher software module passes the SCORE_OBJECT_DETECT_ON event to the Application Layer.
Figure 13D:
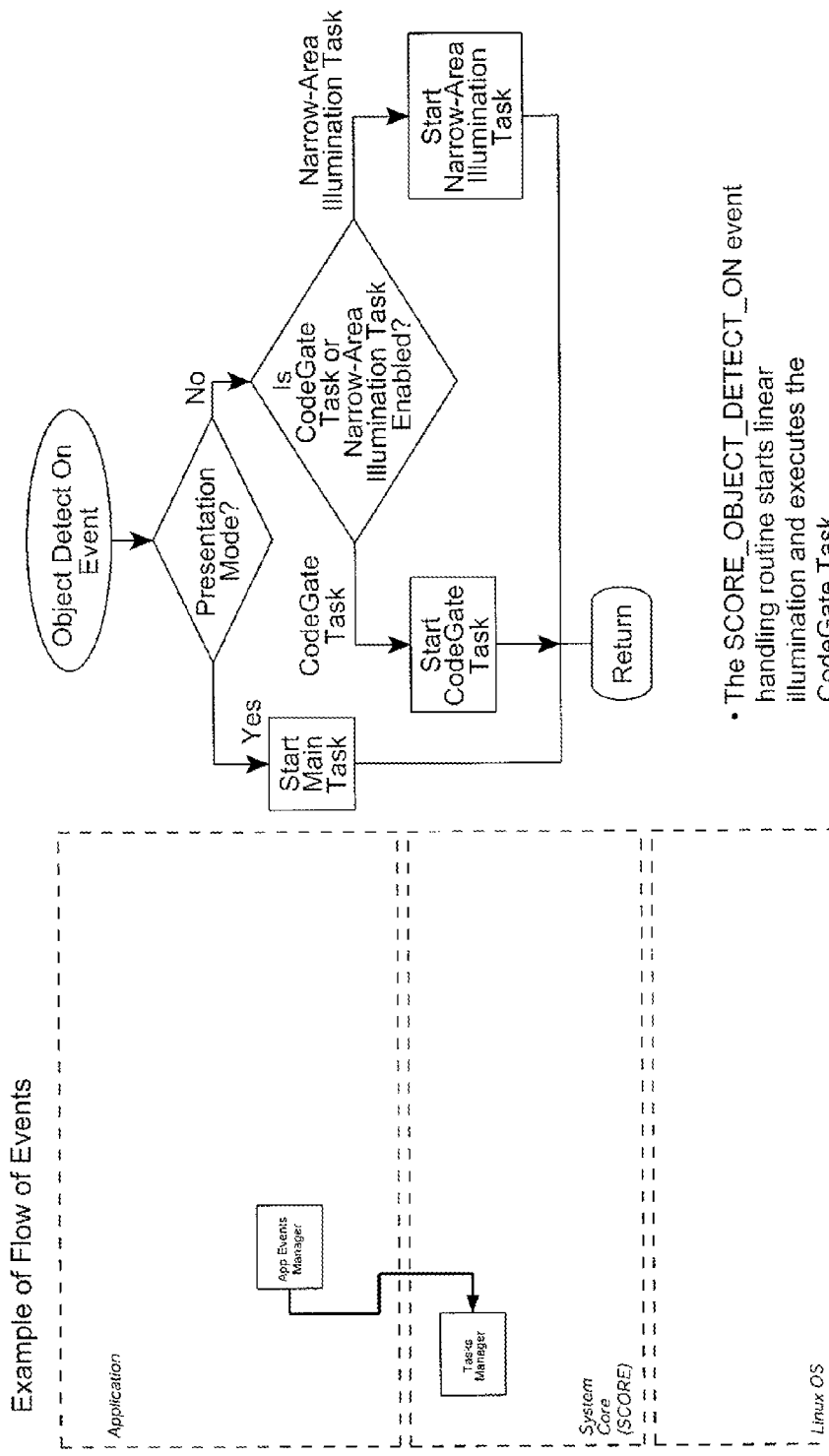
FIG. 13D is an exemplary flow chart representation showing how upon receiving the SCORE_OBJECT_DETECT_ON event at the Application Layer, the Application Events Manager executes an event handling routine which activates the narrow-area illumination array associated with the Multi-Mode Illumination Subsystem, and executes either the CodeGate Task described in FIG. 13E (when required by System Mode in which the Device is programmed) or the Narrow-Area Illumination Task described in FIG. 13M (when required by System Mode in which the Device is programmed)

FIG. 13A shows the basic operations carried out within the System Core Layer of the system when the user points the bar code reader towards a bar code symbol on an object. Such operations include the by IR device drivers enabling automatic detection of the object within the field, and waking up of the Input/Output Manager software module. As shown in FIG. 13B, the Input/Output Manager then posts the SCORE_OBJECT_DETECT_ON event to the Events Dispatcher software module in response to detecting an object. Then as shown in FIG. 13C, the Events Dispatcher software module passes the SCORE_OBJECT_DETECT_ON event to the Application Layer.

Upon receiving the SCORE_OBJECT_DETECT_ON event at the Application Layer, the Application Events Manager executes an event handling routine (shown in FIG. 13D) which activates the narrow-area (linear) illumination array 27 (i.e. during narrow-area illumination and image capture modes), and then depending on whether the presentation mode has been selected and whether CodeGate Task or Narrow-Area Illumination Mode has been enabled during system configuration, this even handling routine executes either Main Task, CodeGate Task, or Narrow-Area Illumination Task. As shown in the flow chart of FIG. 13D, the system event handling routine first involves determining whether the Presentation Mode has been selected (i.e. enabled), then the event handling routine determines whether the CodeGate Task or Narrow-Area Illumination Routines have been enabled (with Main Task). If CodeGate Task has been enabled, then Application Layer starts CodeGate Task. If the Narrow-Area Illumination Task has been enabled, then the Application Layer starts the Narrow-Area Illumination Task, as shown.

Figure 13E:
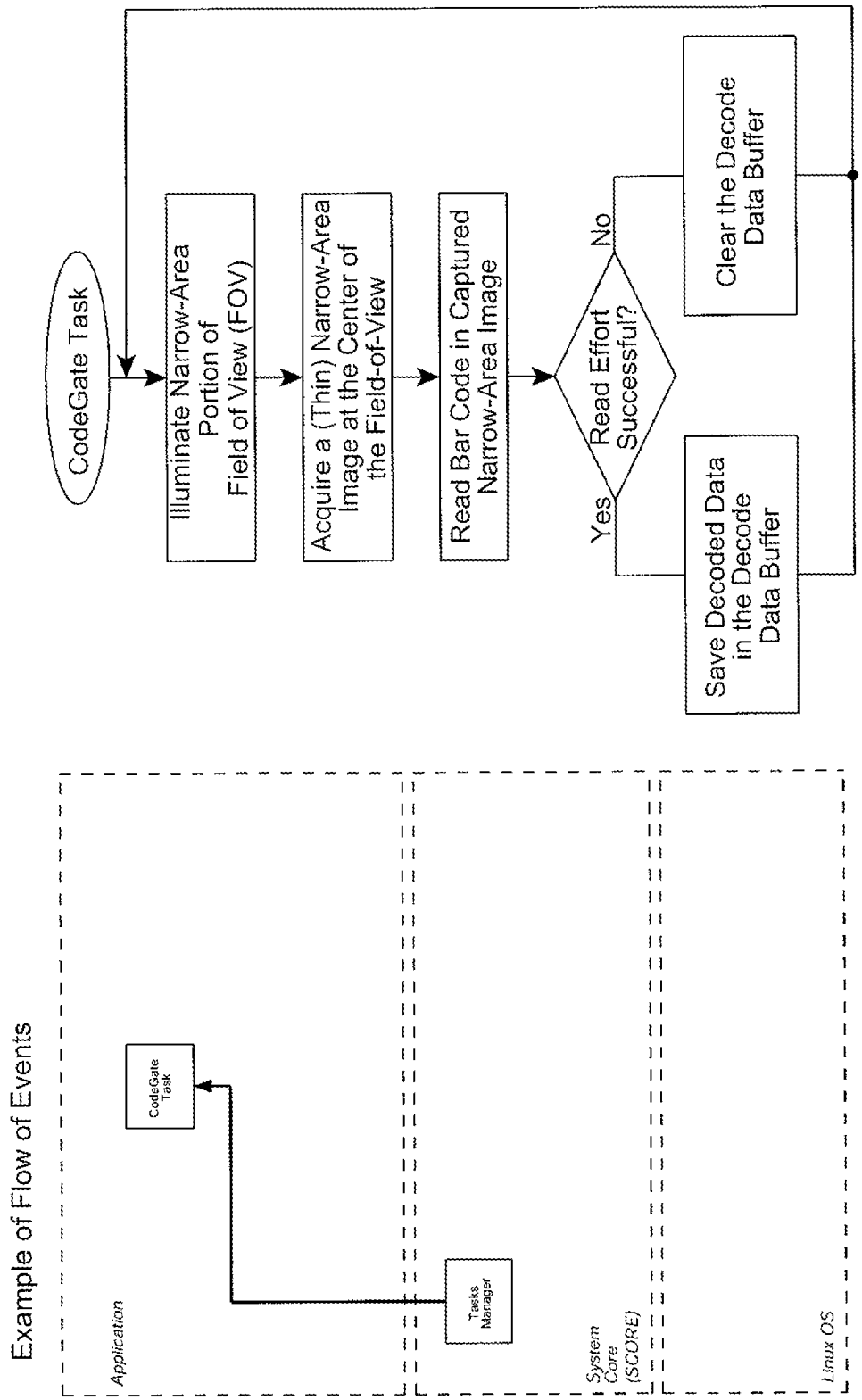
FIG. 13E is an exemplary flow chart representation showing how what operations are carried out when the CodeGate Task is (enabled and) executed within the Application Layer.

As shown in FIG. 13E, the Application Layer executes the CodeGate Task by first activating the narrow-area image capture mode in the Multi-Mode Image Formation and Detection Subsystem 13 (i.e. by enabling a few middle rows of pixels in the CMOS sensor array 22), and then acquiring/capturing a narrow image at the center of the FOV of the Bar Code Reader. CodeGate Task then performs image processing operations on the captured narrow-area image using No-Finder Module which has been enabled by the selected Programmable Mode of System Operation No. 12. If the image processing method results in a successful read of a bar code symbol, then the CodeGate Task saves the decoded symbol character data in the CodeGate Data Buffer; and if not, then the task clears the CodeGate Data Buffer, and then returns to the main block of the Task where image acquisition reoccurs.

Figure 13F:
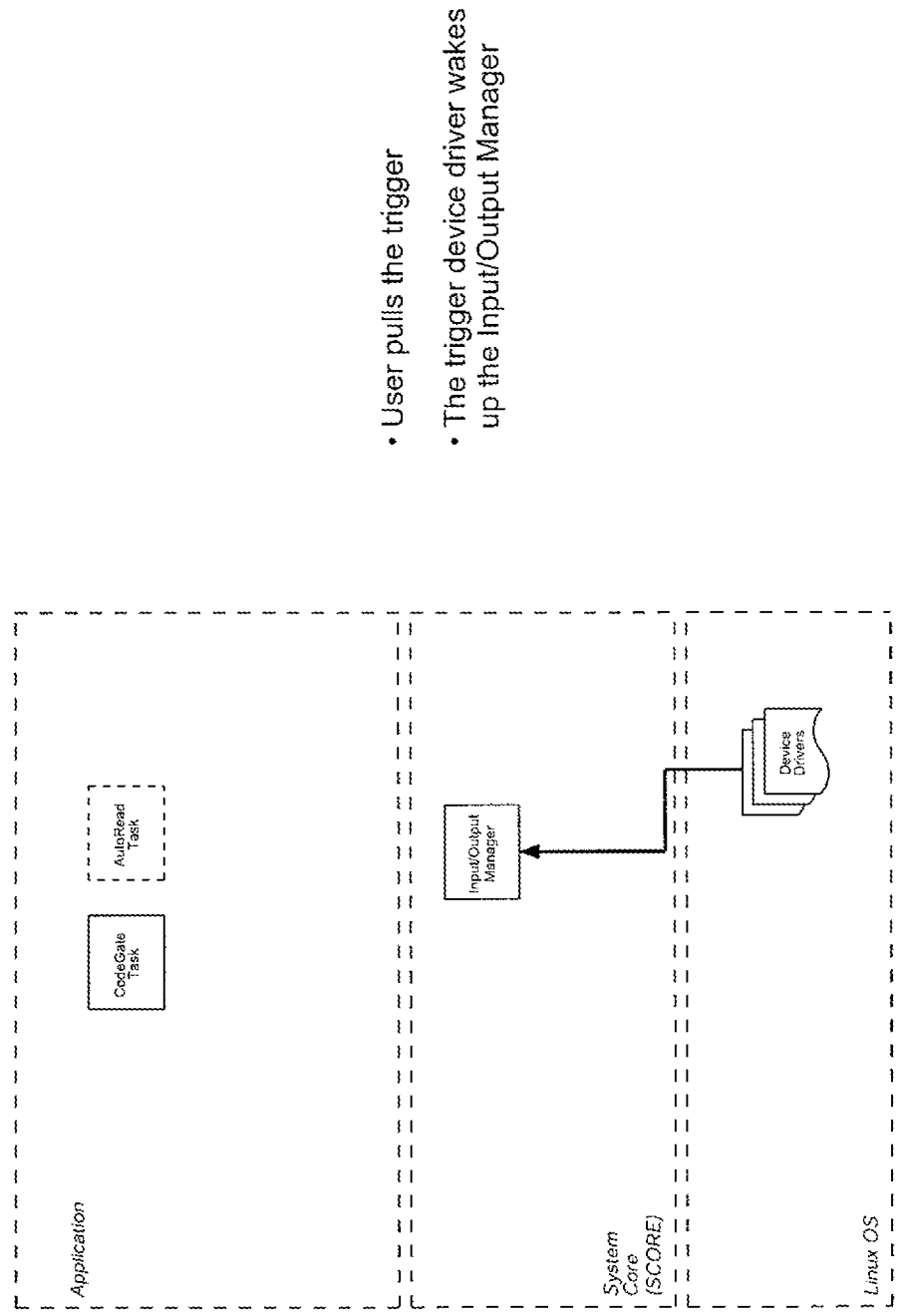
FIG. 13F is an exemplary flow chart representation showing how, when the user pulls the trigger switch on the bar code reader while the Code Task is executing, the trigger device driver wakes up the Input/Output Manager at the System Core Layer.

As shown in FIG. 13F, when the user pulls the trigger switch 2C on the bar code reader while the Code Task is executing, the trigger switch driver in the OS Layer automatically wakes up the Input/Output Manager at the System Core Layer. The Input/Output Manager, in response to being woken up by the trigger device driver, posts the SCORE_TRIGGER_ON event to the Events Dispatcher also in the System Core Layer. The Events Dispatcher then passes on the SCORE_TRIGGER_ON event to the Application Events Manager at the Application Layer. The Application Events Manager responds to the SCORE_TRIGGER_ON event by invoking a handling routine (Trigger On Event) within the Task Manager at the System Core Layer.

The routine determines whether the Presentation Mode (i.e. Programmed Mode of System Operation No. 10) has been enabled, and if so, then the routine exits. If the routine determines that the Presentation Mode (i.e. Programmed Mode of System Operation No. 10) has not been enabled, then it determines whether the CodeGate Task is running, and if it is running, then it first cancels the CodeGate Task and then deactivates the narrow-area illumination array 27 associated with the Multi-Mode Illumination Subsystem 14, and thereafter executes the Main Task. If however the routine determines that the CodeGate Task is not running, then it determines whether Narrow-Area Illumination Task is running, and if it is not running, then Main Task is started. However, if Narrow-Area Illumination Task is running, then the routine increases the narrow-illumination beam to full power and acquires a narrow-area image at the center of the field of view of the system, then attempts to read the bar code in the captured narrow-area image. If the read attempt is successful, then the decoded (symbol character) data is saved in the Decode Data Buffer, the Narrow-Area Illumination Task is canceled, the narrow-area illumination beam is stopped, and the routine starts the Main Task, as shown. If the read attempt is unsuccessful, then the routine clears the Decode Data Buffer, the Narrow-Area Illumination Task is canceled, the narrow-area illumination beam is stopped, and the routine starts the Main Task, as shown.

The Narrow-Area Task routine is an infinite loop routine that simply keeps a narrow-area illumination beam produced and directed at the center of the field of view of the system in a recursive manner (e.g. typically at half or less power in comparison with the full-power narrow-area illumination beam produced during the running of CodeGate Task).

The first step performed in the Main Task by the Application Layer is to determine whether CodeGate Data is currently available (i.e. stored in the Decode Data Buffer), and if such data is available, then the Main Task directly executes the Data Output Procedure. However, if the Main Task determines that no such data is currently available, then it starts the Read TimeOut Timer, and then acquires a wide-area image of the detected object, within the time frame permitted by the Read Timeout Timer. Notably, this wide-area image acquisition process involves carrying out the following operations, namely: (i) first activating the wide-area illumination mode in the Multi-Mode Illumination Subsystem 14 and the wide-area capture mode in the CMOS image formation and detection module; (ii) determining whether the object resides in the near-field or far-field portion of the FOV (through object range measurement by the IR-based Object Presence and Range Detection Subsystem 12); and (iii) then activating either the near or far field wide-area illumination array to illuminate either the object in either the near or far field portions of the FOV using either the near-field illumination array 28 or the far-field illumination array 29 (or possibly both 28 and 29 in special programmed cases) at an intensity and duration determined by the automatic light exposure measurement and control subsystem 15; while (iv) sensing the spatial intensity of light imaged onto the CMOS image sensing array 22 in accordance with the Global Exposure Control Method of the present invention, described in detail hereinabove. Then the Main Task performs image processing operations on the captured image using either the Manual, ROI-Specific or Automatic Modes of operation (although it is understood that other image-processing based reading methods taught herein, such as Automatic or OmniScan (as well we other suitable alternative decoding algorithms/processes not disclosed herein), can be used depending on which Programmed Mode of System Operation has been selected by the end user for the imaging-based bar code symbol reader of the present invention. Notably, the time duration of each image acquisition/processing frame is set by the Start Read Timeout Timer and Stop Read Timeout Timer blocks shown therein, and that within the Programmed Mode of System Operation No. 12, the Main Task will support repeated (i.e. multiple) attempts to read a single bar code symbol so long as the trigger switch 2C is manually depressed by the operator and a single bar code has not yet been read. Then upon successfully reading a (single) bar code symbol, the Main Task will then execute the Data Output Procedure. Notably, in other Programmed Modes of System Operation, in which a single attempt at reading a bar code symbol is enabled, the Main Task will be modified accordingly to support such system behavior. In such a case, an alternatively named Main Task (e.g. Main Task No. 2) would be executed to enable the required system behavior during run-time.

It should also be pointed out at this juncture, that it is possible to enable and utilize several of different kinds of symbol reading methods during the Main Task, and to apply particular reading methods based on the computational results obtained while processing the narrow-area image during the CodeGate Task, and/or while preprocessing of the captured wide-area image during one of the image acquiring/processing frames or cycles running in the Main Task. The main point to be made here is that the selection and application of image-processing based bar code reading methods will preferably occur through the selective activation of the different modes available within the multi-mode image-processing based bar code symbol reading Subsystem 17, in response to information learned about the graphical intelligence represented within the structure of the captured image, and that such dynamic should occur in accordance with principles of dynamic adaptive learning commonly used in advanced image processing systems, speech understanding systems, and alike. This general approach is in marked contrast with the approaches used in prior art imaging-based bar code symbol readers, wherein permitted methods of bar code reading are pre-selected based on statically defined modes selected by the end user, and not in response to detected conditions discovered in captured images on a real-time basis.

The first step carried out by the Data Output Procedure, called in the Main Task, involves determining whether the symbol character data generated by the Main Task is for programming the bar code reader or not. If the data is not for programming the bar code symbol reader, then the Data Output Procedure sends the data out according to the bar code reader system configuration, and then generates the appropriate visual and audio indication to the operator, and then exits the procedure. If the data is for programming the bar code symbol reader, then the Data Output Procedure sets the appropriate elements of the bar code reader configuration (file) structure, and then saves the Bar Code Reader Configuration Parameters in non-volatile RAM (i.e. NOVRAM). The Data Output Procedure then reconfigures the bar code symbol reader and then generates the appropriate visual and audio indication to the operator, and then exits the procedure. Decoded data is sent from the Input/Output Module at the System Core Layer to the Device Drivers within the Linux OS Layer of the system.

Specification of Symbologies and Modes Supported by the Multi-Mode Bar Code Symbol Reading Subsystem Module Employed within the Hand-Supportable Digital Image-Based Bar Code Reading Device of the Present Invention Various bar code symbologies are supported by the Multi-Mode Bar Code Symbol Reading Subsystem 17 employed within the hand-supportable digital imaging-based bar code symbol reading device of the present invention. These bar code symbologies include: Code 128; Code 39; 12 of 5; Code93; Codabar; UPC/EAN; Telepen; UK-Plessey; Trioptic; Matrix 2 of 5; Ariline 2 of 5; Straight 2 of 5; MSI-Plessey; Code11; and PDF417.

Specification of the Various Modes of Operation in the Multi-Mode Bar Code Symbol Reading Subsystem of the Present Invention The Multi-Mode Image-Processing Based Bar Code Symbol Reading Subsystem 17 of the illustrative embodiment supports five primary modes of operation, namely: the Automatic Mode of Operation; the Manual Mode of Operation; the ROI-Specific Mode of Operation; the No-Finder Mode of Operation; and Omniscan Mode of Operation. Various combinations of these modes of operation can be used during the lifecycle of the image-processing based bar code reading process of the present invention.

The Automatic Mode of Multi-Mode Bar Code Symbol Reading Subsystem

In its Automatic Mode of Operation, the Multi-Mode Bar Code Symbol Reading Subsystem 17 is configured to automatically start processing a captured frame of digital image data, prior to the complete buffering thereof, so as to search for one or more bar codes represented therein in an incremental manner, and to continue searching until the entire image is processed.

This mode of image-based processing enables bar code locating and reading when no prior knowledge about the location of, or the orientation of, or the number of bar codes that may be present within an image, is available. In this mode of operation, the Multi-Mode Bar Code Symbol Reading Subsystem 17 starts processing the image from the top-left corner and continues until it reaches the bottom-right corner, reading any potential bar codes as it encounters them.

The Manual Mode of the Multi-Mode Bar Code Symbol Reading Subsystem

In its Manual Mode of Operation, the Multi-Mode Bar Code Symbol Reading Subsystem 17 is configured to automatically process a captured frame of digital image data, starting from the center or sweep spot of the image at which the user would have aimed the bar code reader, so as to search for (i.e. find) a at least one bar code symbol represented therein. Unlike the Automatic Mode, this is done by searching in a helical manner through frames or blocks of extracted image feature data, and then marking the same and image-processing the corresponding raw digital image data until a bar code symbol is recognized/read within the captured frame of image data.

This mode of image processing enables bar code locating and reading when the maximum number of bar codes that could be present within the image is known a priori and when portions of the primary bar code have a high probability of spatial location close to the center of the image. The Multi-Mode Bar Code Symbol Reading Subsystem 17 starts processing the image from the center, along rectangular strips progressively further from the center and continues until either the entire image has been processed or the programmed maximum number of bar codes has been read.

The ROI-Specific Mode of the Multi-Mode Bar Code Symbol Reading Subsystem

In its ROI-Specific Mode of Operation, the Multi-Mode Bar Code Symbol Reading Subsystem 17 is configured to automatically process a captured frame of digital image data, starting from the region of interest (ROI) in the captured image, specified by coordinates acquired during a previous mode of operation within the Multi-Mode Bar Code Symbol Reading Subsystem 17. Unlike the Manual Mode, this is done by analyzing the received ROI-specified coordinates, derived during either a previous NoFinder Mode, Automatic Mode, or Omniscan Mode of operation, and then immediately begins processing image feature data, and image-processing the corresponding raw digital image data until a bar code symbol is recognized/read within the captured frame of image data. Thus, typically, the ROI-Specific Mode is used in conjunction with other modes of the Multi-Mode Bar Code Symbol Reading Subsystem 17.

This mode of image processing enables bar code locating and reading when the maximum number of bar codes that could be present within the image is known a priori and when portions of the primary bar code have a high probability of spatial location close to specified ROI in the image. The Multi-Mode Bar Code Symbol Reading Subsystem starts processing the image from these initially specified image coordinates, and then progressively further in a helical manner from the ROI-specified region, and continues until either the entire image has been processed or the programmed maximum number of bar codes have been read.

The No-Finder Mode of the Multi-Mode Bar Code Symbol Reading Subsystem

In its No-Finder Mode of Operation, the Multi-Mode Bar Code Symbol Reading Subsystem 17 is configured to automatically process a captured narrow-area (linear) frame of digital image data, without the feature extraction and marking operations used in the Automatic, Manual and ROI-Specific Modes, so as to read a one or more bar code symbols represented therein.

This mode enables bar code reading when it is known, a priori, that the image contains at most one (1-dimensional) bar code symbol, portions of which have a high likelihood of spatial location close to the center of the image and when the bar code is known to be oriented at zero degrees relative to the horizontal axis. Notably, this is typically the case when the bar code reader is used in a hand-held mode of operation, where the bar code symbol reader is manually pointed at the bar code symbol to be read. In this mode, the Multi-Mode Bar Code Symbol Reading Subsystem 17 starts at the center of the image, skips all bar code location steps, and filters the image at zero (0) degrees and 180 degrees relative to the horizontal axis. Using the "bar-and-space-count" data generated by the filtration step, it reads the potential bar code symbol.

The Omni-Scan Mode of the Multi-Mode Bar Code Reading Subsystem

In its Omniscan Mode of Operation, the Multi-Mode Bar Code Symbol Reading Subsystem 17 is configured to automatically process a captured frame of digital image data along any one or more predetermined virtual scan line orientations, without feature extraction and marking operations used in the Automatic, Manual and ROI-Specific Modes, so as to read a single bar code symbol represented in the processed image.

This mode enables bar code reading when it is known, a priori, that the image contains at most one (1-dimensional) bar code, portions of which have a high likelihood of spatial location close to the center of the image but which could be oriented in any direction. Multi-Mode Bar Code Symbol Reading Subsystem 17 starts at the center of the image, skips all bar code location steps, and filters the image at different start-pixel positions and at different scan-angles. Using the bar-and-space-count data generated by the filtration step, the Omniscan Mode reads the potential bar code symbol.

Programmable Modes of Bar Code Reading Operation within the Hand-Supportable Digital Image-Based Bar Code Reading Device of the Present Invention In the illustrative embodiment, the imaging-based bar code symbol reader of the present invention has at least seventeen (17) Programmable System Modes of Operation, namely: Programmed Mode of System Operation No. 1—Manually-Triggered Single-Attempt 1D Single-Read Mode Employing the No-Finder Mode of the Multi-Mode Bar Code Reading Subsystem; Programmed Mode Of System Operation No. 2—Manually-Triggered Multiple-Attempt 1D Single-Read Mode Employing the No-Finder Mode of the Multi-Mode Bar Code Reading Subsystem; Programmed Mode Of System Operation No. 3—Manually-Triggered Single-Attempt 1D/2D Single-Read Mode Employing the No-Finder Mode And The Automatic Or Manual Modes of the Multi-Mode Bar Code Reading Subsystem; Programmed Mode of System Operation No. 4—Manually-Triggered Multiple-Attempt 1D/2D Single-Read Mode Employing the No-Finder Mode And The Automatic Or Manual Modes of the Multi-Mode Bar Code Reading Subsystem; Programmed Mode of System Operation No. 5—Manually-Triggered Multiple-Attempt 1D/2D Multiple-Read Mode Employing the No-Finder Mode And The Automatic Or Manual Modes of the Multi-Mode Bar Code Reading Subsystem; Programmed Mode of System Operation No. 6—Automatically-Triggered Single-Attempt 1D Single-Read Mode Employing The No-Finder Mode Of the Multi-Mode Bar Code Reading Subsystem; Programmed Mode of System Operation No. 7—Automatically-Triggered Multi-Attempt 1D Single-Read Mode Employing The No-Finder Mode Of the Multi-Mode Bar Code Reading Subsystem; Programmed Mode of System Operation No. 7—Automatically-Triggered Multi-Attempt 1D/2D Single-Read Mode Employing The No-Finder Mode and Manual and/or Automatic Modes Of the Multi-Mode Bar Code Reading Subsystem; Programmed Mode of System Operation No. 9—Automatically-Triggered Multi-Attempt 1D/2D Multiple-Read Mode Employing The No-Finder Mode and Manual and/or Automatic Modes Of the Multi-Mode Bar Code Reading Subsystem; Programmable Mode of System Operation No. 10—Automatically-Triggered Multiple-Attempt 1D/2D Single-Read Mode Employing The Manual, Automatic or Omniscan Modes Of the Multi-Mode Bar Code Reading Subsystem; Programmed Mode of System Operation No. 11—Semi-Automatic-Triggered Single-Attempt 1D/2D Single-Read Mode Employing The No-Finder Mode And The Automatic Or Manual Modes Of the Multi-Mode Bar Code Reading Subsystem; Programmable Mode of System Operation No. 12—Semi-Automatic-Triggered Multiple-Attempt 1D/2D Single-Read Mode Employing The No-Finder Mode And The Automatic Or Manual Modes Of the Multi-Mode Bar Code Reading Subsystem; Programmable Mode of Operation No. 13—Semi-Automatic-Triggered Multiple-Attempt 1D/2D Multiple-Read Mode Employing The No-Finder Mode And The Automatic Or Manual Modes Of the Multi-Mode Bar Code Reading Subsystem; Programmable Mode of Operation No. 14—Semi-Automatic-Triggered Multiple-Attempt 1D/2D Multiple-Read Mode Employing The No-Finder Mode And The Omniscan Modes Of the Multi-Mode Bar Code Reading Subsystem; Programmable Mode of Operation No. 15—Continuously-Automatically-Triggered Multiple-Attempt 1D/2D Multiple-Read Mode Employing The Automatic, Manual Or Omniscan Modes Of the Multi-Mode Bar Code Reading Subsystem; Programmable Mode of System Operation No. 16—Diagnostic Mode Of Imaging-Based Bar Code Reader Operation; and Programmable Mode of System Operation No. 17—Live Video Mode Of Imaging-Based Bar Code Reader Operation.

Preferably, these Modes Of System Operation can programmed by reading a sequence of bar code symbols from a programming menu as taught, for example, in U.S. Pat. No. 6,565,005, which describes a bar code scanner programming technology developed by Metrologic Instruments, Inc., and marketed under the name MetroSelect® Single Line Configuration Programming Method.

These Programmable System Modes of Operation will be described in detail hereinbelow. Alternatively, the MetroSet® Graphical User Interface (GUI) can be used to view and change configuration parameters in the bar code symbol reader using a PC. Alternatively, a Command Line Interface (CLI) may also be used to view and change configuration parameters in the bar code symbol reader, Each of these programmable modes of bar code reader operation are described in greater detail in WIPO International Publication No. WO 05/05039, supra.

Overview of the Imaging-Based Bar Code Reader Start-Up Operations

When the bar code reader hereof boots up, its FPGA is programmed automatically with 12.5/50/25 MHz clock firmware and all required device drivers are also installed automatically. The login to the Operating System is also done automatically for the user "root", and the user is automatically directed to the /root/ directory. For nearly all programmable modes of system operation employing automatic object detection, the IR object detection software driver is installed automatically. Also, for all Programmable System Modes of operation employing the narrow-area illumination mode, the narrow-area illumination software drivers are automatically installed, so that a Pulse Width Modulator (PWM) is used to drive the narrow-area LED-based illumination array 27. To start the bar code reader operation, the operating system calls the/tmp/ directory first ("cd /tmp"), and then the focusapp program, located in /root/ directory is run, because the /root/ directory is located in Flash ROM, and to save captured images, the directory /tmp/ should be the current directory where the image is stored in transition to the host), which is located in RAM.

Second Illustrative Embodiment of Digital Imaging-Based Bar Code Symbol Reading Device of the Present Invention, Wherein Four Distinct Modes of Illumination are Provided In the first illustrative embodiment described above, the Multi-mode Illumination Subsystem 14 had three primary modes of illumination: (1) narrow-area illumination mode; (2) near-field wide-area illumination mode; and (3) far-field wide-area illumination mode.

In a second alternative embodiment of the digital imaging-based bar code symbol reading device of the present invention, the Multi-Mode Illumination Subsystem 14 is modified to support four primary modes of illumination: (1) near-field narrow-area illumination mode; (2) far-field narrow-area illumination mode; (3) near-field wide-area illumination mode; and (4) far-field wide-area illumination mode. In general, these near-field and far-field narrow-area illumination modes of operation are conducted during the narrow-area image capture mode of the Multi-Mode Image Formation and Detection Subsystem 13, and are supported by a near-field narrow-illumination array and a far field narrow-area illumination array. In the second illustrative embodiment, each of these illumination arrays are realized using at least a pair of LEDs, each having a cylindrical lens of appropriate focal length to focus the resulting narrow-area (i.e. linear) illumination beam into the near-field portion and far-field portion of the field of view of the system, respectively.

One of the advantages of using a pair of independent illumination arrays to produce narrow-area illumination fields over near and far field portions of the FOV is that it is possible to more tightly control the production of a relatively "narrow" or "narrowly-tapered" narrow-area illumination field along its widthwise dimension. For example, during bar code menu reading applications, the near-field narrow area illumination array can be used to generate (over the near-field portion of the FOV) an illumination field that is narrow along both its widthwise and height-wise dimensions, to enable the user to easily align the illumination field (beam) with a single bar code symbol to be read from a bar code menu of one type or another, thereby avoiding inadvertent reads of two or more bar code symbols or simply the wrong bar code symbol. At the same time, the far-field narrow area illumination array can be used to generate (over the far-field portion of the FOV) an illumination field that is sufficient wide along its widthwise dimension, to enable the user to easily read elongated bar code symbols in the far-field portion of the field of view of the bar code reader, by simply moving the object towards the far portion of the field.

Third Illustrative Embodiment of Digital Imaging-Based Bar Code Symbol Reading Device of the Present Invention Alternatively, the imaging-based bar code symbol reading device of the present invention can have virtually any type of form factor that would support the reading of bar code symbols at diverse application environments. One alternative form factor for the bar code symbol reading device of the present invention is a portable digital imaging-based bar code symbol reading device of the present invention arranged in a Presentation Mode (i.e. configured in Programmed System Mode No. 12).

The digital imaging-based bar code symbol reading device of the present invention can also be realized in the form of a Digital Imaging-Based Bar Code Reading Engine that can be readily integrated into various kinds of information collection and processing systems. Notably it is understood that a trigger switch or functionally equivalent device will be typically integrated with the housing of the resultant system into which the engine is embedded so that the user can interact with and actuate the same. Such Engines according to the present invention can be realized in various shapes and sizes and be embedded within various kinds of systems and devices requiring diverse image capture and processing functions as taught herein.

Digital Image Capture and Processing Engine of the Present Invention Employing Linear Optical Waveguide Technology for Collecting and Conducting LED-Based Illumination in the Automatic Light Exposure Measurement and Illumination Control Subsystem During Object Illumination and Image Capture Modes of Operation Referring to FIGS. 14Q through 18, it is appropriate at this juncture to describe the digital image capture and processing engine of the present invention 220 employing light-pipe technology 221 for collecting and conducting LED-based illumination in the automatic light exposure measurement and illumination control subsystem 15 during object illumination and image capture modes of operation.

The digital image capture and processing engine 220 is shown generating and projecting a visible illumination-based Image Cropping Pattern (ICP) 200 within the field of view (FOV) of the engine, during object illumination and image capture operations. Typically, as shown, the digital image capture and processing engine 220 will be embedded or integrated within a host system 222 which uses the digital output generated from the digital image capture and processing engine 220. The host system 222 can be any system that requires the kind of information that the digital image capture and processing engine 220 can capture and process.

As shown in 14Q and 15, the digital image capture and processing engine 220 depicted in FIG. 40 is shown comprising: an assembly of an illumination/targeting optics panel 223; an illumination board 224; a lens barrel assembly 225; a camera housing 226; a camera board 227; and image processing board 230. As shown, these components are assembled into an ultra-compact form factor offering advantages of light-weight construction, excellent thermal management, and exceptional image capture and processing performance. Also, camera housing 226 has a pair of integrated engine mounting projections 226A and 226B, each provided with a hole through which a mounting screw can be passed to fix the engine relative to an optical bench or other support structure within the housing of the host system or device.

Figure 15:
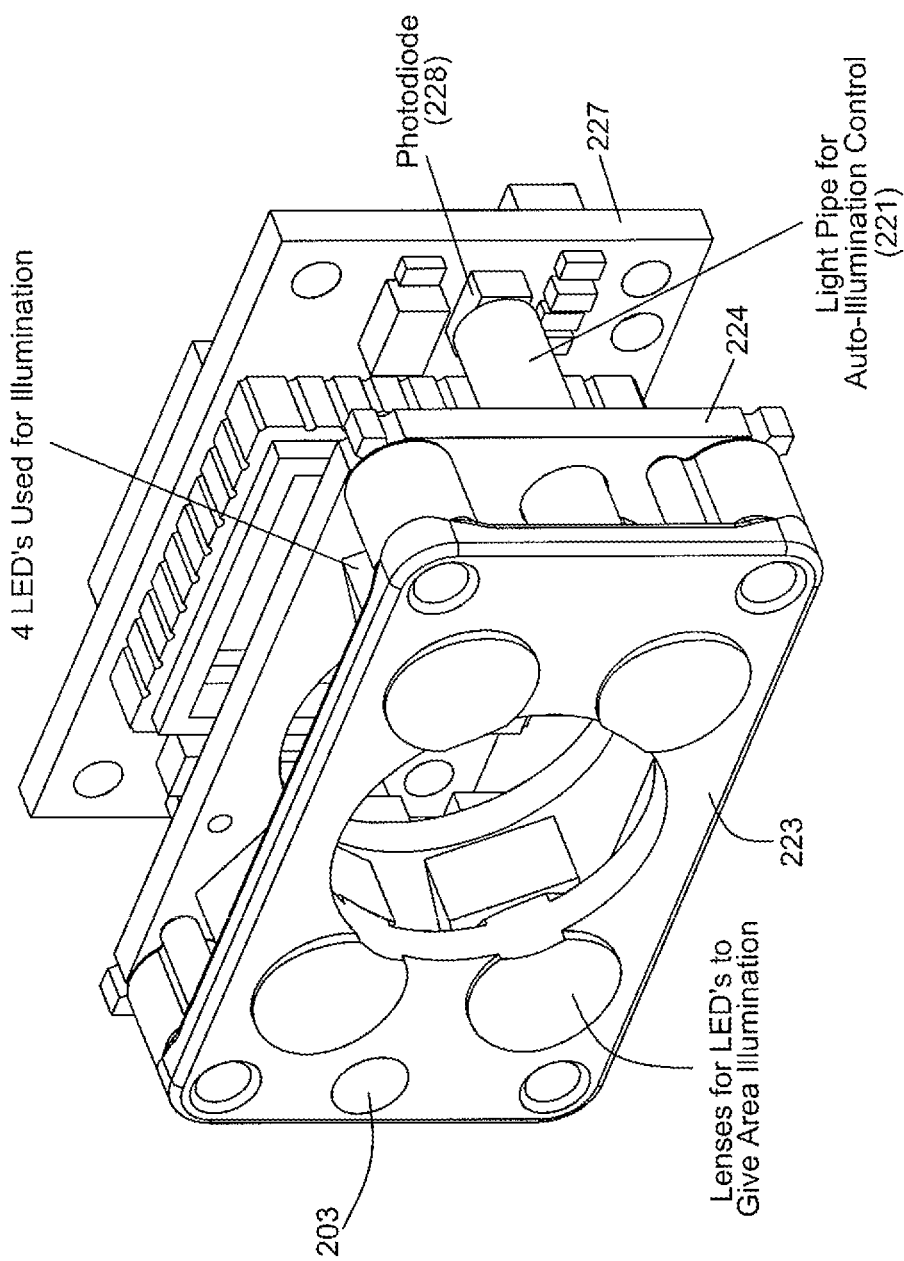
FIG. 15 is a perspective view of the illumination/targeting optics panel, the illumination board and the camera board of digital image capture and processing engine of FIG. 14Q, shown assembled with the lens barrel assembly and the camera housing removed for clarity of illustration.

In FIG. 15, the digital image capture and processing engine 220 reveals the integration of a linear optical waveguide (i.e. light conductive pipe) component 221 within the engine housing. Preferably, optical waveguide 221 is made from a plastic material having high light transmission characteristics, and low energy absorption characteristics over the optical band of the engine (which is tuned to the spectral characteristics of the LED illumination arrays and band-pass filter employed in the engine design). The function of optical waveguide 221 is to collect and conduct light energy from the FOV of the Multi-Mode Area-Type Image Formation and Detection Subsystem 13, and direct it to the photo-detector 228 mounted on the camera board 227, and associated with the Automatic Light Exposure Measurement and Illumination Control Subsystem 15. Notably, in the engine design of the illustrative embodiment, the optical waveguide 221 replaces the parabolic light collecting mirror 55 which is employed in the system design shown in FIG. 6A. Use of the optical waveguide 221 in subsystem 15 offers the advantage of ultra-small size and tight integration within the miniature housing of the digital image capture and processing engine. Upon assembling the engine components, the optical waveguide 221 aligns with the photodiode 228 on the camera board which supports subsystem 15, specified in great detail in FIGS. 6B through 6C2.

Figure 14A:
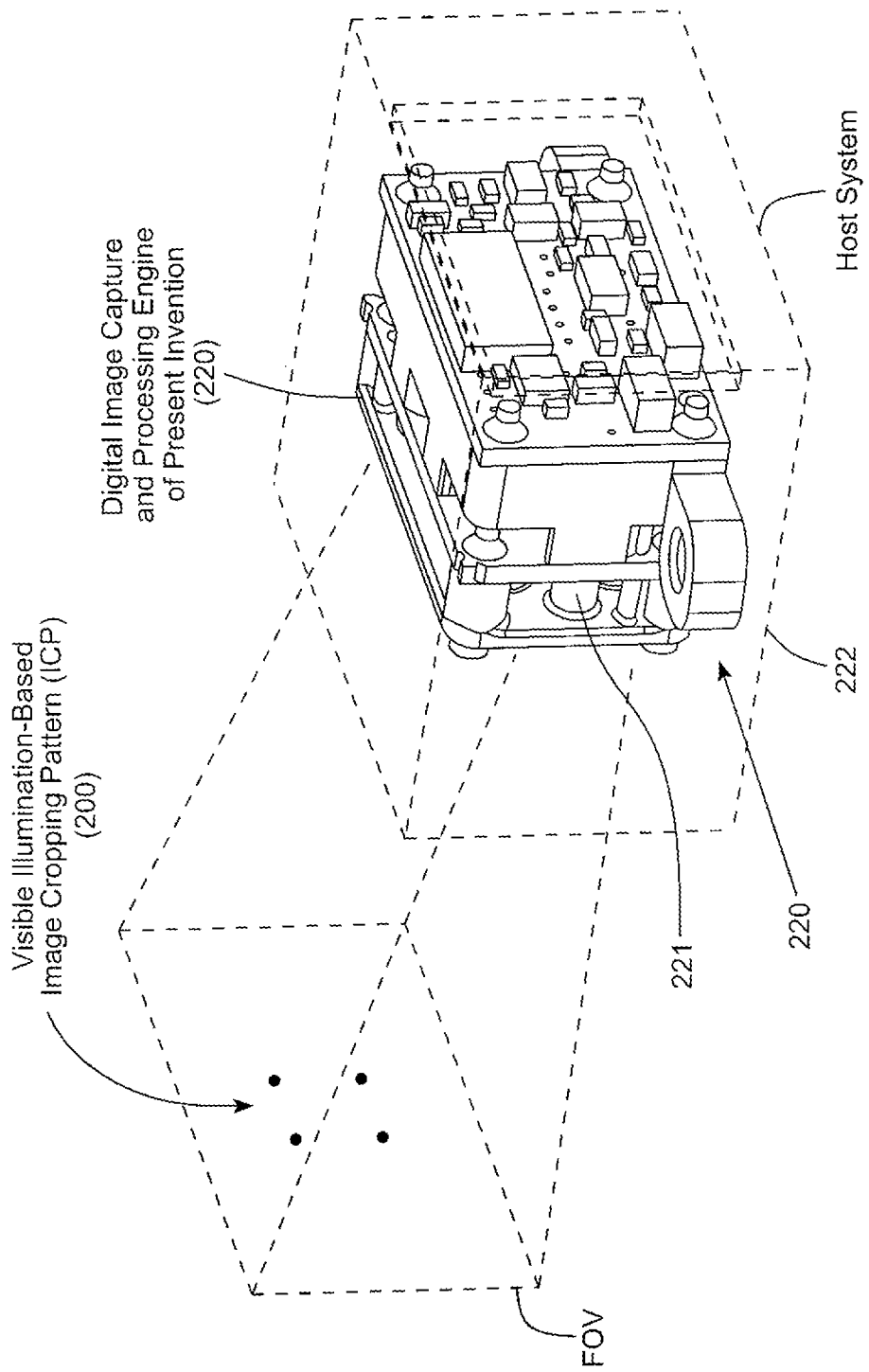
FIG. 14A is a perspective view of the digital image capture and processing engine of the present invention, showing the projection of a visible illumination-based Image Cropping Pattern (ICP) within the field of view (FOV) of the engine, during object illumination and image capture operations.
Figure 14B:
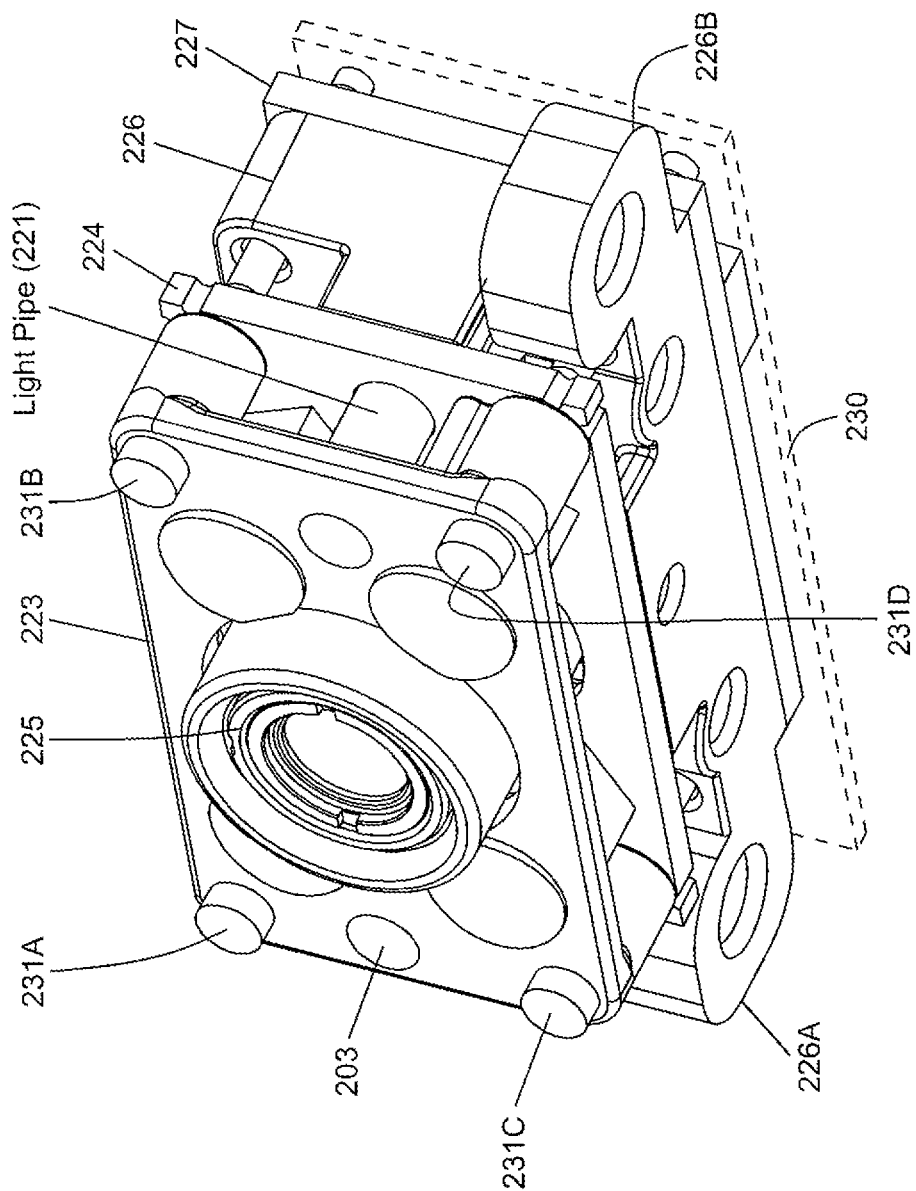
FIG. 14B is a close-up, perspective view of the digital image capture and processing engine of the present invention depicted in FIG. 14A, showing the assembly of an illumination/targeting optics panel, an illumination board, a lens barrel assembly, a camera housing, and a camera board, into a an ultra-compact form factor offering advantages of light-weight construction, excellent thermal management, and exceptional image capture performance.
Figure 14C:
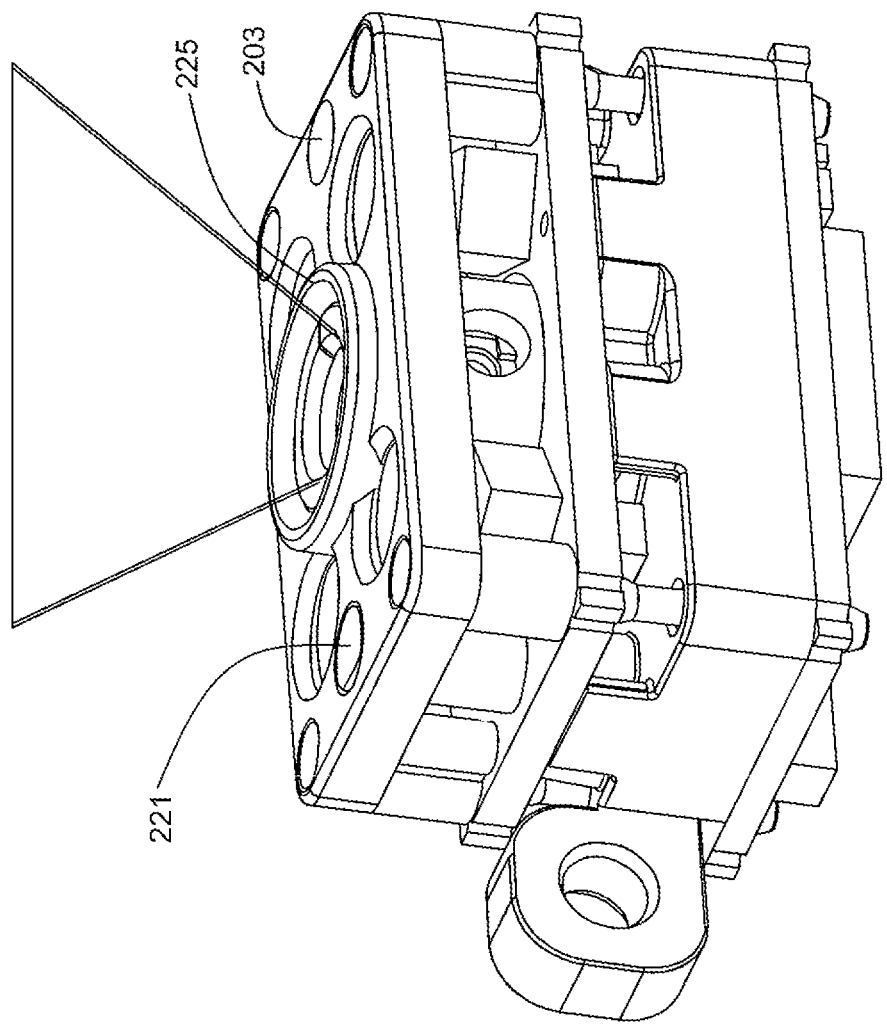
FIG. 14C is a perspective view of the digital image capture and processing engine of FIG. 14A, showing a cross-section of the field of view (FOV) of its FOV forming (i.e. light collection) optics.
Figure 14D:
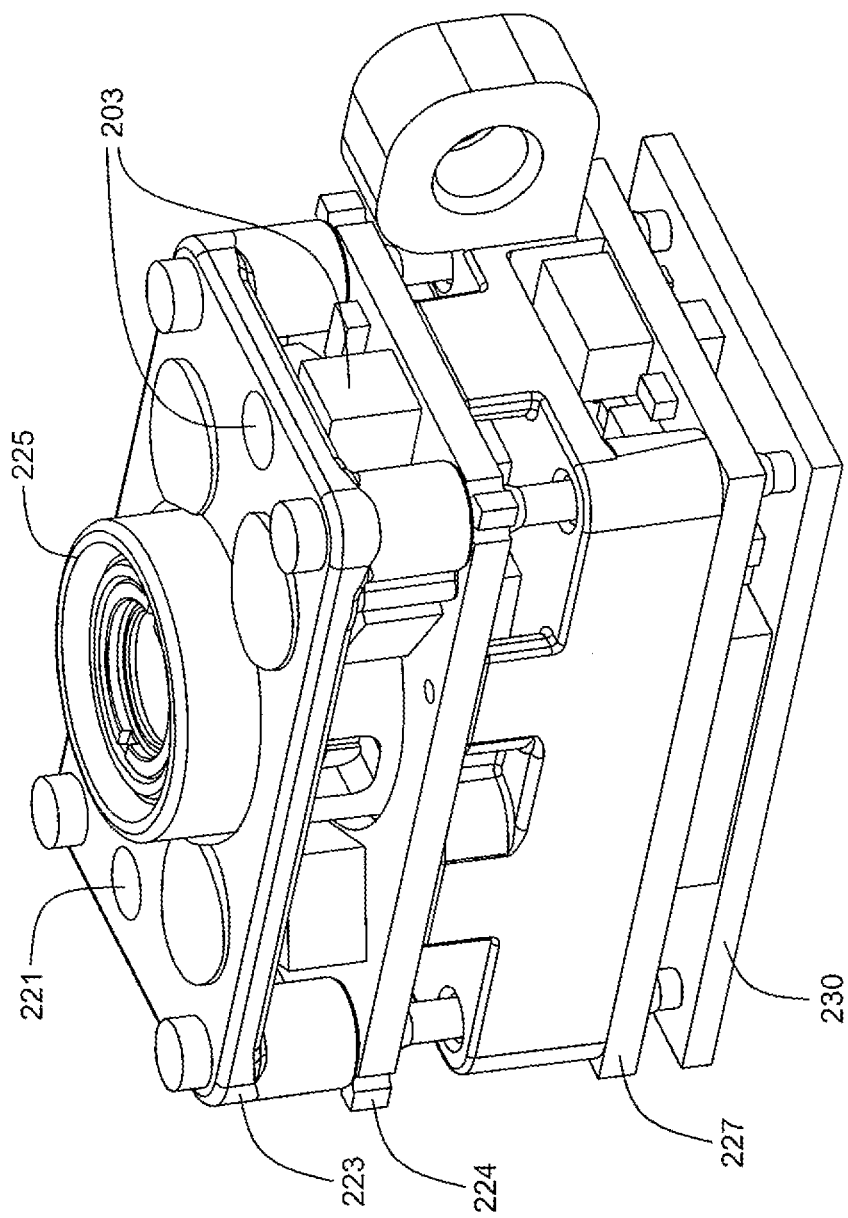
FIG. 14D is a side perspective view of the digital image capture and processing engine of FIG. 14A, showing how the various components are arranged with respect to each other.
Figure 14E:
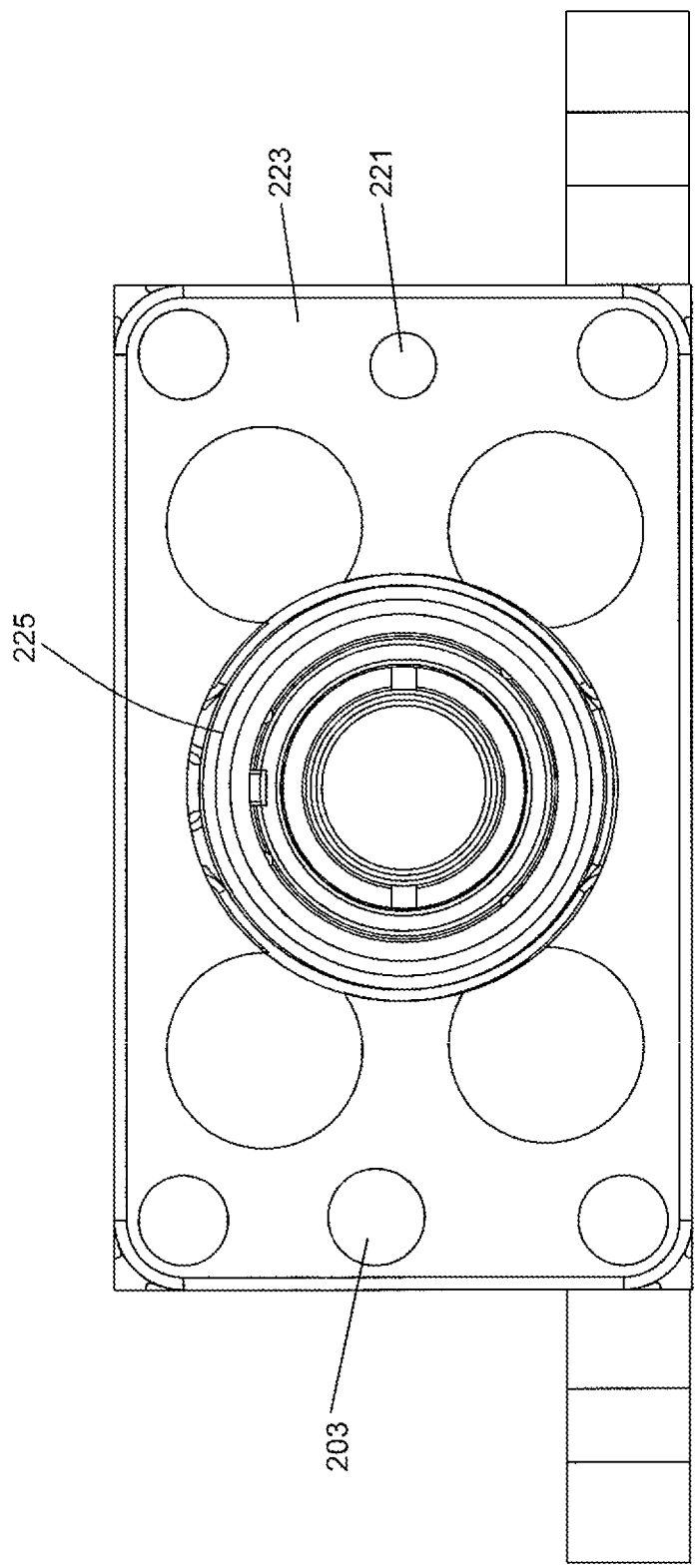
FIG. 14E is an elevated front view of the digital image capture and processing engine of FIG. 14A, taken along the optical axis of its image formation optics.
Figure 14F:
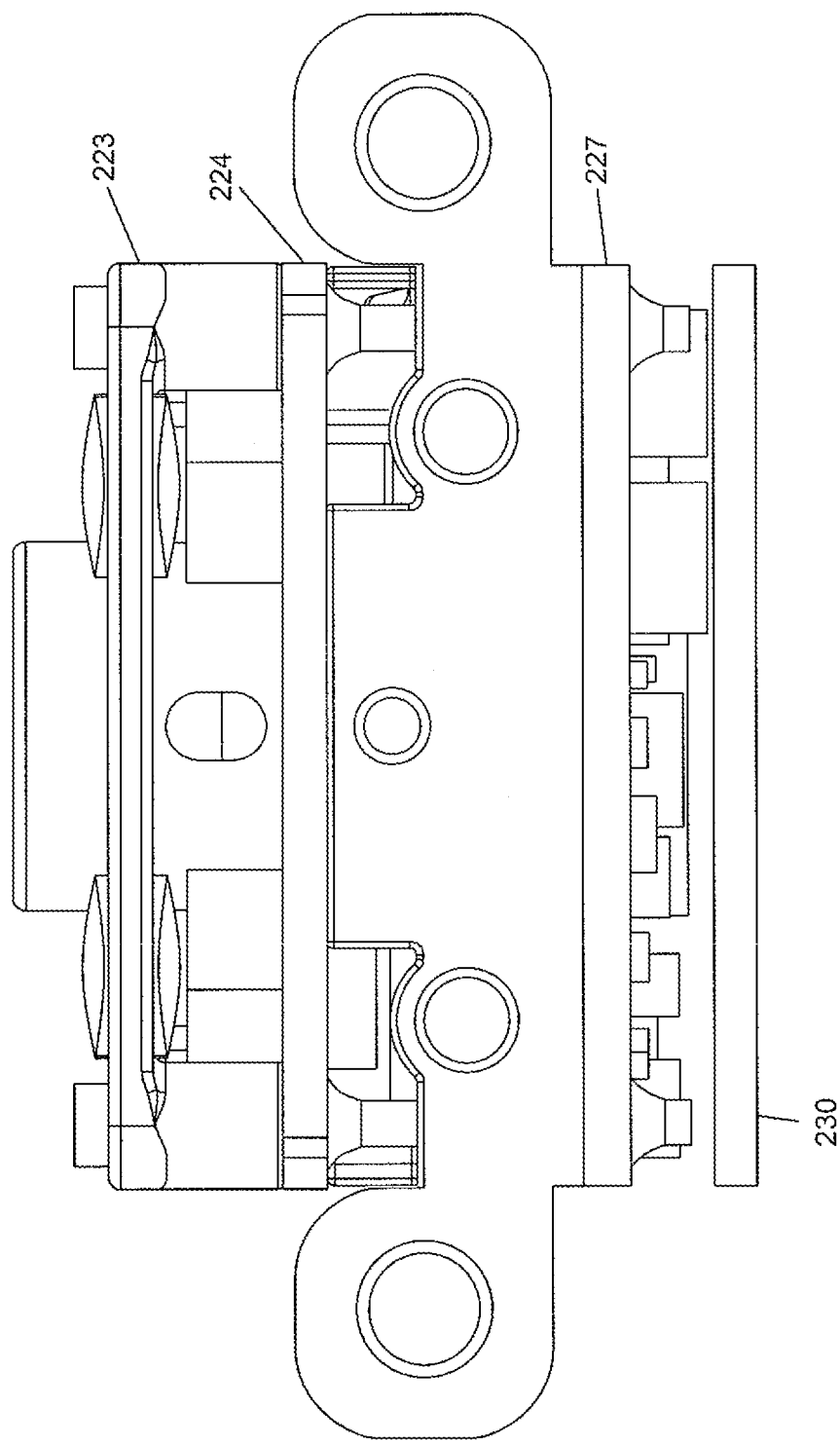
FIG. 14F is a bottom view of the digital image capture and processing engine of FIG. 14A, showing the bottom of its mounting base for use in mounting the engine within diverse host systems.
Figure 14G:
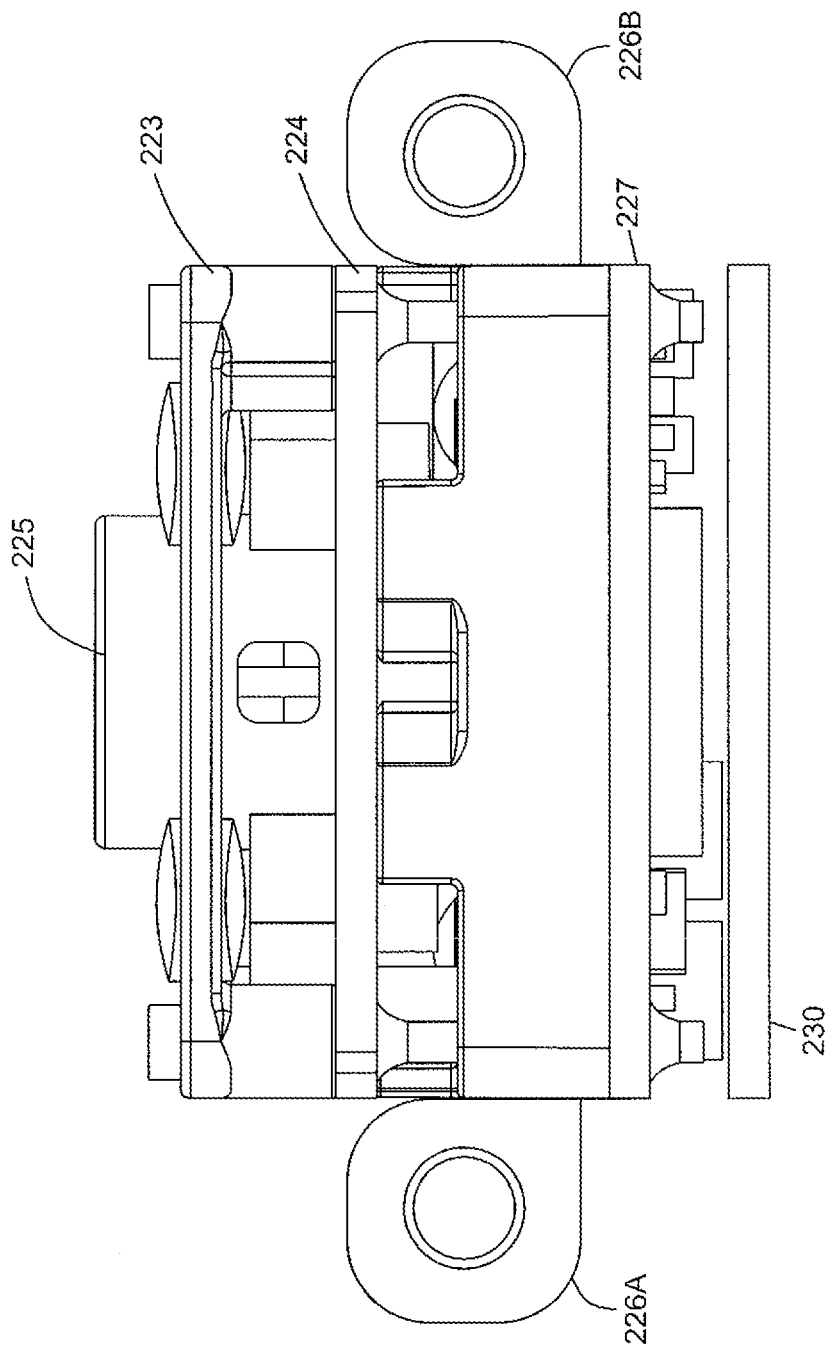
FIG. 14G is a top view of the digital image capture and processing engine of FIG. 14A.
Figure 14H:
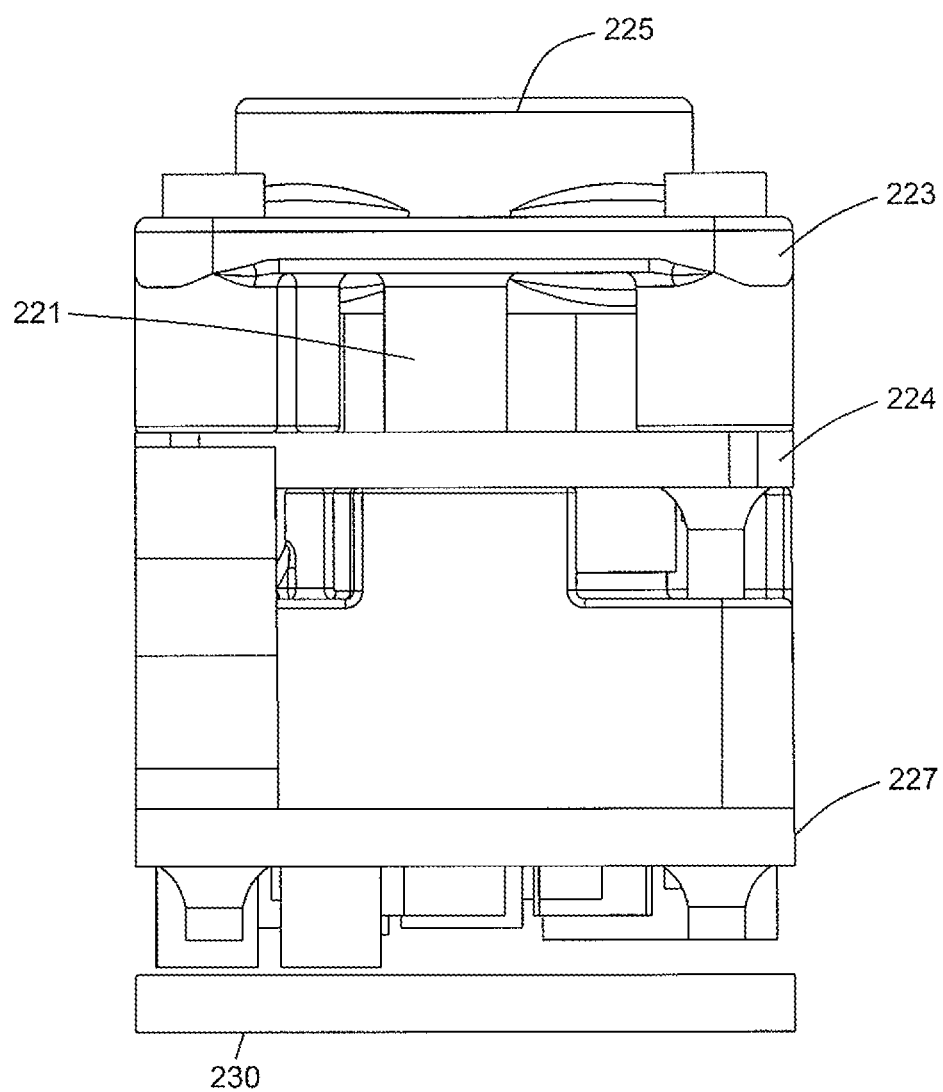
FIG. 14H is a first side view of the digital image capture and processing engine of FIG. 14A.
Figure 14I:
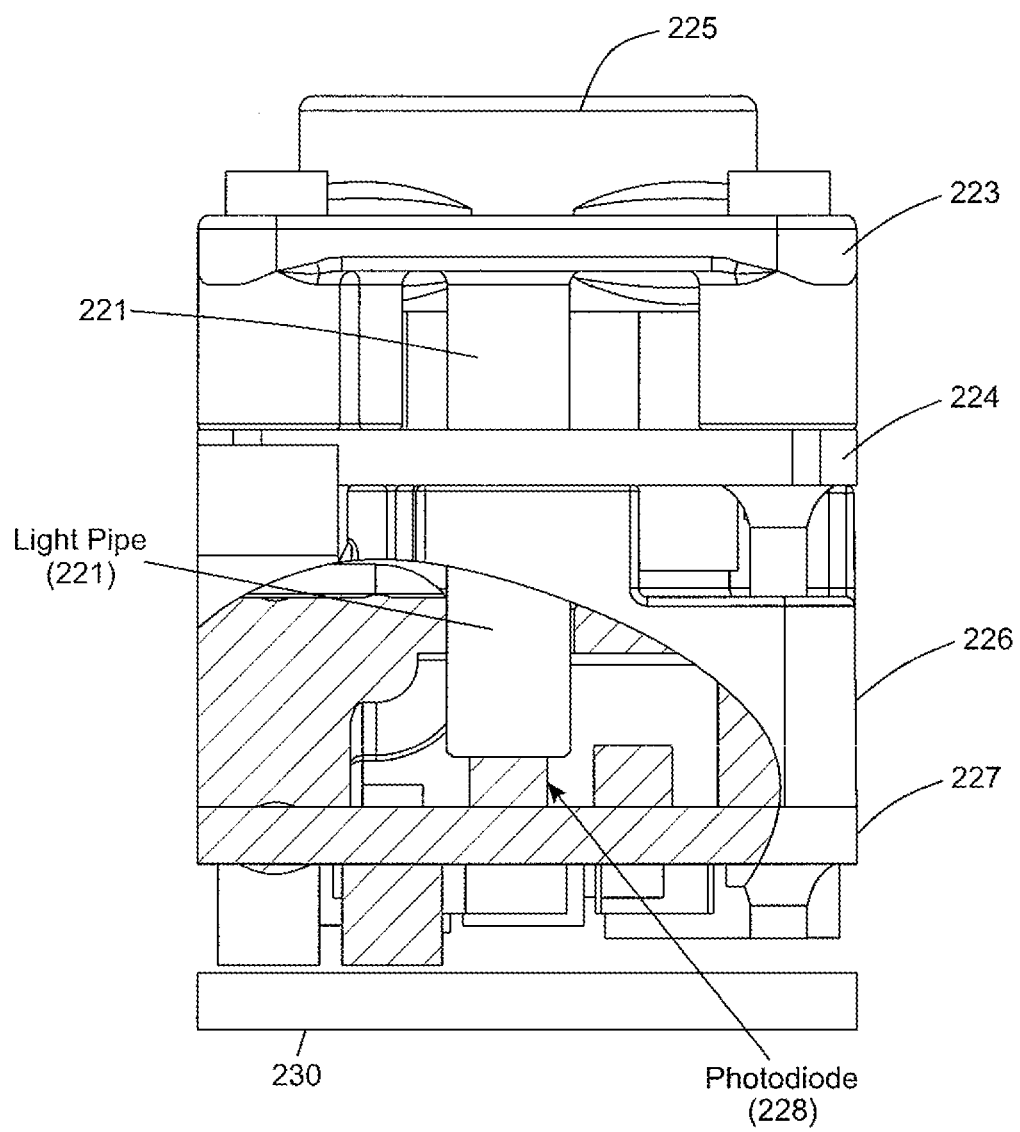
FIG. 14I is a second partially cut-away side view of the digital image capture and processing engine taken in FIG. 14H, revealing the light conductive pipe used to collect and conduct light energy from the FOV of the Multi-Mode Area-Type Image Formation and Detection Subsystem, and direct it to the photo-detector associated with the Automatic Light Exposure Measurement and Illumination Control Subsystem.
Figure 14J:
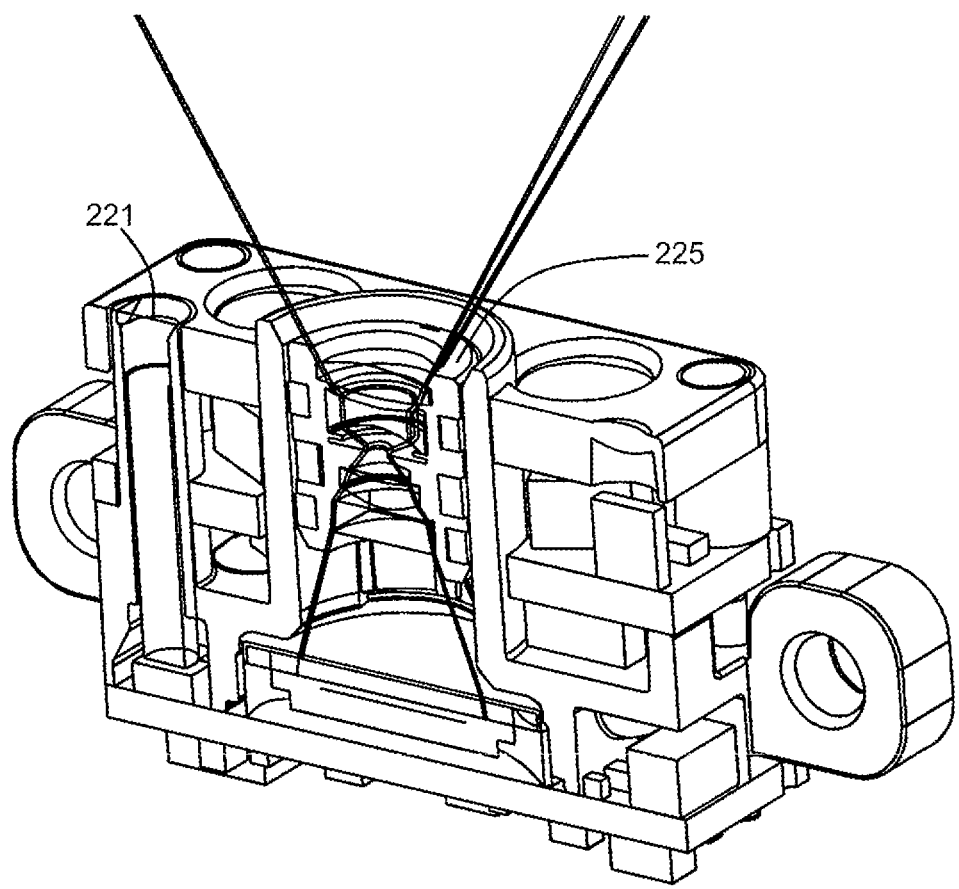
FIG. 14J is a first cross-sectional view of the digital image capture and processing engine taken in FIG. 46, revealing the light conductive pipe used to collect and conduct light energy from the FOV of the Multi-Mode Area-Type Image Formation and Detection Subsystem.
Figure 14K:
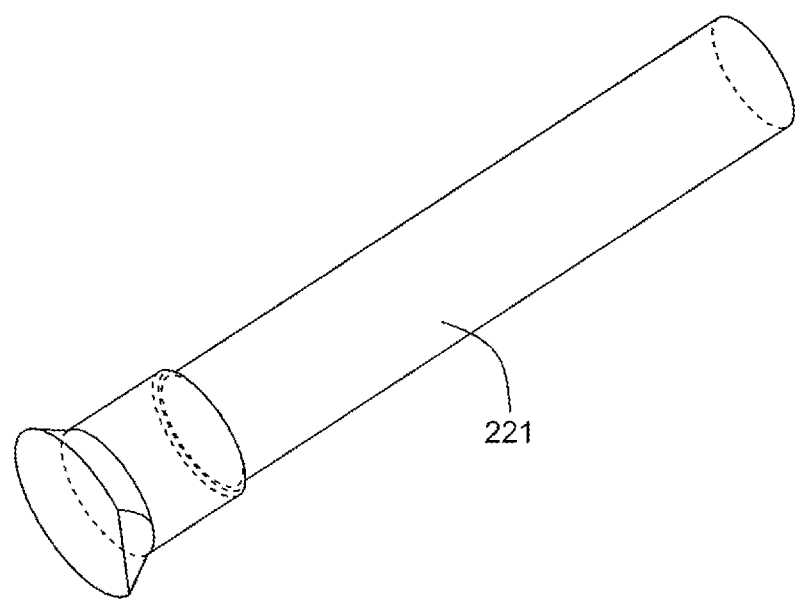
FIG. 14K is a perspective view of the light conductive pipe used in the digital image capture and processing engine shown in FIG. 14J.
Figure 14L:
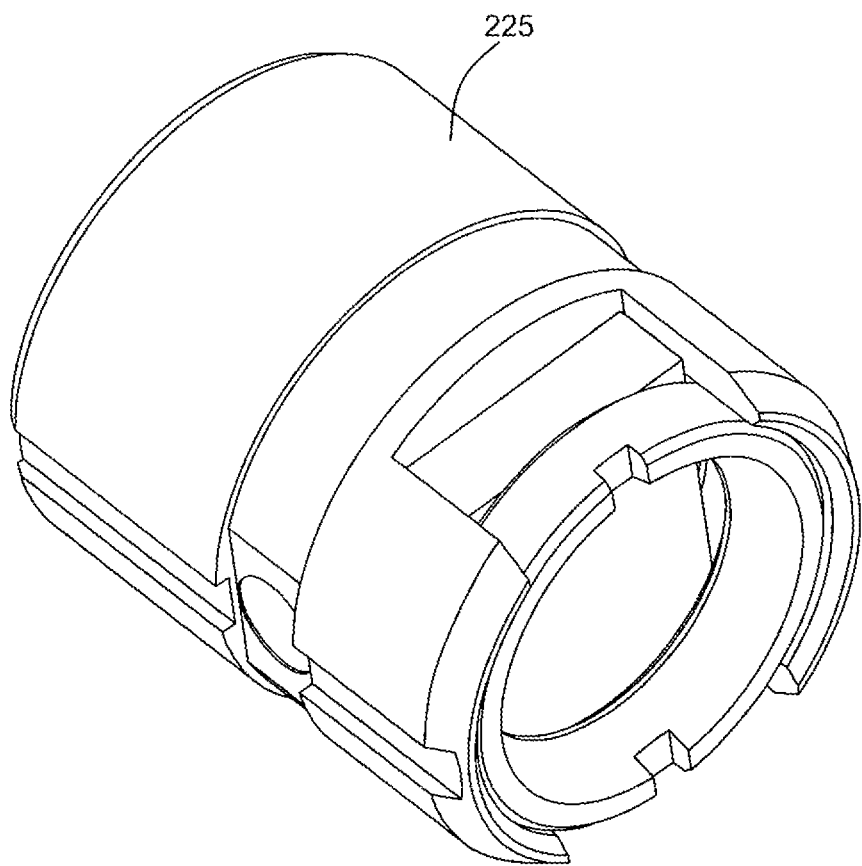
FIGS. 14L and 14M are perspective views of the lens barrel assembly employed in the digital image capture and processing engine shown in FIGS. 14A through 14J.
Figure 14M:
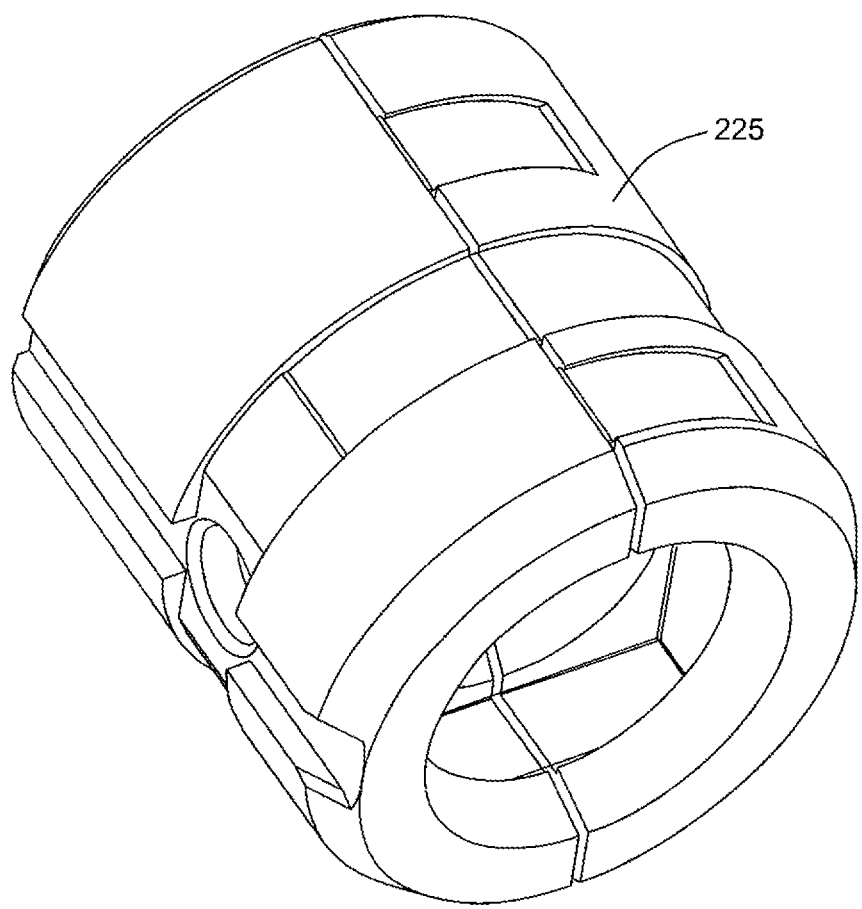
Figure 14N:
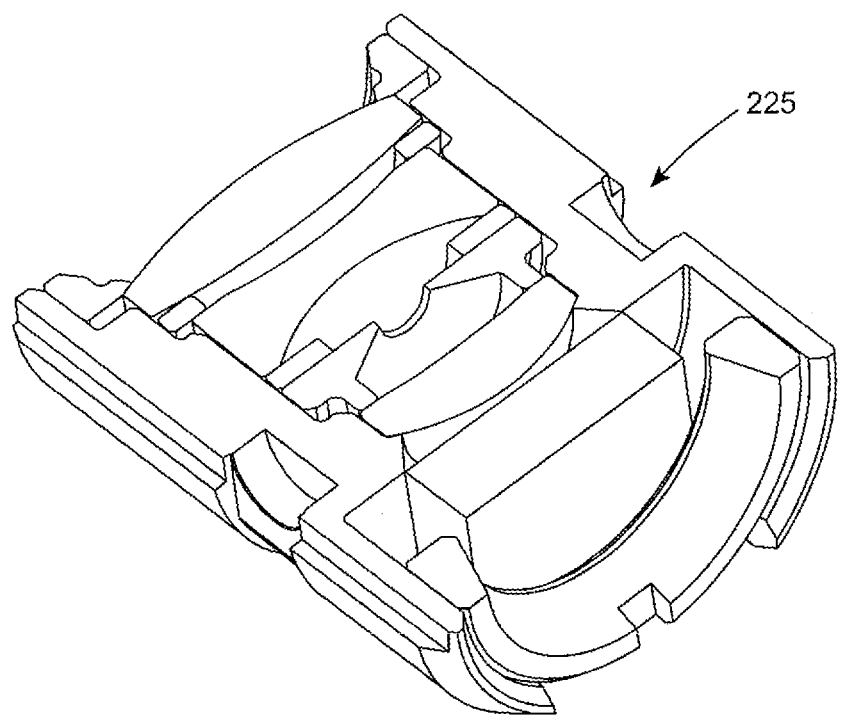
FIG. 14N is a cross-sectional view of the FOV forming optics shown in FIGS. 14L and 14M.
Figure 14O:
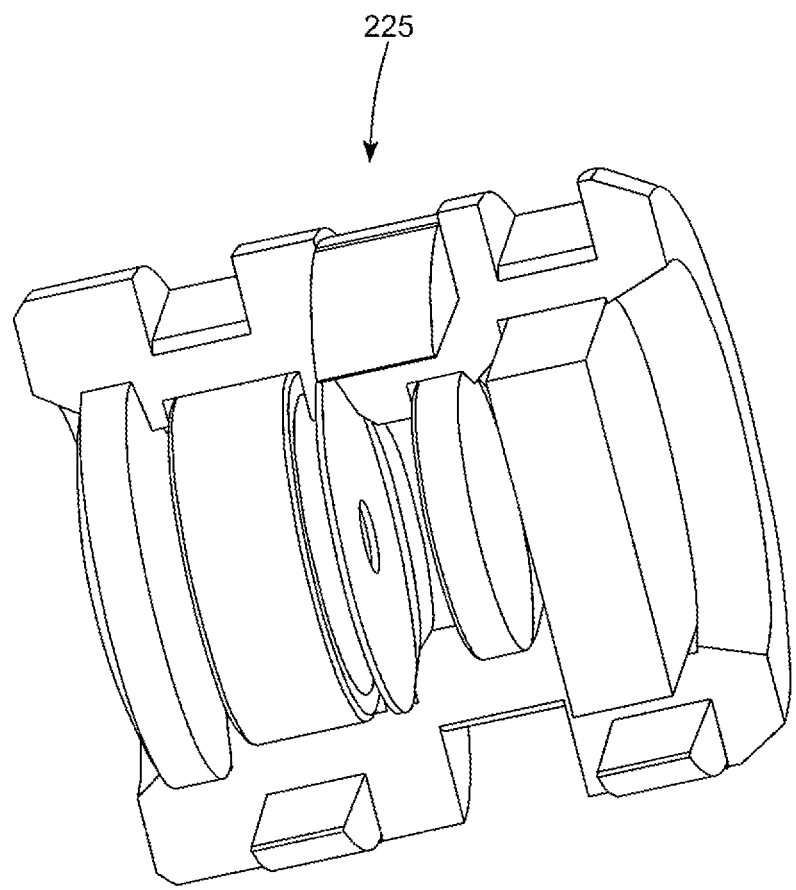
FIG. 14O is a perspective view of the FOV forming optics supported in one half of the lens barrel assembly shown in FIGS. 14L and 14M.
Figure 14P:
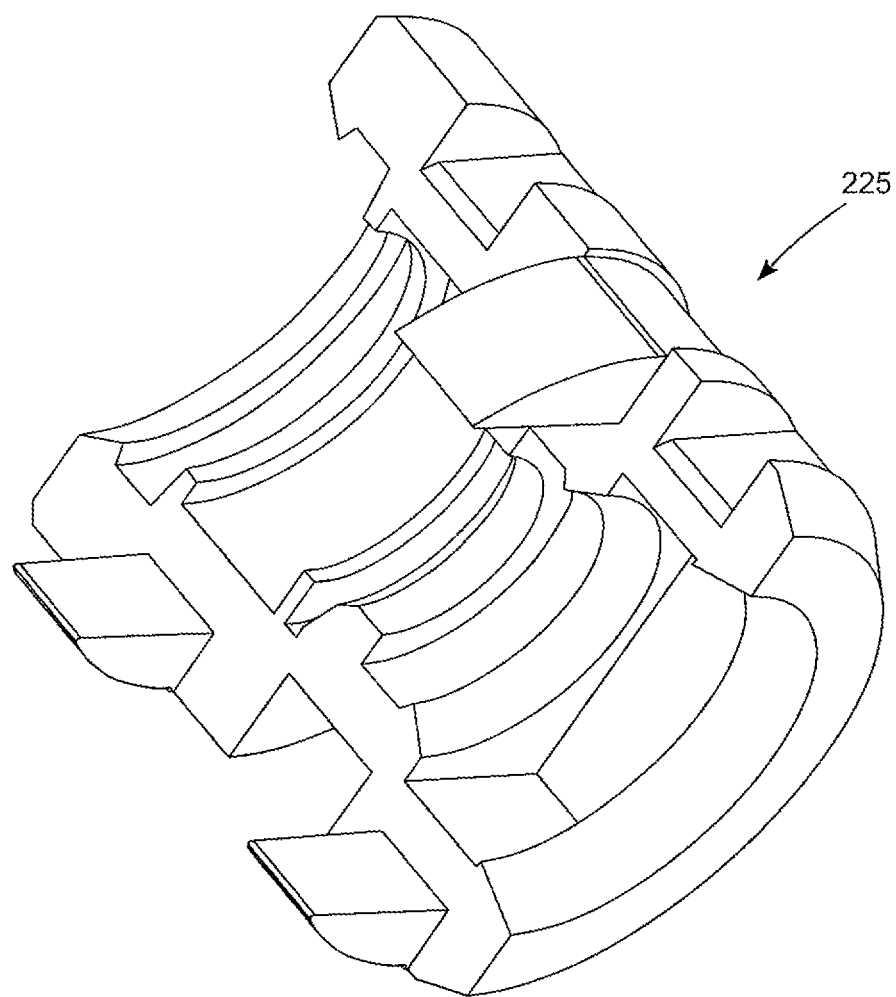
FIG. 14P is a perspective view of the lens assembly optics.
Figure 14Q:
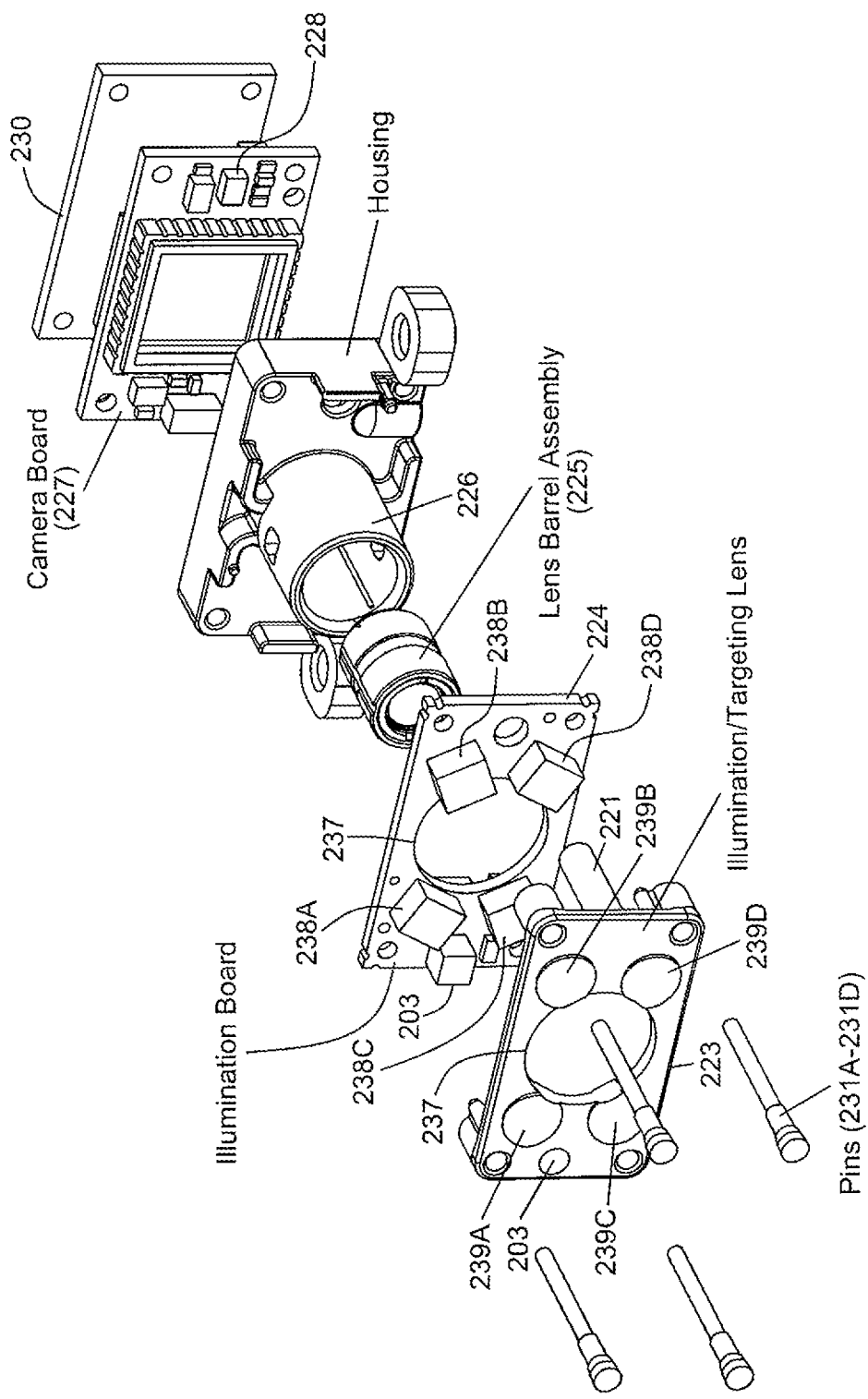
FIG. 14Q is an exploded, perspective view of the digital image capture and processing engine of the present invention, showing how the illumination/targeting optics panel, the illumination board, the lens barrel assembly, the camera housing, the camera board and its assembly pins are arranged and assembled with respect to each other in accordance with the principles of the present invention.

In FIG. 14Q, an exploded, perspective view of the digital image capture and processing engine 220 is provided to show how the illumination/targeting optics panel 23, the illumination board 224, the lens barrel assembly 225, the camera housing 226, the camera board 227, and its assembly pins 231A through 231D are easily arranged and assembled with respect to each other in accordance with the principles of the present invention.

As shown in FIG. 14Q, the illumination board 224 of the illustrative embodiment supports four (4) LEDs 238A through 238D, along with driver circuitry, as generally taught in FIGS. 6C1 and 6C2. Also, illumination/targeting optics panel 223 supports light focusing lenses 239A through 239D, for the LEDs in the illumination array supported on the illumination board 224. Optical principles and techniques for specifying lenses 239A through 239D are taught in FIGS. 4B through 4D7, and corresponding disclosure here. While a wide-area near/far field LED illumination array is shown used in the digital image capture and processing engine of the illustrative embodiment 220, it is understood that the illumination array can be readily modified to support separate wide-area near field illumination and wide-area far field illumination, as well as narrow-area far and near fields of illumination, as taught in great detail herein.

Figure 16:
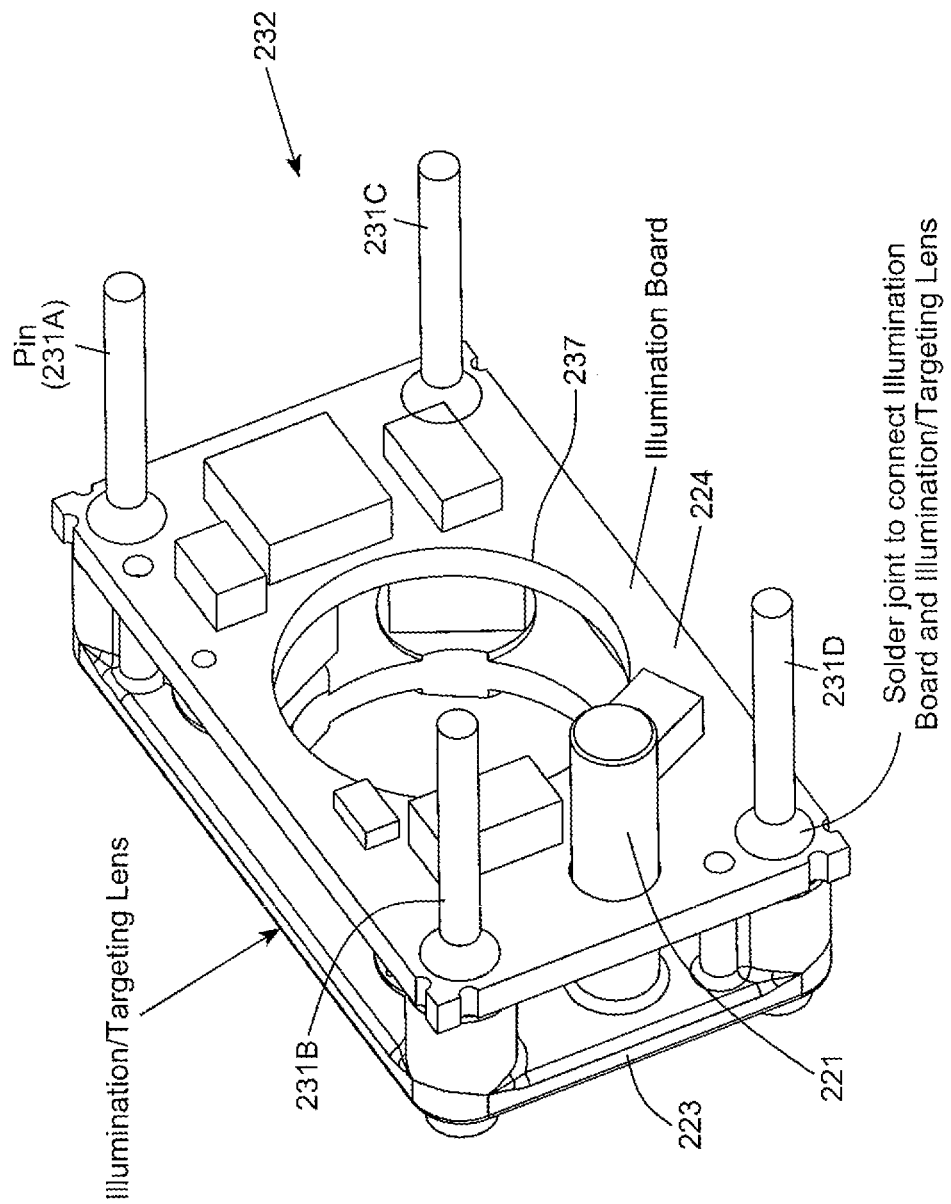
FIG. 16 is a perspective view of the illumination/targeting optics panel and the illumination board of the engine of the present invention assembled together as a subassembly using the assembly pins.
Figure 17:
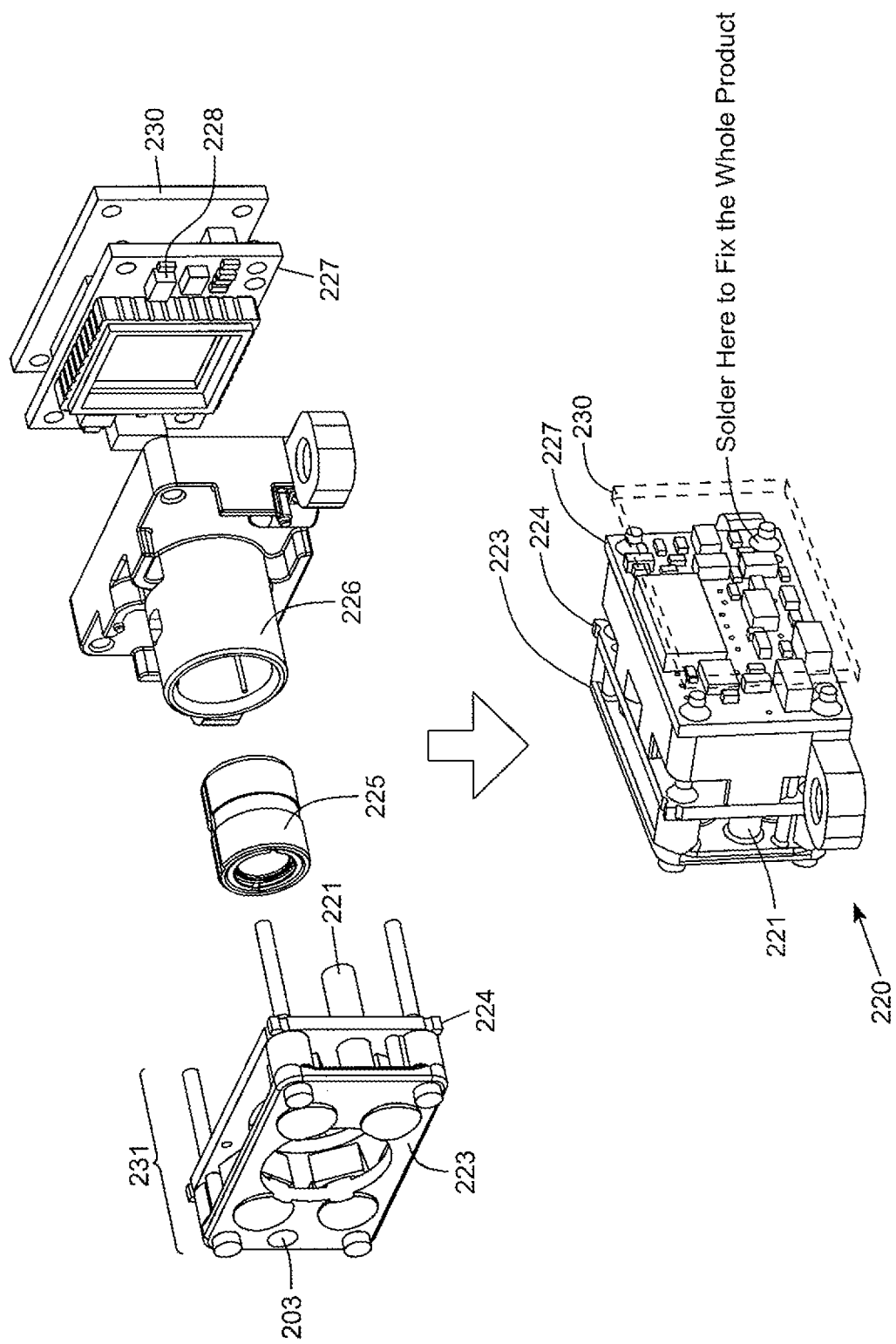
FIG. 17 is a perspective view of the subassembly of FIG. 16 arranged in relation to the lens barrel assembly, the camera housing and the camera board of the engine of the present invention, and showing how these system components are assembled together to produce the digital image capture and processing engine of FIG. 14Q.

In FIG. 15, the illumination/targeting optics panel 223, the illumination board 224 and the camera board 230 of digital image capture and processing engine 220 are shown assembled with the lens barrel assembly 225 and the camera housing 226 removed for clarity of illustration. In FIG. 16, the illumination/targeting optics panel 223 and the illumination board 224 are shown assembled together as a subassembly 232 using the assembly pins. In FIG. 17, the subassembly 232 of FIG. 16 is arranged in relation to the lens barrel assembly 225, the camera housing 226, the camera board 227 and the image processing board 230, showing how these system components are assembled together to produce the digital image capture and processing engine 220.

Figure 18:
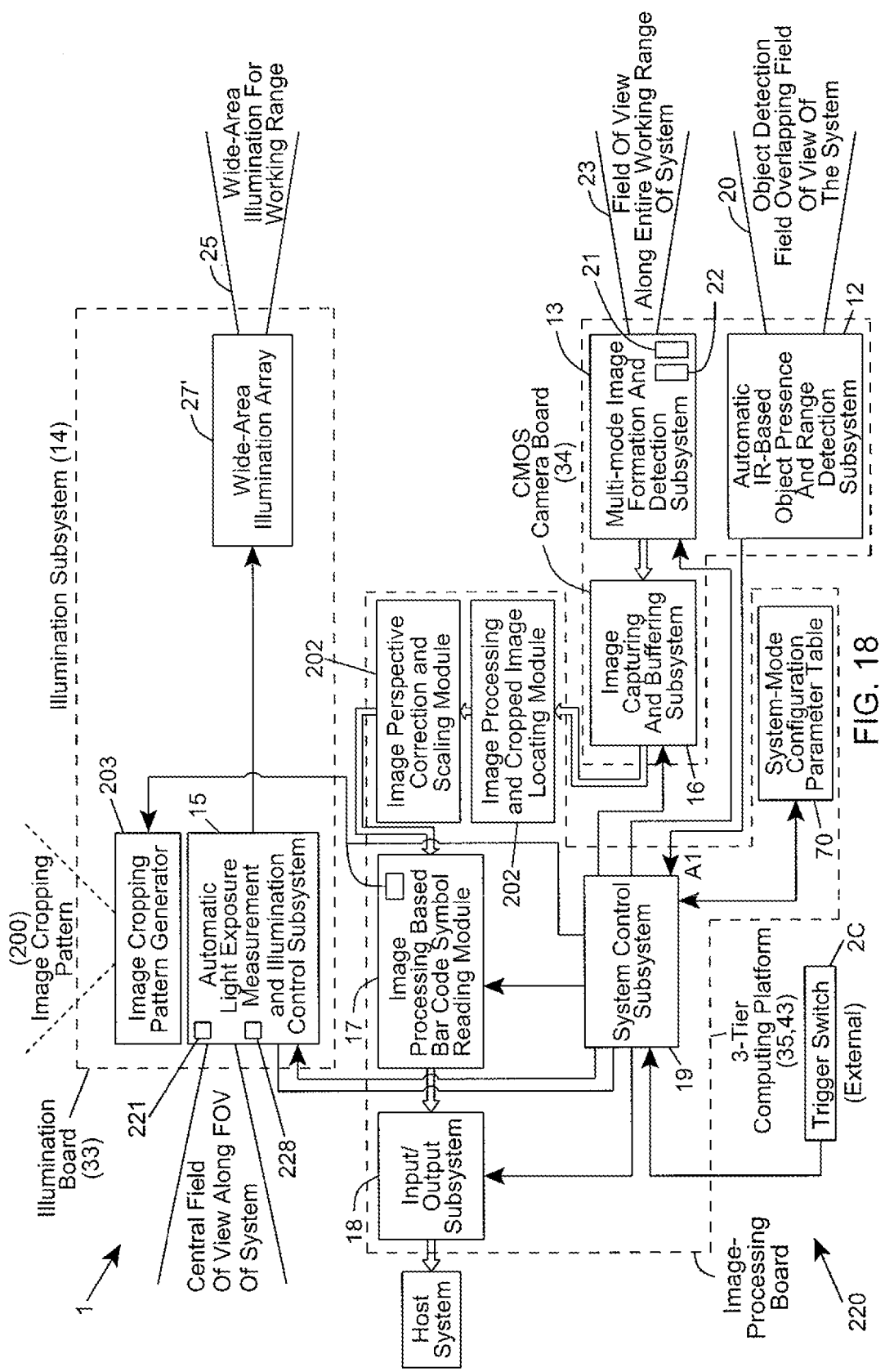
FIG. 18 is a schematic block diagram representative of a system design for the digital image capture and processing engine illustrated in FIGS. 14Q through 17, wherein the system design is shown comprising (1) a Multi-Mode Area-Type Image Formation and Detection (i.e. Camera) Subsystem having image formation (camera) optics for producing a field of view (FOV) upon an object to be imaged and a CMOS or like area-type image sensing array for detecting imaged light reflected off the object during illumination operations in either (i) a narrow-area image capture mode in which a few central rows of pixels on the image sensing array are enabled, or (ii) a wide-area image capture mode in which substantially all rows of the image sensing array are enabled, (2) a LED-Based Illumination Subsystem for producing a wide area field of narrow-band illumination within the FOV of the Image Formation And Detection Subsystem during the image capture mode, so that only light transmitted from the LED-Based Illumination Subsystem and reflected from the illuminated object and transmitted through a narrow-band transmission-type optical filter realized within the hand-supportable housing (i.e. using a red-wavelength high-pass reflecting window filter element disposed at the light transmission aperture thereof and a low-pass filter before the image sensor) is detected by the image sensor and all other components of ambient light are substantially rejected, and an Image Cropping Pattern Generator for generating a visible illumination-based Image Cropping Pattern (ICP) projected within the field of view (FOV) of the Multi-Mode Area-type Image Formation and Detection Subsystem, (3) an IR-based object presence and range detection subsystem for producing an IR-based object detection field within the FOV of the Image Formation and Detection Subsystem, (4) an Automatic Light Exposure Measurement and Illumination Control Subsystem for measuring illumination levels in the FOV and controlling the operation of the LED-Based Multi-Mode Illumination Subsystem, during the image capture mode, (5) an Image Capturing and Buffering Subsystem for capturing and buffering 2-D images detected by the Image Formation and Detection Subsystem, (6) an Image Processing and Cropped Image Locating Module for processing captured and buffered images to locate the image region corresponding to the region defined by the Image Cropping Pattern (ICP), (7) an Image Perspective Correction and Scaling Module for correcting the perspective of the cropped image region and scaling the corrected image to a predetermined (i.e. fixed) pixel image size suitable for decode-processing, (8) an Image-Processing Based Bar Code Symbol Reading Subsystem for processing cropped and scaled images generated by the Image Perspective and Scaling Module and reading 1D and 2D bar code symbols represented, and (9) an Input/Output Subsystem for outputting processed image data and the like to an external host system or other information receiving or responding device, in which each said subsystem component is integrated about (10) a System Control Subsystem, as shown.

In FIG. 18, the digital image capture and processing engine 220 illustrated in FIGS. 14Q through 17, is shown comprising: a Multi-Mode Area-Type Image Formation and Detection (i.e. Camera) Subsystem 14 having image formation (camera) optics for producing a field of view (FOV) upon an object to be imaged and a CMOS or like area-type image sensing array 22 for detecting imaged light reflected off the object during illumination operations in either (i) a narrow-area image capture mode in which a few central rows of pixels on the image sensing array are enabled, or (ii) a wide-area image capture mode in which substantially all rows of the image sensing array are enabled; a LED-Based Illumination Subsystem 14 for producing a wide area field of narrow-band illumination within the FOV of the Image Formation And Detection Subsystem 13 during the image capture mode, so that only light transmitted from the LED-Based Illumination Subsystem 14 and reflected from the illuminated object and transmitted through a narrow-band transmission-type optical filter realized within the hand-supportable housing (i.e. using a red-wavelength high-pass reflecting window filter element disposed at the light transmission aperture thereof and a low-pass filter before the image sensor) is detected by the image sensor and all other components of ambient light are substantially rejected; an Image Cropping Pattern Generator 203 for generating a visible illumination-based Image Cropping Pattern (ICP) 200 projected within the field of view (FOV) of the Multi-Mode Area-type Image Formation and Detection Subsystem 13; an IR-Based Object Presence And Range Detection Subsystem 12 for producing an IR-based object detection field within the FOV of the Image Formation and Detection Subsystem 13; an Automatic Light Exposure Measurement and Illumination Control Subsystem 14 for measuring illumination levels in the FOV and controlling the operation of the LED-Based Multi-Mode Illumination Subsystem 14 during the image capture mode; an Image Capturing and Buffering Subsystem 16 for capturing and buffering 2-D images detected by the Image Formation and Detection Subsystem 13; an Image Processing and Cropped Image Locating Module 201 for processing captured and buffered images to locate the image region corresponding to the region defined by the Image Cropping Pattern (ICP) 200; an Image Perspective Correction and Scaling Module 202 for correcting the perspective of the cropped image region and scaling the corrected image to a predetermined (i.e. fixed) pixel image size suitable for decode-processing; a Multimode Image-Processing Based Bar Code Symbol Reading Subsystem 17 for processing cropped and scaled images generated by the Image Perspective and Scaling Module 202 and reading 1D and 2D bar code symbols represented; and an Input/Output Subsystem 18 for outputting processed image data and the like to an external host system or other information receiving or responding device, in which each said subsystem component is integrated about a System Control Subsystem 19, as shown.

Notably, use of FOV folding mirror 236 can help to achieve a wider FOV beyond the light transmission window, while using a housing having narrower depth dimensions. Also, use of the linear optical waveguide 221 obviates the need for large aperture light collection optics which requires significant space within the housing.

Digital Image Capture and Processing Engine of the Present Invention Employing Curved Optical Waveguide Technology For Collecting and Conducting LED-Based Illumination in the Automatic Light Exposure Measurement and Illumination Control Subsystem During Object Illumination and Image Capture Modes of Operation In FIGS. 19A1 and 19A2, an alternative embodiment of the digital image capture and processing engine 220 of the present invention 220' is shown reconfigured in such as way that the illumination/aiming subassembly 232 (depicted in FIG. 16) is detached from the camera housing 226 and mounted adjacent the light transmission window 233 of the engine housing 234. The remaining subassembly, including lens barrel assembly 225, the camera housing 226, the camera board 227 and the image processing board 230 is mounted relative to the bottom of the engine housing 234 so that the optical axis of the camera lens assembly 225 is parallel with the light transmission aperture 233. A curved optical waveguide 221 is used to collect light from a central portion of the field of view of the engine, and guide the collected light to photodiode 228 on the camera board 227. In addition, a field of view (FOV) folding mirror 236 is mounted beneath the illumination/aiming subassembly 232 for directing the FOV of the system out through the central aperture 237 formed in the illumination/aiming subassembly 232. Use of the FOV folding mirror 235 in this design can help to achieve a wider FOV beyond the light transmission window, while using housing having narrower depth dimensions. Also, use of the curved optical waveguide 221 obviates the need for large aperture light collection optics which requires significant space within the housing.

Automatic Imaging-Based Bar Code Symbol Reading System of the Present Invention Supporting Presentation-Type Modes of Operation Using Wide-Area Illumination and Video Image Capture and Processing Techniques In FIGS. 19B1 through 19B3, a presentation-type imaging-based bar code symbol reading system 300 is shown constructed using the general components of the digital image capture and processing engine of FIGS. 19A1. As shown, the illumination/aiming subassembly 232' of FIG. 16 is mounted adjacent the light transmission window 233' of the system housing 301. The remaining subassembly, including lens barrel assembly 225', the camera housing 226', the camera board 227' and the image processing board 230', is mounted relative to the bottom of the engine housing 234' so that the optical axis of the camera lens is parallel with the light transmission aperture 233'. In addition, a field of view (FOV) folding mirror 236' is mounted beneath the illumination/aiming subassembly 232' for directing the FOV of the system out through the central aperture formed in the illumination/aiming subassembly 232'.

Automatic Imaging-Based Bar Code Symbol Reading System of the Present Invention Supporting a Pass-Through Mode of Operation Using Narrow-Area Illumination and Video Image Capture and Processing Techniques, and a Presentation-Type Mode of Operation Using Wide-Area Illumination and Video Image Capture and Processing Techniques In FIGS. 19C1 through 19C5, there is shown an automatic imaging-based bar code symbol reading system of the present invention 400 supporting a pass-through mode of operation illustrated in FIG. 19C2 using narrow-area illumination and video image capture and processing techniques, and a presentation-type mode of operation illustrated in FIG. 19C3 using wide-area illumination and video image capture and processing techniques. As shown in FIGS. 19C1 through 19C5, the POS-based imaging system 400 employs a digital image capture and processing engine similar in design to that shown in FIGS. 19B1 and 19B2 and that shown in FIG. 2A1, except for the following differences:

(1) the Automatic Light Exposure Measurement and Illumination Control Subsystem 15 is adapted to measure the light exposure on a central portion of the CMOS image sensing array and control the operation of the LED-Based Multi-Mode Illumination Subsystem 14 in cooperation with a the Multi-Mode Image Processing Based Bar Code Symbol Reading Subsystem 17 employing software for performing real-time "exposure quality analysis" of captured digital images in accordance with an adaptive system control method of the present invention;

(2) the substantially-coplanar narrow-area field of illumination and narrow-area FOV 401 are oriented in the vertical direction (i.e. oriented along Up and Down directions) with respect to the counter surface of the POS environment, so as to support the "pass-through" imaging mode of the system, as illustrated in FIG. 19C2; and (3) the IR-based object presence and range detection system 12 employed in FIG. 19A2 is replaced with an automatic IR-based object presence and direction detection subsystem 12' comprising four independent IR-based object presence and direction detection channels (i.e. fields) 402A, 402B, 402C and 402D, generated by IR LED and photodiode pairs 12A1, 12A2, 12A3 and 12A4 respectively, which automatically produce activation control signals A1(t), A2(t), A3(t) and A4(t) upon detecting an object moving through the object presence and direction detection fields, and a signal analyzer and control logic block 12B' for receiving and processing these activation control signals A1(t), A2(t), A3(t) and A4(t), according to Processing Rules 1 through 5 set forth in FIG. 19C4, so as to generate a control activation signal indicative that the detected object is being moved either in a "pass-though" direction (e.g. L→R, R-->L, U→D, or D→U), or in a "presentation" direction (towards the imaging window of the system).

Preferably, this POS-based imaging system supports an adaptive control process, and in the illustrative embodiment of the present invention, operates generally according to System Mode No. 17, described hereinabove. In this POS-based imaging system, the "trigger signal" is generated from the automatic IR-based object presence and direction detection subsystem 12'. In the illustrative embodiment, the trigger signal can take on one or three possible values, namely: (1) that no object has been detected in the FOV of the system; (2) that an object has been detected in the FOV and is being moved therethrough in a "Pass-Through" manner; or that an object has been detected in the FOV and is being moved therethrough in a Presentation" manner (i.e. toward the imaging window).

By virtue of the intelligent automatic pass-through/presentation digital image capture and processing system of the present invention, it is now possible for operators to move objects past the imager in either a pass-through or presentation type manner, and the system will automatically adapt and reconfigure itself to optimally support the method of image-based scanning chosen by the operator.

Alternative Embodiments of Imaging-Based Bar Code Symbol Reading System of the Present Invention In FIG. 20A, a first alternative embodiment of a projection-type POS image-processing based bar code symbol reading system 250 is shown employing the digital image capture and processing engine 220 or 220'. As shown, system 250 includes a housing 251 which may contain the engine housing shown in FIG. 19A1, or alternatively, it may support the subassemblies and components shown in FIG. 19A1.

In FIG. 20B, a second illustrative embodiment of a projection-type POS image-processing based bar code symbol reading system 260 is shown employing the digital image capture and processing engine 220 or 220'. As shown, system 260 includes a housing 261 which may contain the engine housing shown in FIG. 19A1, or alternatively, it may support the subassemblies and components shown in FIG. 19A1.

In FIG. 20C, a third illustrative embodiment of a projection-type POS image-processing based bar code symbol reading system 270 is shown employing the digital image capture and processing engine 220 or 220'. As shown, system 270 includes a housing portion 271 (containing engine 220 or 220'), and a base portion 272 for rotatably supporting housing portion 271. Housing portion 271 may contain the engine housing shown in FIG. 19A1, or alternatively, it may support the subassemblies and components shown in FIG. 19A1.

In each of the POS-based systems disclosed in FIGS. 20A, 20B and 20C, the number of LEDs mounted on the illumination board 224 can be substantially greater than four (4), as shown in the illustrative embodiment in FIG. 19C1 through 19C5. The exact number of LEDs used in the illumination will depend on the end-user application requirements at hand. Also, the IR-Based Object Presence And Range Detection Subsystem 12 employed therein may be used to detect the range of an object within the FOV, and the LED-Based Illumination Subsystem 14 may include both long and short range wide-area LED illumination arrays, as disclosed hereinabove, for optimized illumination of long and short range regions of the FOV during image capture operations.

In FIG. 2I, a price lookup unit (PLU) system 280 is shown comprising: a housing 281 with mounting bracket; a LCD panel 282; a computing platform 283 with network interfaces etc, and a digital image capture and processing subsystem 220 or 220' of the present invention, for identifying bar coded consumer products in retail store environments, and displaying the price thereof on the LCD panel 282.

Method of and Apparatus for Modifying and/or Extending System Features and Functions within a Digital Image Capture and Processing System in Accordance with Principles of the Present Invention Referring now to FIGS. 22 through 23C2, the method of and apparatus for extending the standard system features and functions within a digital image capture and processing system of the present invention, will now be described below. While it is understood that any of the digital image capture and processing systems described and disclosed herein could be referred to for purposes of illustrating the novel plug-in programming methodology of the present invention, described in FIGS. 22 through 23C2, reference will be made to the digital imaging based bar code reading system shown in FIGS. 2A through 13F for purposes of illustration, and not limitation.

Figure 22:
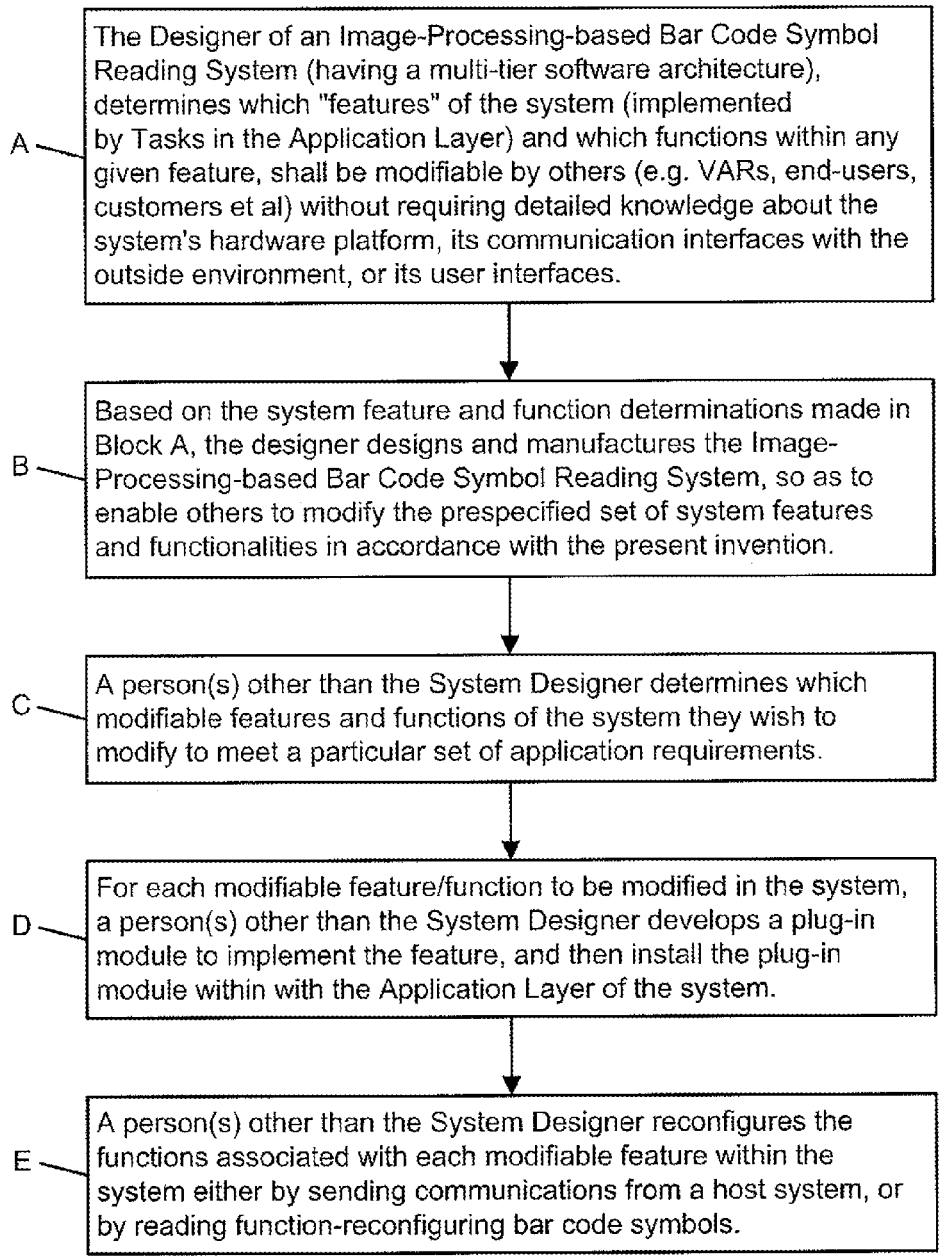
FIG. 22 is a high-level flow chart illustrating the steps involving carrying out the method of the present invention, wherein the system behavior (i.e. features) of the imaging-based bar code symbol reading system of the present invention can be modified by the end-user, within a set of manufacturer-defined constraints (i.e. imposed on modifiable features and functions within features), by the end-user developing, installing/deploying and configuring "plug-in modules" (i.e. libraries) for any modifiable task within the Application Layer of the system, so as to allow the end user to flexible modify and/or extend standard (i.e. prespecified) features and functionalities of the system, and thus satisfy customized end-user application requirements, but without requiring detailed knowledge about the hard-ware platform of the system, its communication with the environment, and/or its user interfaces.

As indicated in Block A of FIG. 22, the first step involves the "system designer" of the Imaging-based Bar Code Symbol Reading System (having a multi-tier software architecture), determining which "features" of the system (implemented by Tasks called in the Application Layer) and which functions within any given feature, will be modifiable and/or extendable by end-users and/or third-party persons other (than the original designer and the manufacturer, e.g. VARs, end-users, customers et al.) without having detailed knowledge of the system's hardware platform, its communication interfaces with the outside environment, or its user interfaces. This step by the system designer establishes constraints on system modification by others, yet provides degrees of freedom on how the system can be modified to meet custom requirements of end-user applications.

As indicated in Block B of FIG. 22, based on such determinations, the system designer designs and makes the image-processing based bar code reading system of the present invention, wherein persons other than the system designer (e.g. end-users and third-parties) are permitted to modify and/or extend the system features and functionalities of the original product/system specified by the system designer (i.e. designer of the original product/system) in Block A.

As indicated in Block C of FIG. 22, persons other than the system designer, then determine which modifiable and/or extendable system features and functions they wish to modify and/or extend to meet a particular set of end-user application requirements.

As indicated in Block D of FIG. 22, for each modifiable feature/function to be modified in the system, persons other than the system designer develop a "plug-in module" (third-party code or "software object") to implement the designed custom system feature, and thereafter they install the plug-in module (i.e. third-party code) within the suitable Library(ies) in the Application Layer of the multi-tier system.

As indicated in Block E of FIG. 22, persons other than the system designer reconfigure the functions associated with each modifiable and/or extendible feature within the system by either sending communications from a host system, or by reading function-reconfiguring bar code symbols.

Having provided a brief overview on the system feature/functionality modification methodology of the present invention, it is now in order to describe these method steps in greater detail referring to FIG. 10, and FIGS. 22 through 23C2, in particular.

In the illustrative embodiment, each plug-in module, stored within the Plug-In and Configuration File Library, shown in FIG. 10, consists of the set of software libraries (object modules) and configuration files. They can be downloaded to the Image-Processing Based Bar Code Symbol Reading System from an external host system, such as Plug-in Development Platform implemented on a host PC, and using various standard or proprietary communication protocols to communicate with the OS layer of the system. In the Image-Processing Based Bar Code Symbol Reading System, this operation is performed by the Metroset task or User Command Manager (see Software Block Diagram) upon reception of the appropriate command from the host system. Once the download is complete, the plug-in files are stored in the file system of the Image-Processing Based Bar Code Symbol Reading System.

The management of all plug-in modules (i.e. third-party code) is performed by the Plug-in Controller shown in FIG. 10. The Plug-in Controller can perform operations such as: load (install) plug-in module from the file system to the executable memory of the Image-Processing Based Bar Code Symbol Reading System and perform dynamic linking of the plug-in libraries with the Application; unload (uninstall) the plug-in module; provide executable address of (i.e. Place Holder for) the plug-in module (i.e. third-party code) to the Application; provide additional information about the plug-in module to the Application, such as the rules of the plug-in engagement as described in the plug-in configuration file.

Any task of the Image-Processing Based Bar Code Symbol Reading System can request information from the Plug-in Controller about a plug-in module and/or request an operation on it. For a set of predetermined features, the Application tasks can request the Plug-in Controller to check the availability of a third-party plug-in module, and if such module is available, install it and provide its executable address as well as the rules of the plug-in engagement. The tasks then can execute it either instead or along with the "standard" module that implements the particular feature. The rules of engagement of the plug-in module, i.e. determination whether the plug-in module should be executed as a replacement or a complimentary module to the "standard" module, can be unique to the particular feature. The rules can also specify whether the complimentary plug-in module should be executed first, prior to the "standard" module, or after. Moreover, the plug-in module, if executed first, can indicate back to the device whether the "standard" module should also be called or not, thus, allowing the alteration of the device's behavior. The programming interfaces are predefined for the features that allow the plug-in functionality, thus, enabling the third-parties to develop their own software for the device.

Consider, as a first and very simple example, an Image Pre-Processing Plug-in. The original equipment manufacturer of the Image-Processing Based Bar Code Symbol Reading System supplies the system's "standard" Image Pre-Processing Module (i.e. "original product code" of executable binary format), which is normally executed by the Main Task, after the system acquires an image. In accordance with the principles of the present invention, the customer can provide its own image preprocessing software as a plug-in module (i.e. "third-party code") to the multi-tier software-based system. Notably, the third-party code is typically expressed in executable binary format. The plug-in can be described in a "Image Preprocessing Plug-in Configuration File", having a format, for example, as expressed below:

```
// Image Preprocessing Configuration File
//type              param     library                function
IMGPREPR:                     libimgprepr_plugin.so.1->PluginImgprepr
IMGPREPR_PROGMD:              libimgprepr_plugin.so.1->PluginImgpreprProgmd
IMGPREPR_PROGBC:   libimgprepr_plugin.so.1->PluginImgpreprProgbc
```

Figure 23:
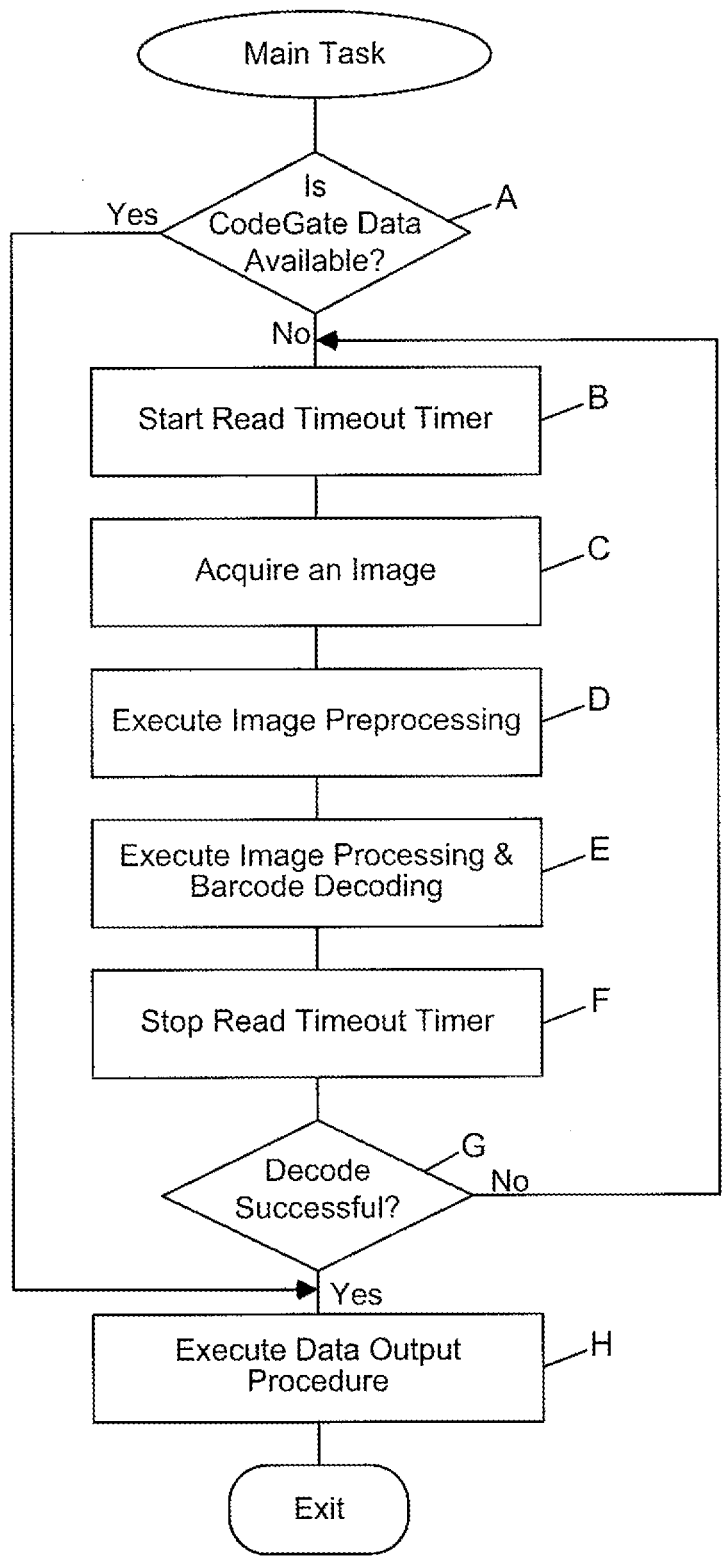
FIG. 23 is an exemplary flow chart representation showing what operations are carried out when the "Modifiable" Main Task is (enabled and) executed within the Application Layer of the system as shown in FIG. 10.
Figure 23A:
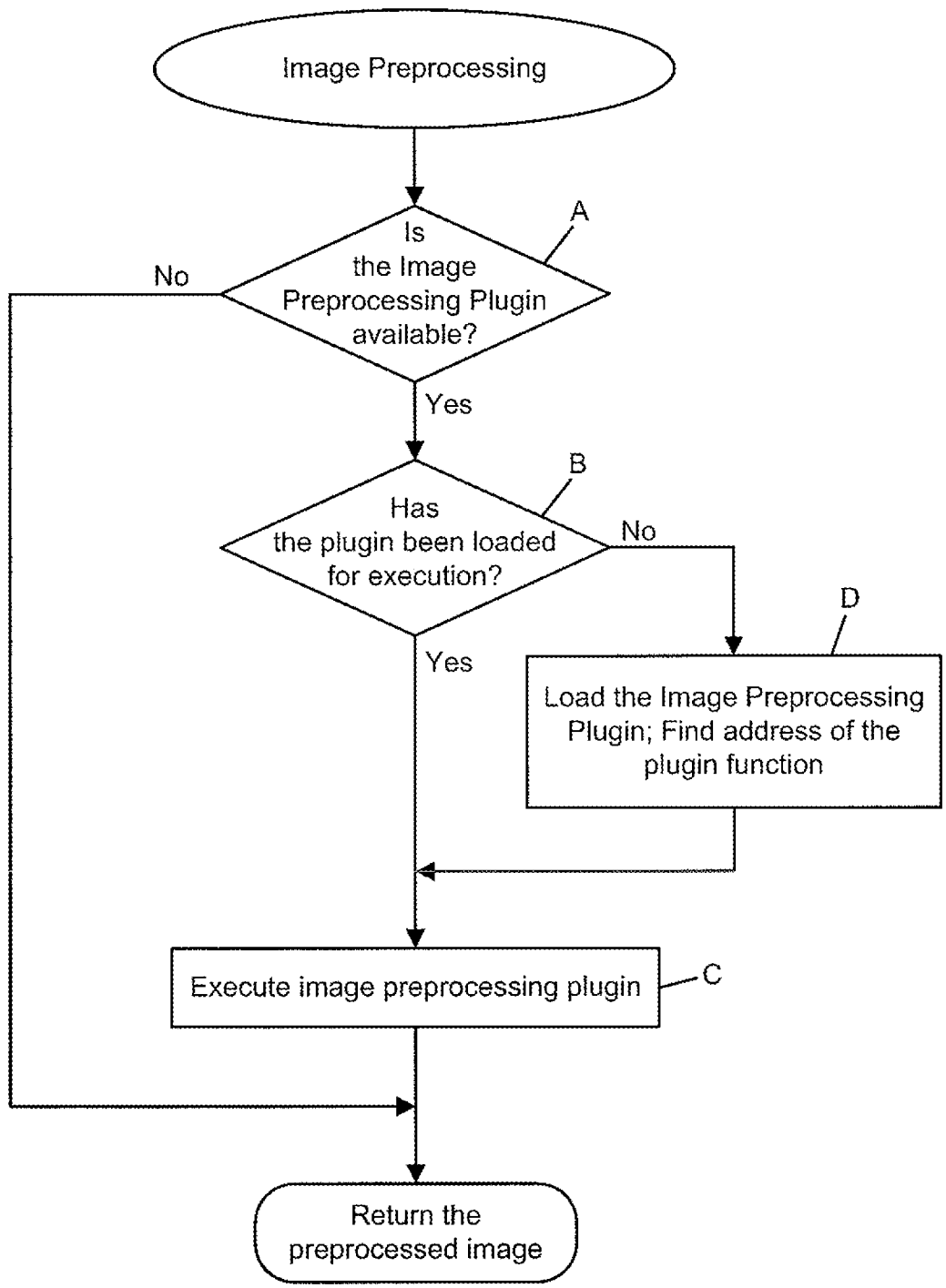
FIG. 23A is an exemplary flow chart representation showing what operations are carried out when the system feature called "Image Preprocessing" is executed within the Image-Processing Based Bar Code Symbol Reading Subsystem software module in the Application Layer of the system as shown in FIG. 10.

The block-diagram set forth in FIG. 23A illustrates the logic of the Image Preprocessing plug-in.

Figure 23B:
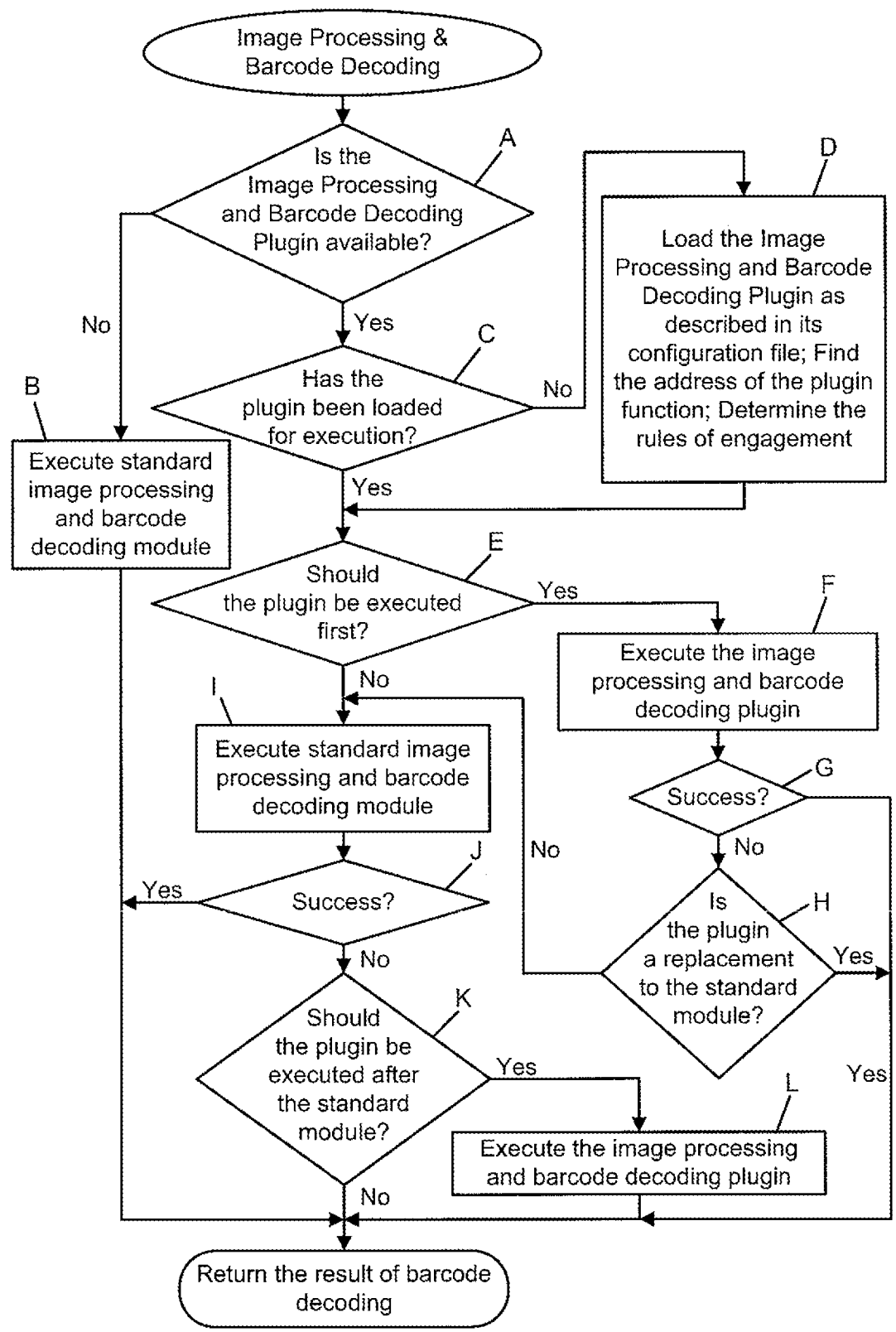
FIG. 23B is an exemplary flow chart representation showing what operations are carried out when the system feature called "Image Processing and Bar Code Decoding" is executed within the Modifiable Main Task software module in the Application Layer of the system as shown in FIG. 10.

Consider, as a second, more interesting example, the Image Processing and Barcode Decoding Plug-in described in FIG. 23B. The original equipment manufacturer of the Image-Processing Based Bar Code Symbol Reading System supplies the system's "standard" Image Processing and Barcode Decoding Module, which is normally executed by the Main Task after the system acquires an image, as indicated in FIG. 23. In accordance with the principles of the present invention, the customer can provide its own image processing and barcode decoding software as a plug-in module to the multi-tier software-based system. The plug-in can be described in a "Image Processing and Barcode Decoding Plug-in Configuration File", having a format, for example, as expressed below:

```
// Decode Plug-in Configuration File
//type    param    library              function
DECODE:   0x02:    libdecode_plugin.so.1    ->PluginDecode
``` wherein "DECODE" is a keyword identifying the image processing and barcode decoding plug-in; wherein "0x02" is the value identifying the plug-in's rules of engagement; wherein "libdecode_plugin.so.1" is the name of the plug-in library in the device's file system; and wherein "PluginDecode" is the name of the plug-in function that implements the customer-specific image processing and barcode decoding functionality.

The individual bits of the value "param", which is used as the value indicating the rules of this particular plug-in's engagement, can have the following meaning:

| bit | meaning |
| --- | --- |
| 0 | 0 = compliment standard; 1 = replace standard |
| 1 | (if bit0 == 0) 0 = call before standard func; 1 = call after standard func |

| bit | meaning |
|---|---|
| 2 | reserved |
| ... | ... |

The value "0x02", therefore, means that the customer plug-in is a complimentary, not a replacement, module (the bit "0" is 0), and it should be executed after the execution of the standard module (bit "1" is 1).

Figure 23C:
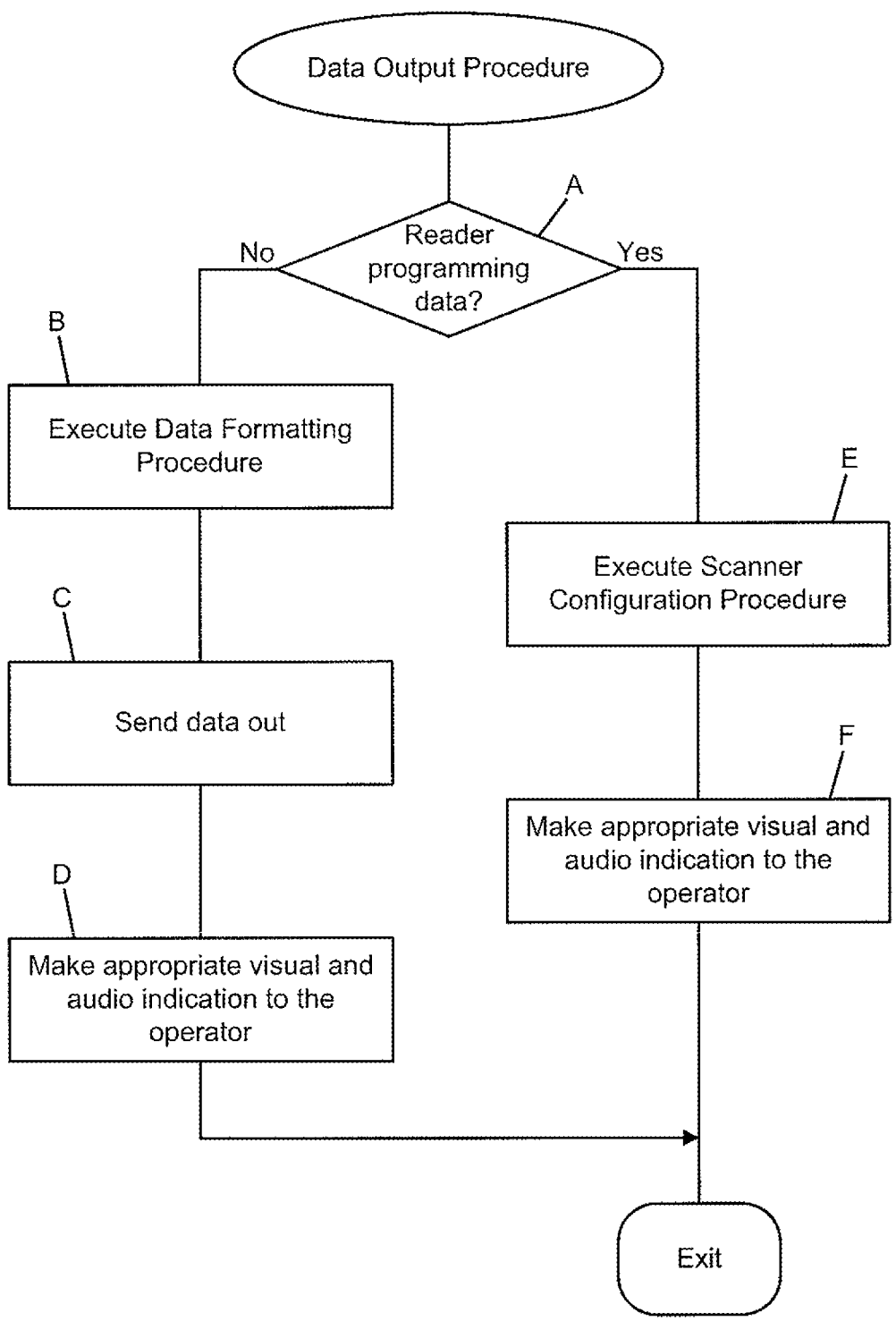
FIG. 23C is an exemplary flow chart representation showing what operations are carried out when the system feature called "Data Output Procedure" is executed within the Modifiable Main Task in the Application Layer of the system as shown in FIG. 10.

Consider, as a third example, the Image Processing and Barcode Decoding Plug-in described in FIG. 23C1. The original equipment manufacturer of the Image-Processing Based Bar Code Symbol Reading System supplies the system's "standard" Image Processing and Barcode Decoding Module, which is normally executed by the Main Task after the system acquires an image as indicated in FIG. 23. In accordance with the principles of the present invention, the customer can provide its own image processing and barcode decoding software as a plug-in module to the multi-tier software-based system. The plug-in can be described in a "Image Processing and Barcode Decoding Plug-in Configuration File", having a format, for example, as expressed below:

```
// Data Formatting Plug-in Configuration File
//type           param           library              function
PREFORMAT:            libformat_plugin.so.1->PluginPreformat
FORMAT_PROGMD:       libformat_plugin.so.1->PluginFormatProgmd
FORMAT_PROGBC:       libformat_plugin.so.1->PluginFormatProgbc
```

The block-diagram set forth in FIG. 23C1 illustrates the logic of the Data Formatting Procedure plug-in.

The Plug-Ins described above provide a few examples of the many kinds of plug-ins (objects) that be developed so that allowed features and functionalities of the system can be modified by persons other than the system designer, in accordance with the principles of the present invention. Other system features and functionalities for which Plug-in modules can be developed and installed within the Image-Processing Based Bar Code Symbol Reading System include, but are not limited to, control over functions supported and performed by the following systems: the IR-based Object Presence and Range Detection Subsystem 12; the Multi-Mode Area-type Image Formation and Detection (i.e. camera) Subsystem 13; the Multi-Mode LED-Based Illumination Subsystem 14; the Automatic Light Exposure Measurement and Illumination Control Subsystem 15; the Image Capturing and Buffering Subsystem 16; the Multi-Mode Image-Processing Bar Code Symbol Reading Subsystem 17; the Input/Output Subsystem 18; the manually-actuatable trigger switch 2C; the System Mode Configuration Parameter Table 70; the System Control Subsystem 18; and any other subsystems which may be integrated within the Image-Processing Based Bar Code Symbol Reading System.

Figure 11:
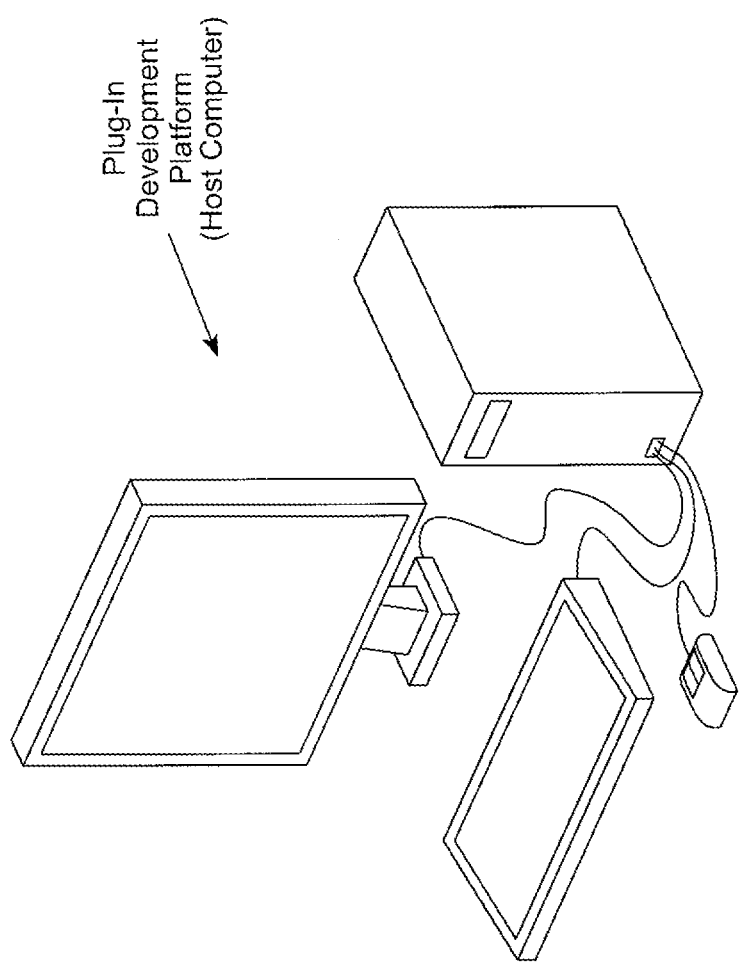
FIG. 11 is a perspective view of an illustrative embodiment of a computer software development platform for developing plug-ins for tasks within the application layer of the imaging-based bar code reading system of the present invention.

Having described the structure and function of Plug-In Modules that can be created by persons other than the OEM system designer, it is now in order to describe an illustrative embodiment of the Plug-In Development Platform of the present invention with reference to FIGS. 10 and 11.

In the illustrative embodiment, the system designer/OEM of the system (e.g. Metrologic Focus™1690 Image-Processing Bar Code Reader) will provide the plug-in developer with a CD that contains, for example, the following software tools:

Arm Linux Toolchain for Linux PC

This directory contains the Arm Linux cross-compiling toolchain package for IBM-compatible Linux PC.

Arm Linux Toolchain for Cygwin

This directory contains the Arm Linux cross-compiling toolchain package for IBM-compatible Windows PC. The Cygwin software must be installed prior to the usage of this cross-compiling toolchain.

Plug-in Samples

This directory contains sample plug-in development projects. The plug-in software must be compiled on the IBM-compatible Linux PC using the Arm Linux Toolchain for Linux PC or on Windows PC with installed Cygwin software using Arm Linux Toolchain for Cygwin.

FWZ Maker

This directory contains the installation package of the program FWZ Maker for Windows PC. This program is used to build the FWZ-files for downloading into the Focus 1690 scanner.

Latest Metrologic® Focus™ Software

This directory contains the FWZ-file with the latest Metrologic® Focus™ scanner software.

The first step of the plug-in software development process involves configuring the plug-in developer platform by installing the above tools on the host/developer computer system. The next step involves installing system software onto the Image-Processing Bar Code Reader, via the host plug-in developer platform using a communications cable between the communication ports of the system and the plug-in developer computer shown in FIGS. 10 and 11.

To develop plug-in software, a corresponding shared library can be developed on the plug-in developer platform (i.e. the Linux PC) or in Windows Cygwin, and then the proper plug-in configuration file. The plug-in configuration file is then be loaded to the "/usr" directory in the case of developing a plug-in for example, an image capture and receiving device, such as Metrologic's Focus™ image-processing bar code reader. In this illustrative embodiment, each line of the plug-in configuration file contains information about a plug-in function in the following format:

| plug-in type: | parameter: | filename | ->function_name |
|---|---|---|---| wherein plug-in type is one of the supported plug-in type keywords, followed by the field separator wherein parameter is a number (could be decimal or hex, if preceded with 0x), having a specific and unique meaning for some plug-in functions. The parameter is also called a "call-mode", for it can provide some specific information on how the plug-in should be called. The parameter is not required and can be omitted. If specified, the parameter must be followed by the field separator ":"; wherein filename is the name of the shared library, followed by the filename separator "->".

The filename can contain a full-path to the library. If the path is omitted, the library is assumed to be located in either "/usr/local/lib" or "/usr/lib/" directory in the Focus scanner. It is therefore important to make sure that the shared library is loaded to the correct directory in the Focus scanner, as specified by the plug-in configuration file; and
wherein function_name is the name of the corresponding plug-in C function.

Notably, that the configuration file can also contain single-line C-style comments.

It is within the discretion of the plug-in developer to decide which plug-in functions (of those supported by the system designer) should be included in the plug-in module (i.e. "object"). Once the shared library is built and configuration file is prepared on the plug-in development platform (illustrated in FIGS. 10 and 11), the plug-in developer can then generate the FWZ file and include the configuration file and the shared library in it using FWZ Maker program on the Windows PC. Thereafter, the FWZ file can be downloaded to Metrologic's Focus™ Image-processing bar code reader using, for example, Metrologic's Metroset program's Flash Utility tool.

In the case of installing plug-in software for Metrologic's Focus™ Image-processing bar code reader, it is recommended not to use dynamic memory allocation and have static buffers rather than allocating them dynamically. As far as the filesystem is concerned, if necessary to store data in a file, then the locations such as "/use" and "/usr/local" are recommended for storing data in non-volatile Flash memory; the "/tmp" directory can be used to store data in RAM.

Programming Barcodes and Programming Modes

In the illustrative embodiment, configuration of image-processing bar code reader of the present invention can be changed via scanning special programming barcodes, or by sending equivalent data to the reader from the host computer (i.e. plug-in development computer). Programming barcodes are usually Code 128 symbols with the Fn3 codeword.

When scanning a programming barcode, the reader may or may not be in its so-called programming mode. When the reader is not in its programming mode, the effect of the programming barcode is supposed to be immediate. On the other hand, when the reader is in its programming mode, the effect of all the programming barcodes read during the programming mode should occur at the time when the reader exits the programming mode.

There is a special set of programming barcodes reserved for the plug-in software configuration purposes. These barcodes have at least 4 data characters, and the first three data characters are "990". It is recommended (but not required) that the Decode Plug-in use programming barcodes having 6 characters long, starting with "9900xx". It is recommended (but not required) that the Image Preprocessing Plug-in use programming barcodes having 6 characters long, starting with "9901xx". It is recommended (but not required) that the Formatting Plug-in use programming barcodes having 6 characters long, starting with "9902xx".

Once a plug-in module has been developed in accordance with the principles of the present invention, the plug-in can be uninstalled by simply downloading an empty plug-in configuration file. For example, to uninstall a Decode plug-in, download an empty "decode.plugin" file into the "/usr" directory of the file system within the OS layer, shown in FIG. 10.

Details about the Decode Plug-in of the Illustrative Embodiment

The purpose of the Decode Plug-in is to provide a replacement or a complimentary barcode decoding software to the standard Focus barcode decoding. The Decode Plug-in can have the following plug-in functions:

DECODE; DECODE_ENABLE2D; DECODE_PROGMD; DECODE_PROGBC.

DECODE Plug-in Function

This function is called to perform a barcode decoding from the given image in memory. Image is represented in memory as a two-dimensional array of 8-bit pixels. The first pixel of the array represents the upper-left corner of the image.

Function Prototype:

```
int        /* Return: number of decoded barcodes; negative if error */
(*PLUGIN_DECODE)(
   void *p_image,           /* Input: pointer to the image */
   int size_x,              /* Input: number of columns */
   int size_y,              /* Input: number of rows */
   int pitch,               /* Input: row size, in bytes */
   DECODE_RESULT *p_decode_results, /* Output: decode results */
   int max_decodes,         /* Input: maximum decode results allowed
                               */
   int *p_cancel_flag);     /* Input: if not NULL, pointer to the
                               cancel flag */
```

Note that p_decode_results points to the location in memory where the Decode plug-in function should store one or more results of barcode decoding (if of course the plug-in successfully decodes one or more barcodes in the given image) in the form of the array of DECODE_RESULT structures. The maximum number of allowed decode results (i.e. the size of the array) is given in max_decodes. The plug-in must return the number of successfully decoded barcodes (i.e. the number of populated elements in the array p_decode_results), or a negative number in case of an error.

If p_cancel_flag is not NULL, it points to the integer flag (called "Cancel flag") that indicates whether the decoding process should continue or should stop as soon as possible. If the flag is 0, the decoding process can continue. If the flag is not zero, the decoding process must stop as soon as possible. The reason for aborting the decoding process could be, for example, a time out. It is recommended to check the Cancel flag often enough so that the latency on aborting the decoding process would be as short as possible.

Note that the Cancel flag is not the only way the Decoding plug-in (or any plug-in for that matter) can be aborted. Depending on the circumstances, the system can decide to abruptly kill the thread, in which the Decoding plug-in is running, at any time.

Structure DECODE_RESULT

The structure DECODE_RESULT has the following format:

```
#define MAX_DECODED_DATA_LEN  4096
#define MAX_SUPPL_DATA_LEN    128
typedef struct {
   int  x;
   int  y;
} BC_POINT;
typedef struct {
   BC_POINT  BCPts[4]; /* Coordinates of the 4 corners of the
      barcode */
} BC_BOUNDS;
```

The order of the array elements (i.e. corners) in BC_BOUNDS structure is as follows:
0—top left
1—top right
2—bottom right
3—bottom left

```
typedef struct {
int decode_result_index;      /* index of the decode result, starting from 0 */
int num_decode_results;       /* total number of decode results minus 1 (i.e. 0-based) */
char SymId[32];               /* the symbology identifier characters */
int Symbology;                /* the decoded barcode's symbology identifier number */
int Modifier;                 /* additional information of the decoded barcode */
int DecId;                    /* reserved */
int Class;                    /* 1 for ID, 2 for 2D */
unsigned char Data[MAX_DECODED_DATA_LEN]; /* decoded data - may contain null chars */
int Length;                   /* number of characters in the decoded barcode */
unsigned char SupplData[MAX_SUPPL_DATA_LEN]; /* supplemental code's data */
int SupplLength;              /* number of characters in the supplemental code's data */
unsigned char LinkedData[MAX_DECODED_DATA_LEN];
int LinkedLength;
BC_BOUNDS C_Bounds;           /* Bounds for the primary barcode */
BC_BOUNDS S_Bounds;           /* Bounds for the supplemental barcode */
} DECODE_RESULT;
```

The first two members of each populated DECODE_RESULT structure must contain a zero-based index of the decode result in the array (i.e. the first decode result must have decode_result_index=0, the second must have decode_result_index=1, and so on) and the zero-based total number of successfully decoded barcodes (which should equal the returned value minus 1).

The SymId member of DECODE_RESULT structure can have a string of up to 31 null-terminated characters describing the barcode symbology. It is used for informational purposes only. The following values are recommended for some known barcode symbologies.

| | |
|---|---|
| "AZTEC" | Aztec |
| "CBR" | Codabar |
| "CBK_A" | Codablock A |
| "CBK_F" | Codablock F |
| "C11" | Code 11 |
| "C128" | Code 128 |
| "C39" | Code 39 |
| "C93" | Code 93 |
| "DM" | Datamatrix |
| "S2O5" | Straight 2 of 5 |
| "I2O5" | Interleaved 2 of 5 |
| "MC" | MexiCode |
| "PDF" | Code PDF |
| "QR" | Code QR |
| "RSS-E" | Code RSS-E |
| "RSS-EST" | Code RSS-EST |
| "RSS14-LIM" | Code RSS Limited |
| "RSS14" | Code RSS-14 |
| "RSS14-ST" | Code RSS-ST |
| "UPC" | Code UPC/EAN |

The Symbology member of the DECODE_RESULT structure must contain the id of the decoded barcode symbology. The following symbology ids must be used for the known barcode symbologies:

| | |
|---|---|
| MBCD_SYM_C128 | Code 128 |
| MBCD_SYM_C39 | Code 39 |
| MBCD_SYM_ITF | Interleaved 2 of 5 |
| MBCD_SYM_C93 | Code 93 |
| MBCD_SYM_CBR | Codabar |
| MBCD_SYM_UPC | Code UPC/EAN |
| MBCD_SYM_TPEN | Telepen |
| MBCD_SYM_RSS14 | Code RSS-14 |
| MBCD_SYM_RSSE | Code RSS-E |
| MBCD_SYM_RSSL | Code RSS Limited |
| MBCD_SYM_MTF | Matrix 2 of 5 |
| MBCD_SYM_ATF | Airline 2 of 5 |
| MBCD_SYM_STF | Straight 2 of 5 |
| MBCD_SYM_MPLY | MSI Plessey |
| MBCD_SYM_C11 | Code 11 |
| MBCD_SYM_PDF | Code PDF |
| MBCD_SYM_PN | Postnet |
| MBCD_SYM_DM | Datamatrix |
| MBCD_SYM_MC | MaxiCode |
| MBCD_SYM_QR | Code QR |
| MBCD_SYM_AZ | Aztec |
| MBCD_SYM_MICROPDF | MicroPDF |
| MBCD_SYM_CBLA | 1Codablock A |
| MBCD_SYM_CBLF | Codablock F |
| MBCD_SYM_UNKNOWN | User-defined symbology |

The Modifier member of the DECODE_RESULT structure contains additional information about the decoded barcode. The values of the Modifier are usually bit-combinatory. They are unique for different symbologies, and many symbologies don't use it all. If the Modifier is not used, it should be set to 0. For some symbologies that support Modifier, the possible values are presented below.

| Coupon Modifier | |
|---|---|
| MBCD_MODIFIER_COUP | Coupon code |

| UPC Modifier Bit Flag Constants | |
|---|---|
| MBCD_MODIFIER_UPCA | UPC-A |
| MBCD_MODIFIER_UPCE | UPC-E |
| MBCD_MODIFIER_EAN8 | EAN-8 |
| MBCD_MODIFIER_EAN13 | EAN-13 |
| MBCD_MODIFIER_SUPP2 | 2-digit supplement |
| MBCD_MODIFIER_SUPP5 | 5 digit supplement |

| Code 128 Modifier Bit Flag Constants | |
|---|---|
| MBCD_MODIFIER_C128A | Code 128 with A start character |
| MBCD_MODIFIER_C128B | Code 128 with B start character |
| MBCD_MODIFIER_C128C | Code 128 with C start character, but not an EAN128 |
| MBCD_MODIFIER_EAN128 | EAN-128 |
| MBCD_MODIFIER_PROG | Programming label (overrides all other considerations) |

| Code 128 Modifier Bit Flag Constants | |
| --- | --- |
| MBCD_MODIFIER_AIM_AI | Code 128 with AIM Application indicator |

| Code 39 Modifier Bits Flag Constands | |
| --- | --- |
| MBCD_MODIFIER_ITPHARM | Italian Pharmaceutical |

| Codabar Modifier Bit Flag Constants | |
| --- | --- |
| MBCD_MODIFIER_CBR_DF | Double-Field Codabar |

| POSTNET iModifier Bit Flag Constants | |
| --- | --- |
| MBCD_MODIFIER_PN | POSTNET |
| MBCD_MODIFIER_JAP | Japan Post |
| MBCD_MODIFIER_AUS | Australia Post |
| MBCD_MODIFIER_PLANET | PLANET |
| MBCD_MODIFIER_RM | Royal Mail |
| MBCD_MODIFIER_KIX | KIX Code |
| MBCD_MODIFIER_UPU57 | UPU (57-bar) |
| MBCD_MODIFIER_UPU75 | UPU (75-bar) |

| Datamatrix Modifier Bit Flag Constants | |
| --- | --- |
| MBCD_MODIFIER_ECC140 | ECC 000-140 |
| MBCD_MODIFIER_ECC200 | ECC 200 |
| MBCD_MODIFIER_FNC15 | ECC 200, FNC1 in first or fifth position |
| MBCD_MODIFIER_FNC26 | ECC 200, FNC1 in second or sixth position |
| MBCD_MODIFIER_ECI | ECC 200, ECI protocol implemented |
| MBCD_MODIFIER_FNC15_ECI | ECC 200, FNC1 in first or fifth position, ECI protocol |
| MBCD_MODIFIER_FNC26_ECI | ECC 200, FNC1 in second or sixth position, ECI protocol |
| MBCD_MODIFIER_RP | Reader Programming Code |

| MaxiCode Modifier Bit Flag Constants | |
| --- | --- |
| MBCD_MODIFIER_MZ | Symbol in Mode 0 |
| MBCD_MODIFIER_M45 | Symbol in Mode 4 or 5 |
| MBCD_MODIFIER_M23 | Symbol in Mode 2 or 3 |
| MBCD_MODIFIER_M45_ECI | Symbol in Mode 4 or 5, ECI protocol |
| MBCD_MODIFIER_M23_ECI | Symbol in Mode 2 or 3, ECI protocol |

The DecId member of the DECODE_RESULT structure is currently not used and should be set to 0.

The Class member of the DECODE_RESULT structure must be set either to 1 or 2. If the decoded barcode is a regular linear barcode, such as UPC, Code 39, RSS, etc., the Class should be set to 1. If the decoded barcode is a 2D symbology, such as Code PDF, Datamatrix, Aztec, MaxiCode, etc., the Class should be set to 2.

The Data member of the DECODE_RESULT structure contains the decoded data. It can contain up to MAX_DECODED_DATA_LEN bytes of data.

The Length member of the DECODE_RESULT structure specifies how many bytes of decoded data are stored in Data.

The SupplData member of the DECODE_RESULT structure contains the data decoded in a supplemental part of the barcode, such as a coupon. It can contain up to MAX_DECODED_DATA_LEN bytes of data.

The SupplLength member of the DECODE_RESULT structure specifies how many bytes of decoded data are stored in SupplData.

The LinkedData member of the DECODE_RESULT structure contains the data decoded in a secondary part of the composite barcode, such as RSS/PDF composite. It can contain up to MAX_DECODED_DATA_LEN bytes of data.

The LinkedLength member of the DECODE_RESULT structure specifies how many bytes of decoded data are stored in LinkedData.

The C_Bounds and S_Bounds members of the DECODE_RESULT structure are currently not used.

DECODE Plug-in Call-Mode

The DECODE plug-in can have the following call-mode values:

bit value
0<--0=compliment standard; 1=replace standard
1<--(if bit0==0) 0=call before standard function; 1=call after standard function The default call-mode value is 0, meaning that by default, the DECODE plug-in is considered a complimentary module to standard Focus barcode decoding software and is executed before the standard function. In this case, the standard function will be called only if the result returned from DECODE plug-in is not negative and less than max_decodes.

DECODE_ENABLE2D Plug-in Function

This function is called to notify the plug-in that the scanner enters a mode of operation in which decoding of 2D symbologies (such as PDF417, Datamatrix, etc.) should be either allowed or disallowed. By default, the decoding of 2D symbologies is allowed.

Function Prototype:

```
void
(*PLUGIN_ENABLE2D)(int enable); /* Input: 0 = disable; 1 = enable */
```

For example, when the Focus scanner is configured to work in linear mode (as opposed to omni-directional mode), the decoding of 2D symbologies is disallowed.

DECODE_PROGMD Plug-in Function

This function is called to notify the plug-in that the scanner enters a programming mode.

Function Prototype:

```
void
(*PLUGIN_PROGMD)(int progmd);   /* Input: 1 = enter; 0 = normal exit; (−1) = abort */
```

DECODE_PROGBC Plug-in Function

This function is called to notify the plug-in that the scanner just scanned a programming barcode, which can be used by the plug-in for its configuration purposes.

Function Prototype:

```
int       /* Return: 1 if successful; 0 if barcode is invalid; negative if error */
(*PLUGIN_PROGBC)(unsigned char *bufferptr,
    int data_len);
```

Details about the Image Preprocessing Plug-in of the Illustrative Embodiment of the Present Invention The purpose of the Image Preprocessing Plug-in is to allow the plug-in to perform some special image processing right after the image acquisition and prior to the barcode decoding. The Image Preprocessing Plug-in can have the following plug-in functions:
IMGPREPR; IMGPREPR_PROGMD; IMGPREPR_PROGBC.

IMGPREPR Plug-in Function

This function is called to perform an image preprocessing. The image is represented in memory as a two-dimensional array of 8-bit pixels. The first pixel of the array represents the upper-left corner of the image.
Function Prototype:

```
int         /* Return: 1 if preprocessing is done; 0 if not; neg. if error */
(*PLUGIN_IMGPREPR)(
void *p_image,              /* Input: pointer to the image */
int size_x,                 /* Input: number of columns */
int size_y,                 /* Input: number of rows */
int pitch,                  /* Input: row size, in bytes */
void **pp_new_image,        /* Output: pointer to the new image */
int *p_new_size_x,          /* Output: new number of columns */
int *p_new_size_y,          /* Output: new number of rows */
int *p_new_pitch);          /* Output: new row size, in bytes */
```

If the IMGPREPR plug-in function is successful, it should return 1 and store the address of the new image in the location in memory pointed to by pp_new_image. The new image dimensions should be stored in the locations pointed to by p_new_size_x, p_new_size_y, and p_new_pitch.

If the preprocessing is not performed for whatever reason, the IMGPREPR plug-in function must return 0.

The negative returned value indicates an error.

IMGPREPR_PROGMD Plug-in Function

This function is called to notify the plug-in that the scanner enters a programming mode.
Function Prototype:

```
void
(*PLUGIN_PROGMD)(int progmd);   /* Input: 1 = enter; 0 = normal
                                   exit; (-1) = abort */
```

IMGPREPR_PROGBC Plug-in Function

This function is called to notify the plug-in that the scanner just scanned a programming barcode, which can be used by the plug-in for its configuration purposes.
Function Prototype:

```
int         /* Return: 1 if successful; 0 if barcode is invalid; negative if
    error */
(*PLUGIN_PROGBC)(unsigned char *bufferptr,
    int data_len);
```

Details about Formatting Plug-in of the Illustrative Embodiment

The purpose of the Formatting Plug-in is to provide a replacement or complimentary software to the standard Focus data formatting software. The Formatting Plug-in configuration file must have the name "format.plugin" and loaded in the "/usr" directory in the Focus scanner.

The Formatting Plug-in can currently have the following plug-in functions:
PREFORMAT; FORMAT_PROGMD; FORMAT_PROGBC.

PREFORMAT Plug-in Function

This function is called to perform a necessary transformation of the decoded barcode data prior to the data being actually formatted and sent out.
Function Prototype:

```
int         /* Return: 1 if preformat is done; 0 if not; neg. if error */
(*PLUGIN_PREFORMAT)(
DECODE_RESULT *decode_results,          /* Input: decode results */
DECODE_RESULT *new_decode_results);     /* Output: preformatted
decode results */
```

If the PREFORMAT plug-in function is successful, it should return 1 and store the new decode result in the location in memory pointed to new_decode_results.

If the preformatting is not performed for whatever reason, the PREFORMAT plug-in function must return 0.

The negative returned value indicates an error.

For the details about the DECODE_RESULT structure, please refer to the section DECODE Plug-in Function.

FORMAT_PROGMD Plug-in Function

This function is called to notify the plug-in that the scanner enters a programming mode.
Function Prototype:

```
void
(*PLUGIN_PROGMD)(int progmd);   /* Input: 1 = enter; 0 = normal
                                   exit; (-1) = abort */
```

FORMAT_PROGBC Plug-in Function

This function is called to notify the plug-in that the scanner just scanned a programming barcode, which can be used by the plug-in for its configuration purposes.
Function Prototype:

```
int         /* Return: 1 if successful; 0 if barcode is invalid; negative if
    error */
(*PLUGIN_PROGBC)(unsigned char *bufferptr,
    int data_len);
```

The method of system feature/functionality modification described above can be practiced in diverse application environments which are not limited to image-processing based bar code symbol reading systems described hereinabove. In general, any image capture and processing system or device that supports an application software layer and at least an image capture mechanism and an image processing mechanism would be suitable for the practice of the present invention. Thus, image-capturing cell phones, digital cameras, video cameras, and portable or mobile computing terminals and portable data terminals (PDTs) are all suitable systems in which the present invention can be practiced.

Also, it is understood that the application layer of the image-processing bar code symbol reading system of the present invention, illustrated in FIG. 10, with the above-described facilities for modifying system features and functionalities using the plug-in development techniques described above, can be ported over to execute on conventional mobile computing devices, PDAs, pocket personal computers (PCs), and other portable devices supporting image capture and processing functions, and being provided with suitable user and communication interfaces.

The Image Capture and Processing System of the present invention described above can be implemented on various hardware computing platforms such as Palm®, PocketPC®, MobilePC®, JVM®, etc. equipped with CMOS sensors, trigger switches etc. In such illustrative embodiments, the 3-tier system software architecture of the present invention can be readily modified by replacing the low-tier Linux OS (described herein) with any operating system (OS), such as Palm, PocketPC, Apple OSX, etc. Furthermore, provided that the mid-tier SCORE subsystem described hereinabove supports a specific hardware platform equipped with an image sensor, trigger switch of one form or another etc., and that the same (or similar) top-tier "Bar Code Symbol Reading System" Application is compiled for that platform, any universal (mobile) computing device can be transformed into an Image Acquisition and Processing System having the bar code symbol reading functionalities of the system shown in FIGS. 2A through 13F, and described in detail hereinabove. In such alternative embodiments of the present invention, third-party customers can be permitted to write their own software plug-ins to enhance or modify the behavior of the Image Acquisition and Processing Device, realized on the universal mobile computing platform, without any required knowledge of underlying hardware platform, communication protocols and/or user interfaces.

Some Modifications which Readily Come to Mind

In alternative embodiments of the present invention, illumination arrays 27, 28 and 29 employed within the Multi-Mode Illumination Subsystem 14 may be realized using solid-state light sources other than LEDs, such as, for example, visible laser diode (VLDs) taught in great detail in WIPO International Publication No. WO 02/43195 A2, published on May 30, 2002, assigned to Metrologic Instruments, Inc., and incorporated herein by reference in its entirety as if set forth fully herein. However, when using VLD-based illumination techniques in the imaging-based bar code symbol reader of the present invention, great care must be taken to eliminate or otherwise substantially reduce speckle-noise generated at the image detection array 22 when using coherent illumination source during object illumination and imaging operations. WIPO Publication No. WO 02/43195 A2, supra, provides diverse methods of and apparatus for eliminating or substantially reducing speckle-noise during image formation and detection when using VLD-based illumination arrays.

While CMOS image sensing array technology was described as being used in the preferred embodiments of the present invention, it is understood that in alternative embodiments, CCD-type image sensing array technology, as well as other kinds of image detection technology, can be used.

The bar code reader design described in great detail hereinabove can be readily adapted for use as an industrial or commercial fixed-position bar code reader/imager, having the interfaces commonly used in the industrial world, such as Ethernet TCP/IP for instance. By providing the system with an Ethernet TCP/IP port, a number of useful features will be enabled, such as, for example: multi-user access to such bar code reading systems over the Internet; control of multiple bar code reading system on the network from a single user application; efficient use of such bar code reading systems in live video operations; web-servicing of such bar code reading systems, i.e. controlling the system or a network of systems from an Internet Browser; and the like.

While the illustrative embodiments of the present invention have been described in connection with various types of bar code symbol reading applications involving 1-D and 2-D bar code structures, it is understood that the present invention can be use to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

Also, imaging-based bar code symbol readers of the present invention can also be used to capture and process various kinds of graphical images including photos and marks printed on driver licenses, permits, credit cards, debit cards, or the like, in diverse user applications.

It is understood that the image capture and processing technology employed in bar code symbol reading systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

The invention claimed is:

1. An image capture and processing system, comprising:
   an image formation and detection subsystem;
   an image capturing subsystem for capturing images detected by said image formation and detection subsystem;
   an image processing subsystem for processing images captured by said image capturing subsystem;
   a processing device; and
   memory comprising processing instructions that, when executed by said processing device, execute an application for reading indicia within said processed images;
   wherein said memory comprises a memory architecture that supports a multi-tier modular software architecture characterized by an operating system (OS) layer and an application layer in which said application for reading indicia is run.

2. The image capture and processing system according to claim 1, comprising an input/output subsystem for transmitting signals to an external system.

3. The image capture and processing system according to claim 2, comprising an image buffering subsystem for buffering images detected by said image formation and detection subsystem.

4. The image capture and processing system according to claim 2, wherein said multi-tier modular software architecture comprises an intermediate layer disposed between said application layer and said OS layer.

5. The image capture and processing system according to claim 4, wherein:
   said OS layer comprises one or more software modules comprising an OS kernal module, an OS file system module, and/or a device driver module;
   said intermediate layer comprises one or more software modules comprising a tasks manager module, an events dispatcher module, an input/output manager module, a user commands manager module, a timer subsystem module, an input/output subsystem module, and/or a memory control subsystem module; and
   said application layer comprises one or more software modules comprising an indicia decoding module, a function programming module, an application events manager module, a user commands table module, and/or a command handler module.

6. The image capture and processing system according to claim 4, wherein, prior to capturing images, said processing device is configured to: (1) access one or more software modules from said OS layer and executing code contained therein; (2) access one or more software modules from said intermediate layer and executing code contained therein; and (3) access one or more software modules from said application layer and executing code contained therein.

7. The image capture and processing system according to claim 1, comprising at least one light emitting diode (LED) for producing narrow-band illumination.

8. The image capture and processing system according to claim 1, wherein said image processing subsystem processes images to read one or more indicia graphically represented therein and produces symbol character data representative of said read one or more indicia.

9. The image capture and processing system according to claim 8, wherein said one or more indicia comprise 1D bar code symbols, 2D bar code symbols, and/or data matrix type code symbol structures.

10. The digital image capture and processing system according to claim 1, comprising an automatic object detection subsystem;
wherein said image formation and detection subsystem has a field of view (FOV); and
wherein said automatic object detection subsystem automatically detects the presence of an object in the FOV, and in response thereto, generates a trigger signal.

11. An image capture and processing system, comprising:
an image formation and detection subsystem;
an image capturing subsystem for capturing images detected by said image formation and detection subsystem;
an image processing subsystem for processing images captured by said image capturing subsystem;
an input/output subsystem for transmitting signals to an external system;
a processing device;
memory comprising processing instructions that, when executed by said processing device, execute an application for reading indicia within said processed images;
Flash ROM for storing said application; and
RAM for storing said images captured by said image capturing subsystem;
wherein said memory comprises a memory architecture that supports a multi-tier modular software architecture characterized by an operating system (OS) layer and an application layer in which said application for reading indicia is run.

12. The image capture and processing system according to claim 11, comprising an image buffering subsystem for buffering images detected by said image formation and detection subsystem.

13. The image capture and processing system according to claim 11, wherein said multi-tier modular software architecture comprises an intermediate layer disposed between said application layer and said OS layer.

14. The image capture and processing system according to claim 13, wherein:
said OS layer comprises one or more software modules comprising an OS kernal module, an OS file system module, and/or a device driver module;
said intermediate layer comprises one or more software modules comprising a tasks manager module, an events dispatcher module, an input/output manager module, a user commands manager module, a timer subsystem module, an input/output subsystem module, and/or a memory control subsystem module; and
said application layer comprises one or more software modules comprising an indicia decoding module, a function programming module, an application events manager module, a user commands table module, and/or a command handler module.

15. The image capture and processing system according to claim 11, wherein, prior to capturing images, said processing device is configured to: (1) access one or more software modules from said OS layer and executing code contained therein; (2) access one or more software modules from said intermediate layer and executing code contained therein; and (3) access one or more software modules from said application layer and executing code contained therein.

16. The image capture and processing system according to claim 11, wherein said memory maintains system parameters used to configure functions of the image capture and processing system.

17. An image capture and processing system, comprising:
an image formation and detection subsystem;
an image capturing subsystem for capturing images detected by said image formation and detection subsystem;
an image processing subsystem for processing images captured by said image capturing subsystem;
an input/output subsystem for transmitting signals to an external system;
a processing device; and
memory comprising processing instructions that, when executed by said processing device, execute an application for reading indicia within said processed images;
wherein said memory comprises a memory architecture that supports a multi-tier modular software architecture characterized by an operating system (OS) layer and an application layer in which said application for reading indicia is run; and
wherein said application layer comprises one or more software modules comprising an indicia decoding module, a function programming module, an application events manager module, a user commands table module, and/or a command handler module.

18. The image capture and processing system according to claim 17, wherein said OS layer comprises one or more software modules comprising an OS kernal module, an OS file system module, and/or a device driver module.

19. The image capture and processing system according to claim 17, wherein said multi-tier modular software architecture comprises an intermediate layer disposed between said application layer and said OS layer.

20. The image capture and processing system according to claim 19, wherein said intermediate layer comprises one or more software modules comprising a tasks manager module, an events dispatcher module, an input/output manager module, a user commands manager module, a timer subsystem module, an input/output subsystem module, and/or a memory control subsystem module.

* * * * *